United States Patent
Kats et al.

(10) Patent No.: US 11,368,575 B2
(45) Date of Patent: Jun. 21, 2022

(54) MANAGEMENT OF CALLS AND MEDIA CONTENT ASSOCIATED WITH A CALLER ON MOBILE COMPUTING DEVICES

(71) Applicant: Vyng, Inc., Venice, CA (US)

(72) Inventors: Paul Kats, Los Angeles, CA (US); Jeffrey Chernick, Venice Beach, CA (US); Mark Randall Goldston, Beverly Hills, CA (US); Sohrab Pirayesh, Los Angeles, CA (US)

(73) Assignee: VYNG, INC., Manhattan Beach, CA (US)

( * ) Notice: Subject to any disclaimer, the term of this patent is extended or adjusted under 35 U.S.C. 154(b) by 0 days.

(21) Appl. No.: 16/659,330

(22) Filed: Oct. 21, 2019

(65) Prior Publication Data

US 2020/0053214 A1 Feb. 13, 2020

Related U.S. Application Data

(63) Continuation of application No. PCT/US2018/064962, filed on Dec. 11, 2018, and a
(Continued)

(51) Int. Cl.
*H04M 3/42* (2006.01)
*H04M 19/04* (2006.01)
(Continued)

(52) U.S. Cl.
CPC ..... *H04M 3/42051* (2013.01); *H04M 1/2757* (2020.01); *H04M 1/576* (2013.01);
(Continued)

(58) Field of Classification Search
CPC ....... H04L 51/18; H04L 51/22; H04L 51/046; H04L 51/10; H04L 65/1069; H04L 41/22;
(Continued)

(56) References Cited

U.S. PATENT DOCUMENTS 7,412,049 B1   8/2008   Koch
7,904,067 B1   3/2011   Tiwari et al.
(Continued)

FOREIGN PATENT DOCUMENTS

CN   103931165 A   7/2014
CN   104335612 A   2/2015
(Continued)

OTHER PUBLICATIONS

USPTO, "U.S. Appl. No. 15/469,772 Notice of Allowance dated Oct. 11, 2017", 8 pages.
(Continued)

*Primary Examiner* — Kwasi Karikari
(74) *Attorney, Agent, or Firm* — RMCK Law Group, PLC

(57) ABSTRACT

Call originator feedback may be gathered from members of a call group for a call originator. This feedback may be stored in a contact firewall data structure indexed by call originator identification information, where a contact firewall function can intercept a call to a member of the group when the contact firewall data structure indicates that an action to impact the call should be taken. In another aspect, a method may include receiving an indication of no-answer by a recipient of a call, activating a sender-controlled media (SCM) content selection/generation interface on the caller's phone, and delivering the item of content to the recipient's call message storage system, where the item of content is linked to the missed call. For example, a SCM data structure, or a link to the SCM data structure, may be delivered to the recipient's call message storage system.

27 Claims, 62 Drawing Sheets

Related U.S. Application Data continuation-in-part of application No. 16/158,000, filed on Oct. 11, 2018, now Pat. No. 10,511,711, which is a continuation of application No. 15/725,645, filed on Oct. 5, 2017, now Pat. No. 10,104,228, which is a continuation-in-part of application No. 15/469,772, filed on Mar. 27, 2017, now Pat. No. 9,871,902, which is a continuation of application No. 15/142,200, filed on Apr. 29, 2016, now Pat. No. 9,609,124, said application No. 15/725,645 is a continuation-in-part of application No. PCT/US2016/030083, filed on Apr. 29, 2016.

(60) Provisional application No. 62/597,309, filed on Dec. 11, 2017, provisional application No. 62/155,706, filed on May 1, 2015, provisional application No. 62/459,742, filed on Feb. 16, 2017, provisional application No. 62/486,495, filed on Apr. 18, 2017.

(51) Int. Cl.
| H04M 1/57 | (2006.01) |
| H04M 1/2757 | (2020.01) |
| H04M 1/72403 | (2021.01) |
| H04M 1/72439 | (2021.01) |

(52) U.S. Cl.
CPC ... *H04M 1/72403* (2021.01); *H04M 1/72439* (2021.01); *H04M 3/42042* (2013.01); *H04M 19/04* (2013.01); *H04M 19/041* (2013.01); *H04M 2201/50* (2013.01); *H04M 2203/306* (2013.01)

(58) Field of Classification Search
CPC ......... H04W 4/80; H04W 12/06; H04W 4/12; H04W 12/00503; H04W 88/02
See application file for complete search history.

(56) References Cited

U.S. PATENT DOCUMENTS

| 7,995,728 B1 | 8/2011 | Martin et al. |
| 8,548,418 B1 | 10/2013 | Jintaseranee et al. |
| 8,576,270 B1* | 11/2013 | Vitale ............ H04M 3/53308 348/14.01 |
| 9,002,410 B2 | 4/2015 | Tsui et al. |
| 9,203,954 B1 | 12/2015 | Van Rensburg et al. |
| 9,304,621 B1 | 4/2016 | Wakim et al. |
| 9,609,124 B2 | 3/2017 | Kats et al. |
| 9,871,902 B2 | 1/2018 | Kats et al. |
| 9,929,998 B1 | 3/2018 | Soundararajan et al. |
| 10,104,228 B2 | 10/2018 | Kats et al. |
| 10,511,711 B2 | 12/2019 | Kats et al. |
| 2004/0005880 A1 | 1/2004 | Shanahan et al. |
| 2005/0143103 A1 | 6/2005 | Bjorgan et al. |
| 2005/0180554 A1 | 8/2005 | Alston |
| 2006/0110185 A1 | 5/2006 | Lee |
| 2006/0140200 A1 | 6/2006 | Black et al. |
| 2006/0199570 A1 | 9/2006 | Vendrow |
| 2006/0291641 A1 | 12/2006 | Barclay et al. |
| 2006/0291841 A1 | 12/2006 | Fukumoto et al. |
| 2007/0161382 A1 | 7/2007 | Melinger et al. |
| 2007/0189488 A1 | 8/2007 | Stoops |
| 2007/0211872 A1 | 9/2007 | Cai et al. |
| 2007/0230678 A1 | 10/2007 | Bloebaum et al. |
| 2007/0297599 A1 | 12/2007 | Sylvain |
| 2008/0137828 A1 | 6/2008 | Chmaytelli |
| 2008/0162731 A1 | 7/2008 | Kauppinen et al. |
| 2008/0219425 A1 | 9/2008 | Wang |
| 2008/0220816 A1 | 9/2008 | Ryu et al. |
| 2008/0235104 A1 | 9/2008 | Chow et al. |
| 2009/0029721 A1 | 1/2009 | Doraswamy |
| 2009/0041222 A1 | 2/2009 | Guven |
| 2009/0067602 A1 | 3/2009 | Rudolph |
| 2009/0113005 A1 | 4/2009 | Gregg et al. |
| 2009/0318196 A1 | 12/2009 | Sakakura et al. |
| 2010/0014647 A1 | 1/2010 | Subramaniam |
| 2010/0146437 A1 | 6/2010 | Woodcock et al. |
| 2010/0150332 A1 | 6/2010 | Soo |
| 2010/0274847 A1 | 10/2010 | Anderson et al. |
| 2011/0014932 A1 | 1/2011 | Estevez et al. |
| 2011/0051914 A1 | 3/2011 | Neuman et al. |
| 2011/0313861 A1 | 12/2011 | Lawrence, III et al. |
| 2011/0314390 A1 | 12/2011 | Park et al. |
| 2012/0036440 A1 | 2/2012 | Dare et al. |
| 2012/0102409 A1 | 4/2012 | Fan et al. |
| 2012/0158863 A1 | 6/2012 | Kikin-Gil et al. |
| 2012/0190333 A1 | 7/2012 | Portman et al. |
| 2012/0209850 A1 | 8/2012 | Kikin-Gil et al. |
| 2013/0072164 A1 | 3/2013 | Balannik et al. |
| 2013/0093719 A1 | 4/2013 | Tokutake et al. |
| 2013/0293663 A1 | 11/2013 | Chang et al. |
| 2013/0303151 A1 | 11/2013 | Johnson |
| 2014/0018113 A1 | 1/2014 | Wosk et al. |
| 2014/0095576 A1 | 4/2014 | Edamadaka et al. |
| 2014/0128047 A1 | 5/2014 | Edwards et al. |
| 2014/0169539 A1* | 6/2014 | Mumick ............ H04M 3/48 379/88.23 |
| 2015/0103990 A1 | 4/2015 | Lee |
| 2015/0206000 A1 | 7/2015 | El Kaliouby et al. |
| 2015/0213490 A1 | 7/2015 | Oikonomidis |
| 2015/0229781 A1 | 8/2015 | Ashton |
| 2015/0269623 A1 | 9/2015 | Andersson |
| 2015/0278872 A1 | 10/2015 | Raghavan et al. |
| 2016/0142540 A1 | 5/2016 | Hickey et al. |
| 2016/0171981 A1 | 6/2016 | Mohajer et al. |
| 2016/0219142 A1 | 7/2016 | Brown |
| 2017/0201608 A1 | 7/2017 | Kats et al. |
| 2017/0220556 A1 | 8/2017 | Pasternack |
| 2018/0048762 A1 | 2/2018 | Kats et al. |
| 2019/0045052 A1 | 2/2019 | Kats et al. |
| 2020/0053206 A1 | 2/2020 | Kats et al. |
| 2020/0053207 A1 | 2/2020 | Kats et al. |
| 2020/0053208 A1 | 2/2020 | Kats et al. |
| 2020/0053209 A1 | 2/2020 | Kats et al. |
| 2020/0053210 A1 | 2/2020 | Kats et al. |
| 2020/0053211 A1 | 2/2020 | Kats et al. |
| 2020/0053212 A1 | 2/2020 | Kats et al. |
| 2020/0053213 A1 | 2/2020 | Kats et al. |
| 2020/0053215 A1 | 2/2020 | Kats et al. |

FOREIGN PATENT DOCUMENTS

| CN | 107258098 A | 10/2017 |
| EP | 3222069 A1 | 9/2017 |
| WO | WO-2016178984 | 11/2016 |

OTHER PUBLICATIONS

USPTO, "U.S. Appl. No. 15/725,645 Non-Final Office Action dated Apr. 9, 2018", 13 pages.
USPTO, "U.S. Appl. No. 15/725,645 Notice of Allowance dated Aug. 13, 2018", 7 pages.
USPTO, "U.S. Appl. No. 16/158,000 Non-Final Office Action dated Dec. 20, 2018", 11 pages.
USPTO, "U.S. Appl. No. 16/158,000 Notice of Allowance dated Jun. 19, 2019", 8 pages.
USPTO, "U.S. Appl. No. 16/158,000 Notice of Allowance dated Nov. 6, 2019", 8 pages.
USPTO, "U.S. Appl. No. 15/142,200, Non-Final Office Action dated Jul. 28, 2016", 13 pages.
USPTO, "U.S. Appl. No. 15/142,200,Notice of Allowance dated Jan. 20, 2017", 12 pages.
USPTO, "U.S. Appl. No. 15/469,772, Non-Final Office Action dated Jun. 30, 2017", 16 pages.
WIPO, "PCT Application No. PCT/US16/30083 International Preliminary Report on Patentability dated Nov. 16, 2017", 10 pages.
ISA, "PCT Application No. PCT/US16/30083 International Search Report and Written Opinion dated Jul. 29, 2016", 11 pages.

(56) References Cited

OTHER PUBLICATIONS

ISA, "PCT Application No. PCT/US18/64962 International Search Report and Written Opinion dated Aug. 14, 2019", 29 pages.
USPTO, "U.S. Appl. No. 16/659,278 Non-Final Office Action dated Mar. 3, 2020", 14 pages.
USPTO, "U.S. Appl. No. 16/659,201, Non-Final Office Action dated Feb. 14, 2020", 10 pages.
USPTO, "U.S. Appl. No. 16/658,887, Non-Final Office Action dated Jan. 29, 2020", 18 pages.
USPTO, "U.S. Appl. No. 16/659,003, Notice of Allowance dated Feb. 3, 2020", 10 pages.
USPTO, "U.S. Appl. No. 16/659,116, Non-Final Office Action dated Jan. 31, 2020", 12 pages.
U.S. Appl. No. 62/155,706, filed May 1, 2015, Paul Kats.
U.S. Appl. No. 62/459,742, filed Feb. 16, 2017, Paul Kats.
U.S. Appl. No. 62/486,495, filed Apr. 18, 2017, Paul Kats.
USPTO NonFinal Office Action dated May 19, 2020 for U.S. Appl. No. 16/659,330, 11 pages.
USPTO NonFinal Office Action dated May 21, 2020 for U.S. Appl. No. 16/659,071, 8 pages.
USPTO NonFinal Office Action dated May 22, 2020 for U.S. Appl. No. 16/658,777, 10 pages.
USPTO NonFinal Office Action dated Jun. 9, 2020 for U.S. Appl. No. 16/659,240, 10 pages.
U.S. Appl. No. 16/658,777, filed Oct. 21, 2019, Kats et al.
U.S. Appl. No. 16/658,887, filed Oct. 21, 2019, Kats et al.
U.S. Appl. No. 16/659,071, filed Oct. 21, 2019, Kats et al.
U.S. Appl. No. 16/659,116, filed Oct. 21, 2019, Kats et al.
U.S. Appl. No. 16/659,201, filed Oct. 21, 2019, Kats et al.
U.S. Appl. No. 16/659,240, filed Oct. 21, 2019, Kats et al.
U.S. Appl. No. 16/659,278, filed Oct. 21, 2019, Kats et al.
U.S. Appl. No. 16/659,003, filed Oct. 21, 2019, Kats et al.
U.S. Appl. No. 16/659,361, filed Oct. 21, 2019, Kats et al.
Extended European Search Report dated Jul. 21, 2021 for EP Application No. 18889857.1, 8 pages.

\* cited by examiner

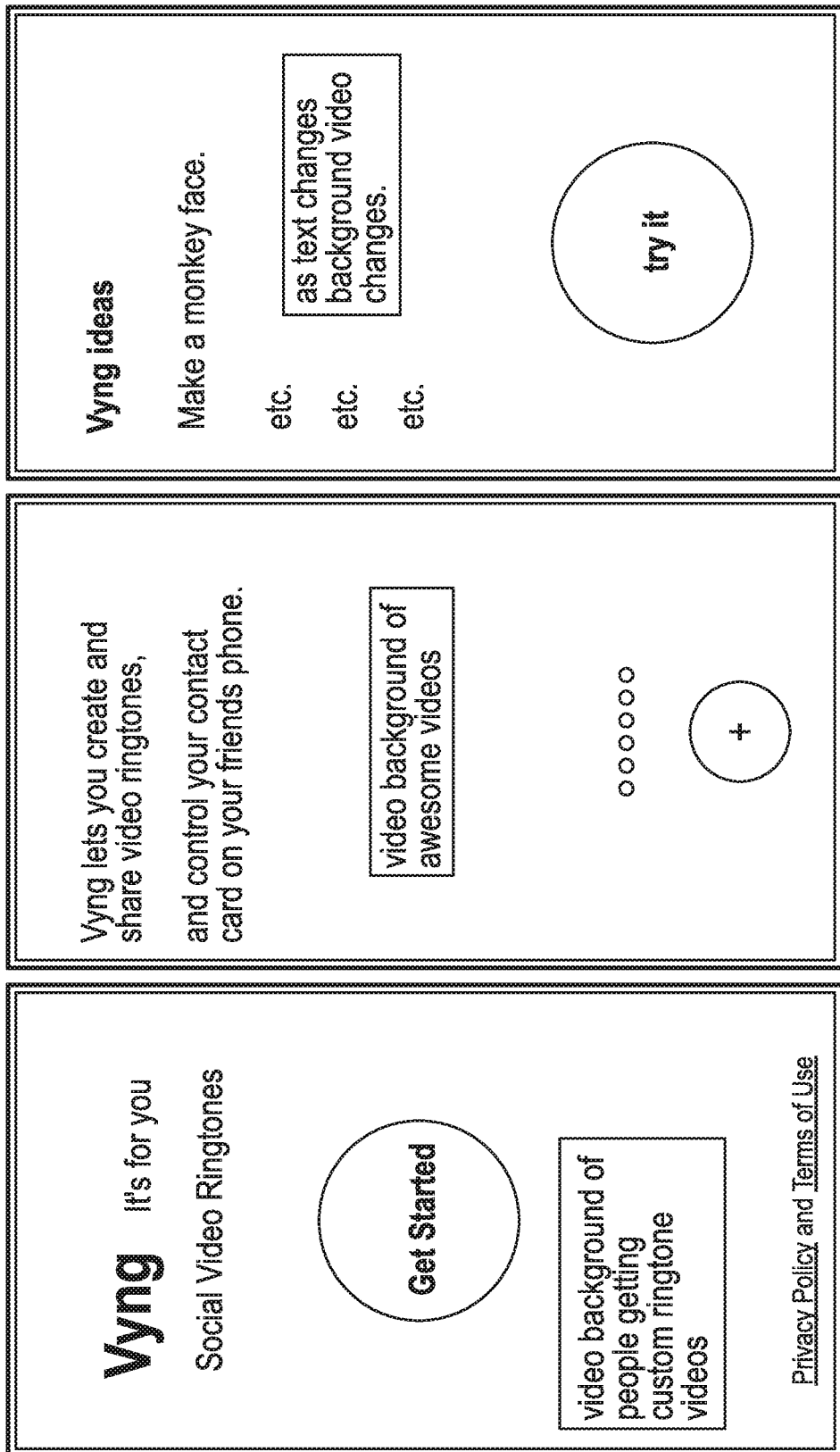

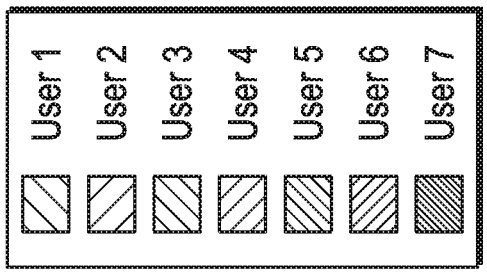
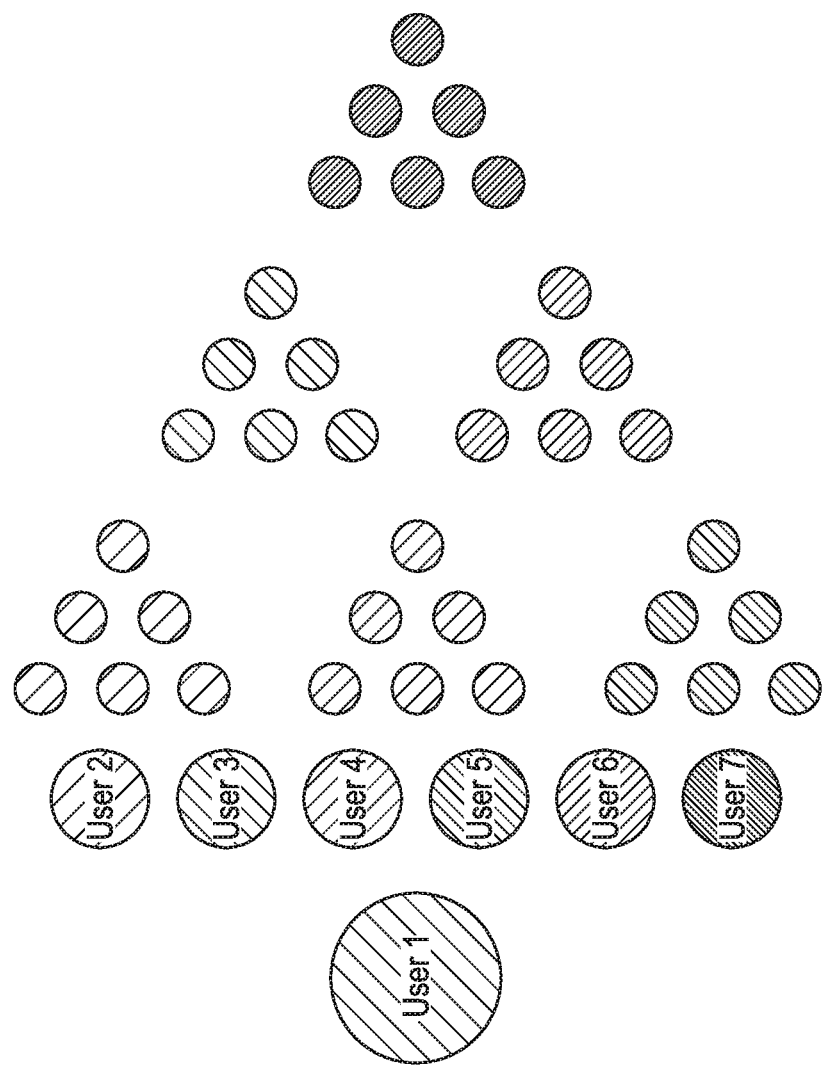
FIG. 17C

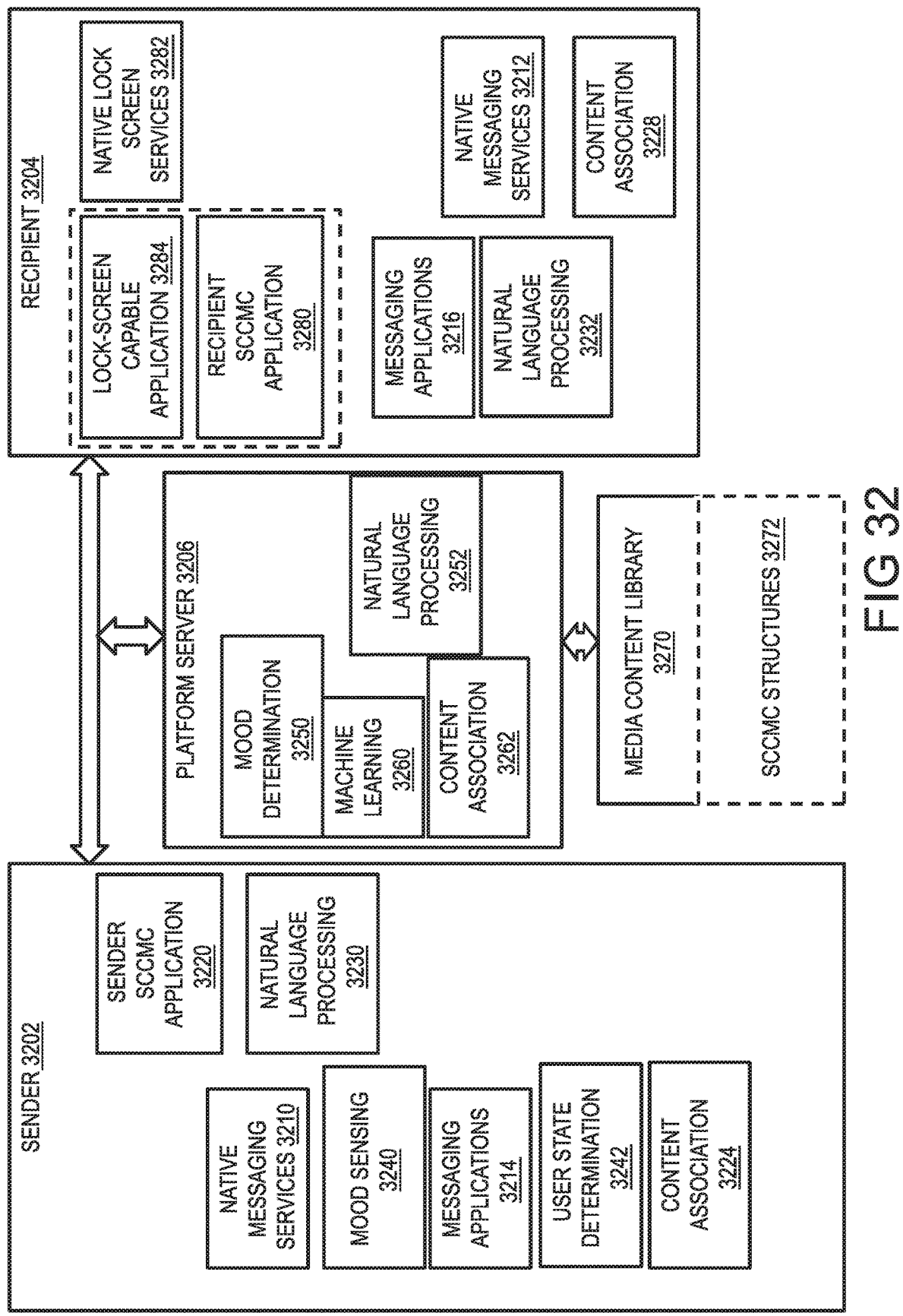

| ITEM ID | MEDIA TYPE | SCCMC REF | CHANNEL 1 REF | CHANNEL 2 REF | | | | | |
|---|---|---|---|---|---|---|---|---|---|
| SELFIE 1 | IMAGE | SENDER 1 | - | | | | | | |
| GIF 1 | IMAGE | - | COMEDY | | | | | | |
| GIF 2 | IMAGE | SENDER 1 | WORK | | | | | | |
| HOME MOVIE 1 | VIDEO | SENDER 2 | FAMILY | PERSONAL | | | | | |
| MY NY TRIP 2017 | IMAGE | SENDER 3 | PERSONAL | | | | | | |
| | | | | | | | | | |
| | | | | | | | | | |
| | | | | | | | | | |
| | | | | | | | | | |

FIG 33

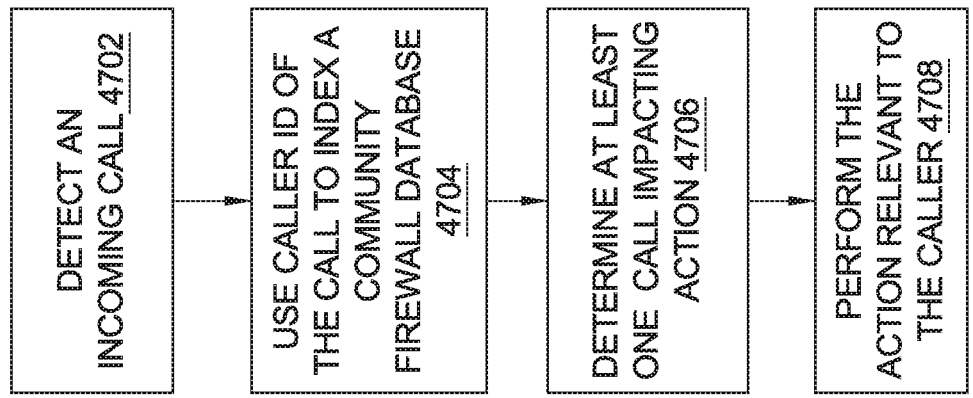
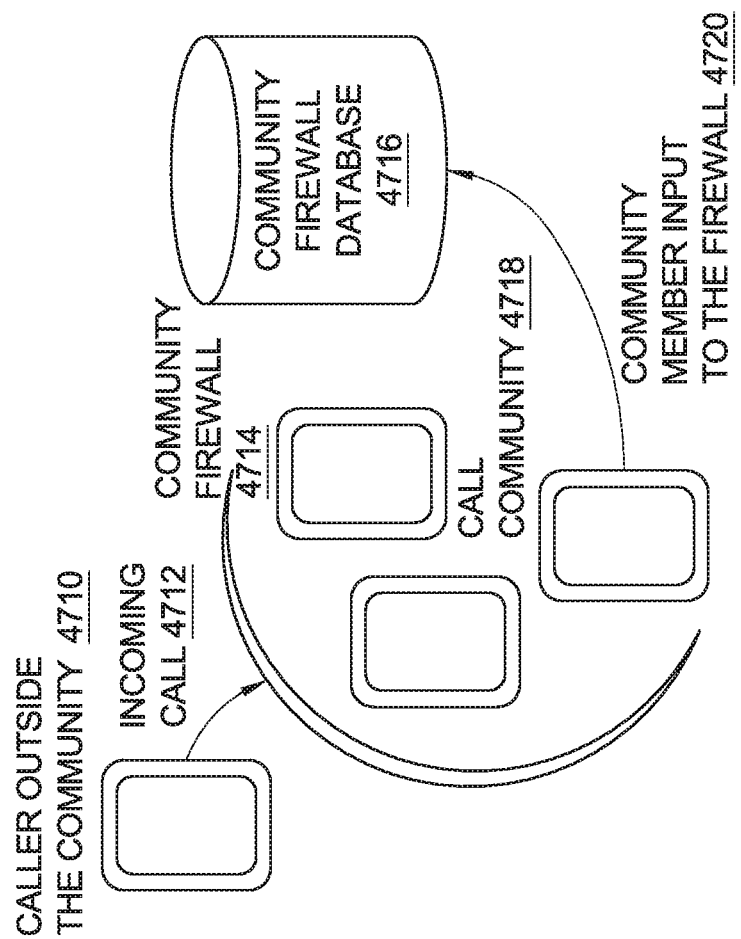
FIG. 47

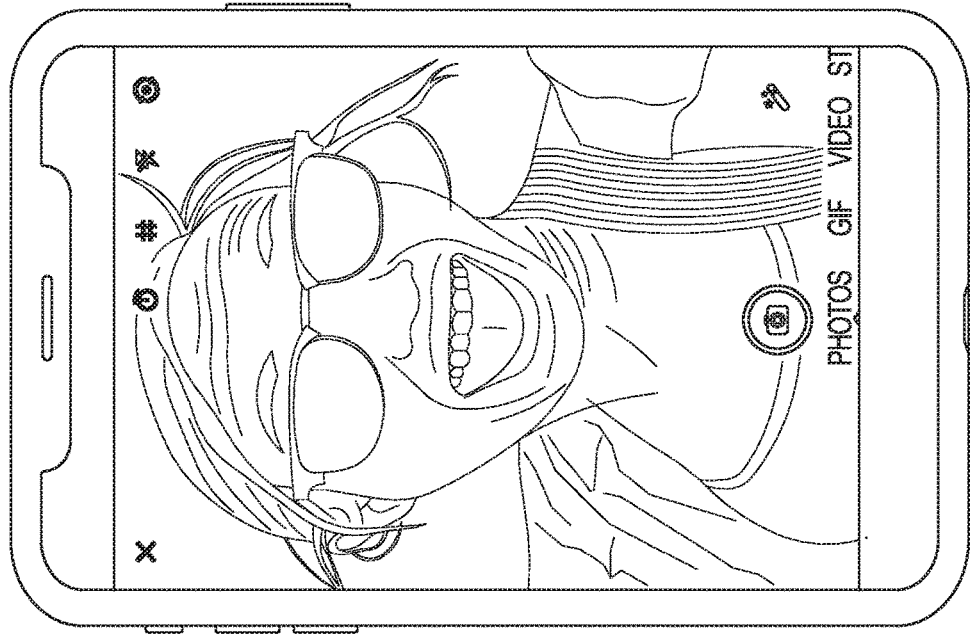
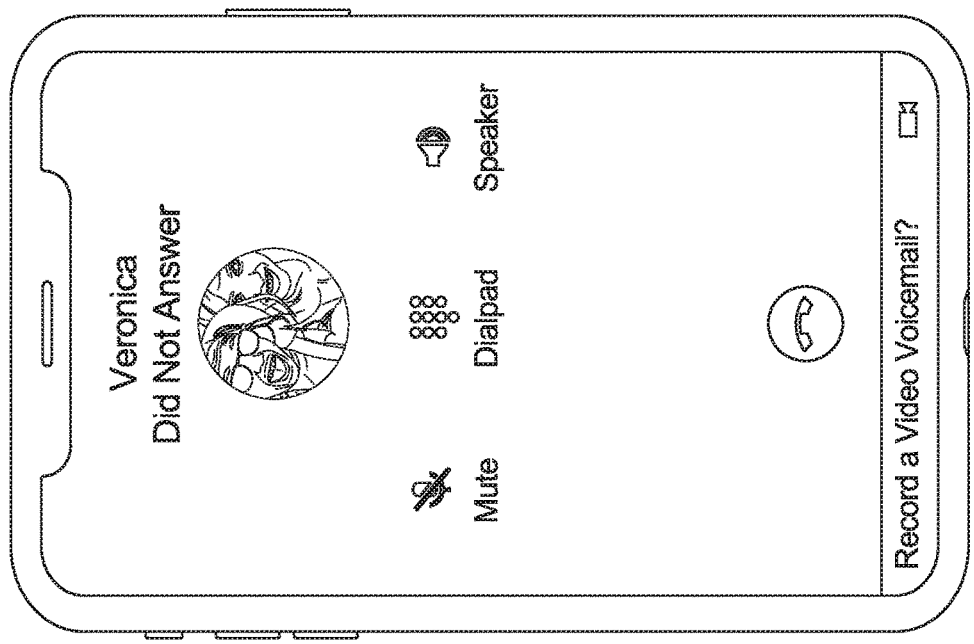
FIG. 49

MANAGEMENT OF CALLS AND MEDIA CONTENT ASSOCIATED WITH A CALLER ON MOBILE COMPUTING DEVICES

RELATED APPLICATIONS

This application is a bypass continuation that claims priority to International Pat. App. No. PCT/US18/64962 filed on Dec. 11, 2018 (published as WO/2019/118469 on Jun. 20, 2019), which claims priority to U.S. Prov. App. No. 62/597,309 filed on Dec. 11, 2017, where the entire content of each of the foregoing is incorporated herein by reference in its entirety as if fully set forth herein.

This application is also a continuation-in-part of U.S. patent application Ser. No. 16/158,000 filed on Oct. 11, 2018, which is a continuation of U.S. patent application Ser. No. 15/725,645 filed on Oct. 5, 2017 ("the '645 application") (now U.S. Pat. No. 10,104,228), which is a continuation-in-part of U.S. patent application Ser. No. 15/469,772 filed on Mar. 27, 2017 (now U.S. Pat. No. 9,871,902), which is a continuation of U.S. patent application Ser. No. 15/142,200 filed on Apr. 29, 2016 (now U.S. Pat. No. 9,609,124), which claims the benefit of U.S. Prov. Pat. App. No. 62/155,706 filed on May 1, 2015. The '645 application further claims priority to U.S. Prov. Pat. App. No. 62/459,742 filed on Feb. 16, 2017, and U.S. Prov. Pat. App. No. 62/486,495 filed on Apr. 18, 2017. The '645 application is a bypass continuation-in-part of International Pat. App. No. PCT/US2016/30083 filed on Apr. 29, 2016 (published as WO/2016/178984 on Nov. 10, 2016). The entire content of each of the above-identified applications is hereby incorporated by reference in its entirety as if fully set forth herein.

TECHNICAL FIELD

This application relates to the field of mobile devices, and more particularly to the management of content, such as ring tones and video, that may be played when one user contacts another via a mobile device.

BACKGROUND

The proliferation of mobile devices has enabled a wide range of highly personalized social interactions, such as sharing of photos, videos, and music, among other types of content. However, the contact function of a typical mobile device is quite generic, typically providing an alphabetized list of names, with phone numbers and other basic contact information. Calls and texts between users typically identify the user, and may even play a selected ring tone that is selected by the recipient of the call or text to play when a particular individual calls or texts, but the event of a call or text is otherwise un-customized.

Users might create content that could be played upon contact events, but in current systems another user would need to undertake significant interactions in order for them to be played, and the content would tend to go stale without significant effort on the part of a receiver of a call or text.

A need exists for improved methods and systems for managing the contacts modules and functions of mobile devices.

SUMMARY

In embodiments, methods and systems of content matching may include a system that includes a computer to computer interface configured to facilitate communication between a messaging platform that is adapted to associate a hash tag with a message and a content matching platform, the communication between the messaging platform and the content matching platform comprising at least one of messages and hash tags. The system may include a natural language processing facility of the content matching platform producing an output comprising at least one of an understanding, theme, emotion, and intent of a message communicated from the messaging platform. The system may also include a metadata matching facility in communication with the content matching platform, the metadata matching facility configured to identify candidate hash tags by determining similarity of hash tags in a pool of hash tags with an output of the natural language processing, the content matching facility communicating at least one of the candidate hash tags to the messaging platform over the computer to computer interface. The system may further include an electronic user interface that facilitates user selection of one or more of the candidate hash tags that the content matching facility communicates to the messaging platform for associating with the message processed by the natural language processing facility. In the system, the computer to computer interface may include an Application Programming Interface (API). In the system, determining similarity of hash tags with an output of the natural language processing of the message may include determining similarity of metadata associated with the hash tags. In the system, the metadata associated with the hash tags may be generated by processing the hash tags with the natural language processing facility. In the system, the at least one of the candidate hash tags may indicate an emotion of the message. In the system, the at least one of the candidate hash tags may indicate an intent of the message. In the system, the content matching platform may tag the message with the at least one candidate hash tags and communicates the tagged message to the messaging platform. The system may further include the content matching platform communicating the output of natural language processing of the message to the messaging platform.

In embodiments, methods and systems of content matching may include a system that includes a computer to computer interface configured to facilitate communication between a messaging platform that is adapted to associate a hash tag with a message and a content matching platform, the communication between the messaging platform and the content matching platform comprising at least one of messages and hash tags. The system may further include a natural language processing facility of the content matching platform producing an output comprising at least one of an understanding, theme, emotion, and intent of a message communicated from the messaging platform and of a plurality of hash tags in a pool of hash tags. The system may further include a metadata matching facility configured to determine candidate hash tags by determining similarity of an output of the natural language processing for the plurality of hash tags with an output of the natural language processing for the message communicated from the messaging platform, the content matching facility communicating at least one candidate hash tag based on the determined similarity to the messaging platform over the computer to computer interface. In the system, the output of the natural language processing of the at least one candidate hash tag may be more similar to the output of the natural language processing of the message than the natural language processing of any of the other hash tags in the pool of hash tags. The system may further include an electronic user interface that facilitates user selection of one or more of the candidate hash tags that the content matching facility communicates to the messaging platform for associating with the message processed by the natural language processing facility. In the system, the computer to computer interface may be an Application Programming Interface (API). In the system, determining similarity of hash tags with an output of the natural language processing of the message may include determining similarity of metadata associated with the hash tags. In the system, the metadata associated with the hash tags may be generated by processing the hash tags with the natural language processing facility.

In embodiments, methods and systems of content matching may include communicating a portion of a message from a messaging platform to a content matching platform. The method may also include processing text in the portion of the message with natural language processing, thereby generating an NLP output comprising at least one of a theme, understanding, intent, and emotion of the message. The message may also include determining similarity of the NLP output with a plurality of hash tags. The method may also include communicating at least one candidate hash tag for the message to the messaging platform based on the determined similarity. In the method, determining similarity may include comparing a portion of the NLP output with the hash tags. In the method, determining similarity may include comparing a portion of the NLP output with metadata descriptive of the hash tags. The method may further include facilitating user selection of the at least one candidate hash tag by presenting in an electronic user interface a plurality of hash tags based on the determined similarity. In the method, the communicating a portion of a message and communicating at least one candidate hash tag may utilize an Application Programming Interface between the content matching platform and the messaging platform.

Provided herein are methods and systems for a sender-controlled contact media content type (referred to herein in some cases as "SCCMC") that can be sent among mobile devices, including addressing the contacts systems and methods of such devices to provide rich interactions among users upon the occurrence of contact events. Such methods and systems may occur at the level of the contacts functions of a mobile device, such as being initiated directly upon a contact independent of the need for an application on the recipient's mobile device. In embodiments, the SCCMC can play, for example, on the lock screen of the recipient's mobile device as an incoming call occurs, or the SCCMC can display on a contact screen when the phone is unlocked and active, including, without limitation, on the home screen of the recipient's mobile device, on a screen that displays when the recipient is on a phone call and/or when the recipient is using an application on the recipient's mobile device. The methods and systems described herein may allow a first user (user A) to create custom photos, videos, ring tones and the like that are played, under control of user A, on the mobile device of another user (user B), such as when user A calls or texts user B's device. For example, user A may create a video, with associated audio content, and deliver that content to user B's phone, and have the video and audio play on user B's phone when user A contacts user B, such as by text or call. The content may, in a single broadcast act, comprise both voice layer and data layer content and use, in a coordinated fashion, voice layer and data layer transmission mediums. Such content is referred to herein as a sender-controlled contact media content item ("SCCMC") or, in some cases as a "Ving" or a "Vyng."

Provided herein are methods and systems for providing a sender-controlled contact media content data structure that is adapted to be created using a mobile device of a sender and sent to at least one mobile device of at least one recipient; and a host computing system including at least one server for managing the sender-controlled contact media content data structure; wherein the sender-controlled contact media data structure is adapted to be displayed via the contacts function of the mobile device of a recipient under control of the sender of the sender-controlled contact media content data structure.

Methods and systems are provided herein, including methods and systems that include a sender-controlled contact media content data structure that is adapted to be created using a mobile device of a sender and sent to at least one mobile device of at least one recipient; and a host computing system including at least one server for managing the sender-controlled contact media content data structure; wherein the sender-controlled contact media data structure is adapted to be displayed on a screen of a recipient's mobile device when the recipient's device is turned on and able to receive at least one of a data signal and a voice signal, wherein the sender-controlled contact media data structure displays content that is under the control of the sender of the sender-controlled contact media content data structure.

In embodiments, the sender-controlled contact media content data structure uses voice layer and data layer transmission mediums in a single broadcast act by the sender. In embodiments, the screen of the recipient's mobile device is the screen that displays upon the occurrence of a contact event at the recipient's mobile device. In embodiments, the screen of the recipient's mobile device is the lock screen of the recipient's mobile device. In embodiments, the screen of the recipient's mobile device is the home screen of the recipient's mobile device. In embodiments, the screen of the recipient's mobile device is an active screen of the recipient's mobile device that displays when the mobile device is unlocked. In embodiments, the screen of the recipient's mobile device is a screen that displays while the recipient is on a phone call using the recipient's mobile device.

The methods and systems disclosed herein may include an installable application running on the host computing system for establishing a data connection between the mobile device of the sender and the at least one mobile device of the at least one recipient. In embodiments, the installable application is configured to allow discovery of peer devices in proximity to allow an exchange of the sender-controlled contact media content data structure between the mobile device of the sender and the at least one mobile device of the at least one recipient. In embodiments, the installable application enables a user interface that allows the creation of the sender-controlled contact media content data structure on the mobile device of the sender.

In embodiments, the host computing system enables downloading of the sender-controlled contact media content data structure on the at least one mobile device of the at least one recipient.

In embodiments, the mobile device of the sender and the at least one mobile device of the at least one recipient are communicatively coupled to the server, and wherein the server is a content server. In embodiments, the mobile device of the sender is communicatively coupled to mobile devices of a plurality of recipients, such that each of the recipient devices receives the sender-controlled contact media content data structure. In some cases, this is described as a "bomb," a "Vyng bomb," or the like.

In embodiments, a plurality of sender-controlled contact media data structures is organized into a channel, such that at least one recipient's mobile device plays a series of the sender-controlled contact media data structures upon a plurality of contact events from at least one sender. In embodiments, the channel is associated with at least one of a topic of interest to a sender, a topic of interest to at least one recipient and a social graph of at least one of a sender and at least one recipient. In embodiments, the sender-controlled contact media data structures are selected by the sender from a curated library of sender-controlled contact media data structures. In embodiments, the library is curated by an algorithm based on a topic of interest indicated by at least one of the sender and the recipient. In embodiments, the library is curated by an editor based on the subject matter of the channel.

The methods and systems described herein may include methods and systems for taking a sender-controlled contact media content data structure that is created using a mobile device of a sender; providing a host system that enables transmission of the sender-controlled contact media content data structure from the mobile device of the sender to at least one mobile device of at least one recipient; and causing the display of the sender-controlled contact media content data structure on a screen of the at least one mobile device of the at least one recipient when the at least one recipient's device is turned on and able to receive at least one of a data signal and a voice signal, wherein the sender-controlled contact media data structure displays content that is under the control of the sender of the sender-controlled contact media content data structure. In embodiments, the sender-controlled contact media content data structure uses voice layer and data layer transmission mediums in a single broadcast act by the sender. In embodiments, the screen of the recipient's mobile device is the screen that displays upon the occurrence of a contact event at the recipient's mobile device. In embodiments, the screen of the recipient's mobile device is the lock screen of the recipient's mobile device. In embodiments, the screen of the recipient's mobile device is the home screen of the recipient's mobile device. In embodiments, the screen of the recipient's mobile device is an active screen of the recipient's mobile device that displays when the mobile device is unlocked. In embodiments, the screen of the recipient's mobile device is a screen that displays while the recipient is on a phone call using the recipient's mobile device. In embodiments, the sender-controlled contact media content data structure comprises one or more of audio, video, contact data, and metadata. In embodiments, sending the sender-controlled contact media content data structure comprises sending a text message, wherein the text message includes an embedded link to facilitate installation of an application by the at least one recipient on the at least one mobile device of the at least one recipient upon tapping of the embedded link by the at least one recipient, wherein the installable application establishes a data connection between the mobile phone of the sender and the mobile phone of the at least one recipient.

In embodiments, the methods and systems described herein may further include downloading of the sender-controlled contact media content data structure on the at least one mobile device of the at least one recipient using the embedded link, wherein the downloading of the sender-controlled contact media content data structure enables displaying a contact of the sender as being associated with the sender-controlled contact media content data structure on the at least one mobile device of the at least one recipient.

In embodiments, the methods and systems described herein may further include initiating a contact by the mobile device of the sender with the at least one mobile device of the at least one recipient such that the sender-controlled contact media content data structure is displayed on the at least one mobile device of the at least one recipient when the contact between the mobile device of the sender and the at least one mobile device of the at least one recipient initiates. In embodiments, the contact is initiated between the mobile device of the sender and the at least one mobile device of the at least one recipient when the sender places a phone call. In embodiments, the contact is initiated between the mobile device of the sender and the at least one mobile device of the at least one recipient when the sender sends a text message to the at least one mobile device of the at least one recipient.

In embodiments, the methods and systems described herein may further include enabling a user interface on the mobile device of the sender to allow the creation of the sender-controlled contact media content data structure through the user interface. In embodiments, the user interface further allows editing of the sender-controlled contact media content data structure from an external source that stores the sender-controlled contact media content data structure. In embodiments, the external source comprises one of a cloud repository and a library of a third-party content provider. In embodiments, the user interface allows for the creating the sender-controlled contact media content data structure associated with an emotional state of the sender. In embodiments, the emotional state is indicated through a data field in metadata associated with the sender-controlled contact media content data structure. In embodiments, the emotional state is indicated by one or more of a facial expression, an image, a sound, and an emoticon.

In embodiments, the methods and systems described herein may further include setting a privacy control through the installable application to limit publication of the sender-controlled contact media content data structure to a select audience.

The methods and systems disclosed herein may include methods and systems for segregating the created sender-controlled contact media content data structure into one or more of audio, video, and metadata components; associating each of the components of the created sender-controlled contact media content data structure with a particular tone; and storing the tone for each of the components locally on the mobile device of the sender. In embodiments, the methods and systems described herein may further include uploading the tone for each of the components on an application server or a content server. In embodiments, the methods and systems described herein may further include allowing previewing the sender-controlled contact media content data structure; and adding custom details to the sender-controlled contact media content data structure, either before or after sending the sender-controlled contact media content data structure to the at least one recipient. In embodiments causing the display of the sender-controlled contact media content data structure on the screen of the at least one mobile device is triggered by detection of the passing of the recipient's mobile device into an area defined by a geofence.

The methods and systems disclosed herein may include establishing a personal channel having at least one media item by accessing an installable application from the mobile device and selecting at least one pre-configured menu item that permits access to the at least one media item as part of the personal channel. The personal channel may include the at least one media item selected from at least one media content source. The at least one media content source may include at least one of sender-controlled contact media content received from other devices, content available locally on the mobile device, content created or captured by the mobile device, content obtained from social network servers, and combinations thereof. The methods and systems disclosed herein may further include sharing the personal channel of the sender with at least one recipient of the sender-controlled contact media content data structure.

The methods and systems may further include initiating a contact with the mobile device of the at least one recipient for notifying the mobile device of the at least one recipient to provide a media content for use as the sender-controlled contact media content data structure associated with the at least one recipient. In some examples, the at least one recipient may be selected from a contact list or phonebook available on the sender's mobile device. The methods and systems may enable providing a link to a website to the at least one recipient for uploading some media content that may be used as the sender-controlled contact media content data structure associated with the at least one recipient.

Methods and systems are provided herein for establishing a personal channel of media content items to be displayed on the lock-screen of a user's mobile device in response to a triggering contact event. These may include providing a host system that enables handling of contact media content data structures for controlled display of the contact media content data structures on the lock-screen of at least one mobile device; causing a display of the contact media content data structure on a screen of the at least one mobile device of the at least one recipient when the at least one recipient's device is turned on and able to receive at least one of a data signal and a voice signal, where the contact media data structure displays media content on the lock-screen of the at least one mobile device upon receipt of a triggering contact event to the at least one mobile device; and enabling a user to establish a personal channel of contact media content having at least one media item by accessing an installable application on the at least one mobile device and selecting at least one pre-configured menu item that designates the at least one media item as part of the personal channel. In embodiments, the personal channel includes the at least one media item selected from at least one media content source, where the at least one media content source includes at least one of a sender-controlled contact media content received from another device, content available locally on the at least one mobile device, content created using the mobile device, and content obtained from a server. The methods and systems may further include enabling the user to share the personal channel with at least one other user of a mobile application that is configured to interact with the host system. The methods and systems may further include initiating a contact with the mobile device of the at least one other user of a mobile device that is configured to interact with the host system to request that the other user designate a contact media content item to be displayed when the other user initiates a triggering contact to the user of the at least one mobile device. In embodiments, the at least one other user is selected from a contact list available on the mobile device of the sender. In embodiments, notifying the mobile device of the at least one other user includes sending a link for a website where the other user is invited to upload the media content to be displayed when the other user initiates a triggering contact to the user of the at least one mobile device.

In embodiments, methods and systems described herein may include a systems that may include a lock-screen capable application executing on a recipient computing device, the lock-screen capable device facilitating user interface access to a communication function of the recipient computing device while the computing device remains in a locked state, wherein the lock-screen capable application intercepts a communication received by the recipient device, the communication associated with at least one communication application or service operable on the recipient computing device. The system may further include a content association application executing on the recipient computing device, wherein the content association application facilitates associating a content item with the communication, based on a relevance of the content item with the communication, the relevance determined from processing the intercepted communication to identify an association based on metadata descriptive of content items stored in a library of content items. The system may further include automatically associating a content item in response to detecting an indication of an intercepted communication. Automatically associating may include associating at least one of a GIF and a video with the communication. Automatically associating may further include determining an emotional state of the communication and associating content in response to the determined emotional state. Automatically associating may further include determining a context of the communication and associating content in response to the determined context.

Methods and systems described herein may include a system that may include a sender computing device configured with a sender-controlled contact media content-based application (SCCMC application), the SCCMC application executing on the sender device and interfacing with a sender state detection application executing on the sender device, wherein the sender state detection application detects at least one of a mood of the sender, a physical status of the sender, an emotional state of the sender and a mental state of the sender, and wherein the SCCMC application uses the detected state of the sender to determine an SCCMC structure that corresponds to the detected state and associates information that identifies the determined SCCMC structure with an outgoing message for a recipient. In the system, the outgoing message is associated with a phone call from the sender to a recipient. In the system, the SCCMC application further determines a content channel associated with at least one of the sender and the recipient and bases the determined SCCMC structure on the determined content channel.

Methods and systems described herein may include a method that may include adapting a sender-controlled contact media content structure in response to receiving an indication of a current state of a sender of the sender-controlled contact media content structure, wherein the state is one of a mood, a physical status, an emotional status, and a mental status. In the method, the state is determined in response to facial recognition of the sender contemporaneously with the sender sending a message from a sender's computing device to a recipient's computing device. In the method, adapting occurs while a recipient computing device is processing a contact event resulting from receipt of a message from a sender's computing device.

Methods and systems described herein may include a method that may include operating a sender-controlled contact media content structure creation platform on a computing device that, in response to intercepting a message being communicated between messaging applications resident on a sender's mobile device and a recipient's mobile device, offers customized services of the platform to a user of the mobile device on which the message is intercepted. In the method, the message is intercepted on a sender mobile device prior to the message being sent to the recipient. In the system, the message is intercepted on a recipient mobile device prior to the messaging application resident on the recipient's mobile device receiving the message. In the system, intercepting includes developing an understanding of the message with natural language processing, the understanding further used to facilitate making suggestions for video/image/audio of an SCCMC to be associated with the message.

Methods and systems described herein may include a method that may include operating a sender-controlled contact media content (SCCMC) structure contact event handling platform. The platform may perform the steps including intercepting a message associated with other messaging applications resident on the mobile device, wherein the message is targeted to a first messaging application of the other messaging applications; processing the message with natural language processing to determine at least one SCCMC structure; forwarding the determined at least one SCCMC structure to an SCCMC unified messaging user interface; processing the SCCMC structure with the unified messaging interface; presenting at least one of text and imagery determined from the processing of the SCCMC structure in the unified messaging interface; and delivering a message that is compatible with the other messaging applications to the first messaging application. In the method, the message is intercepted on a recipient mobile device. In the method, the platform operation may be performed while the recipient's mobile device is locked. In the method, the message is intercepted on a sender's mobile device.

Methods and systems described herein may include a method that may include integrating at least one of audio, video, imagery, and text indicated by a sender-controlled contact media content (SCCMC) structure into an augmented reality environment in response to detecting a mobile-to-mobile device contact event, the integrating indicating the contact event.

Methods and systems described herein include a lock-screen capable application executing on a recipient computing device. The lock-screen capable application is configured to facilitate user interface access to a communication function of the recipient computing device while the recipient computing device remains in a locked state. The lock-screen capable application is configured to intercept a communication received by the recipient computing device. The intercepted communication is associated with at least one of a communication application or a communication service operable on the recipient computing device. The methods and systems further include a content association application executing on the recipient computing device. The content association application is configured to facilitate associating a media content item with the intercepted communication based on a relevance of the media content item with the intercepted communication. The relevance is determined by automatically processing the intercepted communication to identify an association based on metadata descriptive of media content items stored in a library of the media content items.

In embodiments, the associating of the media content item is performed automatically by the content association application in response to detecting an indication of the intercepted communication.

In embodiments, the content association application is configured to associate at least one of a GIF and a video with the intercepted communication.

In embodiments, the processing automatically of the intercepted communication to identify the association includes automatically determining an emotional state of the intercepted communication and automatically associating at least one of the media content items in response to the automatically determined emotional state.

In embodiments, the processing automatically of the intercepted communication to identify the association includes determining a context of the intercepted communication and associating at least one of the media content items in response to the determined context.

Methods and systems described herein include a sender computing device configured with a sender-controlled contact media content-based application (SCCMC application). The SCCMC application is configured to execute on the sender device and interface with a sender state detection application that executes on the sender device. The sender state detection application is configured to detect a detected state that includes at least one of a mood of the sender, a physical status of the sender, an emotional state of the sender and a mental state of the sender. The SCCMC application uses the detected state of the sender to determine an SCCMC structure that corresponds to the detected state and associates information that identifies the determined SCCMC structure with an outgoing message for a recipient.

In embodiments, the outgoing message is associated with a phone call from the sender to a recipient.

In embodiments, the SCCMC application is configured to determine a content channel associated with at least one of the sender and the recipient and to base the determined SCCMC structure on the determined content channel.

Methods and systems described herein include adapting a sender-controlled contact media content structure in response to receiving an indication of a current state of a sender of the sender-controlled contact media content structure. The current state of the sender is one of a mood, a physical status, an emotional status, and a mental status.

In embodiments, the current state of the sender is determined in response to facial recognition of the sender contemporaneously with the sender sending a message from a sender's computing device to a recipient's computing device.

In embodiments, the adapting of the sender controlled contact media content occurs while a recipient's computing device is processing a contact event resulting from receipt of a message from a sender's computing device.

Methods and systems described herein include operating a sender-controlled contact media content structure creation platform on a computing device that, in response to intercepting a message being communicated between messaging applications resident on a sender's mobile device and a recipient's mobile device, offers customized services of the platform to a user of the mobile device on which the message is intercepted.

In embodiments, the message is intercepted on a sender mobile device prior to the message being sent to the recipient.

In embodiments, the message is intercepted on a recipient mobile device prior to the messaging application resident on the recipient's mobile device receiving the message.

In embodiments, the intercepting includes developing an understanding of the message with natural language processing, and wherein the understanding is further used to facilitate making suggestions for video/image/audio of a sender-controlled contact media content to be associated with the message.

Methods and systems described herein include operating a sender-controlled contact media content (SCCMC) structure contact event handling platform including intercepting a message associated with other messaging applications resident on the mobile device, wherein the message is targeted to a first messaging application of the other messaging applications. The methods and system also include processing the message with natural language processing to determine at least one SCCMC structure and forwarding the determined at least one SCCMC structure to an SCCMC unified messaging user interface. The methods and systems further include processing the SCCMC structure with the unified messaging interface, presenting at least one of text and imagery determined from the processing of the SCCMC structure in the unified messaging interface, and delivering the message that is compatible with the other messaging applications to the first messaging application.

In embodiments, the message is intercepted on a recipient's computing device.

In embodiments, the message is intercepted on a recipient computing device while the recipient's computing device is locked.

In embodiments, the message is intercepted on a sender's computing device.

Methods and systems described herein include integrating at least one of audio, video, imagery, and text indicated by a sender-controlled contact media content (SCCMC) structure into an augmented reality environment in response to detecting a mobile-to-mobile device contact event. The integrating of the at least one of audio, video, imagery, and text is an indicator of the contact event.

In embodiments, the methods and systems include adapting the sender-controlled contact media content structure in response to receiving an indication of a current state of a sender of the sender-controlled contact media content structure. The current state of the sender is one of a mood, a physical status, an emotional status, and a mental status.

In embodiments, the current state of the sender is determined in response to facial recognition of the sender contemporaneously with the sender sending a message from a sender's computing device to a recipient's computing device.

In embodiments, integrating includes developing an understanding of the message from the sender with natural language processing, and wherein the understanding is further used to facilitate making suggestions for video/image/audio of a sender-controlled contact media content to be associated with the message.

BRIEF DESCRIPTION OF THE FIGURES

In the accompanying figures, like reference numerals refer to identical or functionally similar elements throughout the separate views and together with the detailed description below are incorporated in and form part of the specification, serve to further illustrate various embodiments and to explain various principles and advantages all in accordance with the systems and methods disclosed herein.

FIGS. 3A-3G illustrate the creation of an SCCMC in accordance with an embodiment of the systems and methods disclosed herein.

FIGS. 17A-17D illustrate user community growth of an SCCMC through a viral sharing effect in accordance with an embodiment of the systems and methods disclosed herein.

FIG. 32 illustrates a block diagram of a unified messaging platform in accordance with an embodiment of the systems and methods disclosed herein.

FIG. 33 illustrates an embodiment of a media content library in accordance with an embodiment of the systems and methods disclosed herein.

FIG. 47 illustrates an architecture and a flow for a call community firewall.

FIG. 49 illustrates user screens for saving and playing back visual/video voice mail.

Figure 1:
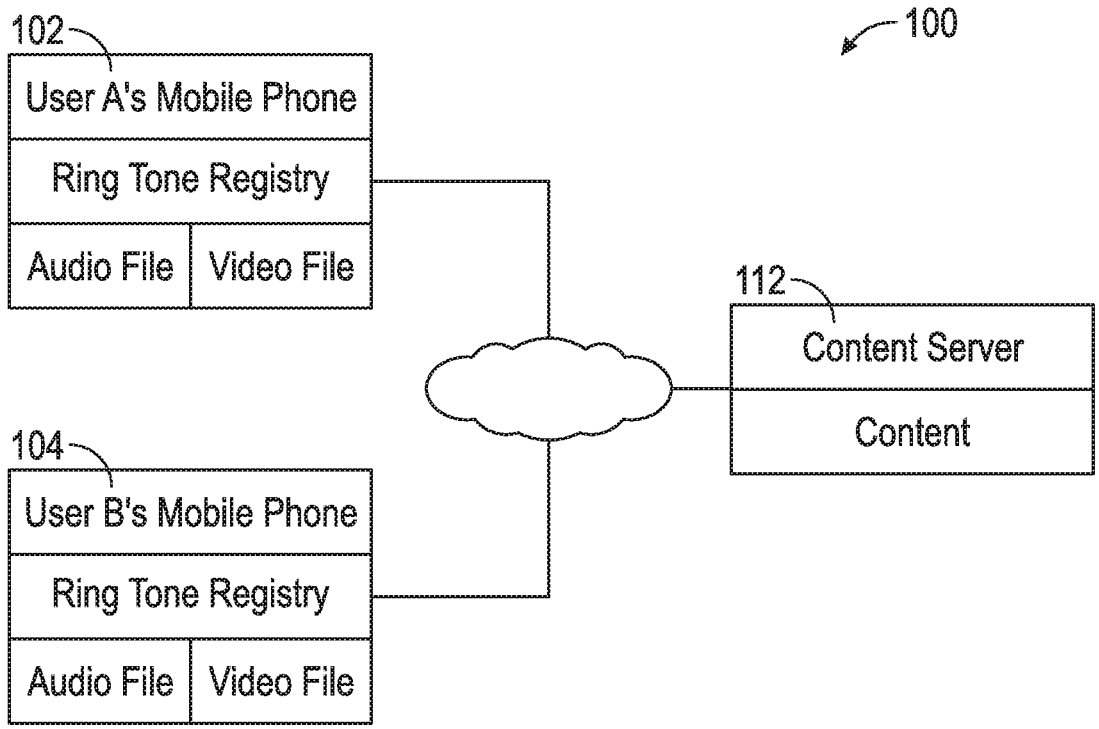
FIG. 1 illustrates an architecture for a method and system for an SCCMC in accordance with an embodiment of the systems and methods disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components related to enabling a user to associate a service with a product in a way that makes it much more convenient and effective for the user to take advantage of the benefits of the service in connection with the product. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those skilled in the art.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one skilled in the art to operate satisfactorily for an intended purpose. Ranges of values and/or numeric values are provided herein as examples only and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

As used herein, the term "tone" may be used to refer to a single instance of a sender-controlled contact media content type, which may include one or more of audio, video (which may include video captured by video cameras, voice, computer-generated video, animations, or other video-type content that can be displayed in any format on a mobile device, such as a mobile phone), contact data, and/or metadata. A single tone may be adapted for broadcast, in a single act by a sender, over both voice layer and data layer transmission mediums in a coordinated fashion. As noted above, an SCCMC is also referred to herein (including in the figures) for convenience as a "Vyng," which is an example of a brand name for the SCCMC that would be understood by users to refer to this novel type of content item.

FIG. 1 illustrates an embodiment of an architecture 100 for an SCCMC. The architecture 100 includes a user A's mobile phone 102, referred to alternatively herein as a sender mobile phone 102. The architecture 100 further includes a user B's mobile phone 104, alternatively referred to as a recipient mobile phone 104. The sender mobile phone 102 and recipient mobile phone 104 are each communicatively connected with a content server 112. The architecture 100 may run an application (referred to herein in some cases as the App) that may establish a data connection, or tunnel, between the two user's phones and may control creation and display of SCCMC-type content between the two devices 102 and 104. The architecture 100 and the SCCMC-type content data structure may be used with any type of mobile device or mobile device operating system or platform, such as the Android™ operating system, the iOS™ operating system, or other operating systems. Embodiments provided herein that describe a particular operating system should be understood to apply to other operating systems, except where the context indicates otherwise (such as where a particular operating system lacks the functions described in connection with a particular embodiment). In addition to using and integrating with mobile operating system platforms, the architecture 100 and SCCMC-type content items may be integrated with and layered within other applications, including ones that host developer platforms, such as Facebook Messenger™ and Viber™. Integration with apps that have calling features, including ones that use Voice over IP allows for the SCCMC-type content item to leverage the platforms that support such applications, including to produce SCCMC-type content items to be delivered upon incoming calls. This may be accomplished, among other things, by use of the developer platform resources that are associated with such applications, such as developer user interfaces, application programming interfaces, developer tools, and the like, including integration of the content server 112 described in connection with the architecture 100.

Figure 2A:
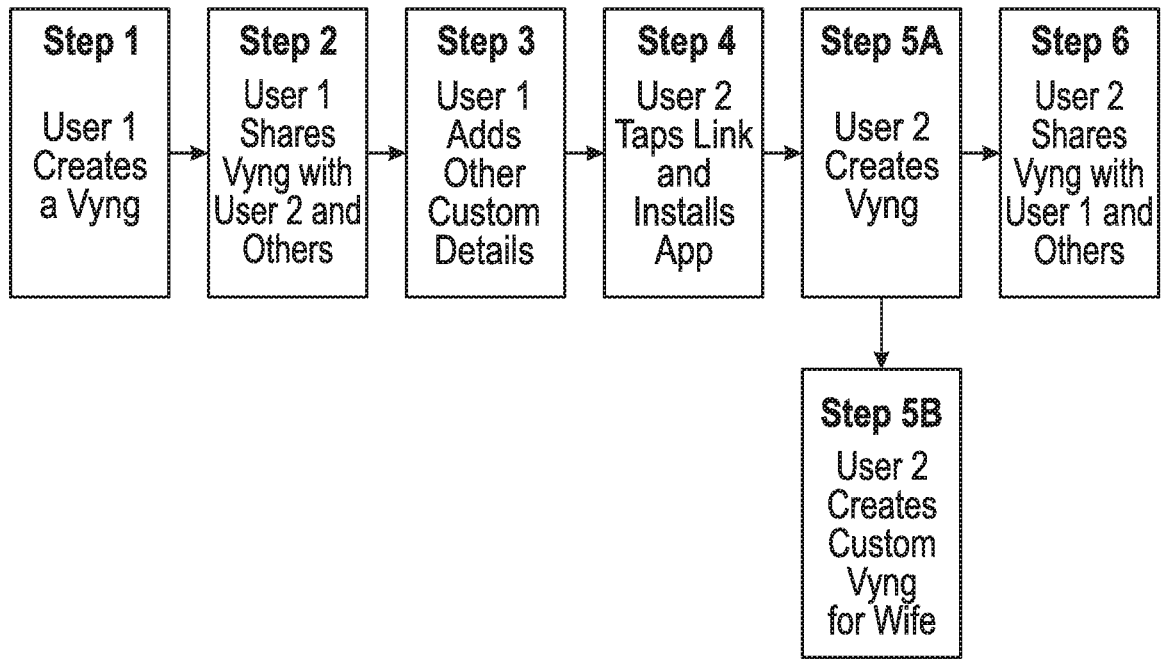
FIGS. 2A and 2B illustrate a process for creating and sharing an SCCMC in accordance with an embodiment of the systems and methods disclosed herein.

FIG. 2A illustrates a process for creating and sharing an SCCMC tone (referred to in some cases simply as a "tone"). First, the architecture 100 may enable a user interface on the sender mobile phone 102 to allow the sender to create video and/or audio content, or an SCCMC tone, at step 1. The user may edit the audio and/or video content from external sources (e.g., stored in the cloud or from a library of a third-party content provider), internal sources (e.g., from saved audio/video on the phone), or may create new video/audio. The user may set privacy controls via the App to limit publication of the SCCMC tone to a select audience.

The user's composite creation may be separated into audio, video, and metadata components. These components may be associated with a particular tone, such as by being assigned as properties of the tone. The tone may then be stored locally on the device 102. The tone may be uploaded to the application server or content server 112 and may be persisted in storage, such as associated with the server 112 or in cloud-based storage.

In an exemplary embodiment, a first user may create the SCCMC such as using the App at step 1. At a step 2, the first user may then share the SCCMC with friends, such as by text/SMS message (such as in a snippet, link, or the like in a text) such as with a second user. At a step 3, the first user may preview the SCCMC and/or add other custom details, either before or after sharing the SCCMC with one or more other users. At a step 4, the second user may tap the link and install the App, which may set the SCCMC of the first user on the second user's phone 104. Either user may send the SCCMC to multiple persons, and a community around the App may be used, such as within a group of friends, within a school district, within a workgroup or enterprise, or the like. When the second user first downloads the App, the first user's contact may be shown now associated with the SCCMC tone created by the first user. The second user may further create a tone at a step 5A. At a step 6, the second user may share this SCCMC with the first user and/or other friends, for example. The second user may, for example, create a custom SCCMC for his spouse at a step 5B.

Figure 2B:
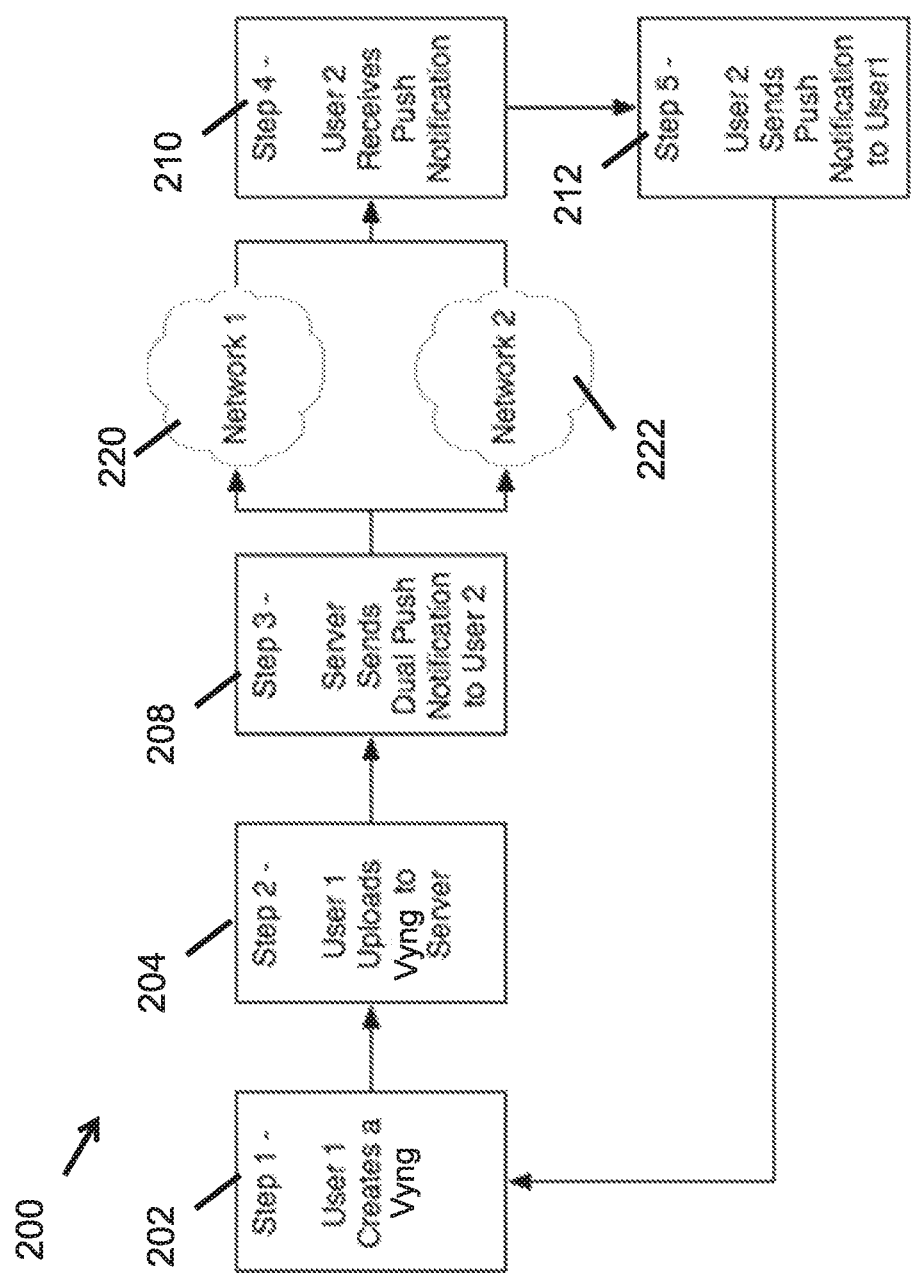

FIG. 2B illustrates a process 200 for creating and sharing an SCCMC tone (referred to in some cases simply as a "tone" or in other cases as a "Ving" or a "Vyng"). First, the architecture 100 may enable a user interface on the sender mobile phone 102 to allow the sender to create video and/or audio content, or an SCCMC tone, at step 202. The user may edit the audio and/or video content from external sources (e.g., stored in the cloud or from a library of a third-party content provider), internal sources (e.g., from saved audio/video on the phone), or may create new video/audio. The user may set privacy controls via the App to limit publication of the SCCMC tone to a select audience.

The user's composite creation may be separated into audio, video, and metadata components. These components may be associated with a particular tone, such as by being assigned as properties of the tone. The tone may then be stored locally on the device 102. The tone may be uploaded to the application server or content server 112 and may be persisted in storage, such as associated with the server 112 or in cloud-based storage.

In an exemplary embodiment illustrated in FIG. 2B, a first user may create the SCCMC such as using the App at the first step 202. The SCCMC may be created using a standard encoding protocol. Standard encoding protocols may include HTML5, Flash, MP4/H.264, WebM, Ogg, 3GP/MPEG4 and the like. At a second step 204, the first user may upload the SCCMC to a server. The server may be a hosted on a cloud hosting service. Cloud hosting services may include Amazon Web Services™ (AWS), Microsoft Azure Infrastructure Services™, Google Cloud Platform™, CenturyLink Cloud™ (CLC), VMware vCloud Air™, IBM SoftLayer™, Rackspace™ and the like.

At a third step 208, a dual push notification may be sent from the server to a second user. The dual push notification may be sent over a first network 220, a second network 222, or a first network 220 and a second network 222. First network 220 and second network 222 may be on separate infrastructures operated by different operators, such as an Amazon™ SMS infrastructure, a Google™ Cloud Messaging infrastructure, a Pushy™ MQTT infrastructure, an infrastructure of a mobile telecommunications operator, and the like. Sending the push notification over multiple, separate infrastructures may increase the reliability of the push notification sent from the first user being received by the second user.

At a fourth step 210, the second user may receive the push notification on the second user's mobile phone 104. The push notification may include information that tells the second user's mobile phone 104 to prepare to play the SCCMC created by the first user. The second user's mobile phone 104 may download the SCCMC. The SCCMC may be installed on the second user's mobile phone 104 to be played on a screen of the second user's mobile phone 104, such as at the lock screen, on the home screen, in an application, or on a screen that displays while the recipient is on a phone call. At a fifth step 212, the second user may send a push notification to the first user. The push notification sent by the second user to the first user may inform the first user that the second user received the SCCMC sent by the first user. The push notification sent by the second user to the first user may also inform the first user that the SCCMC sent by the first user to the second user is ready to play on the second user's mobile phone 104.

Figure 2C:
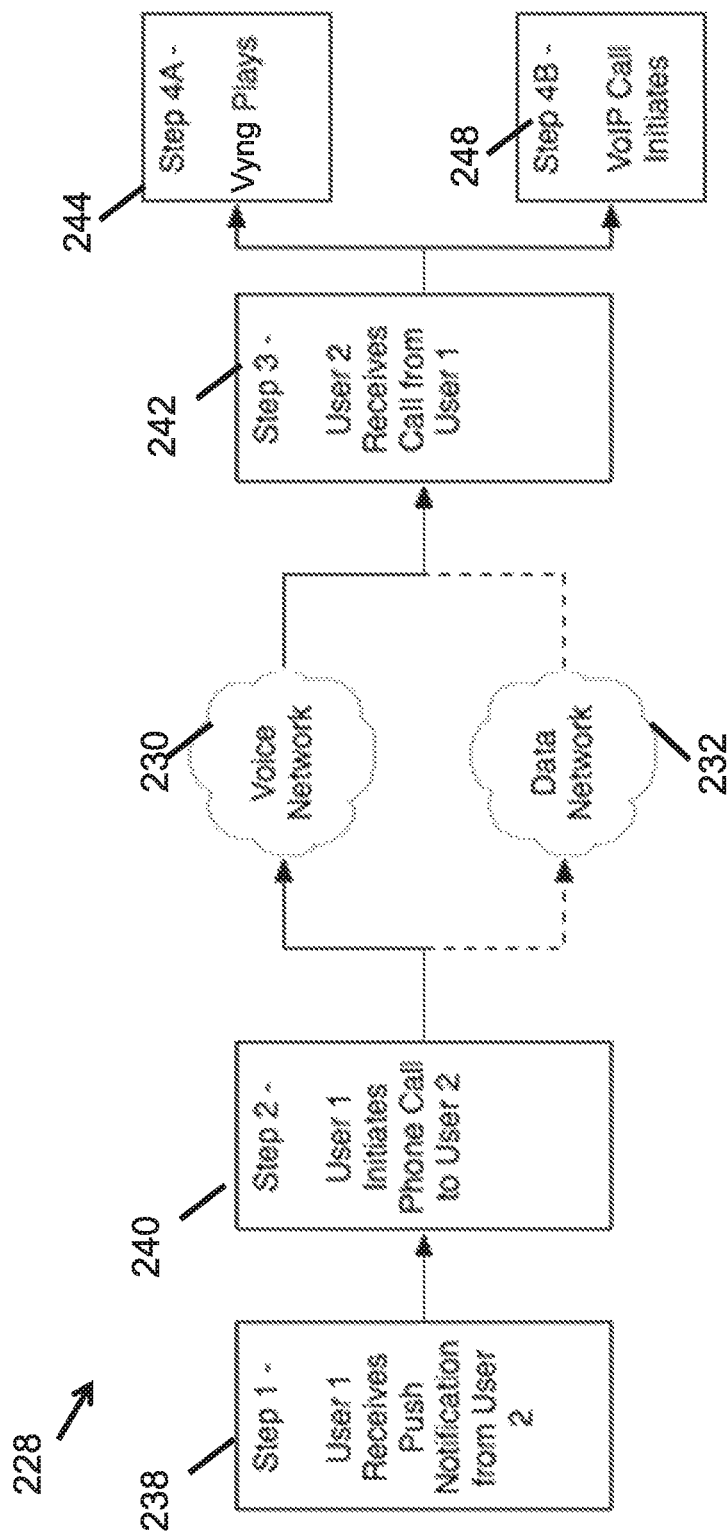
FIG. 2C illustrates a process for initiating a phone call in accordance with an embodiment of the systems and methods disclosed herein.
Figure 3D:
Figure 3E:
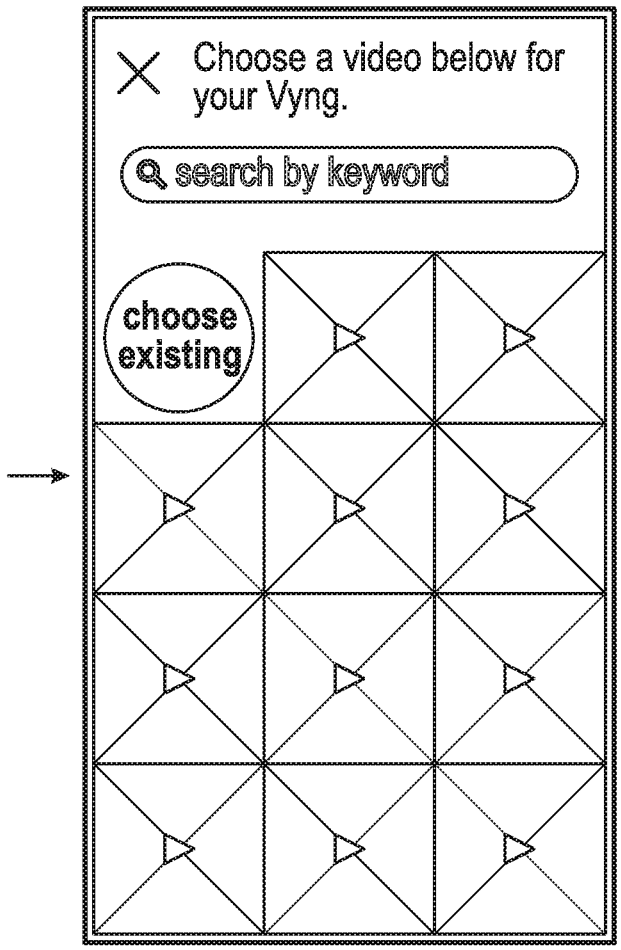
Figure 3F:
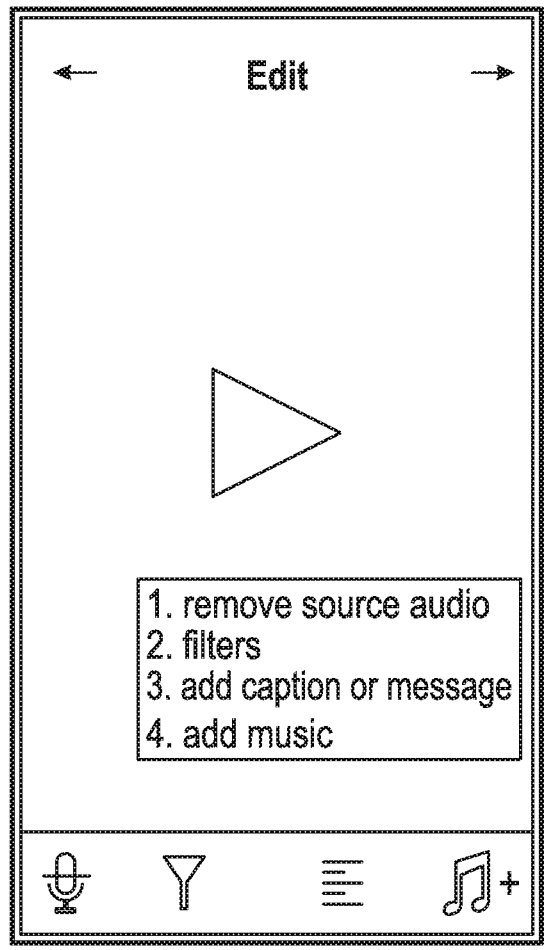
Figure 3G:
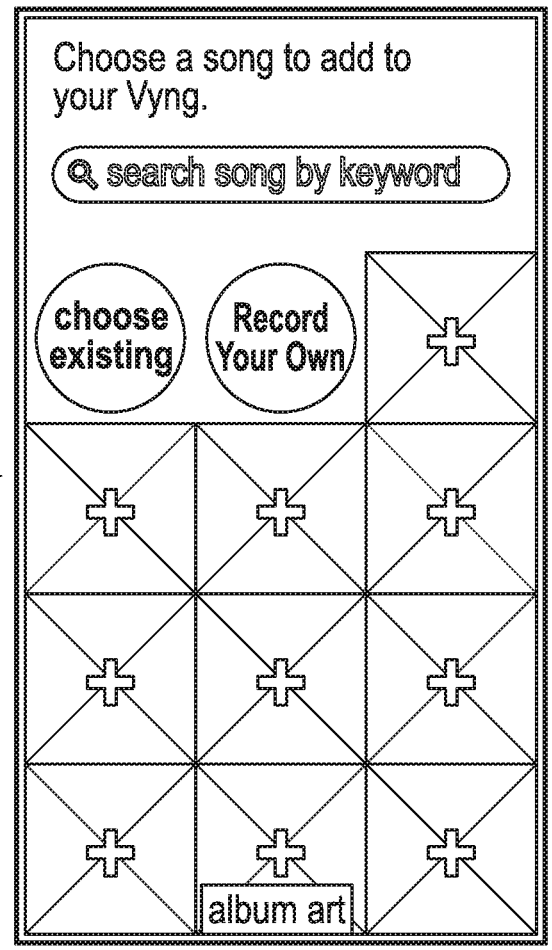

FIG. 2C illustrates a process and flow 228 for initiating a phone call. A phone call may be initiated when a first user receives a push notification from a second user, as illustrated in the first step 238. In a second step 240, the first user may initiate a phone call from the first user's mobile phone 102 to the second user's mobile phone 104. The phone call may be initiated over a voice network 230, a data network 232, or both, and may be associated with a message from the sender to a recipient. In embodiments, the call may use both transmission layers (voice and data). A voice network 230 may be a cellular phone network. A phone call initiated over a data network 232 may be a voice over Internet protocol (VOIP) phone call. A VOIP phone call may be initiated with a second push notification sent from the first user to the second user. A second push notification may include a session ID. A VOIP call may be initiated using a third-party service. A third-party service may be provided by Top Box™, Skype™, Google Hangouts™, WhatsApp™, WeChat™ and the like.

The second user may receive the phone call on the second user's mobile device 104 from the first user's mobile device 102 at a third step 242. The second user's mobile device 104 may play the SCCMC when the phone call is received from the first user's mobile device 102, as illustrated in subsequent steps 244 and 248.

FIGS. 3A-3G illustrate detailed screenshots of a user interface of the App by which a first user may create a new SCCMC. The first user may create the SCCMC with custom ringtones, text tones, and photo as part of his or her contact card that may be controlled by the first user himself on his or her friend's phone (recipient mobile phone 104) instantly. The App may provide interfaces for getting started with the App, brief tutorials, the capability for recording videos, the ability to select friends, the ability to push videos to other people's phones, and the like. Ideas may be provided as prompts to the user. The App may allow creating and sharing of videos and tunes. The App may allow listening to or viewing other ringtones that have already been created. The App may allow creating the first SCCMC for a user. The App may also allow various video options, such as slow motion, the use of a timer, and the like, to be included in or with the SCCMC. The App may allow the user to edit a page and/or request additional tools or advanced features. In an example, the source file may be removed and the App may keep the video and play something else for audio and/or split the video and audio and change either one. The App may allow adding filters, captions, messages, or music, customization of the message, and the like. The App may allow sharing a page to a list of friends and the like. The App may allow sharing through a text message, such as via a button that allows the user to send a preview of the SCCMC with video and/or audio and a link to download the App. The App may enable a store for downloading the App if it is not already installed on the phone of the recipient. If the second user has an App, a message may trigger delivering the SCCMC tone to a queue.

For purposes of creation, a button in the App may allow the first user to discover and choose audio, videos or SCCMC tones that he may already have. The videos or other forms of content to be used in the SCCMC may be stored in a library, and the App may facilitate discovery from the library. The App may also allow browsing other videos that come from other websites that enable sharing or downloading of video. In embodiments, the SCCMC may be selected from a curated library of SCCMC-type content. The library may be automatically curated, under computer control, via an algorithm that is based on a topic of interest indicated by a sender or a recipient of an SCCMC. The library may be curated by an editor based on subject matter, such as the subject matter of a channel to which a sender or recipient subscribes.

The App may allow searching for keywords, and it may automatically upload a video that is searched for those keywords. The App may also allow using stop-motion photos in the SCCMC and may allow video or audio payload. The App may allow adding audio to videos, and the like. The audio files may be either taken from what is already created (user's library), or from the sender mobile phone 102, or from other users, albums (such as music store), and the like.

Figure 4A:
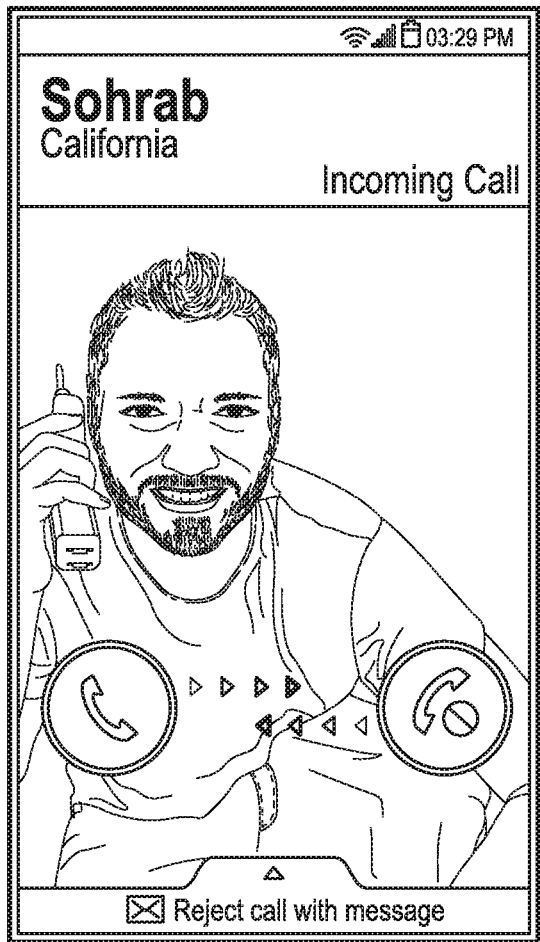
FIGS. 4A-4F illustrate examples of an SCCMC in accordance with an embodiment of the systems and methods disclosed herein.
Figure 4B:
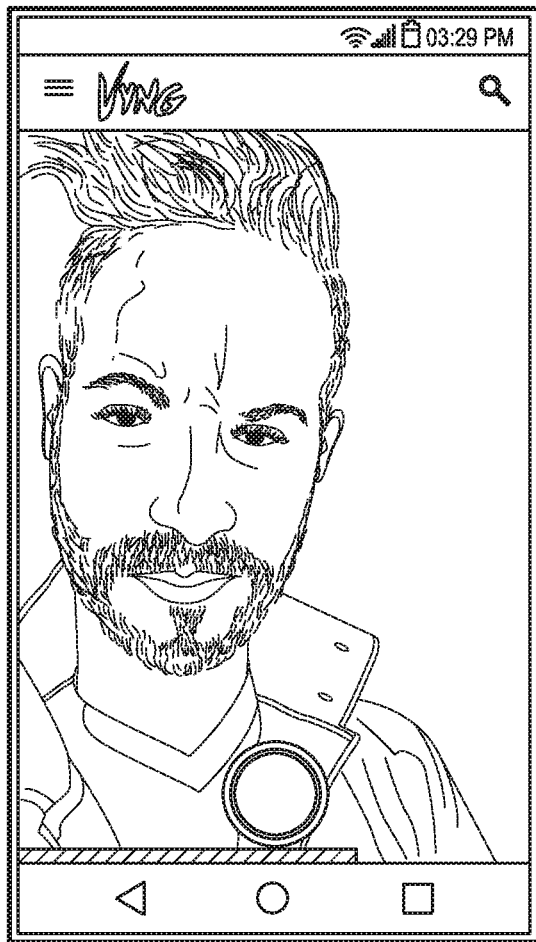
Figure 4C:
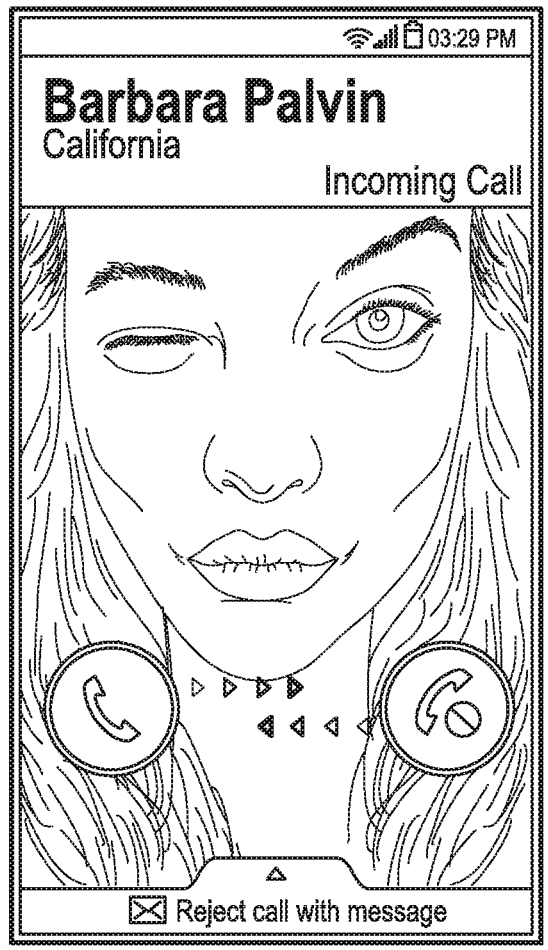
Figure 4D:
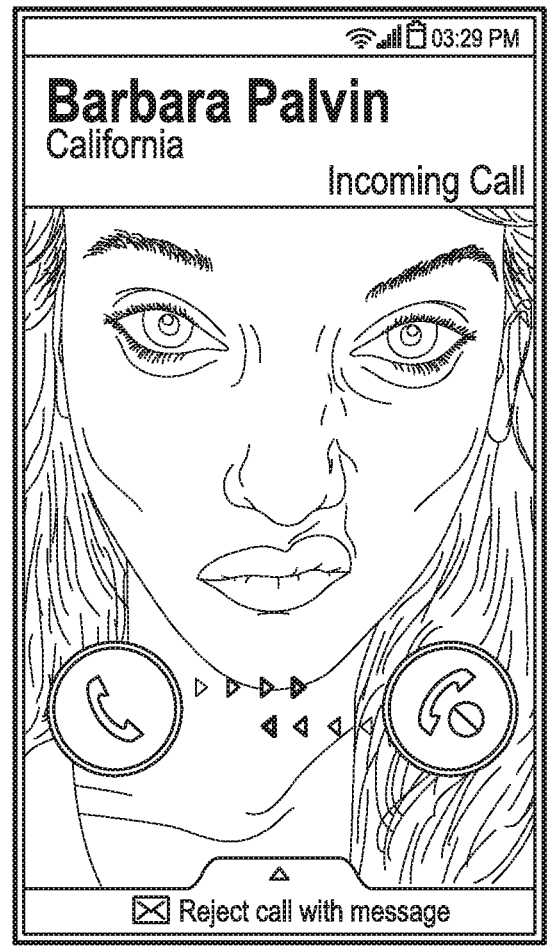
Figure 4E:
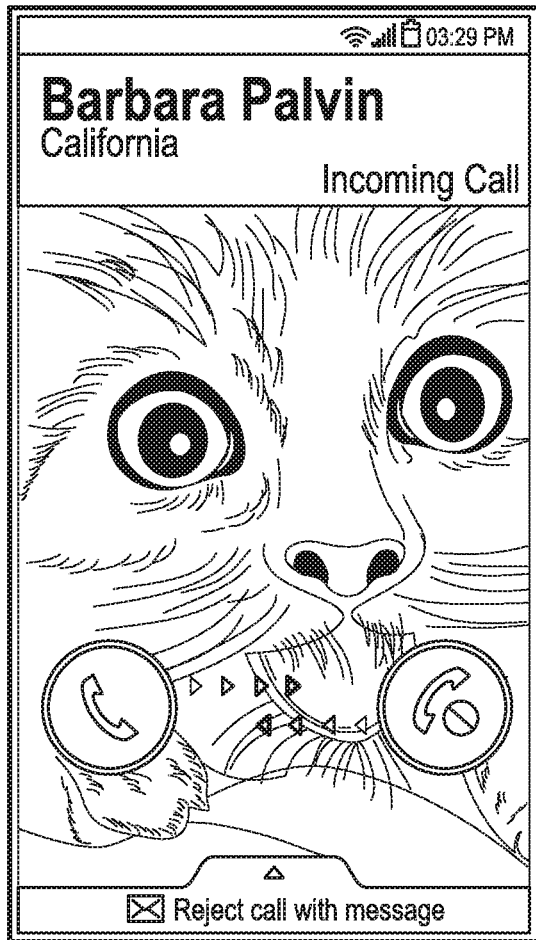
Figure 4F:
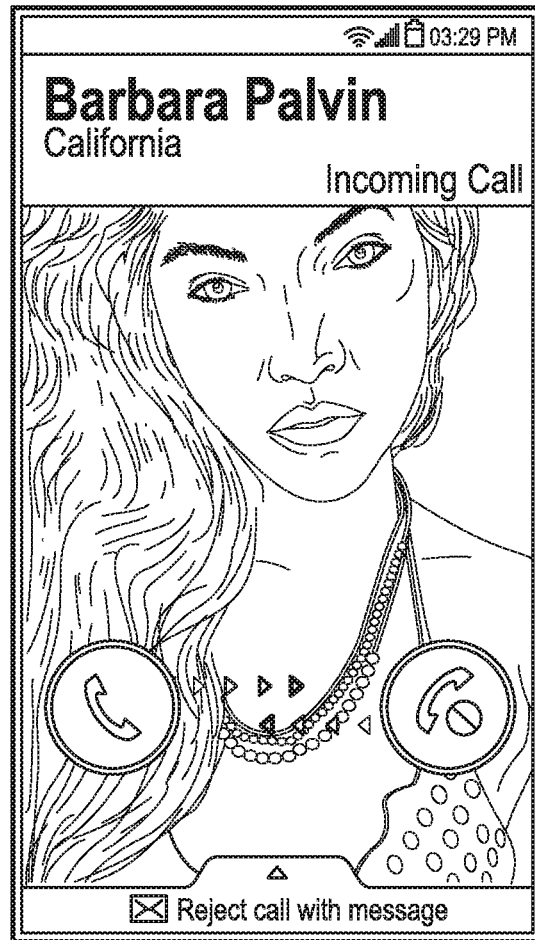

FIGS. 4A and 4B illustrate a call being received on a second user's mobile device 104. The call may display the SCCMC tone created by the first user automatically on the second user's phone. In embodiments, the first user may wish to convey a current emotional state. A user interface on the first user's phone may, for example, allow the first user to create multiple tones, each of which is associated with an emotional state. The emotional states may be indicated in metadata of the tones. When the user initiates a call, the user may indicate a current emotional state, which, when transmitted to the phone of the second user, may initiate a process by which the App selects and displays the correct SCCMC tone that is associated with that current emotional state of the first user. The emotional state may be conveyed by a facial expression, an image, a sound, an emoticon, or other characteristic associated with a particular tone.

As shown, the recipient mobile phone 104 may display the SCCMC that the first user directs the recipient mobile phone 104 to ring/show video that reflects the current mood of the first user. The App may be able to choose what the first user sends, or what message is displayed on the second user's phone, such as indicated by emojis, by selecting a mood, or the like. In embodiments, the correct SCCMC tone may be associated with and therefore shared every time the first user calls or texts the second user. In other embodiments one or more tones is stored on the second user's mobile device 104 and is triggered by the receipt of a call from the number of the first user's device 102, possibly carrying with it other information (which may be transmitted over the server 112 via the App) that allows selection of particular emotional content. In embodiments, the App may change an SCCMC during a call. The App may be triggered to change an SCCMC during a call when the mood of the first user changes to a different mood, for example. The App may select a new SCCMC for display on the second user's device 104 to reflect the different mood of the first user. A user may be able to respond to the SCCMC.

A user may be able to respond to an SCCMC by tapping on the SCCMC. For example, a second user may be able to provide feedback to a first user on an SCCMC sent by the first user to the second user. The feedback sent by the second user may indicate the second user's satisfaction with the SCCMC sent by the first user to the second user. The second user may provide feedback to the first user by tapping on an SCCMC received from a first user, for example. The tap may generate a heart or other emoji on the SCCMC displayed on the second user's mobile device 104. The tap may also generate a heart or other emoji on the screen of the first user's mobile device 102.

Figure 5A:
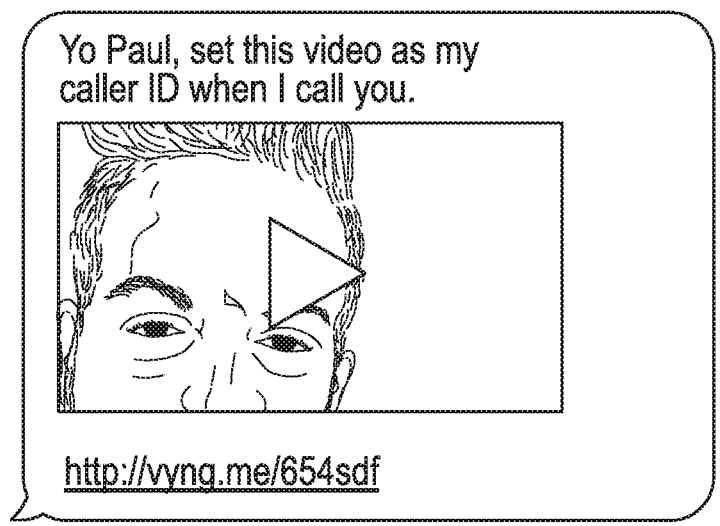
FIGS. 5A, 5B, and 5C illustrate User A sharing an SCCMC with User B in accordance with an embodiment of the systems and methods disclosed herein.
Figure 5B:
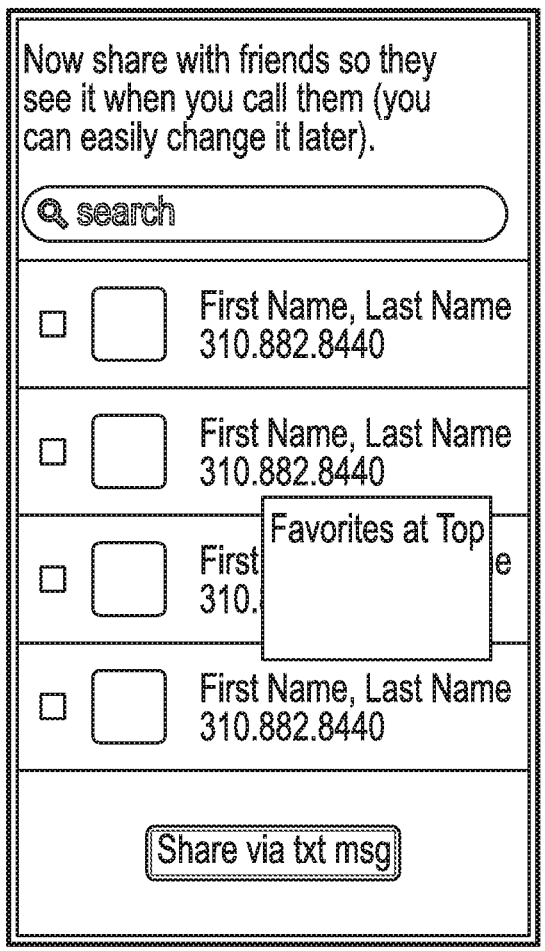
Figure 5C:
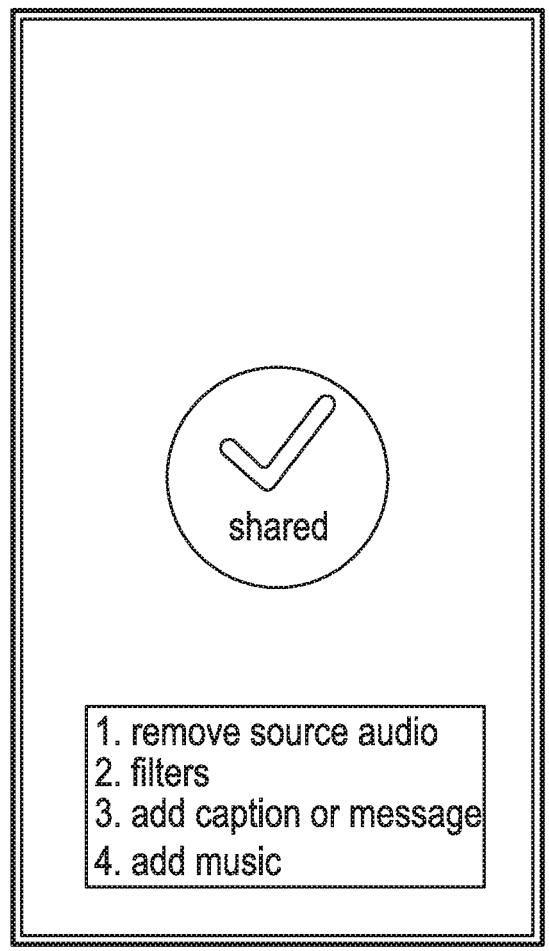

FIGS. 5A-5C illustrate embodiments of user interface features by which the first user may share an SCCMC tone with the second user. FIG. 5A illustrates a message that the second user may receive from the first user, prompting the second user to accept delivery of and set the SCCMC tone of the first user on the mobile device of the second user. The message may include text, video, audio, links, and the like. FIG. 5B illustrates a detailed screenshot of the interface by which a first user may select which friends the first user would like to have received the particular SCCMC tone. FIG. 5C illustrates a confirmation that may be displayed to the first user when the SCCMC has been successfully shared with the selected friends of the first user.

In various embodiments, content delivery may be achieved either through a client-server architecture (including a cloud architecture), a peer-to-peer architecture, or other content delivery architecture.

In a client-server approach, the App may periodically query the application server or content server 112 for newly published or updated content. A content update may also be triggered via a push message from the server 112. Content may be filtered based upon privacy settings set by the content creator. The App may automatically download newly published or updated content and may synchronize the local data store on the device 102 with other content, such as cloud-stored content.

In a peer-to-peer approach, users, such as the first user and the second user in the examples above, who are in proximity to each other or connected via any peer-to-peer network connection may discover each other through the App. For example, the peer application may broadcast its presence to a listening port on the other peer device to establish its presence and seek to exchange credentials. Once discovered, peers may be displayed in the App to a user. The user may then selectively send SCCMC tones to one or more discovered peers.

Figure 6:
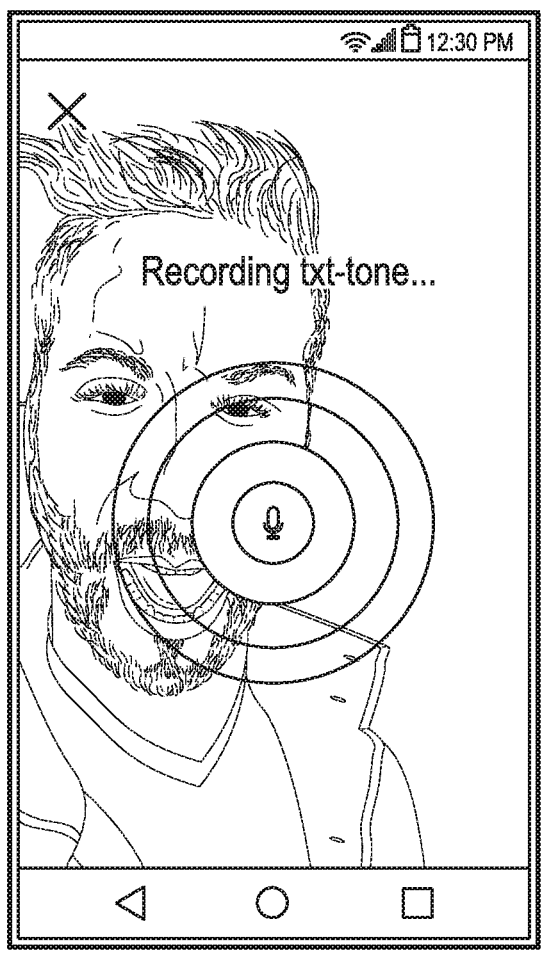
FIG. 6 illustrates User A adding custom details to an SCCMC in accordance with an embodiment of the systems and methods disclosed herein.

FIG. 6 illustrates a detailed screenshot of a user interface by which a user may record audio for inclusion in or with an SCCMC tone.

Figure 7:
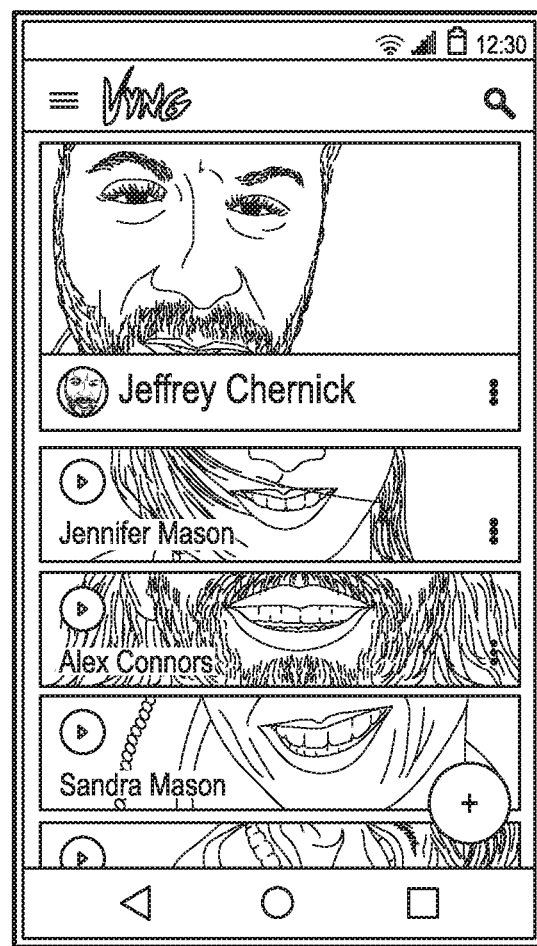
FIG. 7 illustrates User B setting an SCCMC received from User A in accordance with an embodiment of the systems and methods disclosed herein.

FIG. 7 provides a detailed screenshot of an interface by which a user may see snapshots of various SCCMC tones, such as ones received from other users or ones created to be shared with other users. When the App is installed on the phone of a user, the phone number of the user may be verified. Verification may be done in the background, such as when the phone is running the Android operating system. The App then may use the phone number to automatically set any SCCMC tones that are shared with the user by any friends of the user who are listed in the contacts on the phone of the user. The SCCMC tones may be set automatically by seamlessly matching the phone number associated with the SCCMC tone to the phone number of a contact in the address book on the phone of the user. Once the App is installed on the phone of a user, any new SCCMC tones sent to the user may be automatically set and a notification may be displayed in the notification list of the phone. SCCMC tone acceptance by the user may be automatic, may be active and require input from the user, and the like. SCCMC tone acceptance may be controlled by the user in the settings of the phone or of the App.

In embodiments upon initiation of the application on a mobile device 102, 104, the App may register with the operating system of the mobile device, including registering as a listener for incoming voice calls and incoming text messages.

When the App is notified of an incoming call, it may receive the incoming phone number from the operating system. The App may query its own internal database for an SCCMC tone that is linked to the incoming phone number. If a match is found, the App starts a new activity to play the SCCMC tone, such as using the default ringer application on the phone.

When the App is notified of an incoming text message (SMS), it may receive the incoming phone number from the operating system. The App may query its own internal database, such as for audio to play that is linked to the incoming phone number. If a match is found, the App may play the audio file, such as in an alternative to playing the default sound normally used to indicate an incoming text message.

The App may further allow pushing and synchronizing content to the contacts portion of a friend's/contact's phone, such as the recipient mobile phone 104, where the first user may control the video/audio presentation when the recipient mobile phone 104 rings upon the call of the first user. In embodiments, a user may find, manipulate and/or create video and/or audio and push it to the contacts function on someone else's phone, such as the recipient mobile 104.

Figure 8:
FIG. 8 illustrates User B creating an SCCMC and sharing the SCCMC with User A and others in accordance with an embodiment of the systems and methods disclosed herein.
Figure 9:
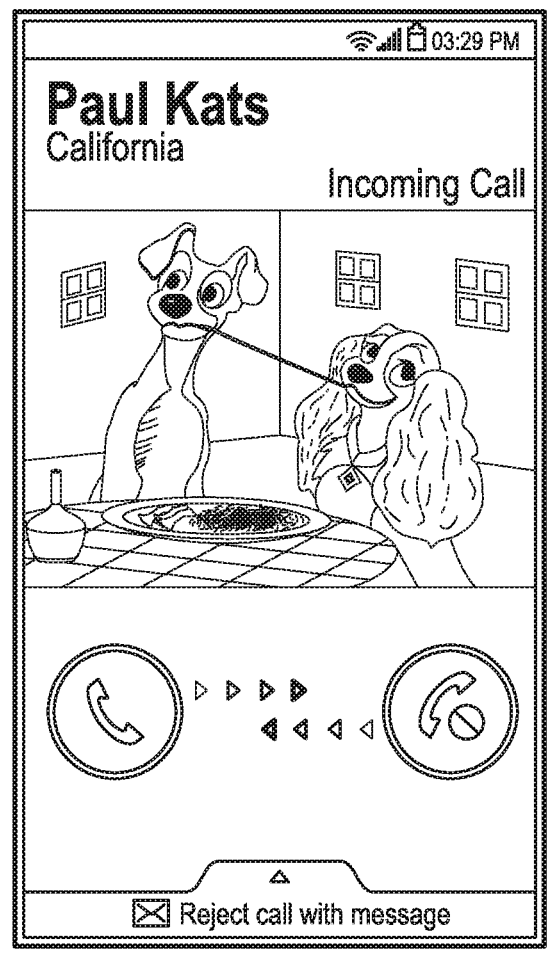
FIG. 9 illustrates an SCCMC created by User B for his or her significant other in accordance with an embodiment of the systems and methods disclosed herein.

FIGS. 8 and 9 illustrate examples of an SCCMC tone being displayed on the mobile phone 104 of the user as the user receives a call from someone who created and sent an SCCMC tone to the user.

Figure 10:
FIG. 10 illustrates a Home-Feed screenshot of an SCCMC in accordance with an embodiment of the systems and methods disclosed herein.

FIG. 10 illustrates a "Home-Feed" interface screenshot. The interface allows a user to see what he or she has downloaded and what he or she has shared with another user. The interface may allow a user to "like" or comment on the SCCMC tone. The interface shows what is pending in the news feeds of the user. The interface may also show updates in the SCCMC tone by other users.

Figure 11A:
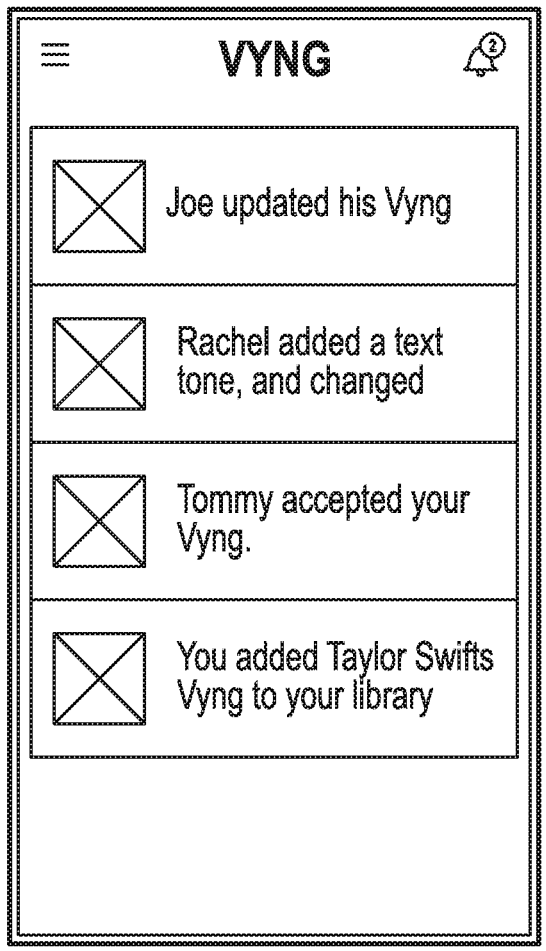
FIGS. 11A and 11B illustrate Notifications screenshots of an SCCMC in accordance with an embodiment of the systems and methods disclosed herein.
Figure 11B:
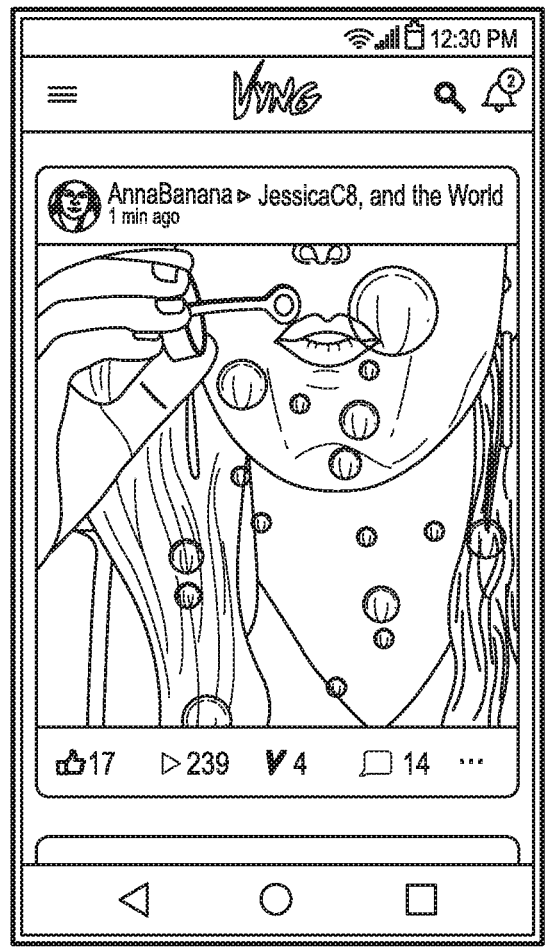

FIGS. 11A and 11B illustrate screenshots for displaying notifications. A user may receive notifications via one or more push messages sent through the mobile operating system of the phone of the user. As illustrated in embodiments shown in FIGS. 11A-11B, a user may access notifications via a notification icon 1102 displayed in the App. The App may enable a communication channel between the first user and his or her close contacts, including the second user, so that the first user and his or her friends may have an automatic update channel. For example, as shown in FIG. 11A, Joe may have updated his SCCMC tone and shared the update with a second user over the communication channel. As an example, the first user may change audio and video associated with the SCCMC tone that the first user shared with the second user. The App may reflect changes in the user profile of the first user on the phone of the second user and notify the second user of the changes in the notifications interface of the phone of the second user. The changes may reflect a changed text (e.g., audio) tone, changed SCCMC tone, and the like.

In the illustrated embodiment shown in FIG. 11A, the first user not only created a video ringtone but also created a text tone. The App changes the text tone accordingly.

Embodiments may include user linking. For example, the first user and the second user may link their accounts so that shared content is available between the users. The first user may send a text message with an identifying token via the App to the second user. The App on the recipient's phone 104 may listen for the incoming text message and automatically send the identifying token to the server 112. The two accounts are then linked server-side so that content may be shared between the first user and the second user.

User discovery may also be enabled. The App may also display a feed of publicly shared tones. The users may discover and link their accounts to other users in the public feed via private request/accept messages. Users may "like" a tone, add a tone to their library (re-Vyng), comment on a tone, report a tone and the like. A record button may be fixed to the bottom of the feed screen. Video may play without audio as a user scrolls through the feed. Users may maximize the video by tapping on it, and when the video is maximized the accompanying audio may be played.

Figure 12:
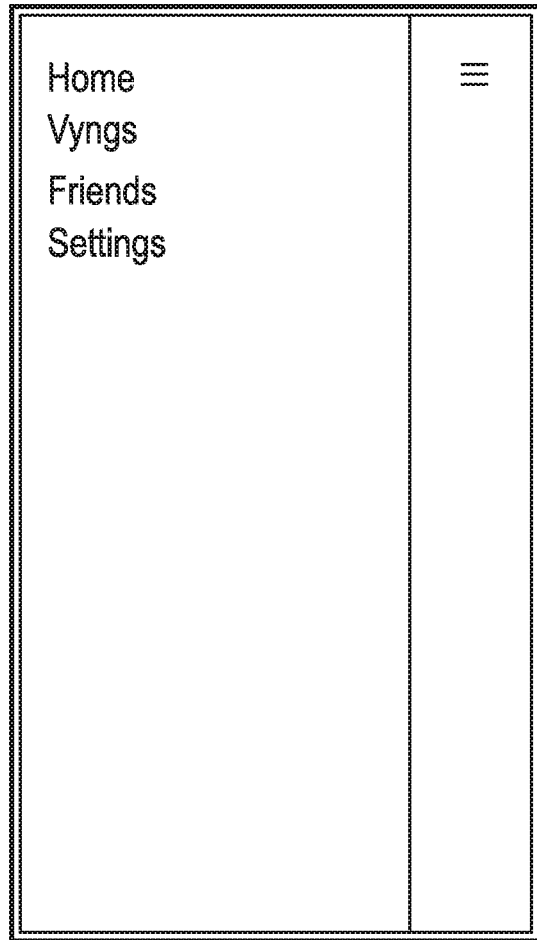
FIG. 12 illustrates a Menu screenshot of an SCCMC in accordance with an embodiment of the systems and methods disclosed herein.

FIG. 12 illustrates a "Menu" screenshot. The user may access a home screen, a list of tones (referred to as "Vyngs" in FIG. 12), a list of the user's friends, and other settings from the "Menu".

Figure 13:
FIG. 13 illustrates a Settings screenshot of an SCCMC in accordance with an embodiment of the systems and methods disclosed herein.

FIG. 13 illustrates a Settings screenshot. Various settings options may be provided to allow the second user to set allowances for his or her contacts e.g., preview tones before they automatically update on the recipient mobile 104.

FIGS. 14A-14I illustrate various screenshots for the process to enable contact editing between the first user and the second user using an SCCMC tone. A channel is provided to enable contact editing between the first user and the second user. The edits made by the first user to the contact provided to the second user may be done automatically or under control of the first user, the second user or the first and second user. A user may allow an SCCMC to be saved, synchronized, or automatically updated.

The first user may go into a payload that the first user sends to the second user. The first user may put content in the form of a profile picture, name, and email into the payload. If the first user changes any of this content, then the second user receives an update (e.g., the first user changed his or her profile picture, email, etc.) that may automatically update the content on the recipient's phone 104, or the recipient may have settings that control updates to the recipient's phone, such as by allowing the payload to be updated under control or automatically, based on the settings selected by the recipient.

The SCCMC tone created for the first user may be shared with the second user, the world, or other people selected by the first user. The first user may decide to not share the SCCMC tone.

Figure 14A:
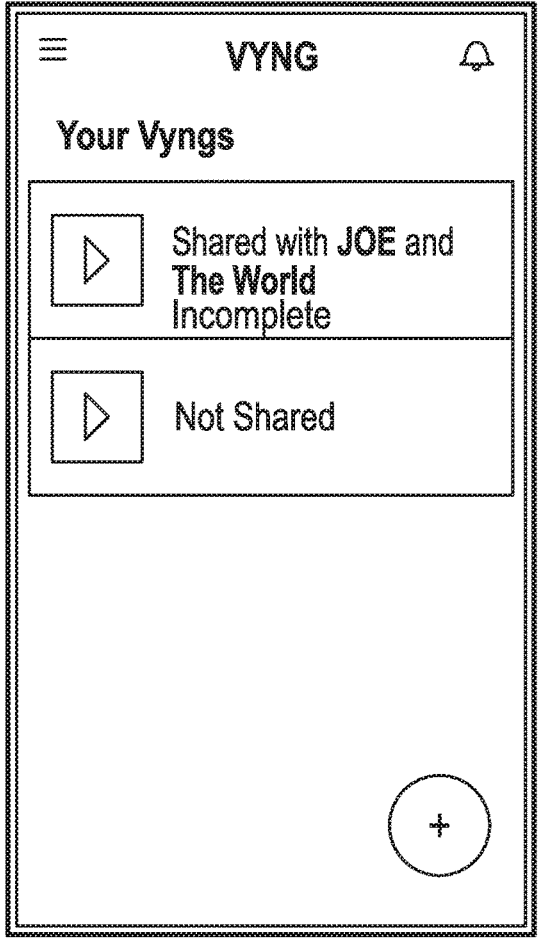
FIGS. 14A-14I illustrate screenshots of a process to enable contact editing between users in accordance with an embodiment of the systems and methods disclosed herein.
Figure 14B:
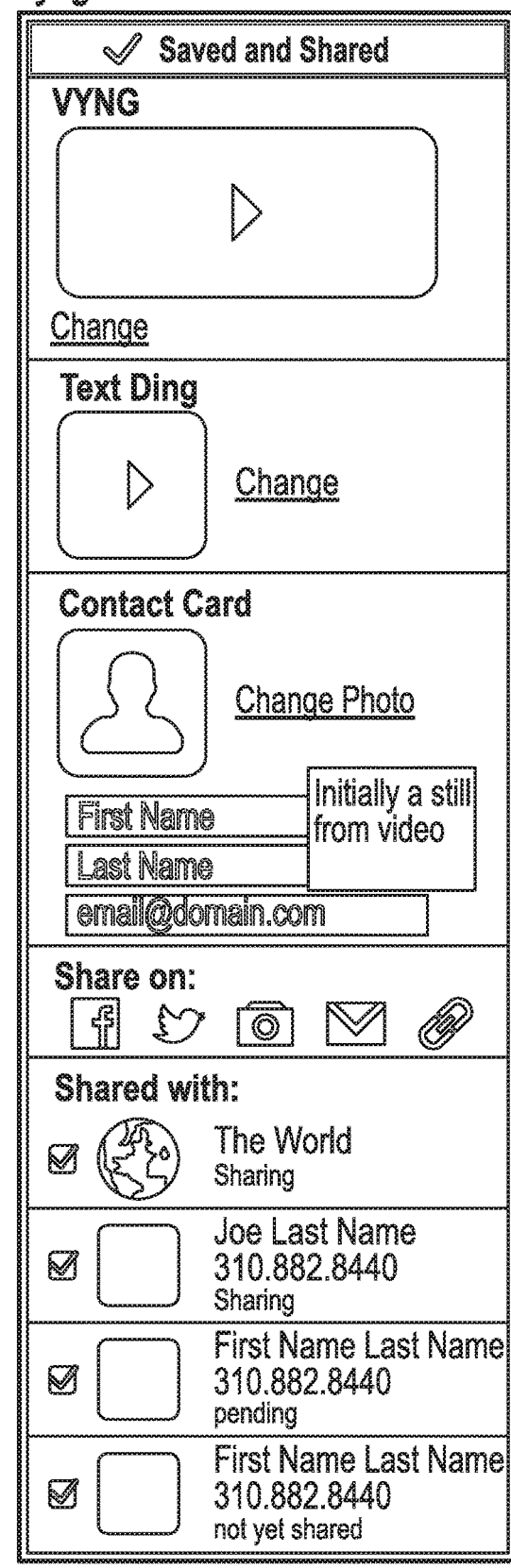
Figure 14C:
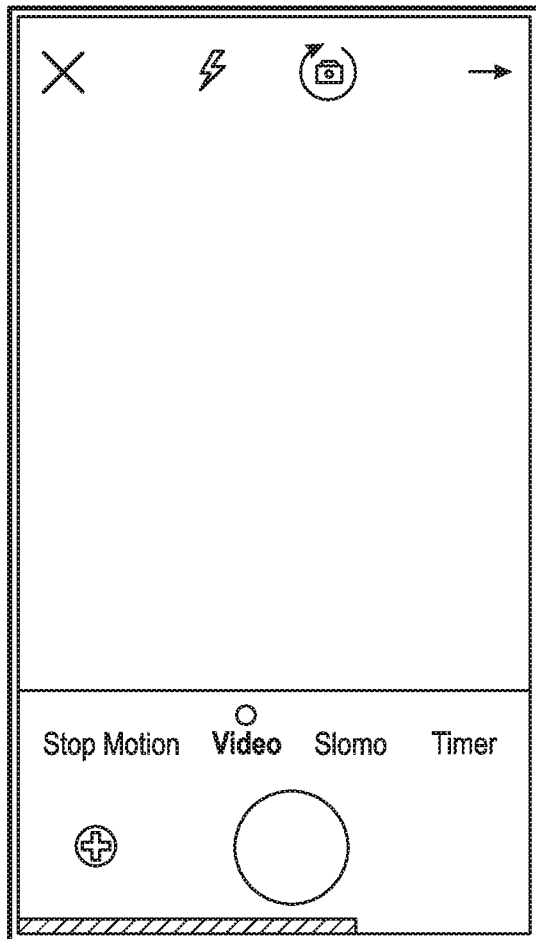
Figure 14D:
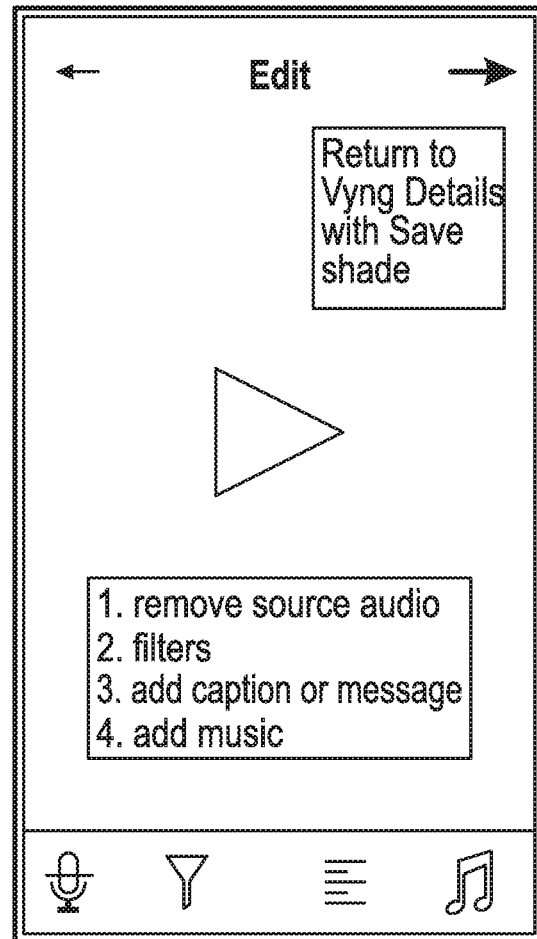
Figure 14E:
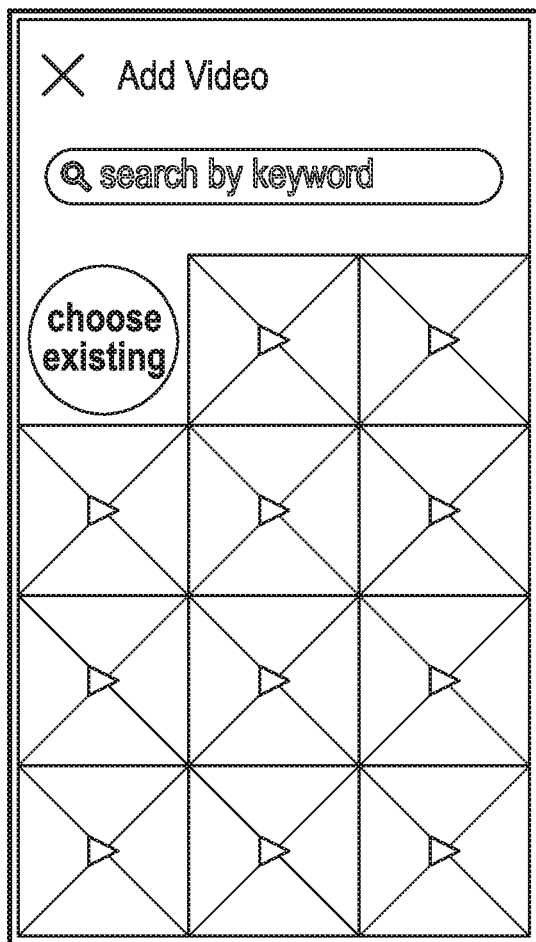
Figure 14F:
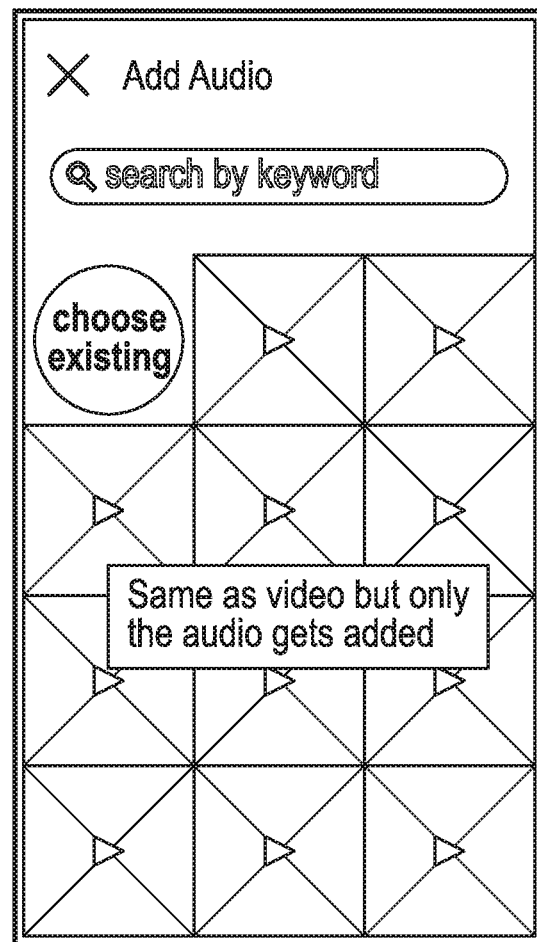
Figure 14G:
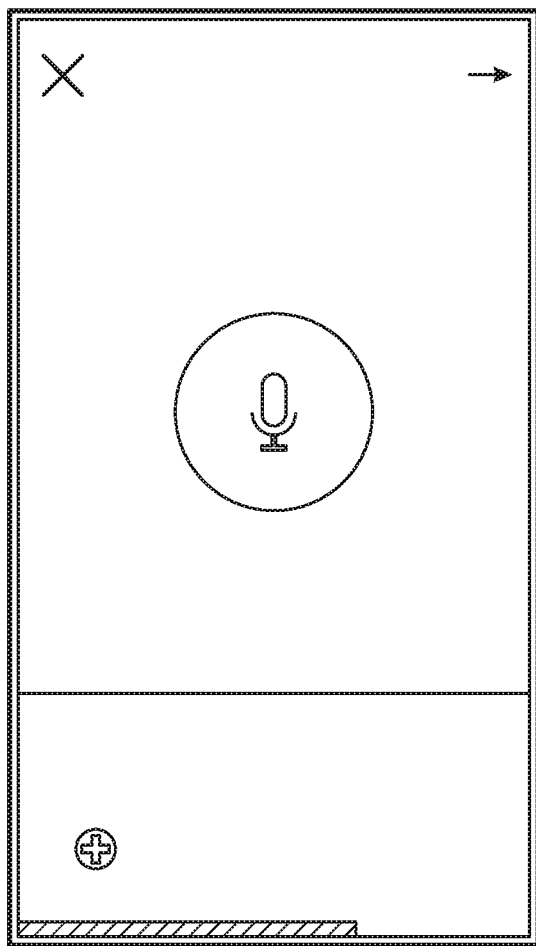
Figure 14H:
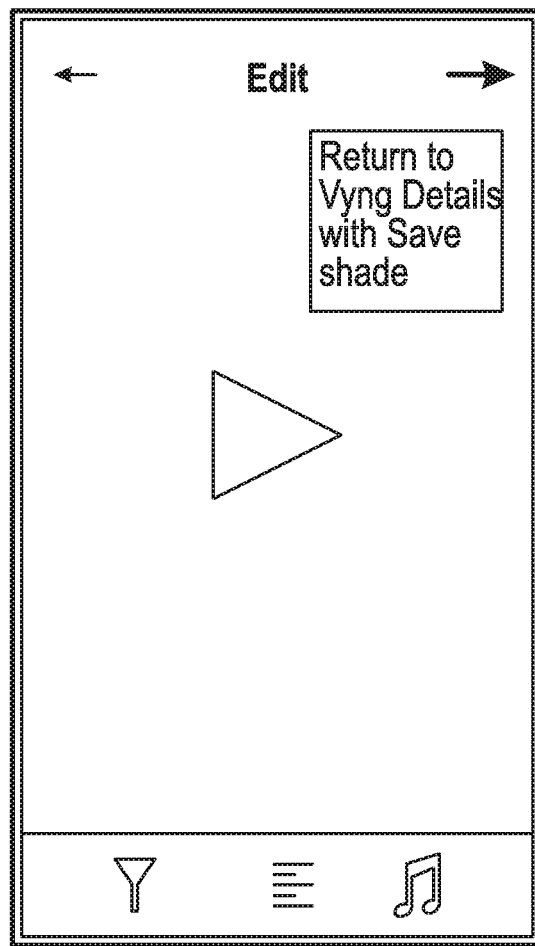
Figure 14I:
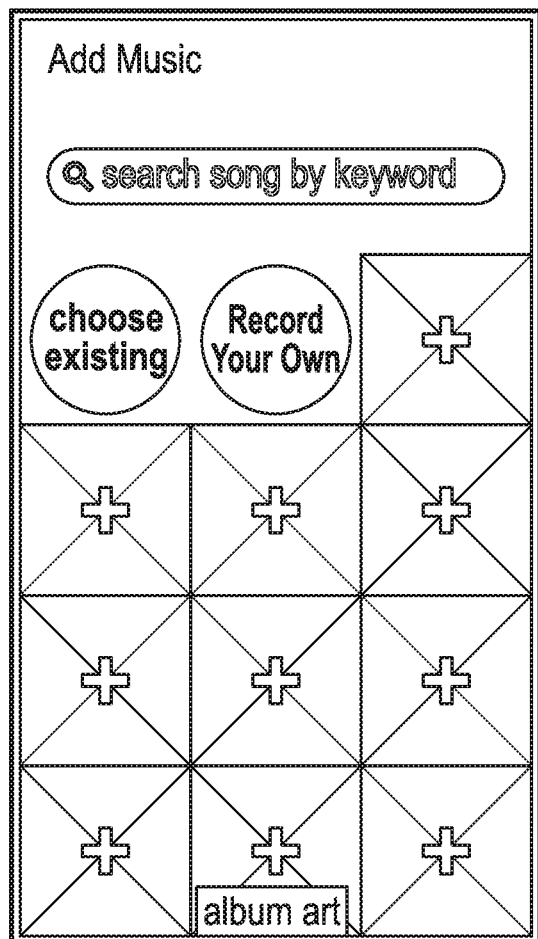

The first user may choose to select existing video or audio to add to the SCCMC tone as shown in FIGS. 14E and 14F, newly captured audio as shown in FIGS. 14G and 14H, and music as shown in FIG. 14I. Newly captured audio may be captured and posted automatically.

In an example, an SCCMC tone may live on the recipient's phone 104 at the level of the contacts function, rather than in an application that the second user has to locate, access, and use. The contact card may create all the features of the SCCMC tone using content taken from the social network of the first user. If the first user calls or texts the second user, the SCCMC displays the contact of the first user, whenever the second user uses the normal functions of the phone 102 to interact with the call or text from the first user. Thus, the SCCMC tone is played within the contacts function of the recipient's phone, without requiring the recipient to interact with an application.

Figure 15A:
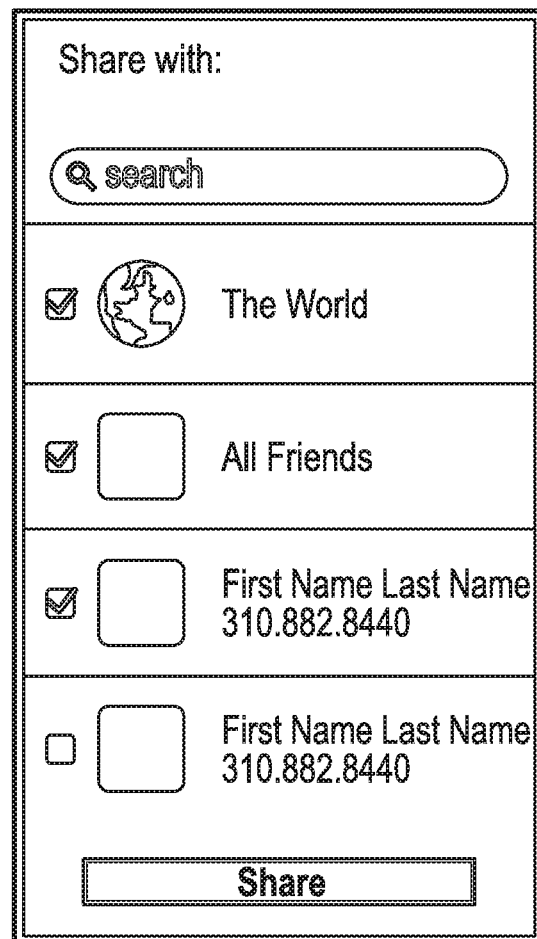
FIGS. 15A, 15B, and 15C illustrate screenshots of a process to deliver a contact with an SCCMC that automatically, or under user control, updates on the phone contacts of another user in accordance with an embodiment of the systems and methods disclosed herein.
Figure 15B:
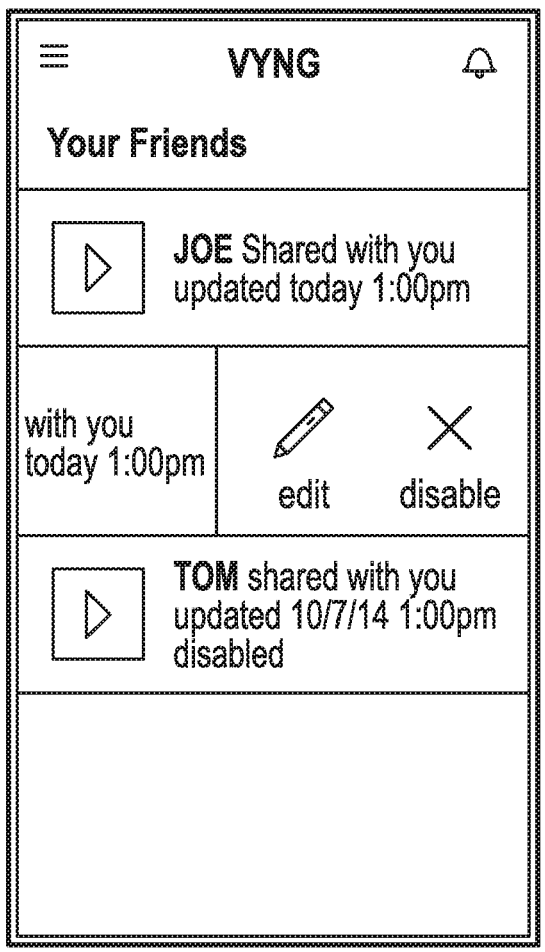
Figure 15C:
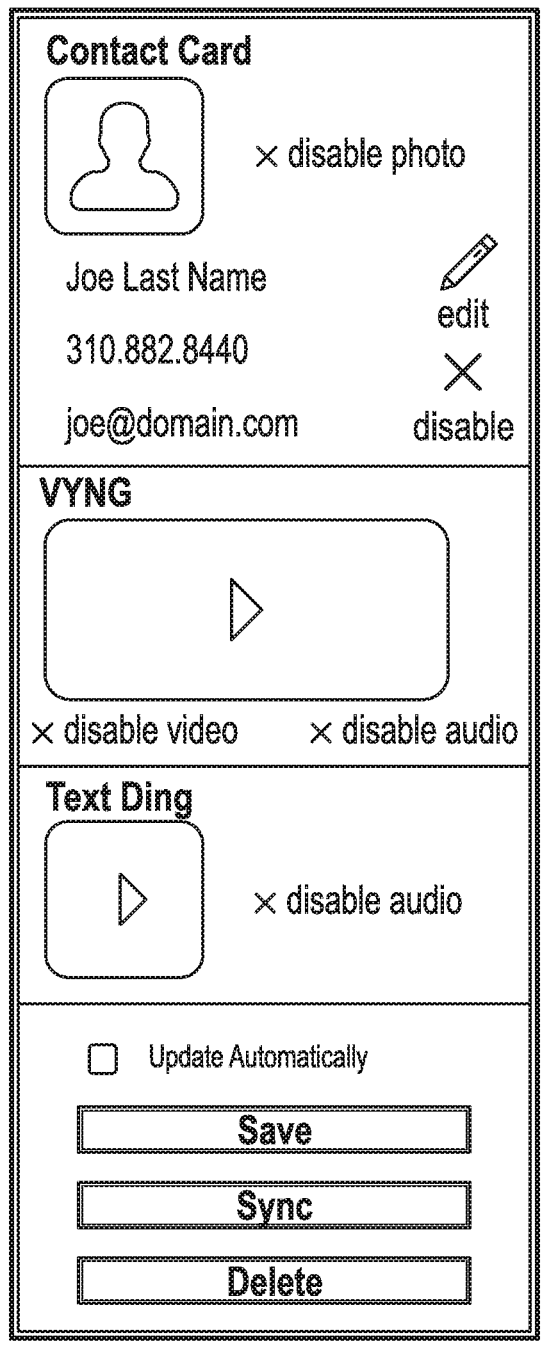

FIGS. 15A, 15B, and 15C illustrate screenshots providing the process to deliver a contact with an SCCMC tone that then automatically, or under user control, updates on the phone contacts of another user. FIG. 15A illustrates a screenshot providing an interface that may allow a first user to select with whom the first user wishes to share the SCCMC tone. The first user may choose to share the SCCMC tone publicly, for example with the world, with all friends or with selected friends. FIG. 15B illustrates a screenshot providing an interface that may allow a second user who receives the SCCMC from the first user to enable or disable the SCCMC. FIG. 15C illustrates a screenshot providing an interface that may allow the second user to edit the SCCMC received from the first user and control the behavior of the SCCMC on the phone of the second user.

Various content control functions may be enabled. When the App receives new or updated SCCMC tone information, the App may update the local store of metadata in the application database and update the local contact information of the registered user with fields stored in a data record for the SCCMC tone. The App may also convert the ringtone audio portion of the SCCMC tone into an acceptable format for a ringtone or text tone on the local device, save the ringtone to the shared data store in the phone's operating system, and register the ringtone with the operating system. Using application programming interfaces (APIs) of the operating system, the App may assign the ringtone to the sender on the recipient's phone 104.

Figure 16:
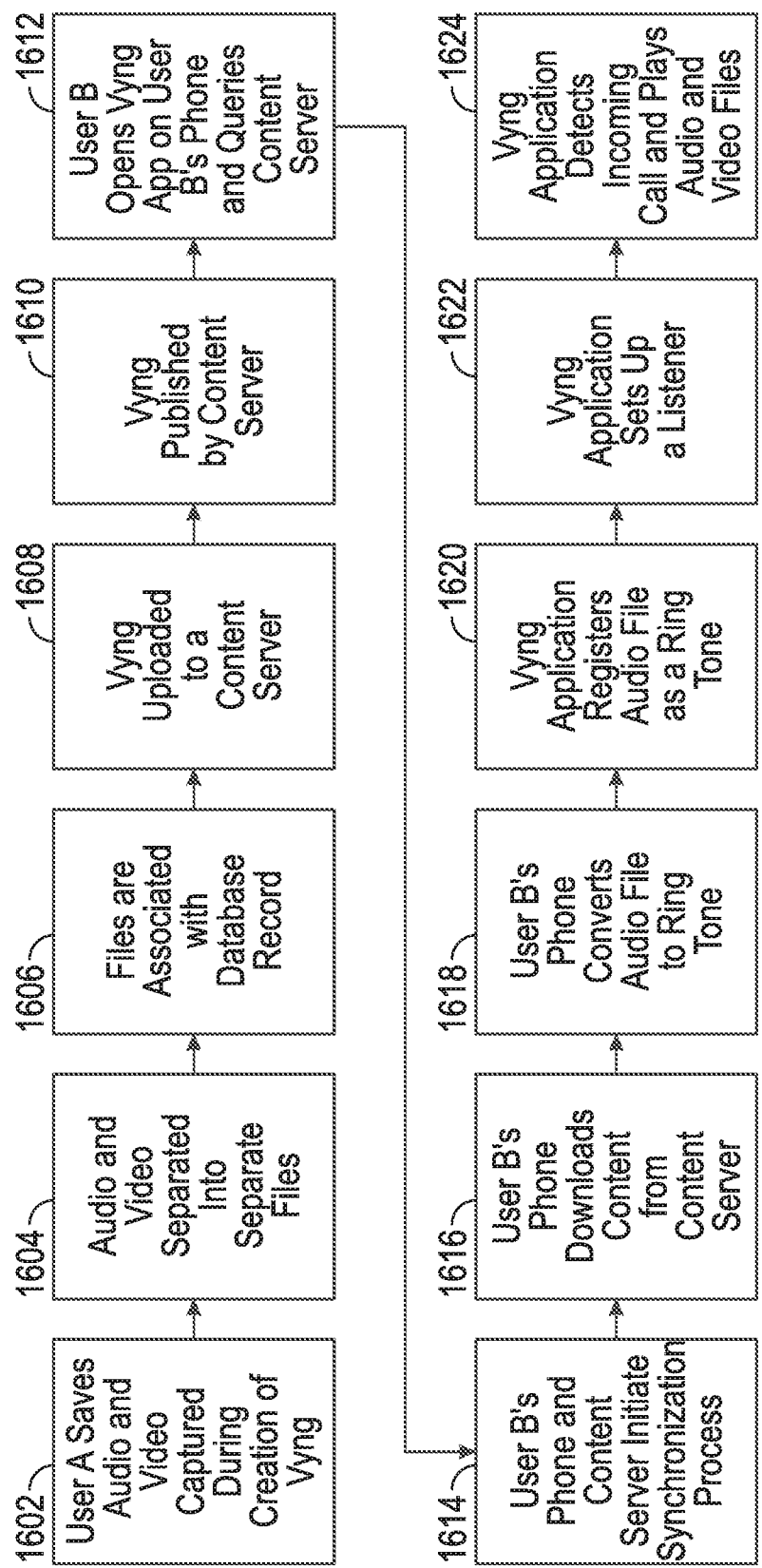
FIG. 16 illustrates a process for transferring an SCCMC from User A to User B in accordance with an embodiment of the systems and methods disclosed herein.

FIG. 16 depicts steps of a method for enabling delivery of an SCCMC tone from the first user (User A) to the second user (User B), according to an embodiment. First, in a step 1602, the first user, referred to herein as User A, may save audio and video captured during creation of the SCCMC tone, which may include audio and video captured by a video camera of the user's phone, audio and/or video retrieved from saved files, and/or video and/or audio retrieved from other sources, such as found in a search, retrieved from storage (including in the cloud), or the like. Next, in a step 1604, the audio and video may be separated into two separate files, one for audio and one for video.

Next, in a step 1606, the files may be associated with a database record that may store information about the SCCMC tone, such as the identifying information for User A, identifying information and property information for the audio file and the video file, and metadata, such as further information about user A and information about how User A wishes to share the SCCMC tone. At a step 1608, the SCCMC tone may be uploaded from User A's mobile phone 102, such as a smartphone, to a content server 112, and at a step 1610 the content server 112 may publish the SCCMC tone along with certain privacy controls that are based on preferences of User A, such as whether the SCCMC tone is just for User A, is intended to be shared with another party (referred to here as User B or the second user) or parties, or is intended to be public. Such privacy controls for a given SCCMC tone may be captured in the application that User A uses on User A's device to create and upload the SCCMC tone.

Next, at a step 1612, User B may open the App on User B's mobile phone 104, which queries the content server 112 to assess what is available to User B's mobile phone 104 in a feed that is associated with User B, which may include User B's own creations, content shared with User B by others (such as User A), and public content published by various users. The content server 112 and User B's mobile phone 104 may undertake a synchronization process at step 1614, where a difference is determined between the available feed on the content server 112 and the content already on User B's phone, after which at a step 1616 User B's mobile phone 104 downloads any content not already present on User B's phone from the content server 112. Once the updated SCCMC tone data is downloaded, the SCCMC App on User B's mobile phone 104 may turn the audio file portion of the SCCMC tone into a ring tone at step 1618, which is a special class or format that typically has its own registry in mobile operating systems, such as the Android™ or iOS™ mobile operating systems, deployed on certain smartphones. At step 1620, the SCCMC App may register the audio file associated with the SCCMC tone in the ringtone registry as a ringtone. Next, at a step 1622, the SCCMC tone may set up a listener, using the feature of the operating system that enables listening for incoming phone calls (which in the case of devices running the Android™ mobile operating system is enabled by an SDK for the operating system). The SCCMC App may access native APIs exposed by the Android™, iOS™ or other operating systems to listen for a call. At a step 1624, if an incoming call is detected from a number (e.g., the number of User A) that has a tone associated with it on User B's mobile phone 104, the SCCMC App retrieves the audio and/or video file portions of the SCCMC tone that was downloaded and the audio file portion and video file portion may be played individually or together.

In some closed operating system environments, one cannot detect an incoming phone call or set the user's ringtone for the user. In such cases, the content server 112 may just update contact information on User B's mobile phone 104, such as allowing User B to save an SCCMC tone for calls from User A, but in such cases possibly requiring actions for User B that are not needed in other situations. In embodiments, the content server 112 may also push notifications to users, so that User B may view User A's content that was shared for User B.

In embodiments, such as involving closed operating systems, an SCCMC content tone may be downloaded and stored on User B's mobile phone 104 for later access, such as at a time when the operating system makes available the ability to listen to a call, or at such time as the user elects to have the phone "jailbroken" or otherwise made open.

In embodiments, other ways to share content may involve the P2P transfer of an SCCMC tone, optionally with separated audio and video components, directly from a phone of a first user to a second user, without requiring a content server 112 or client-server arrangement, or with the content server 112 supplying a complementary role, but not being required for the transfer of the SCCMC. This may include using the Airdrop™ function in phones that use the iOS™ operating system or similar P2P transfer functions in other operating systems, such as Android™.

Figure 17A:
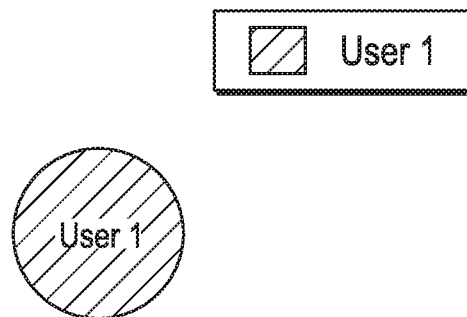
Figure 17B:
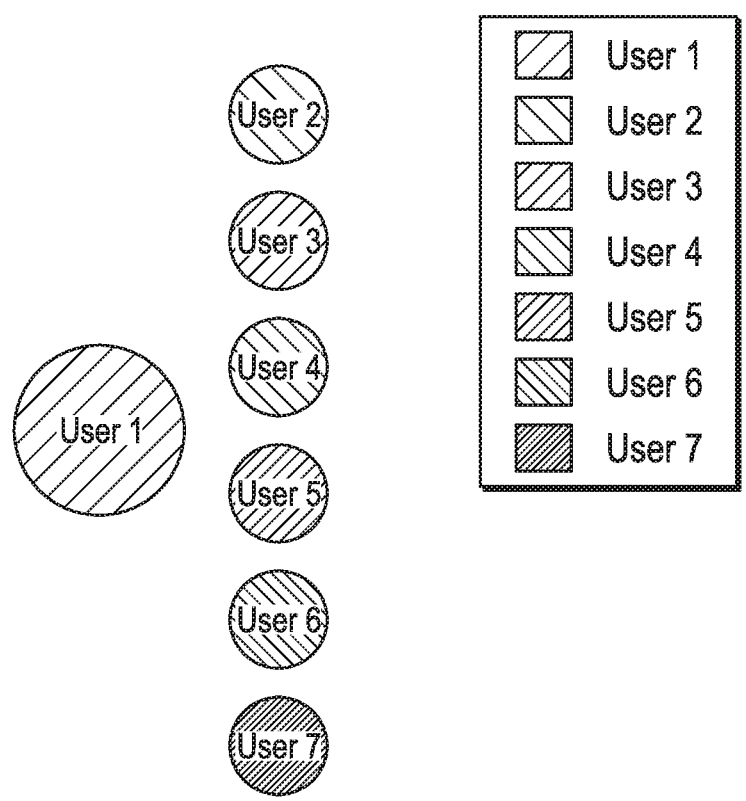
Figure 17D:
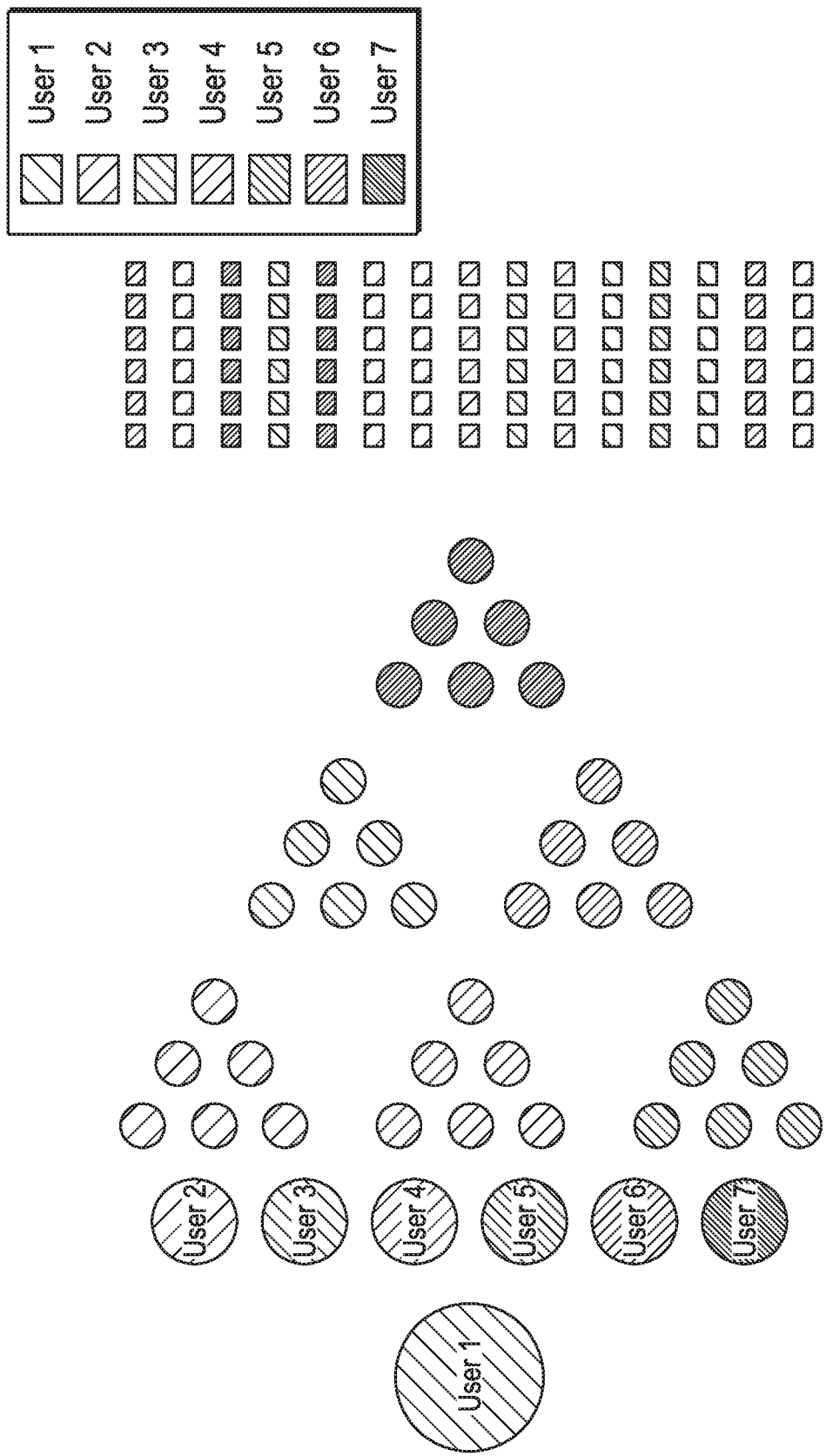

FIGS. 17A-D illustrate a user community growth through viral sharing effects. FIG. 17A illustrates a first user who has created an SCCMC tone. FIG. 17B illustrates the first user sharing the SCCMC tone with a first set of recipients. As illustrated in FIG. 17C, upon receipt of the SCCMC tone from the first user, the first recipients create and share their own SCCMC tones with a second set of recipients and the first set of recipients become users of the SCCMC tones in the process. FIG. 17D illustrates the second set of recipients then sharing their own SCCMC tones with a third set of recipients, as the second set of recipients become users of the SCCMC tones in the process, continuing the growth cycle.

Figure 18A:
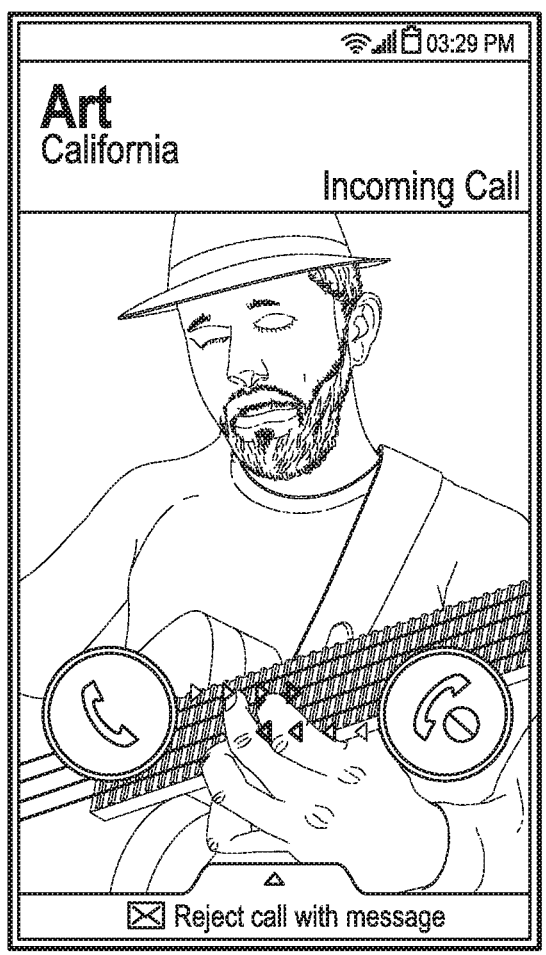
FIGS. 18A, 18B, and 18C illustrate monetization examples of an SCCMC in accordance with an embodiment of the systems and methods disclosed herein.
Figure 18B:
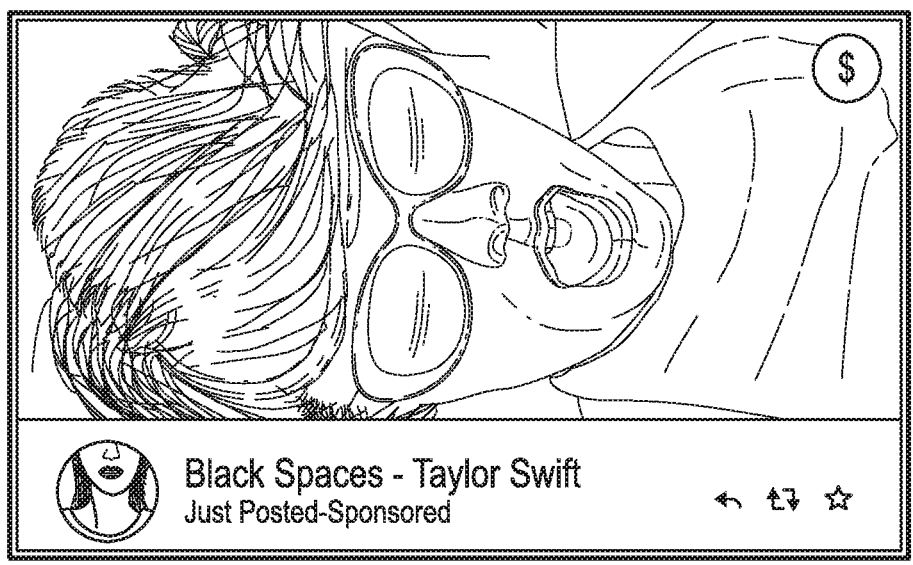
Figure 18C:

FIGS. 18A, 18B, and 18C illustrate monetization examples. FIG. 18A illustrates built-in advertising opportunities made available by a recipient of an SCCMC tone asking the sender of the SCCMC how sender created/used/shared a sender-controlled SCCMC. FIG. 18B illustrates a premium sender-controlled SCCMC tone as posted on a content feed. A premium SCCMC tone may support content taken from a marketplace for content creators. The marketplace for content creators may include SCCMC tone creation add-ons and brand promotional content. Brand promotional content be directly uploaded to the marketplace by brands and may include brand songs.

A creator of an SCCMC may select content from the marketplace to include in the SCCMC that the user is creating. A creator of an SCCMC may select content from a content library that is made available by the marketplace to the creator of the SCCMC. The marketplace may make available SCCMC content add-ons, which may include voice manipulation functions, photo filters, video filters, and the like. A premium SCCMC may also include promotional content for brands. An affiliate code may be linked to an SCCMC or a particular content component, such as an audio or video file, included in an SCCMC. Content may be ranked, rated, shared, liked, or subscribed to by content creators, content senders, or content recipients.

FIG. 18C illustrates an example of advertising in a sender-controlled SCCMC, in which an advertisement is displayed to a second user when a first user calls or sends a text message to a second user. An advertisement may include image components, audio components, video components, and the like.

In another example, a sender of an SCCMC tone may associate a song with an SCCMC tone and choose to have that song play on the mobile device of a recipient when the sender calls or sends a text message to that recipient. The song may be a song performed by a favorite artist, another favorite song, and the like. In yet another example, a pre-recorded message from a celebrity personality may play on the phone of a recipient of an SCCMC tone when the sender of the SCCMC tone calls or sends a text message to the recipient. The pre-recorded message may be selected based on how the recipient chooses to interact with the call or text message by either accepting, rejecting, or replying to the call or message.

Figure 19:
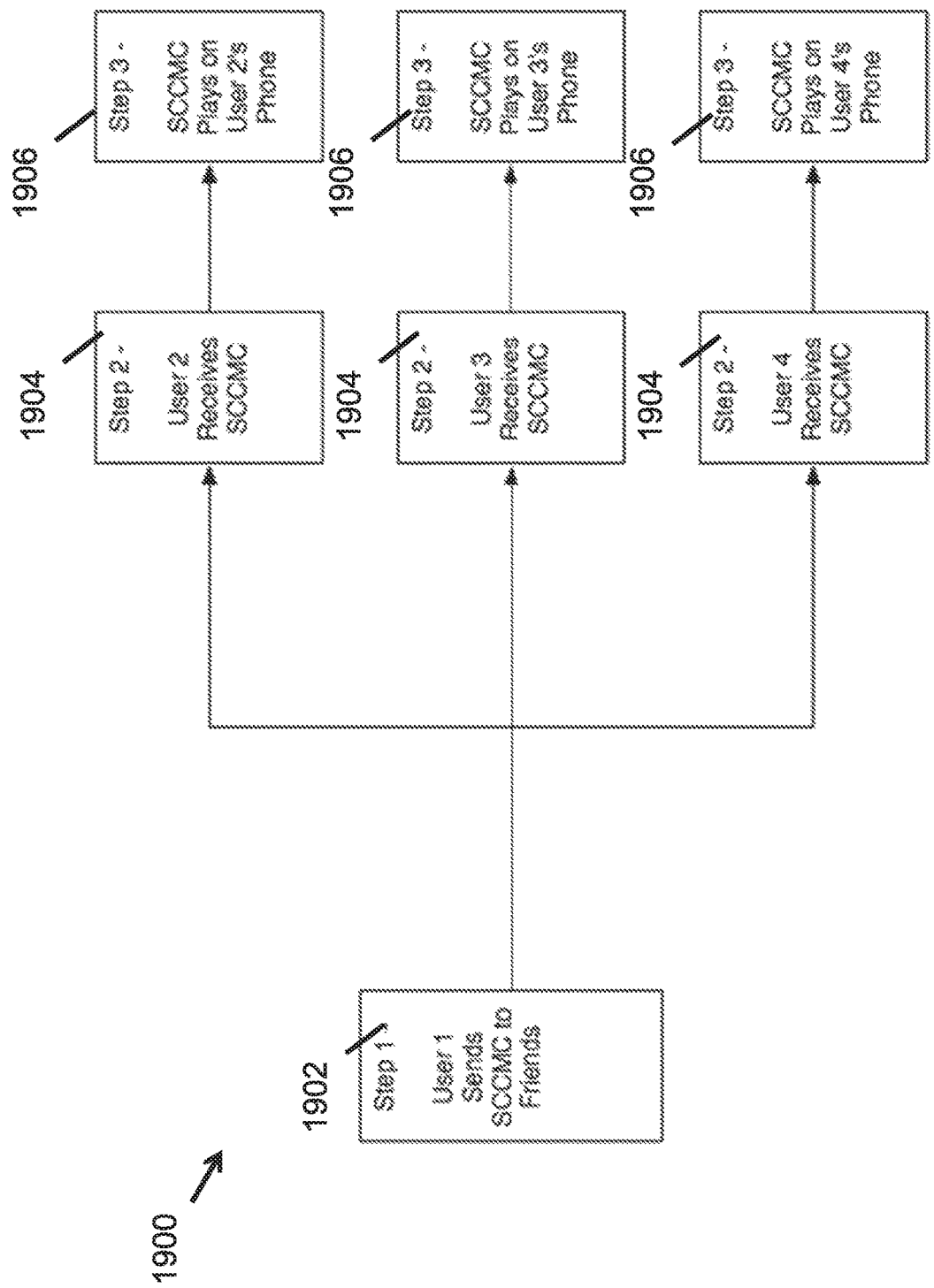
FIGS. 19-21 illustrate trigger examples of an SCCMC in accordance with an embodiment of the systems and methods disclosed herein.

FIG. 19 illustrates flow 1900 in which an SCCMC that may be triggered to play by the sending of an SCCMC from a user to a friend or group of friends. In the example illustrated in FIG. 19, a first user may send an SCCMC to a group of friends, shown in this example as a second user, a third user and a fourth user, as illustrated in first step 1902. In a second step 1904, the second user, third user and fourth user may receive the SCCMC from the first user. In a third step 1906, the SCCMC may play immediately on the screen of the second user's mobile phone when the SCCMC is received on the second user's mobile phone, the screen of the third user's mobile phone when the SCCMC is received on the third user's mobile phone and the screen of the fourth user's mobile phone when the SCCMC is received on the fourth user's mobile phone. An SCCMC that may be triggered to play by the sending of an SCCMC from a user to a friend or group of friends may be referred to as a "Vyng Bomb," in some cases. It may be noted that the SCCMC may be delivered, as described in connection with FIGS. 2B and 2C, over transmission layers of voice and data networks, so that user 2 may receive the SCCMC over a data network and play it upon initiation of a VOIP call, while user 3 may receive the SCCMC over a voice network, such that the SCCMC tone is played on the screen of user 3's phone when the call is received. In embodiments, the trigger to play the SCCMC may comprise a push notification over a data network without involving a phone call. The SCCMC may, in such embodiments, play and immediately disappear without there ever existing a phone call or a VoIP call.

Figure 20:
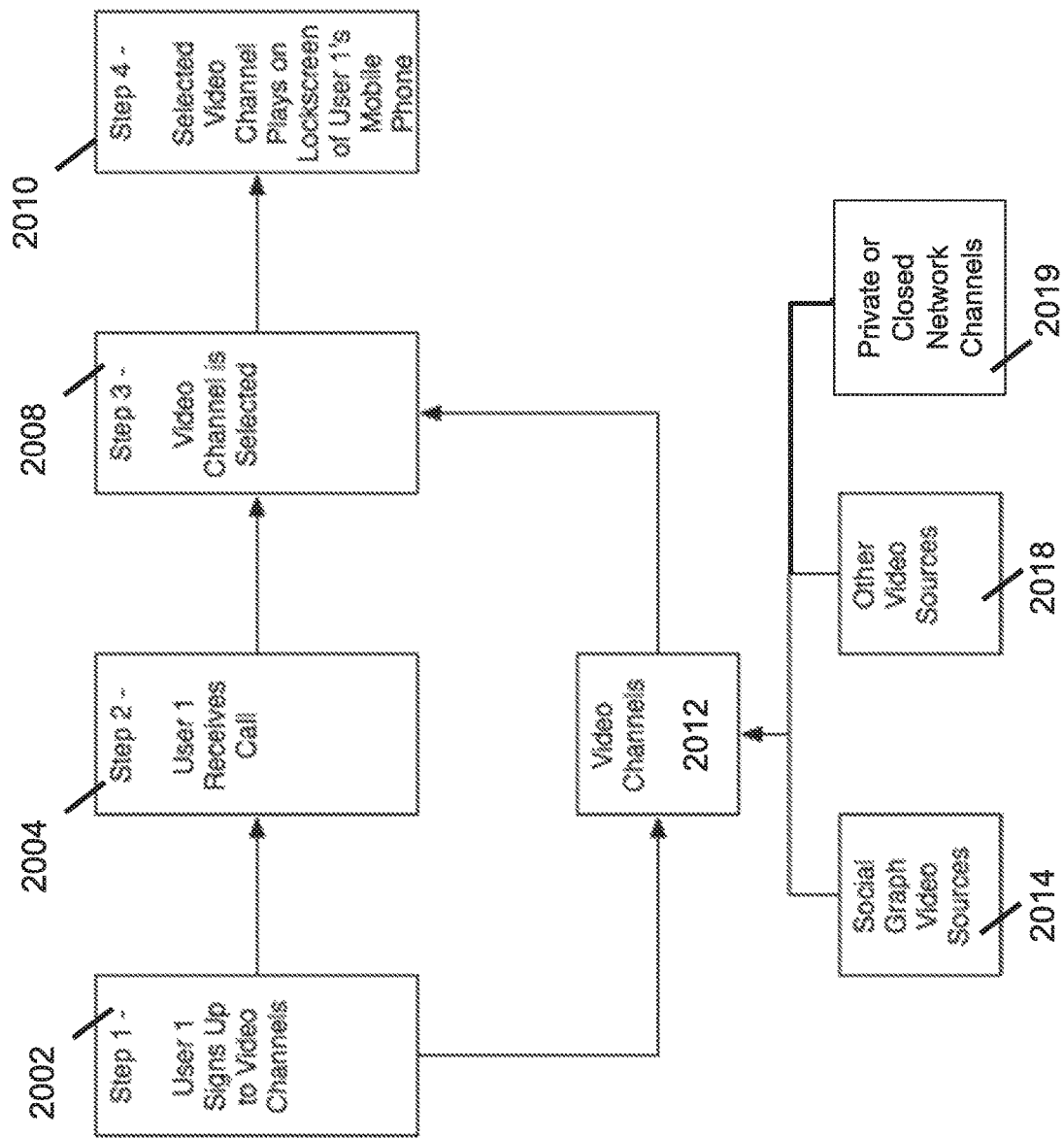

FIG. 20 illustrates an SCCMC that may be selected from a set of video content. In a first step 2002, a first user may sign up to receive content from one or more video channels 2012. Video channels 2002 may be selected from social graph video sources 2014 or other video sources 2018, such as libraries curated by editors or curated automatically, such as by one or more algorithms that identify, and aggregate content based on, for example, a defined topic of interest. Social graph video sources 2014 may be created in the SCCMC App or found in other apps from the social graph of a user, such as videos from Facebook™, Twitter™, LinkedIn™, SnapChat™, Periscope™ and the like. Other video sources 2018 may include local sports team video sources, world news video sources, trending videos in categories video sources, top music video sources and the like. Local sports team video sources may include the latest highlights from local teams, the favorite teams of the first user and the like. World news video sources may include the latest world news. Trending videos in categories video sources may include trending videos in a category such as "cats," for example. Top music video sources may include clips of trending music videos. Once a user has signed up, in a second step 2004, the first user may receive a call. In a third step 2008, a video channel may be selected after the first user receives a call. In a fourth step 2010, a video from the video channel selected in the step 2008 may play on the screen of the first user's mobile phone. In embodiments, in addition to or as an alternative to the user's social graph, there may be one or more private or closed-network channels 2019 that users may create and into which they may add their own videos. These private channels 2019 may be made available by invitation (and optionally closed to uninvited users). For example, there may be a channel #UCLA where only students who attend the university receive permission to view and participate video content within the channel, such as, in embodiments, via some combination of invitation, password, and location (such as by use of a geofence relating to a location of the university).

In the various embodiments described throughout this disclosure, an SCCMC may also be a live look video. A live look video may allow a second user to receive a live look at first user, when a first user sends an SCCMC or otherwise initiates a call to a second user. A live look may allow the second user to immediately see the face of the first user upon receipt of the SCCMC from the first user or notification that the first user is calling the second user. The live look video may play on the screen of the device of the second user, such as the lock screen, home screen, or other screens. A live look video may be generated by initiating a live video stream. A live video stream may be initiated using a live video stream generator. A live stream generator may be an application, such as Skype, Facetime, Periscope, or the like. A live video stream may also be recorded and sent as a series of small video segments. A live look video may be viewed through the window that an SCCMC app has opened on the screen of a user's mobile phone.

Figure 21:
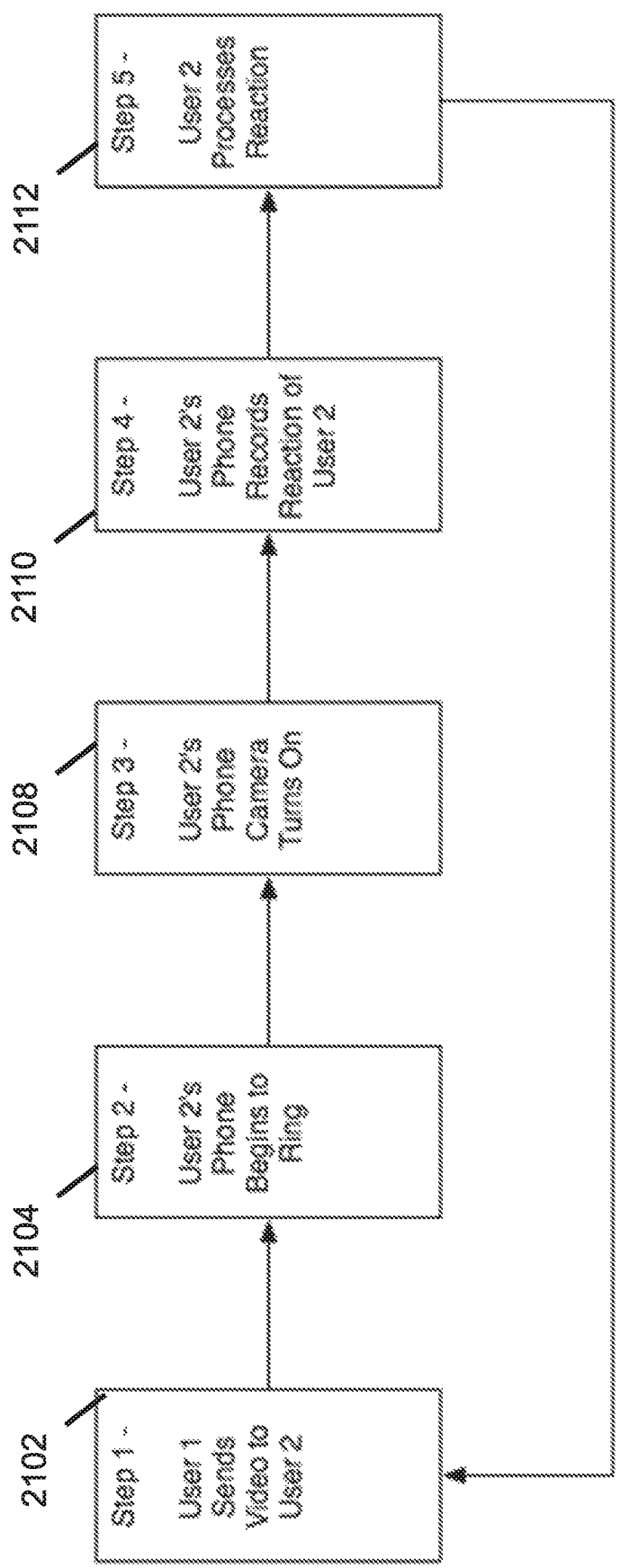

Sending an SCCMC may include automatically recording a user's reaction to an SCCMC, as illustrated in FIG. 21. In a first step 2102, a first user may send an SCCMC to a second user. The second user may receive the SCCMC from the first user in a second step 2104. The mobile phone of the second user may record the reaction of the second user in a third step 2018, such as by having the SCCMC include instructions to turn on the camera of the recipient's phone facing in the direction of the recipient. At a fourth step 2110, the recipient's phone may turn on the camera and record the reaction of the recipient. In embodiments, the second user may give permission to the second user's mobile phone to record the reaction of the second user. Permission may be given by the second user to the second user's mobile phone to record the reaction of the second user prior to receipt of the SCCMC, upon receipt of the SCCMC, before the SCCMC begins to play and the like. In a step 2112, the recipient user may be offered options to process the reaction, such as being given an option to save, upload or share the second user's reaction.

Figure 22:
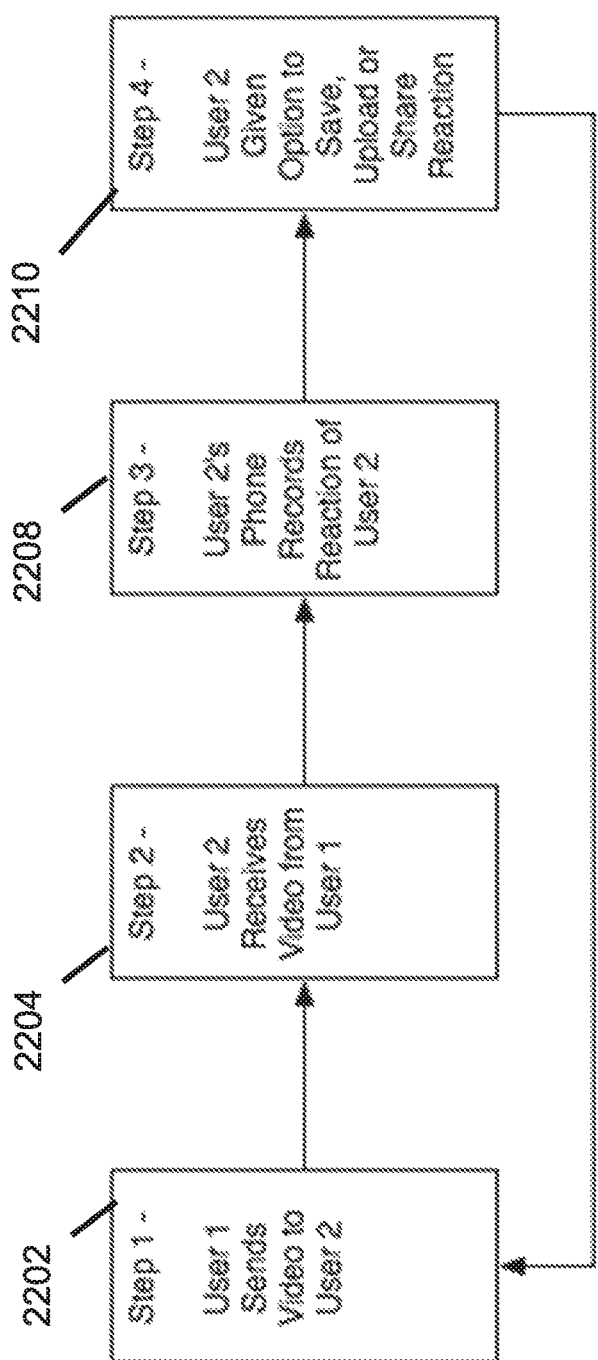
FIG. 22 illustrates a flow in which a second user's reaction to an SCCMC is recorded and shared with another party.

FIG. 22 shows an alternative embodiment of a flow for obtaining a reaction to an SCCMC. After the sender sends the SCCMC in a step 2202, the recipient receives the SCCMC at a step 2204, and the recipient's phone records the recipient's reaction at a step 2208, the recipient may be given an option at a step 2210 to save, upload, or share the reaction, such as with the sender, with the social circle of the recipient, or otherwise, including the option to store the reaction as an SCCMC, such as in a library of SCCMC content.

Figure 23:
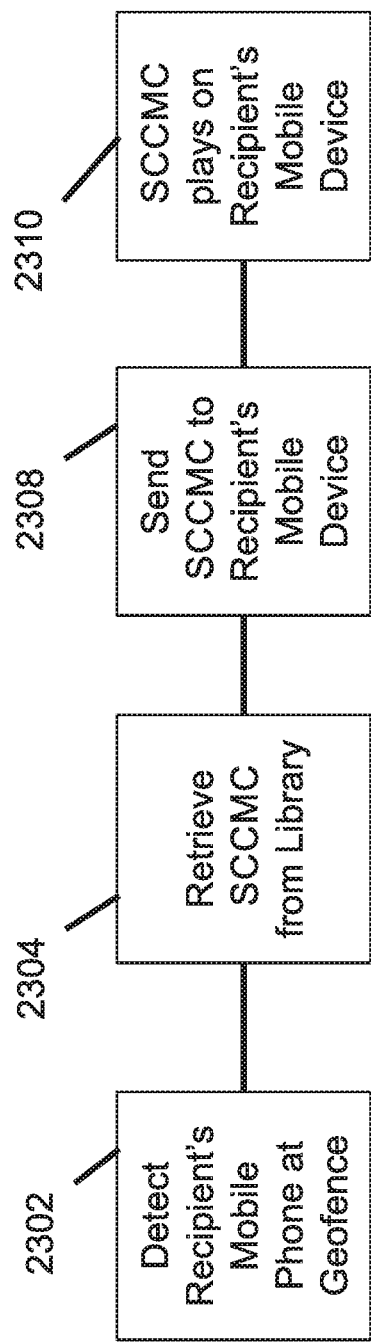
FIG. 23 illustrates a flow in which the playing of an SCCMC may be triggered by a triggering event.

FIG. 23 illustrates a flow in which the playing of an SCCMC may be triggered by a triggering event, such as entry of a recipient's mobile device into a location, such as defined by a geofence. At a step 2302, the location of the recipient's device may be detected at a location, such as defined by a geofence (or otherwise detected at a location according to various location systems known to those of skill in the art of mobile telecommunications). The geofence may surround, by way of example, a point of interest, such as a location within a museum, park, or exhibit, a store or other location relevant to promotion or sale of products or services, an educational location within a school, college, or university, or any other location for which there may be relevant content that may be presented via an SCCMC. Upon detection at the step 2302, an SCCMC may be retrieved at a step 2304, such as from a library of SCCMCs. This may include retrieving content that is associated with the location (such as content about a nearby museum exhibit or a nearby product) and may include retrieving content relevant to the recipient (such as content relating to that recipient's preferences, as indicated by selection of channels, by reactions to particular content, by the recipient's preferences as indicated by other data sources (such as purchases, interactions with content, or the social graph of the recipient), or the like. An SCCMC may be retrieved based in part on whether the recipient has visited the location before (information which may be stored by the host system or stored locally at the computing infrastructure for a geofence), so that the SCCMC may be varied for repeat visitors. The content server may retrieve an appropriate SCCMC and, at a step 2308, send it to the recipient's mobile device. Then the SCCMC may play on the device 2310 as described in connection with various embodiments described throughout this disclosure.

Figure 24:
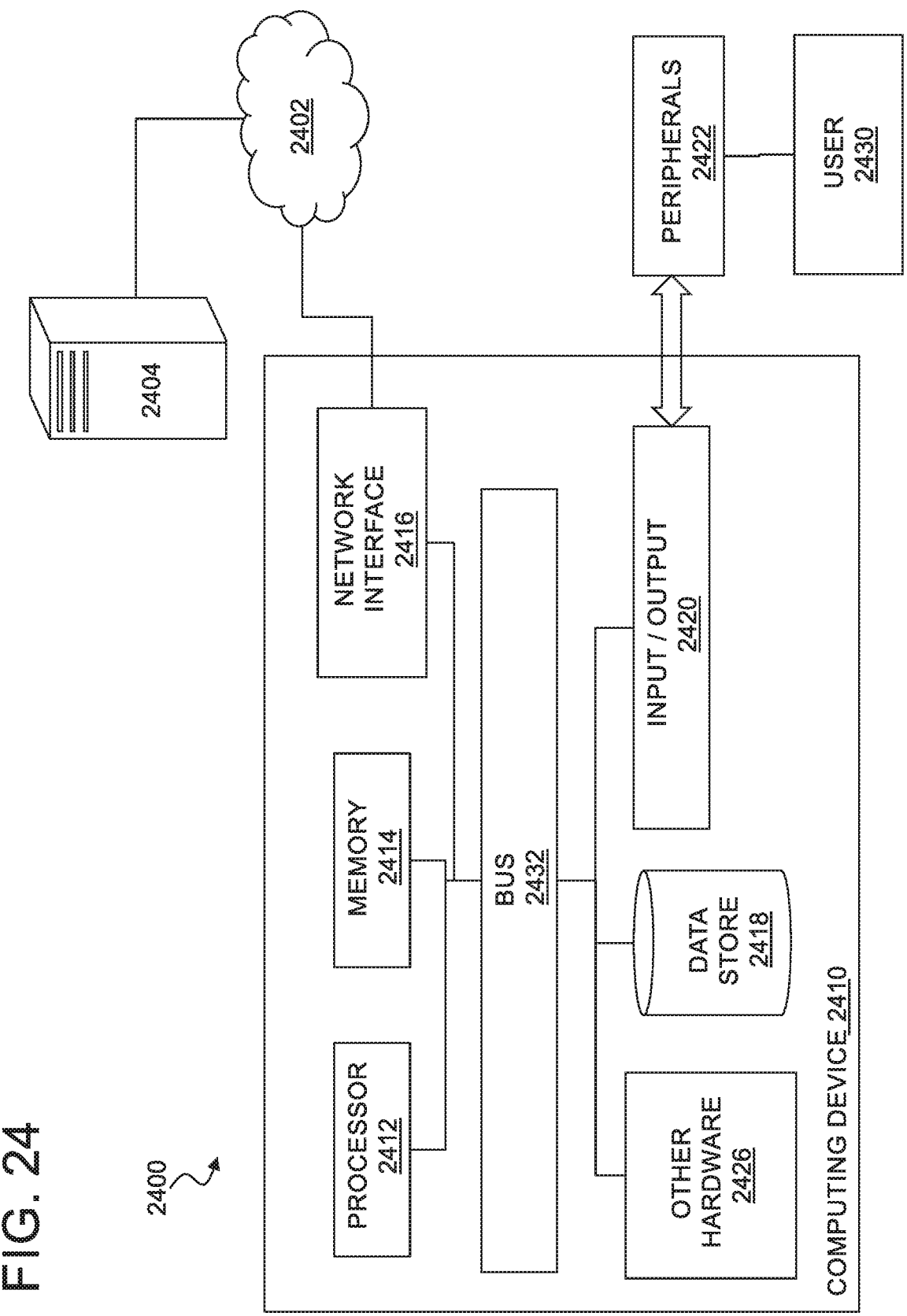
FIG. 24 illustrates a computer system.

FIG. 24 illustrates a computer system, e.g., a computer system that may be used in conjunction with the devices, systems, and methods described herein. In general, the computer system 2400 may include a computing device 2410 connected to a network 2402, e.g., through an external device 2404. The computing device 2410 may be or include any type of client or other network endpoints as described herein, e.g., a mobile device as described throughout this disclosure. The computing device 2410 may also or instead be any device suitable for interacting with other devices over a network 2402, such as a laptop computer, a desktop computer, a personal digital assistant, a tablet, a mobile phone, a television, a set top box, a wearable computer, and the like. The computing device 2410 may also or instead include a server such as any of the servers described herein.

In certain aspects, the computing device 2410 may be implemented using hardware (e.g., in a desktop computer), software (e.g., in a virtual machine or the like) or a combination of software and hardware. The computing device 2410 may be a standalone device, a device integrated into another entity or device, a platform distributed across multiple entities, or a virtualized device executing in a virtualization environment.

The network 2402 may include any network described above, e.g., data network(s) or internetwork(s) suitable for communicating data and control information among participants in the computer system 2400. This may include public networks such as the Internet, private networks, and telecommunications networks such as the Public Switched Telephone Network or cellular networks using third generation cellular technology (e.g., 3G™ or IMT-2000™), fourth generation cellular technology (e.g., 4G™, LTE™. MT-Advanced™, E-UTRA™, etc.) or WiMAX-Advanced™ (IEEE 802.16m)) and/or other technologies, as well as any of a variety of corporate area, metropolitan area, campus or other local area networks or enterprise networks, along with any switches, routers, hubs, gateways, and the like that may be used to carry data among participants in the computer system 2400. The network 2402 may also include a combination of data networks and need not be limited to a strictly public or private network.

The external device 2404 may be any computer or other remote resources that connects to the computing device 2410 through the network 2402. This may include gateways or other network devices, remote servers or the like containing content requested by the computing device 2410, a network storage device or resource, or any other resource or device that may connect to the computing device 2410 through the network 2402.

In general, the computing device 2410 may include a processor 2412, a memory 2414, a network interface 2416, a data store 2418, and one or more input/output interfaces 2420. The computing device 2410 may further include or be in communication with peripherals 2422 and other external input/output devices that may connect to the input/output interfaces 2420.

The processor 2412 may be any processor or other processing circuitry capable of processing instructions for execution within the computing device 2410 or computer system 2400. The processor 2412 may include a single-threaded processor, a multi-threaded processor, a multi-core processor and so forth. The processor 2412 may be capable of processing instructions stored in the memory 2414 or the data store 2418.

The memory 2414 may store information within the computing device 2410. The memory 2414 may include any volatile or non-volatile memory or other computer-readable mediums, including without limitation a Random-Access Memory (RAM), a flash memory, a Read Only Memory (ROM), a Programmable Read-only Memory (PROM), an Erasable PROM (EPROM), registers, and so forth. The memory 2414 may store program instructions, program data, executables, and other software and data useful for controlling operation of the computing device 2410 and configuring the computing device 2410 to perform functions for a user. The memory 2414 may include a number of different stages and types of memory for different aspects of the operation of the computing device 2410. For example, a processor may include on-board memory and/or cache for faster access to certain data or instructions, and a separate, main memory or the like may be included to expand memory capacity as desired. All such memory types may be a part of the memory 2414 as contemplated herein.

The memory 2414 may, in general, include a non-volatile computer readable medium containing computer code that, when executed by the computing device 2410 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 2414 is depicted, it will be understood that any number of memories may be usefully incorporated into the computing device 2410. For example, a first memory may provide non-volatile storage such as a disk drive for permanent or long-term storage of files and code even when the computing device 2410 is powered down. A second memory such as a random-access memory may provide volatile (but higher speed) memory for storing instructions and data for executing processes. A third memory may be used to improve performance by providing higher speed memory physically adjacent to the processor 2412 for registers, caching, and so forth.

The network interface 2416 may include any hardware and/or software for connecting the computing device 2410 in a communicating relationship with other resources through the network 2402. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that may be used to carry data between the computing device 2410 and other devices. The network interface 2416 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 2416 may include any combination of hardware and software suitable for coupling the components of the computing device 2410 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 2402 such as the Internet. This may also or instead include hardware/software for a WiMAX connection or a cellular network connection (using, e.g., CDMA, GSM, LTE, or any other suitable protocol or combination of protocols). The network interface 2416 may be included as part of the input/output devices 2420 or vice-versa.

The data store 2418 may be an internal memory store providing a computer-readable medium such as a disk drive, an optical drive, a magnetic drive, a flash drive, or other devices capable of providing mass storage for the computing device 2410. The data store 2418 may store computer readable instructions, data structures, program modules, and other data for the computing device 2410 or computer system 2400 in a non-volatile form for subsequent retrieval and use. For example, the data store 2418 may store without limitation one or more of the operating system, application programs, program data, databases, files, and other program modules or other software objects and the like.

The input/output interface 2420 may support input from an output to other devices that may couple to the computing device 2410. This may, for example, include serial ports (e.g., RS-232 ports), universal serial bus (USB) ports, optical ports, Ethernet ports, telephone ports, audio jacks, component audio/video inputs, HDMI ports, and so forth, any of which may be used to form wired connections to other local devices. This may also or instead include an infrared interface, RF interface, magnetic card reader, or other input/output system for coupling in a communicating relationship with other local devices. It will be understood that, while the network interface 2416 for network communications is described separately from the input/output interface 2420 for local device communications, these two interfaces may be the same, or may share functionality, such as where a USB port is used to attach to a WiFi accessory, or where an Ethernet connection is used to couple to a local network attached storage.

A peripheral 2422 may include any device used to provide information to or receive information from the computing device 2400. This may include human input/output (I/O) devices such as a keyboard, a mouse, a mouse pad, a track ball, a joystick, a microphone, a foot pedal, a camera, a touch screen, a scanner, or other device that may be employed by the user 2430 to provide input to the computing device 2410. This may also or instead include a display, a speaker, a printer, a projector, a headset or any other audiovisual device for presenting information to a user. The peripheral 2422 may also or instead include a digital signal processing device, an actuator, or other devices to support control or communication to other devices or components. Other I/O devices suitable for use as a peripheral 2422 include haptic devices, three-dimensional rendering systems, augmented-reality displays, magnetic card readers, and so forth. In one aspect, the peripheral 2422 may serve as the network interface 2416, such as with a USB device configured to provide communications via short range (e.g., Bluetooth, WiFi, Infrared, RF, or the like) or long range (e.g., cellular data or WiMAX) communications protocols. In another aspect, the peripheral 2422 may provide a device to augment the operation of the computing device 2410, such as a global positioning system (GPS) device, a security dongle, or the like. In another aspect, the peripheral may be a storage device such as a flash card, USB drive, or other solid-state devices, or an optical drive, a magnetic drive, a disk drive, or other device or combination of devices suitable for bulk storage. More generally, any device or combination of devices suitable for use with the computing device 2400 may be used as a peripheral 2422 as contemplated herein.

Other hardware 2426 may be incorporated into the computing device 2400 such as a co-processor, a digital signal processing system, a math co-processor, a graphics engine, a video driver, and so forth. The other hardware 2426 may also or instead include expanded input/output ports, extra memory, additional drives (e.g., a DVD drive or other accessory), and so forth.

A bus 2432 or combination of busses may serve as an electromechanical platform for interconnecting components of the computing device 2400 such as the processor 2412, memory 2414, network interface 2416, other hardware 2426, data store 2418, and input/output interface. As shown in the figure, each of the components of the computing device 2410 may be interconnected using a system bus 2432 or other communication mechanisms for communicating information.

Methods and systems described herein may be realized using the processor 2412 of the computer system 2400 to execute one or more sequences of instructions contained in the memory 2414 to perform predetermined tasks. In embodiments, the computing device 2400 may be deployed as a number of parallel processors synchronized to execute code together for improved performance, or the computing device 2400 may be realized in a virtualized environment where software on a hypervisor or other virtualization management facility emulates components of the computing device 2400 as appropriate to reproduce some or all of the functions of a hardware instantiation of the computing device 2400.

In one aspect, the computing device 2400 may be a mobile device such as that described below.

Figure 25:
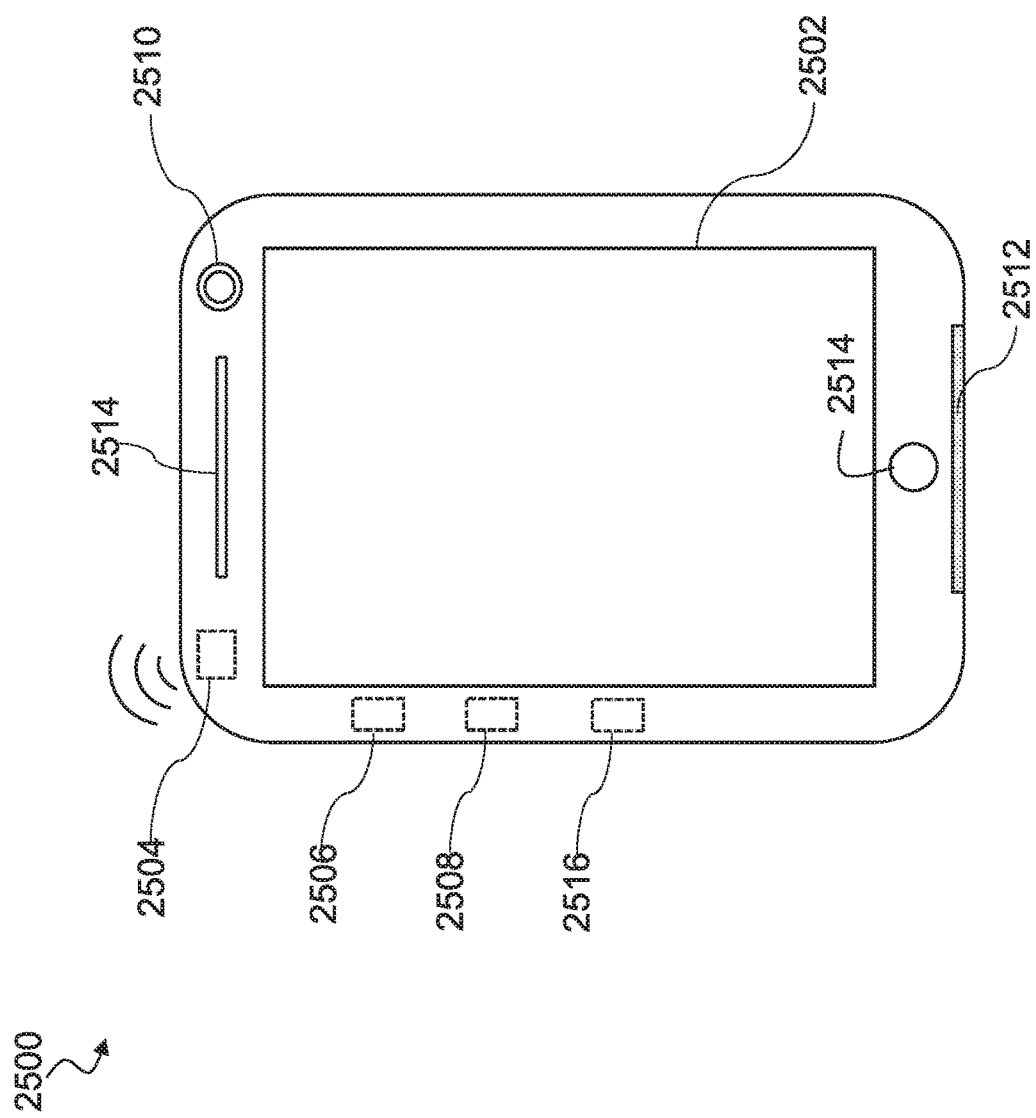
FIG. 25 illustrates a mobile device.

FIG. 25 illustrates a mobile device. The mobile device 2500 may be configured for creating, sending, or receiving an SCCMC as described herein. The mobile device 2500 may be, for example, any of the endpoints or other computing devices described above. The mobile device 2500 may be, for example, a smartphone or a tablet. In general, the mobile device 2500 may include a display 2502 (e.g., a screen), a communications interface 2504 configured to couple the mobile device 2500 in a communicating relationship with a network, a processor 2506, a memory 2508, a camera 2510, a microphone 2512, a speaker 2514, and a location tracking device 2516.

The communications interface 2504 may include hardware and software for communications using a variety of protocols such as a short-range communications protocol (e.g., Bluetooth), a wireless communications protocol (e.g., Wi-Fi, cellular network, and so on), and so forth. The communications interface 2504 may couple the mobile device 2500 to a cellular network or the like through a mobile carrier with which a user has a billing account. The communications interface 2504 may also or instead couple the mobile device 2500 to a data network through which the mobile device 2500 may access an online application store or the like. The communications interface 2504 may also or instead couple the mobile device 2500 to other mobile devices through a data network such as any of the networks described herein.

In an aspect, the memory 2508 bears computer code that, when executing on the processor 2506, performs steps for creating, sending, receiving, editing, and so on, an SCCMC data structure or the like. The memory 2508 may also or instead bear computer code that forms an application for the mobile device 2500, e.g., execution by the processor 2506 on the mobile device 2500.

The display 2502 may include a screen such as a touch screen or other user interface for receiving user input as contemplated herein, e.g., for the creation or editing of SCCMC. The display 2502 may also or instead display SCCMC for a user.

The camera 2510 may be used for capturing images or video for use in an SCCMC.

The microphone 2512 may be used for receiving a voice or audio signal as described herein.

The speaker 2514 may be used for playing audio from an SCCMC for a user. The speaker 2514 may instead include an audio output on the mobile device 2500 such as a headphone jack or the like.

The location tracking device 2516 may be used to establish a location for the mobile device 2500, e.g., for proximity services as contemplated herein. The location tracking device 2516 may include a GPS receiver or the like.

Figure 26:
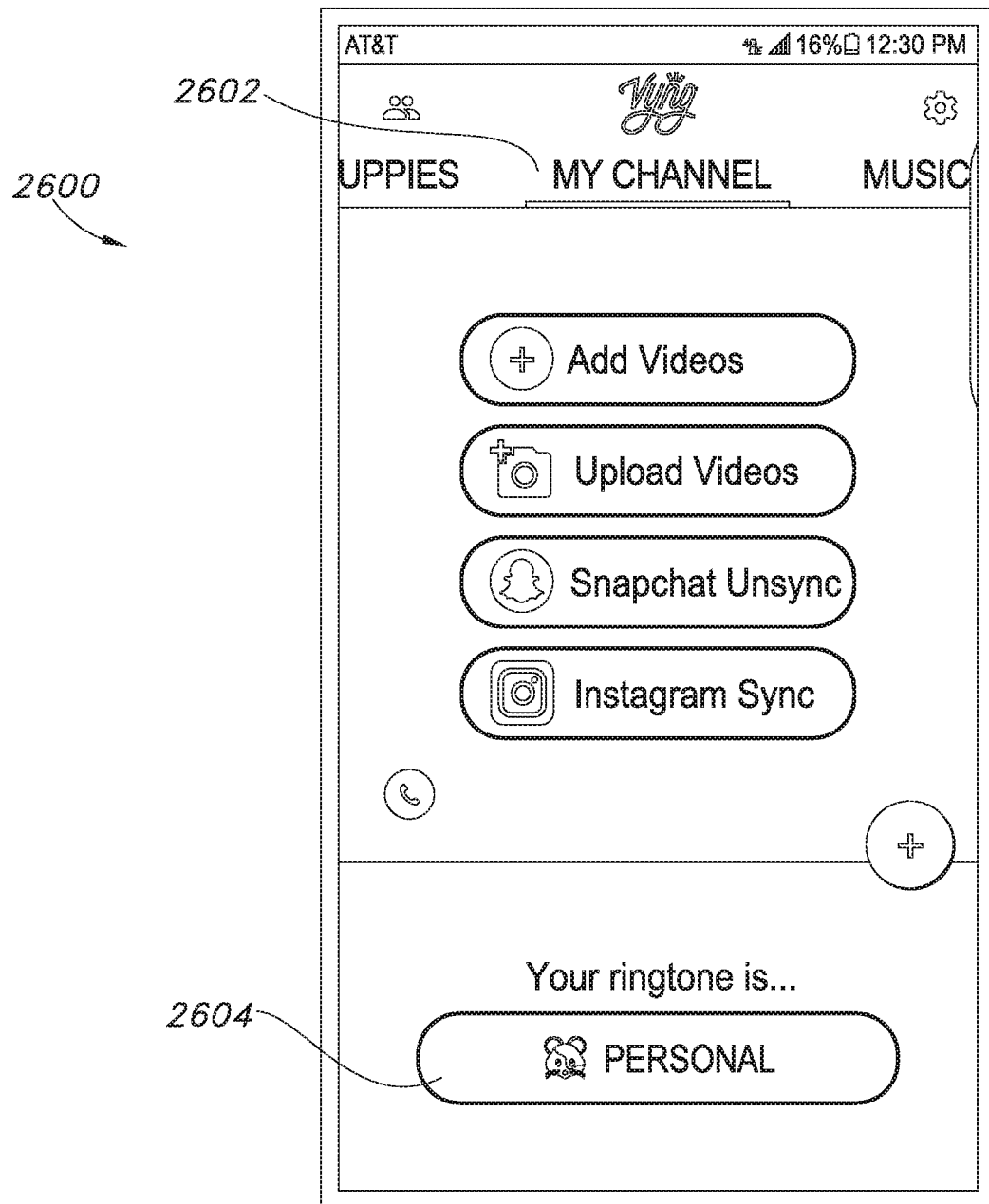
FIG. 26 illustrates a screenshot of a user interface for setting a personal channel for an SCCMC in accordance with an embodiment of the systems and methods disclosed herein.

In certain embodiments, the mobile device 2500 may be used to facilitate a user (such as a recipient) to establish a personal channel such as that shown in FIG. 26. The personal channel may enable the user to choose media content, such as video and image content, from the user's mobile device 2500 and designate it to be used for display on the user's mobile device 2500 when an incoming trigger occurs. The incoming trigger may be an incoming call, a text message, or the like from another mobile device. The user may import multiple files and organize them to play as a personal channel, either in a pre-defined order or in a randomized order.

FIG. 26 illustrates a screenshot of a user interface 2600 for enabling the user to establish such a personal channel. The user interface 2600 may be configured to allow the user to swipe or otherwise select the feature of establishing the personal channel by accessing the SCCMC App installed on the mobile device 2500. For example, the SCCMC App may enable selecting a menu feature labeled "My Channel" 2602 from the user interface 2600. On selecting the menu feature "My Channel" 2602, the user may be able to choose the media content that the user may want to use as part of the personal channel. In some embodiments, the media content may include the SCCMC that may be received from any other user, or content made or captured by the user (such as using a camera of the user's mobile phone), or a video obtained from a social networking server, such as services hosting services similar to YouTube™, Snapchat™, Instagram™ or a user-generated video platform, or from any other channels, without limitations. The media content selected by the user may be added to the user's personal channel by using a user interface element such as an action button labeled "PERSONAL" 2604 as depicted in the user interface 2600 of FIG. 26.

In certain embodiments, the personal channel created by the user may not only be played on the user's device but may also be configured to be shared with other users. In many examples, a user may curate videos or other media content into a channel, then share that channel with other users, including controlling playing of that channel as a series of SCCMC media items on phones of various recipients of the shared channel. These channels may also be customized or configured for particular users or groups of users by allowing the user to create a channel suitable for a particular friend or group of friends and containing user-generated video content showing mutual friends or topics of mutual interest or showing video content that the user believes will be of particular interest for the friend.

In embodiments, a channel shared with a friend or other user may include a wide range of media content, including an SCCMC received from other users, content made or captured by the user (such as using a camera of the user's mobile phone), content stored locally by other applications (such as social media applications), videos obtained from various social sources such as YouTube™ or other user-generated video platforms, or from any other channel. The ability to configure, customize, and share one or more channels may allow the SCCMC App to be used as a self-generated media creation and content distribution platform, where the user forms and orchestrates a wide range of experiences for friends and other users that play on the lock-screens or other contact-initiated elements of the friends' and other users' devices.

In many examples, the media content of the user's personal channel may be enabled based on the identity of another user. For example, the user may associate a video or any other media item with the name of a "friend" or a specific contact in the user's mobile device.

Figure 27:
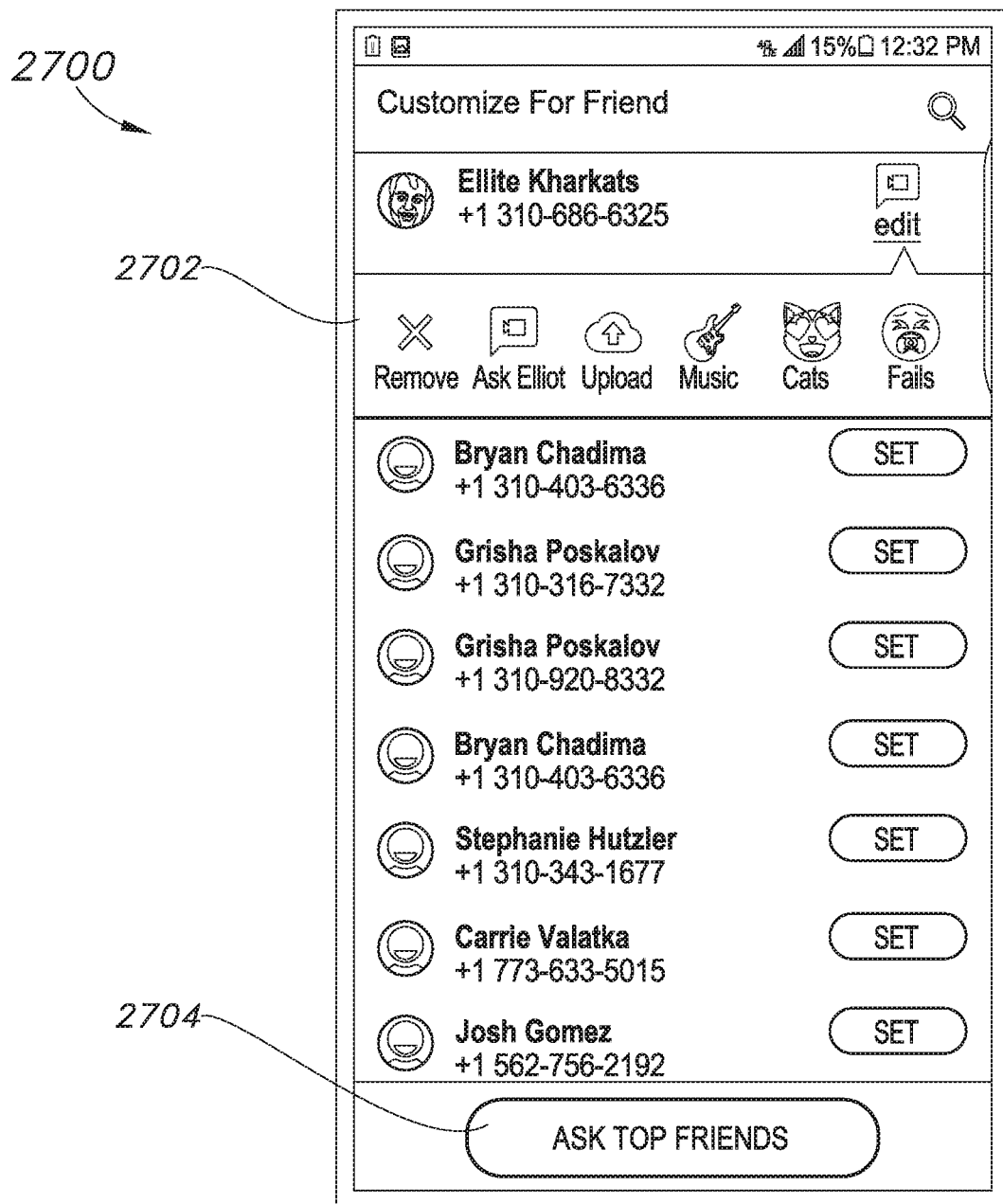
FIGS. 27 and 28 illustrate screenshots of a user interface for enabling a media content based on an identity of a user in accordance with an embodiment of the systems and methods disclosed herein.
Figure 28:
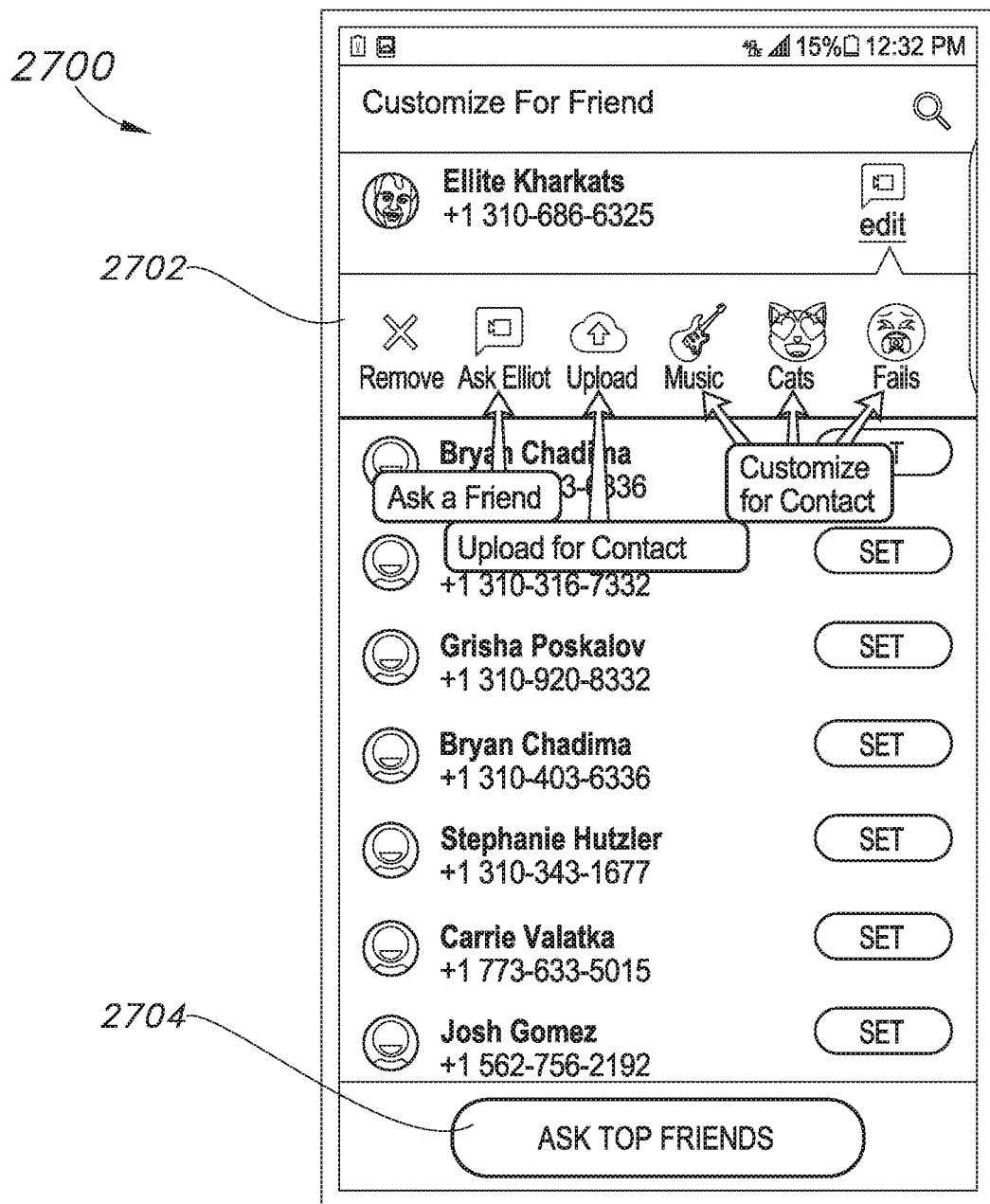

FIGS. 27 and 28 illustrate examples of screenshots of a user interface 2700 for enabling a media content based on the identity of a user. The user interface 2700 may be enabled by the SCCMC App installed on the user's mobile device. The user may open a contact list on the user's mobile phone, and a menu 2702 displayed on the user interface 2700 may provide options such as "Ask Friend", "Upload", "customize for contact", and other options that may enable setting a media content from the user's personal channel for a particular contact, based on the identity of the contact. For example, the user may set a custom video or channel for an individual contact or friend by making appropriate selections from the user interface 2700.

In various embodiments, various kinds of media content, including SCCMC received from other users made or captured by the user such as by using a camera of the user's mobile phone, videos obtained from various sources, YouTube™ or other user-generated video platforms, or from any other channel, may be set in the name of the friend. In some embodiments, the SCCMC App may enable the user to integrate the mobile device with user-generated social media applications or platforms used by the user's mobile device, such as in cases where the user has other social networking applications such as Snapchat™, Instagram™, or the like installed on the user's device. These social networking applications may enable the user to save content to a local device so that when the content is created, it may be saved in a local folder associated with each application. The SCCMC App may include a local storage monitoring component that may monitor the local folder and make the content of the local folder available for selection as an SCCMC media item that may be played in a user channel, set as content associated with a friend, or the like. This may be accomplished by importing the content into one or more locations accessed by the SCCMC App, or by tagging the local folder so that the content may be imported or played when needed from the local folder.

Once this setting is initiated, the selected or tagged content may be configured to play on the lock-screen of the user's phone when the friend calls or upon other triggers, such as upon receiving a text or email from the friend, independent of what channel the user may have selected for incoming calls or other triggers that arrive from other parties.

In embodiments, the user may select an option to "Ask Friend" 2704 (or multiple friends), where the SCCMC App may enable a feature allowing a user to choose to have a friend set a media item, such as a video that plays when the friend calls, such that the friend controls the media content item. In many examples, the feature may be enabled such as when setting custom content by the friend, as discussed in some of the previous examples, that allow the user to set the video that plays when the friend contacts the user. Upon initiating this "Ask Friend" 2704 feature, a message, such as a text message, may be initiated through the App to the friend, automatically embedding a custom link to a website where the friend may upload a media item, such as a video and the like.

In embodiments, the user may also be allowed to choose more than one of the contacts for selecting the "Ask Friend" 2704 feature from the user interface 2700. The user interface 2700 may present a list of contacts or "friends" to the user and the user may select top friends by choosing an action button, such as the button 2704, for implementing the "Ask Friend" 2704 option. In many examples, the top friends may include contacts that are most frequently contacted by the user, such as by calling or messaging. In other examples, other parameters may be used to classify a list of contacts as the top friends of the user. When the user clicks on the button 2704, the SCCMC App may enable initiating sending a message, such as a text message, through the App to each of the top friends. Initiating the message may include automatically embedding a custom link to a website where each of the top friends may upload a media item, such as a video.

Figure 29:
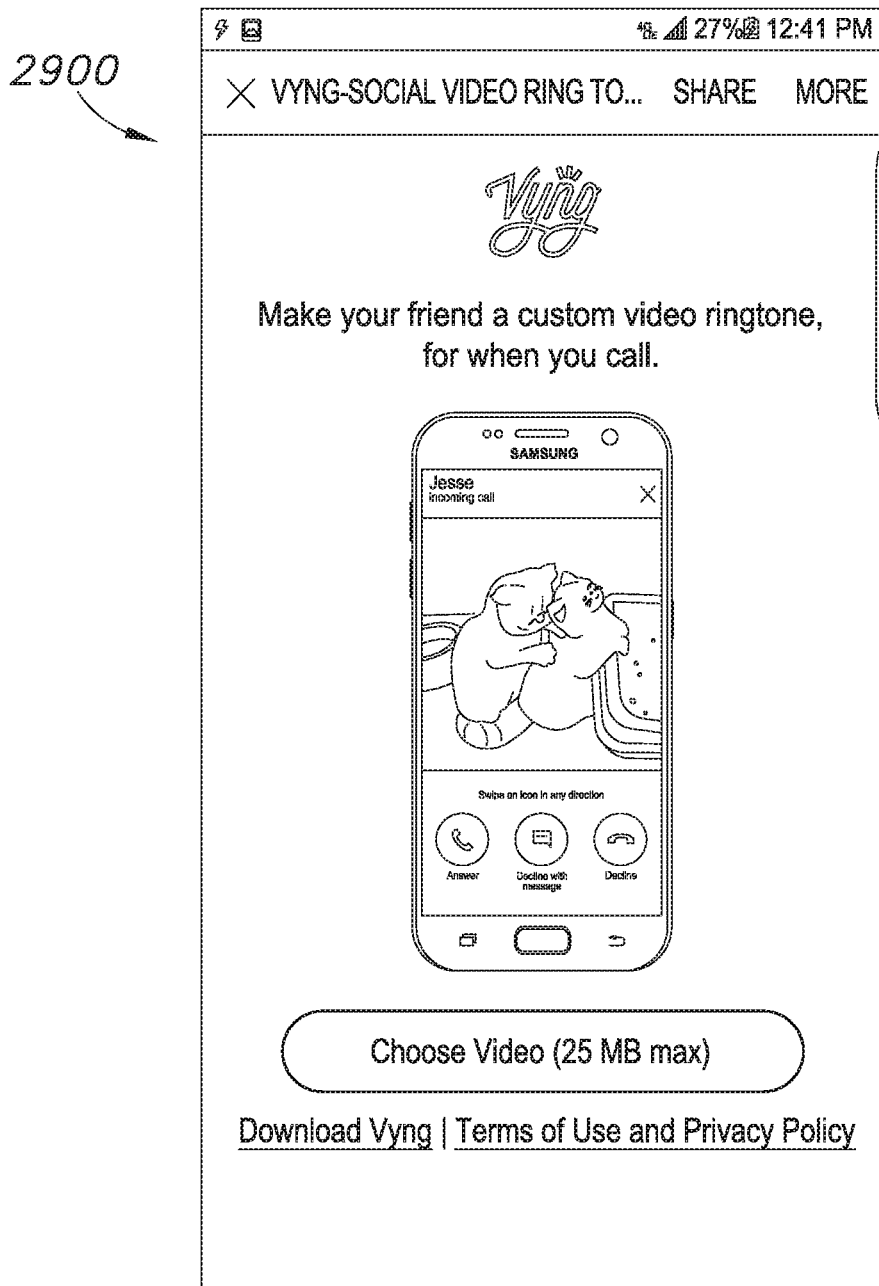
FIG. 29 illustrates a screenshot of a user interface for creating a video for an SCCMC in accordance with an embodiment of the systems and methods disclosed herein.

FIG. 29 illustrates a screenshot of an exemplary user interface 2900 that may enable the user, such as a friend contact of the sender, to create a video that may be played when the friend contact calls or initiates any contact with the user. The video created by the friend may be uploaded by the friend on the website and a link thereto may be sent to the friend, such as when the user selects a contact for the friend from the "Ask Friend" 2704 feature of the SCCMC App. The video may be one of a type of media item that may be used to set specific media types for specific contacts.

In embodiments, the media item may include the SCCMC received from other users, content made or captured by the friend or the user, such as using a camera of the friend's or user's mobile phone, videos obtained from various network sources such as YouTube™ or other user-generated video platforms, or from any other channels. In embodiments, the upload webpage by which the friend may set an item to play on the user's device may be configured to work with mobile and desktop browsers. When the friend uploads a media item, a push notification may be automatically directed to the user's device, indicating that the content has been uploaded. When the friend calls the user or optionally upon other triggering contacts, such as text, chat, or email contacts, the friend-uploaded media content item may play on the user's phone, such as on the lock-screen of the phone.

In embodiments, the user may use the "Ask Friend" 2704 feature to ask various friends to upload or select media content, such that a variety of different media content may be played based on different contacts, augmenting items that the user has set or selected for friends, or items the user has generally selected for unknown inbound contacts.

The various embodiments as discussed herein may facilitate creating, editing, deployment, and managing of media content available in the mobile phone or received from other devices or network sources and to be used as the SCCMC for establishing personalized experiences or for sharing among a group of friends and contacts for personalized experiences during any trigger events such text messaging, ring tones, and the like with the use of various menu options as enabled through the user interfaces such as those illustrated in conjunction with FIGS. 26-29.

Figure 30:
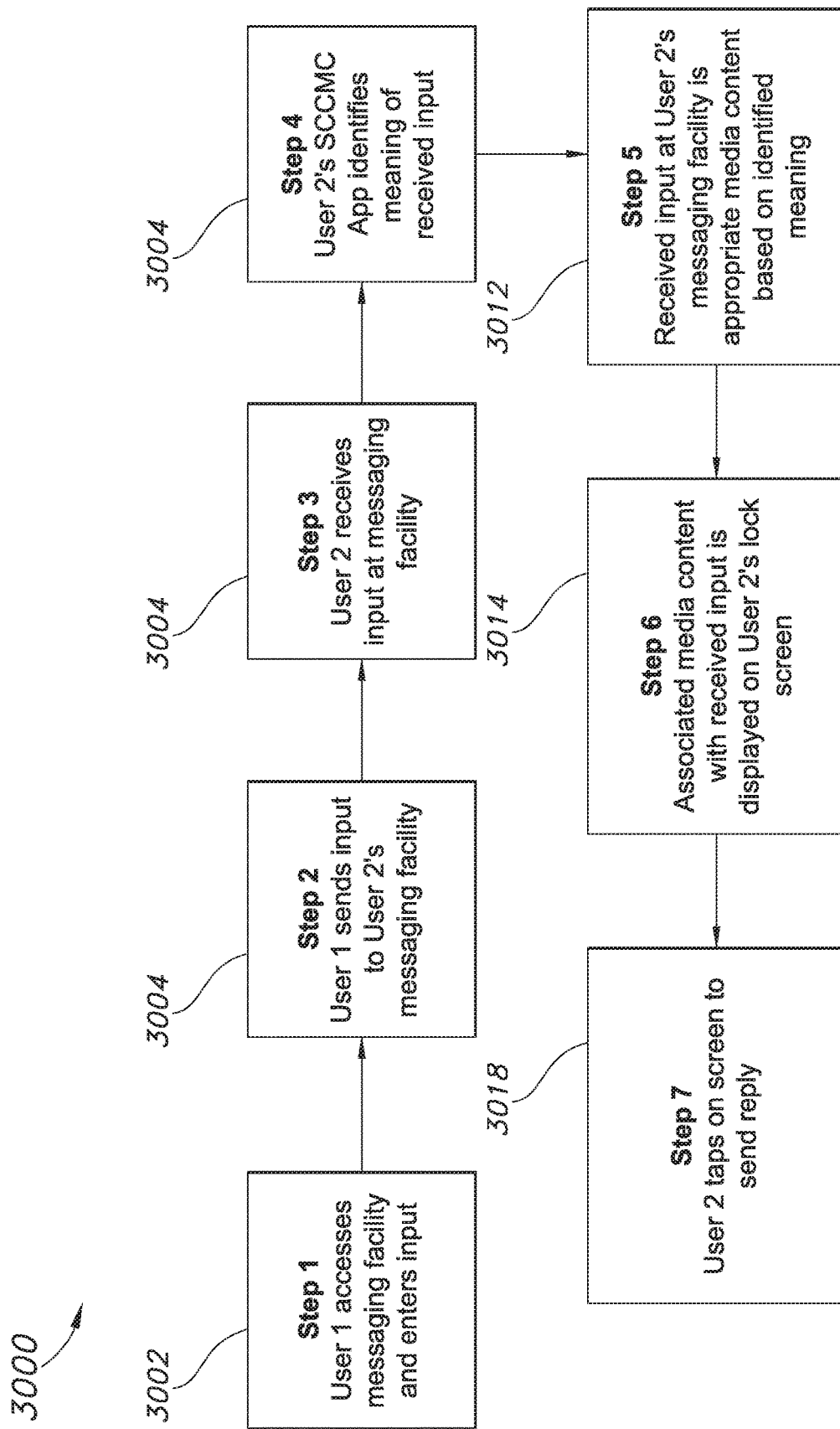
FIG. 30 illustrates a flowchart of a method for providing a setup of a contextual video message in accordance with an embodiment of the systems and methods disclosed herein.

In many examples, the SCCMC App may enable setting up media content including SCCMC. The media content may include video content that may include a contextual video message. FIG. 30 illustrates a flowchart of a method 3000 for providing a setup of a contextual video message included in SCCMC for an interaction between users.

As illustrated in FIG. 30, a User 1, such as the user of a sender mobile phone 102, may access a messaging facility at 3002. The user of the sender mobile phone 102 (FIG. 1) may be involved in a messaging interaction with another user, a User 2, such as the user of a recipient mobile phone 104 (FIG. 1). The messaging interaction may use any of the available messaging facilities such as an SMS, a chat interaction, or any of a number of messaging applications such as WhatsApp?™, iMessage™, Snapchat™, Instagram™, Messenger, and the like available on both the users' respective mobile devices. In embodiments, the app may host the entire communication exchange without relying on a third party application. At 3004, the User 1 may enter some text on an input interface of the messaging facility of the User 1's mobile device and send the text or other messages to the User 2. The input interface of the messaging facility may be configured to receive at least text input. In one example, the input from User 1 is limited to what may be keyed in or dictated text. The input interface of the messaging facility may also be configured to receive text, graphics, audio, video, and combinations thereof including emojis and other graphics that may be inserted with the input interface. The SCCMC App installed on the mobile device of User 1 may have access to the input entered on the input interface of the messaging facility. Similarly, the SCCMC App installed on the mobile device of User 2 may be configured to access the input received on the input interface of the messaging facility on the User 2's mobile device.

At 3008, the input sent by the User 1 may be received at the messaging facility of the User 2's mobile device. At 3010, the SCCMC App installed on the User 2's mobile device may be configured to take the input received on the input interface of the messaging facility of the User 2's mobile device and process the content of the input to determine the meaning of the text and to understand the context of the input. In embodiments, the SCCMC App installed on the User 2's mobile device may also be configured to take the input received on the input interface of the messaging facility of the User 2's mobile device and process the content of the input to determine the meaning of the audio, video, graphics, emojis, and the like to understand the context of the input. The processing of the input may be enabled by the use of a high-level processing facility including a natural language processing (NLP) facility that may include one or more algorithms or methodologies for determining the meaning of a body of text, such as the text received at the input interface of the messaging facility of the mobile device of User 2. It will be appreciated in light of the disclosure that in some examples one or more algorithms of the natural language processing (NLP) facility may be shown to perform more quickly when the input is limited to text and other limited characters.

In embodiments, the natural language processing (NLP) facility may also include additional algorithms or methodologies for determining the meaning of a conversation in an audio or video clip. In many examples, the NLP facility may include an NLP processing module that may be configured to execute a series of instructions, such as in accordance with the one or more algorithms and methodology to identify the meaning and/or context of the input. By way of these examples, the NLP facility may be configured to extract the words, phrases, emojis, geo-location information and sensor-derived data from the text received at the messaging facility of the mobile device of User 2. In embodiments, the extracted information from the text may then be matched to a database of content, such as a database stored in the memory unit 2414 of the computer system 2400 discussed earlier. In many examples, the NLP processing module may be a part of the processor 2412 of the computer system 2400 discussed earlier. In further examples, the NLP processing module may be a part of the other hardware 2426 of the computer system 2400.

At 3012, the meaning identified by the NLP processing module may be used by the SCCMC App installed on the mobile device of User 2 to assign media content to the input received at the input of the messaging facility of the User 2's mobile device. The media content data types discussed earlier, such as a video clip or a video channel may be appropriately linked to the input message. In many examples, media content may be selected from a curated library of the SCCMC-content types such as that discussed earlier. At 3014, the assigned media content may be displayed, in many embodiments, on the lock screen of the mobile device of User 2. At 3018, the User 2 may then tap on his or her lock screen to send the reply to the User 1. In many examples, the User 2 may send the reply directly from the lock screen of the User 2's mobile device without opening the input interface of the messaging facility on his or her mobile device.

In many examples, the User 2's camera may be activated by default while sending the reply to the User 1 and a picture or photo of the User 2 may be associated with the reply sent from the User 2 to the User 1. In further examples, the User 2's microphone may be activated by default while sending the reply to the User 1 and an audio clip the User 2 may be associated with the reply sent from the User 2 to the User 1.

In many examples, as the User 2 types a text for the reply message, some content may be automatically pulled from the database of content to match the keywords of text entered by the User 2. In embodiments, the User 2 may use the content automatically pulled from the content database or may alternately access the messaging facility to complete the text and then send the message. The message sent from the User 2 may also be processed in the same manner when received at the messaging facility of the User 1 during the messaging interaction.

Figure 31A:
FIGS. 31A-31E illustrate screenshots of a user interface for a messaging interaction in accordance with embodiments of the systems and methods disclosed herein.
Figure 31B:
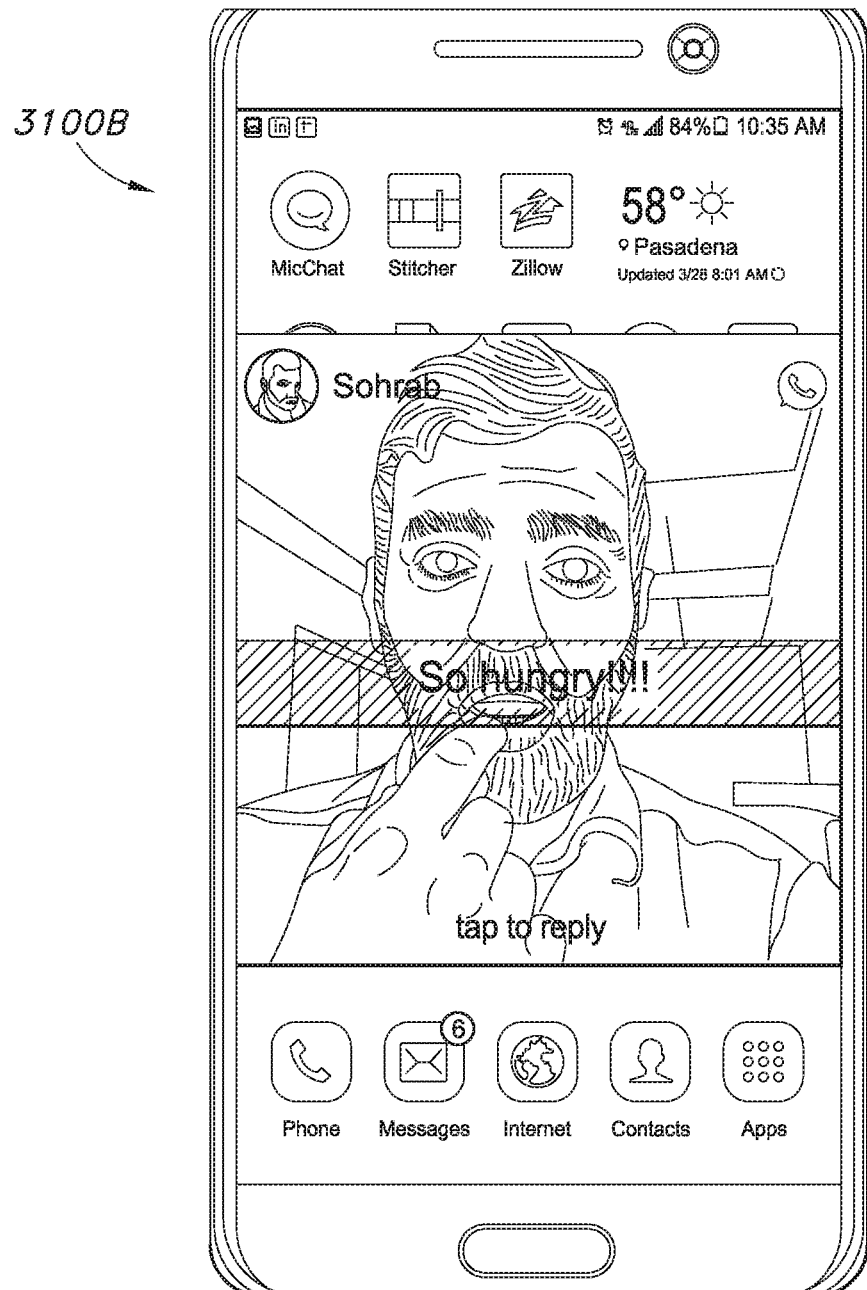

FIGS. 31A-31E illustrate an example of a messaging interaction between the User 1 and the User 2 based on the contextual video message flow discussed in FIG. 30 in accordance with the many embodiments. FIG. 31A illustrates a screenshot of a display interface 3100A of the User 2's mobile device when the User 2 receives a message with a text phrase, "Hungry? Meet for lunch?" from the User 1. The text phrase may be displayed on the User 2's mobile device along with an associated and matching video or other content. The matching of the video or other content with the text phrase may be performed based on the content of the text phrase, as discussed in the flow of FIG. 30. For example, the video in FIG. 31A displays a hungry Homer Simpson cartoon character with a bulging and shaking stomach to indicate the emotion of hunger. In an example, the video may be derived from the curated library of SCCMC-content types of the SCCMC App. Similarly, FIG. 31B illustrates a screenshot of the display screen 3100B of the User 2's mobile device when a text message phrase, "So hungryyy!!!", is received at the User 2's mobile device from the User 1. In embodiments, the text message phrase may be displayed along with a matching video/photo of the sender, such as a photo of the User 1 taken from the camera of their mobile device at the time of sending the message and emoting a feeling of hunger. In further examples, a screenshot of the display screen the mobile device of User 2 may receive an audio message that says, "I'm hungry!" from the User 1 including with a matching video/photo. In embodiments, a matching video/photo of the sender, such as a photo of the User 1 taken from the camera of their mobile device, may be sent at the time of sending the message.

Figure 31C:
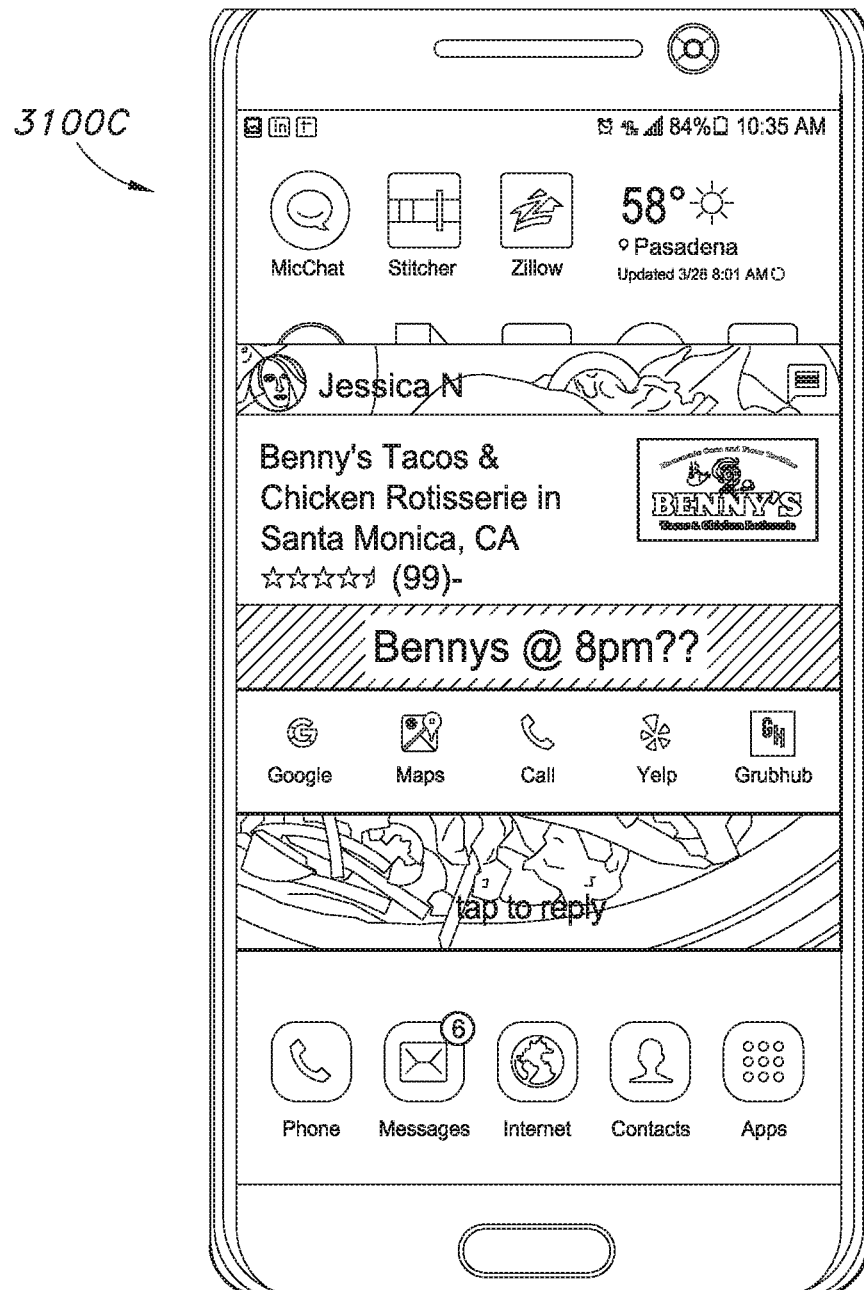

FIG. 31C illustrates a screenshot of the display screen 3100C of the User 1 when a reply message is sent from the User 2 to the User 1, such as on the lock screen of the user 1, and where the reply message contains the text phrase "Bennys@8 pm??." The text phrase is associated with a matching content such as interactive information about the restaurant name mentioned in the text, namely "Bennys." In embodiments, such information may be available even though the lock screen is in place on the mobile device. In embodiments, the interactive information may include, for example, a map of the restaurant location, the ratings for the restaurant, the restaurant's brochure, directions, tips, reviews, and other contextual advertising information associated with the restaurant name. In an example, the reply message may also or instead include information about the type of food and the matched content may be displayed accordingly. In many examples, a message that contains the phrase "want to get tacos?" may be augmented by a video or animation showing tacos. The meaning assigned to the phrase mentioned in the message may be based on a context as well as the content of other messages. By way of the above example, the initial reference to getting tacos may be used to help infer that a follow-on message proposing a name and time is a reference to a restaurant location where tacos are available. Further, the context of the message may be identified such as by using the user's history of interactions with other users, the history of use of the SCCMC App by the user or other users, the geo-location of the user, user contact data (such as stored contacts), the profile of User 1 or User 2 (or both), and many others and combinations thereof. Thus, the matching content for the text in the message may be SCCMC media content that may be automatically associated with an item of media content may be relevant to both the content of the message and the context of the message.

In many examples, the association of media content with text entered in the input message may be performed by applying one or more machine learning algorithms. In many examples, the machine learning algorithm and other methodologies may be used to interpret the body of text in the input message and identify what type of media may be associated with what type of text input. In an example, the interpretation may be based on feedback information entered into the machine learning algorithm such as a feedback information gathered directly from the users regarding the extent of satisfaction with the content recommended by the SCCMC App. Apart from the feedback information gathered directly from the users, the feedback information may also or instead be derived based on some feedback metrics associated with the SCCMC App. In many examples, the feedback information may be derived based on a metric associated with the use of the recommended content such as whether the user saves the content, shares the content, interacts with the content, and the like. The feedback information may be used to provide more relevant and relatively effective media content in response to the text received in the input message.

Figure 31D:
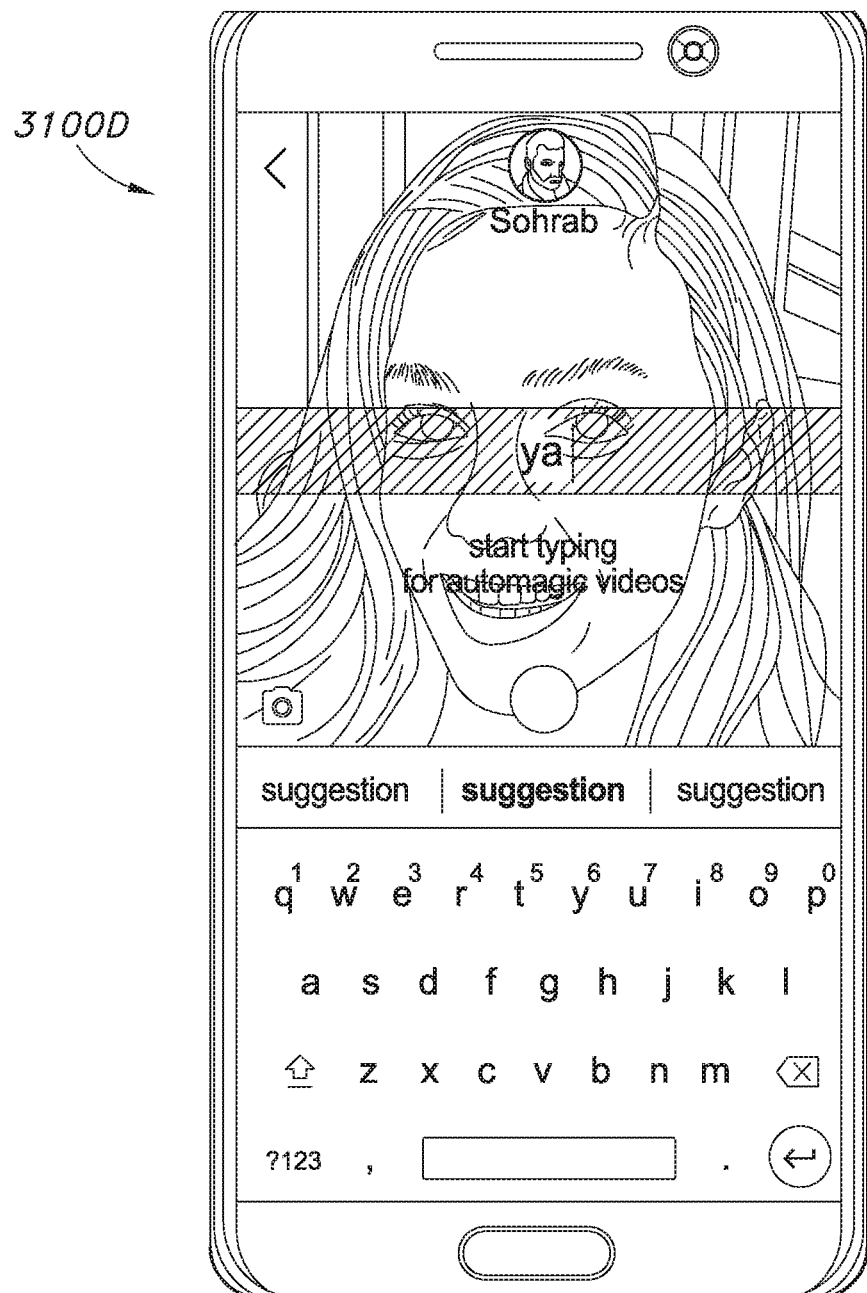
Figure 31E:
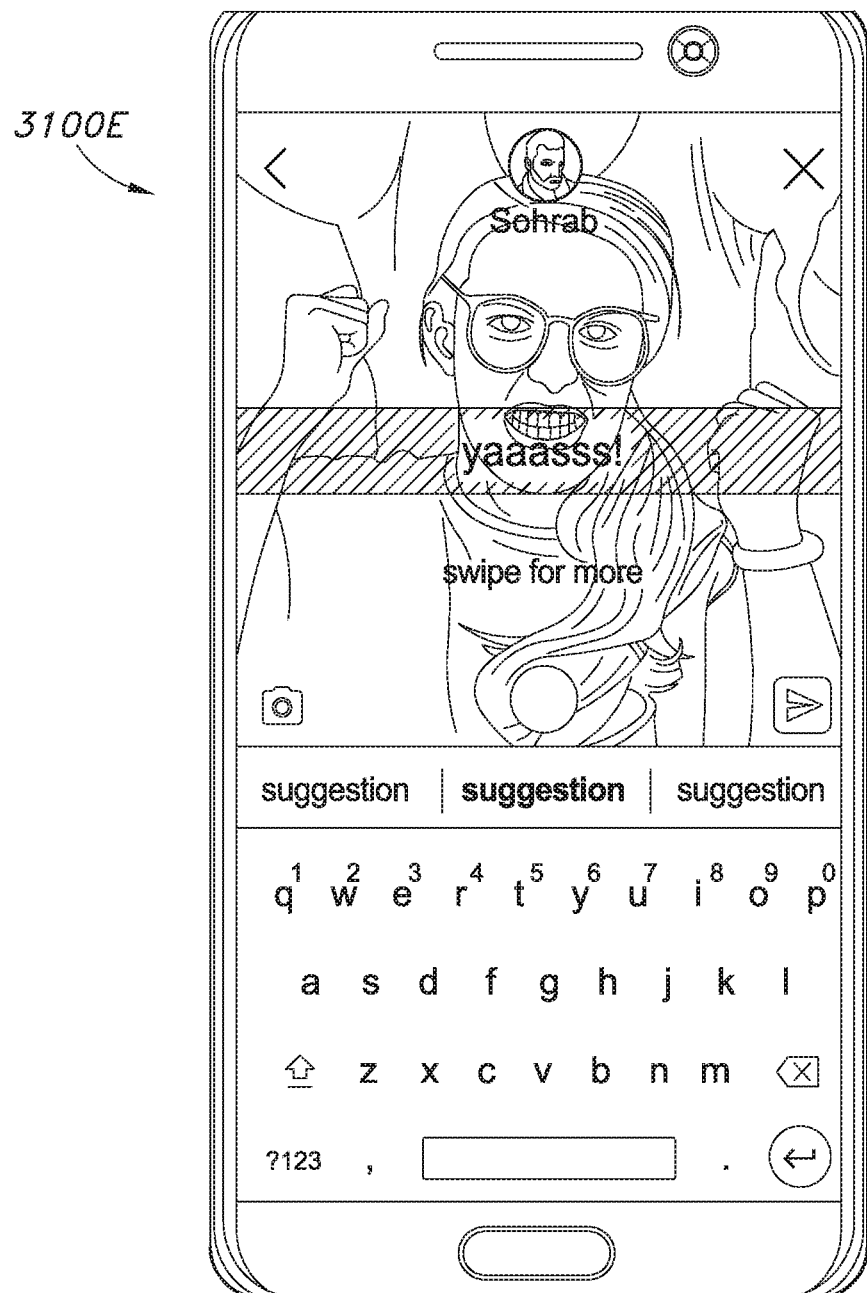

For example, FIG. 31D illustrates that a text entered by a user on their lock screen 3100D may be automatically completed and matched with the relevant media content. The completed content is illustrated in the screenshot of the display 3100E of FIG. 31E. In embodiments, the matched and completed content on the display 3100E may be used directly from the lock screen by the user or alternatively, the user may override the content. In both the scenarios, the user feedback may be used to derive the feedback information for the machine learning algorithm.

In embodiments, methods and systems described herein including SCCMC-based structures such as the SCCMC app and the SCCMC media content, may facilitate user access to or may serve as any of a variety of mobile communication capabilities or applications on a user's mobile device, e.g., text messaging, video calling, audio calling, and the like including use of various networking and transport protocols such as IP-based protocols, cellular networking protocols, or others. In embodiments, the communication capabilities or applications may be accessed directly from a user's lock screen, without requiring the user to unlock the phone or open the communication application. As such, the user need not unlock the mobile device to access the SCCMC app and its media content. In embodiments, the methods and systems may interface with one or more communication port features of a mobile device (such as ones for handling incoming IP-based messaging, ones for handling notifications, ones for handling incoming cellular messages, and the like) to effectively redirect information communicated to the mobile device that is destined for the other communication capability or application to a lock-screen capable application. In embodiments, the lock-screen capable application may operate independently of the locked or unlocked state of a phone or other mobile devices, such as when a device is locked, the screen is blank, it displays its lock screen, or the like. The lock-screen capable application may intercept information destined for or originating from a communication application (e.g., Snapchat™, Facebook Messenger™, iMessage™, WhatsApp™ and the like) or may serve in replacement of such applications as it is received by a recipient mobile device. In embodiments, the recipient mobile device may include SCCMC data structures that may perform contact media adapting functions prior to being sent from a sender mobile device including providing a user interface that operates while a phone is in lock screen mode. The user interface may include the lock screen capable application in order to facilitate a user of the mobile device receiving and responding to a communication associated with the intercepted information before delivery to the communication application, a communication associated with the intercepted information processed by the user interface directly, or the like. In embodiments, the lock-screen capable application may display a wide range of content in response to the intercepted information, such as video content, animations, or a wide range of other types of content described throughout this disclosure. In embodiments, the content may consist of a video. In embodiments, the video may be selected by the sender of the information. In embodiments, the video may be selected from a channel, where the video and/or the channel may be selected based on the content of the intercepted information and/or the context of the information such as based on the time of day, the location of the sender, the location of the recipient, the state of the recipient's device, or other factors. In embodiments, the lock-screen capable application may also interface with the target/source communication capability or application to facilitate end-to-end communication between the relevant communication capability or application on the sender mobile device and the recipient mobile device without the necessity for a third party communications applications.

FIG. 32 depicts a diagram of a unified messaging platform 3200 as described herein. In embodiments, a sender 3202, such as a mobile phone or the like may communicate over an electronic medium, such as an IP-based network, cellular network and the like with a recipient 3204, such as a recipient mobile phone or the like using the methods described herein. In embodiments, communication among one or more senders 3202 and one or more recipients 3204 may include a platform server 3206. Communication among one or more senders 3202 and one or more recipients 3204 may include the use of messaging services, such as native messaging services 3210, 3212, messaging applications 3214, 3218, sender-controlled contact media content applications 3220, 3222, directly, and the like. Communication among one or more senders 3202 and one or more recipients 3204 may also include use of content association services 3224, 3228, A sender may use sender mobile phone 3202 or similar computing device configured with one or more capabilities and/or applications, such as native messaging services 3210 that may facilitate communicating with other users, such as recipients, servers and the like. In embodiments, the sender mobile phone 3202 may further be configured with messaging applications 3214, such as those mentioned and described herein for facilitating communication of text, images, video, and other electronic content among senders and recipients. In embodiments, the sender mobile phone 3202 may also be configured with one or more unified messaging applications or capabilities, such as a sender-controlled contact media content application 3220 that may work cooperatively with (or in lieu of, partially or wholly) the native messaging services and/or messaging applications of the mobile device to facilitate the sender-controlled contact media content control functions and capabilities described herein.

In embodiments, these SCCMC features include performing natural language processing (NLP) 3230, 3232 on a message prepared in any of the messaging applications including the SCCMC application 3220, 3222, and on content associated with an outgoing message as described herein. In embodiments, other features of a sender 3202 may include one or sender mood sensing 3240, sender user state determination 3242, and the like that may provide information to the SCCMC application 3220, and from other SCCMC applications. In embodiments, the features, capabilities and the like of a sender 3202 may be embodied as individual applications, local services available to an SCCMC application 3220, remote services accessed through mood sensing and/or user state determination interface capabilities of the sender mobile device and the like. In embodiments, the mood sensing 3240 may also include mood determination capabilities by interfacing with mood determination services 3250 of the unified messaging platform 3200, or may perform mood determination functions directly or partially using the processing and storage capabilities of a sender 3202 mobile phone and the like.

In embodiments, the platform server 3206 of unified messaging platform 3200 depicted in FIG. 32 may interface through a network connection or the like with at least the sender 3202 or the recipient 3204. The unified messaging platform 3200 server 3206 may further provide services, applications, and/or capabilities for unified messaging as described herein including the mood determination 3250 for determining a mood of a user of the unified messaging platform 3200 including the sender 3202 or the recipient 3204. In embodiments, the platform server 3206 may also provide natural language processing 3252 services for processing messages composed on a sender device 3202 that may be destined for or received on a recipient device 3204. In the many examples, the NLP services 3230, 3232 may be provided to any of the participants in the platform via the natural language processing capability 3252 executing on the platform server 3206. The platform server 3206 or other aspects of the platform 3200 may also provide capabilities such as machine learning via a machine learning capability 3260. The platform server may further provide content association services 3262 via a content association capability executing at least partially using the computing and/or storage features of or accessible to the platform server 3206.

In embodiments, the unified messaging platform 3200 may further include a media content library 3270 that may include or be associated with sender-controlled contact media content structures 3272. Participants on the platform 3200 one more senders 3202 may be provided access to the content library 3270 over one or more networks and when applicable, via the platform server 3206. Similarly, one or more recipients 3204 of the platform 3200 may access the media content library 3200 via a network, through the server 3206, and the like. Features, functions, and services of a media content library including association and/or integration of one or more SCCMC structures when applicable are further described herein.

In embodiments, a unified messaging platform, such as platform 3200 depicted in FIG. 32 includes recipient 3204 that may be embodied as a mobile device or the like. In the many examples, the recipient 3204 of the platform 3200 may include unified messaging capabilities that are similar to the sender 3202 capabilities, such as content association services via a content association module 3228, native messaging services via a native messaging module 3212, messaging services via messaging applications or services 3218, NLP services through a natural language processing module 3232, and the like. In embodiments, the recipient 3204 may include or have access to other capabilities, such as a recipient SCCMC application 3280 that may include functionality similar to a sender SCCMC application 3220 but also may be adapted to work cooperatively with native screen like services 3282, a lock-screen capable application 3284 and the like that may be embodied with and/or use processing and/or storage resources of the recipient 3204 computing device. Capabilities of the recipient SCCMC application 3280, including its cooperative operation with the lock-screen capable application 3284 and or its optional integration with the lock-screen capable application 3282 are described further herein.

In embodiments, the media content library 3270 may provide storage for media content and optionally for SCCMC items or may be associated with SCCMC structures as described herein. FIG. 33 depicts embodiments of the media content library 3300 that facilitate associating content items with a media type, SCCMC references (if any), one or more channels (e.g., topics of interest) and the like. The embodiments of FIG. 33 may also include an index for accessing items in a media content library 3270, SCCMC structures 3272, and the like.

Figure 34:
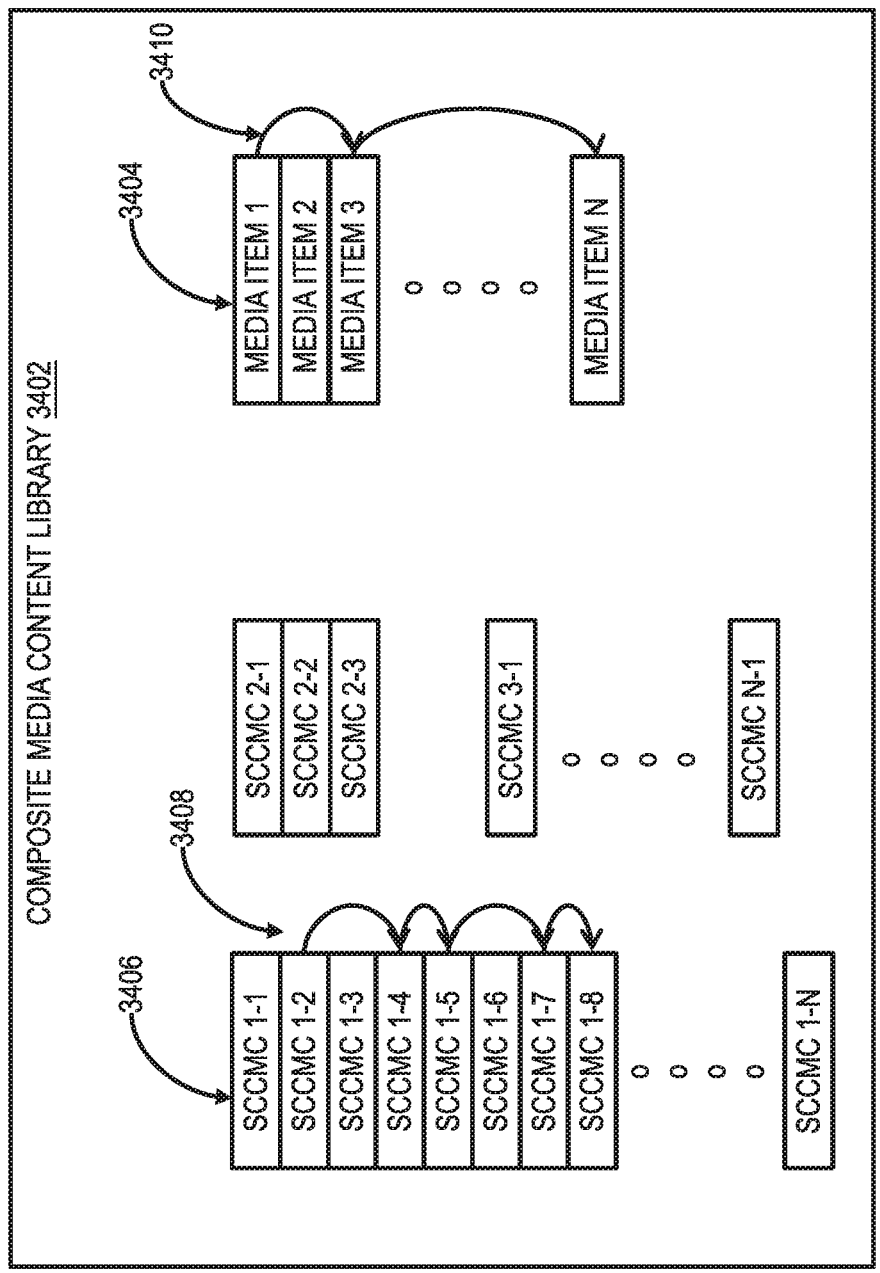
FIG. 34 illustrates an embodiment of composite media content library in accordance with an embodiment of the systems and methods disclosed herein.

FIG. 34 depicts embodiments of media content library 3402 that may incorporate media content items 3404 and SCCMC content items and/or structures 3406. As described herein for many of the embodiments, media items and/or SCCMC content items or structures 3406 may be arranged into channels, which may be based on topics of interest. In embodiments, an exemplary channel indicator 3408 for a set of SCCMC structures for a sender 1 (SCCMC 1-x) may provide a mechanism by which a sender's SCCMC structures may be accessed as a channel as described herein. In the embodiments of FIG. 34, a composite media content library 3402 may also provide access to media content items as a media channel 3410.

Figure 35:
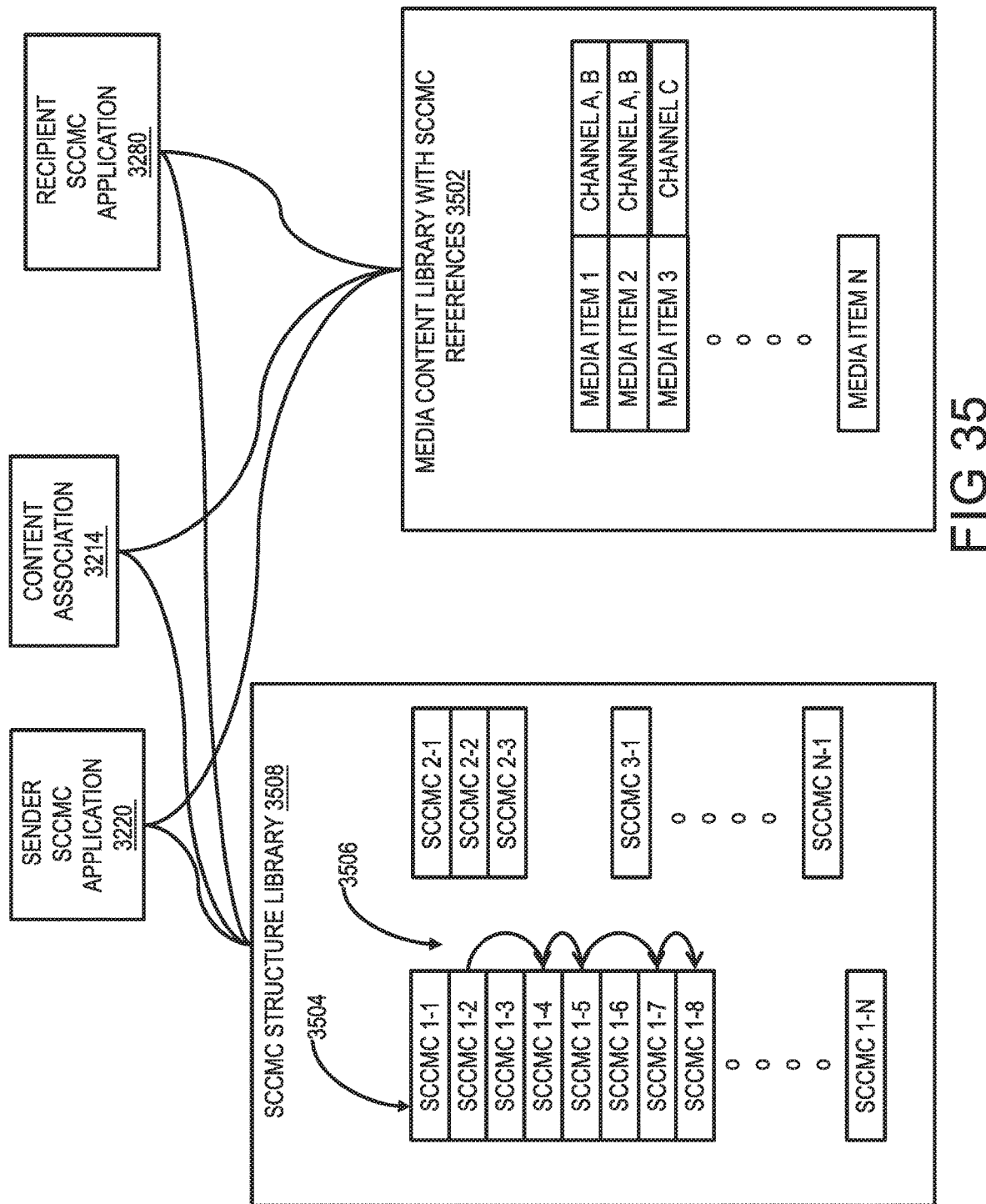
FIG. 35 illustrates an embodiment of separate media and SCCMC structure libraries in accordance with an embodiment of the systems and methods disclosed herein.

In embodiments, FIG. 35 depicts an alternate configuration of a media content library 3502 that may operate cooperatively with an SCCMC structure library 3508 to provide the services and capabilities of a unified messaging platform and the like as described herein. In the embodiments of FIG. 35, the media content library 3502 and the SCCMC library 3508 may be accessed by various functional modules of the platform, such as the sender SCCMC application 3220, the content association capability 3220 and the recipient SCCMC application 3222. In embodiments, each application or capability may determine the appropriate library to access based on the type of media being selected and/or the function being performed. Channels, as used herein, may be configured for the SCCMC library 3508 and the media content library 3502 such that the items in each library may be accessed via channel reference without requiring that each particular item is referenced directly.

Figure 36:
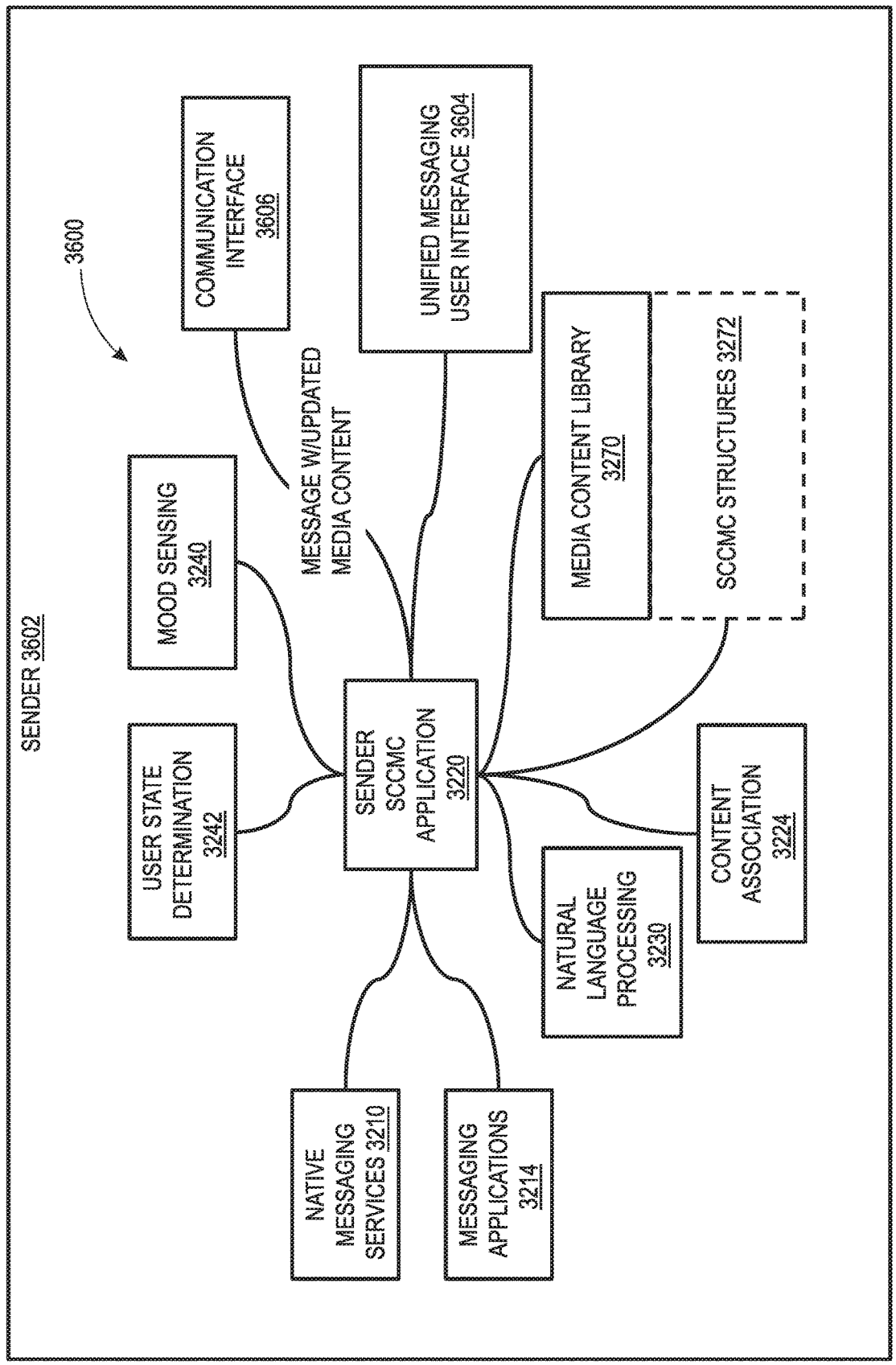
FIG. 36 illustrates an embodiment of a sender device configuration in accordance with an embodiment of the systems and methods disclosed herein.

The embodiments of FIG. 36 depict sender device elements 3600 of a unified messaging platform and flow of information among sender elements 3600. Description of the sender elements may be made with reference to FIG. 32 with the exception of a communication interface 3606 and a unified messaging user interface 3604. In embodiments, the flow of information among the elements may include one or more messaging applications 3214 or services 3210 interfacing with a sender SCCMC application 3220. The messaging applications may send information to the SCCMC application 3220, such as text or other electronic content that may be composed or selected the sender using, for example, functions of the messaging applications with or without using a user interface of the messaging applications. The sender through the unified messaging user interface 3604 via the SCCMC application 3220 may access the functions of the messaging applications. In embodiments, the SCCMC application 3220 may access user state determination facility 3218 to determine a state of the user of the mobile phone and mood sensing facilitate 3212 to determine a mood of the user. This user state and/or mood information may be used by the SCCMC application 3220 along with natural language processing capabilities 3214 to operate a content association function 3224 to associate an item of content from the media content library 3270 and/or the SCCMC structure library 3272 with content of a message from the messaging services or applications. In embodiments, the SCCMC application 3220 may reconfigure the message with the item of content and provide that to a communication interface 3606 of the sender device 3602 where it may be communicated to a recipient computing device over an IP network or the like. In the many examples, the unified messaging user interface 3604 may include features that facilitate the sender selecting among a plurality of content items that may be selected through the content association operations described herein.

Figure 37:
FIG. 37 illustrates an embodiment of a unified messaging user interface for media content selection in accordance with an embodiment of the systems and methods disclosed herein.

FIG. 37 depicts embodiments that are representative of a gallery of content items 3700 that may be suitable for use with the one or more messages being sent and received. In embodiments, a user (e.g., the sender) may operate the unified messaging user interface 3604 to select one more content item manually. In further embodiments, a content item may be automatically selected and the message may be configured with the selected content item for delivery to a recipient. Whether manually, automatically, or combinations thereof, the content items 3700 are candidate media content that may be accessed manually and/or automatically.

Figure 38:
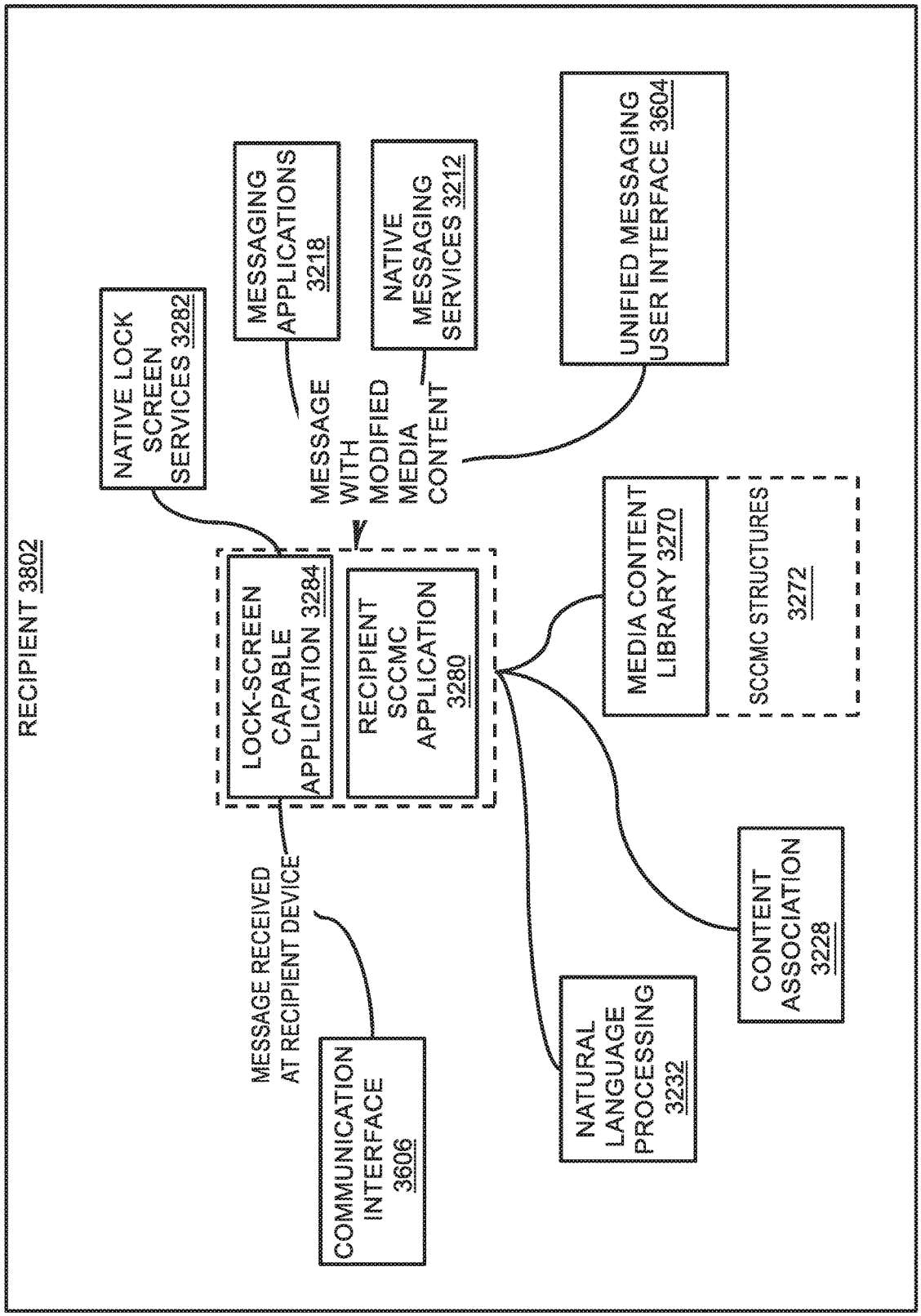
FIG. 38 illustrates an embodiment of a recipient device configuration in accordance with an embodiment of the systems and methods disclosed herein.
Figure 39:
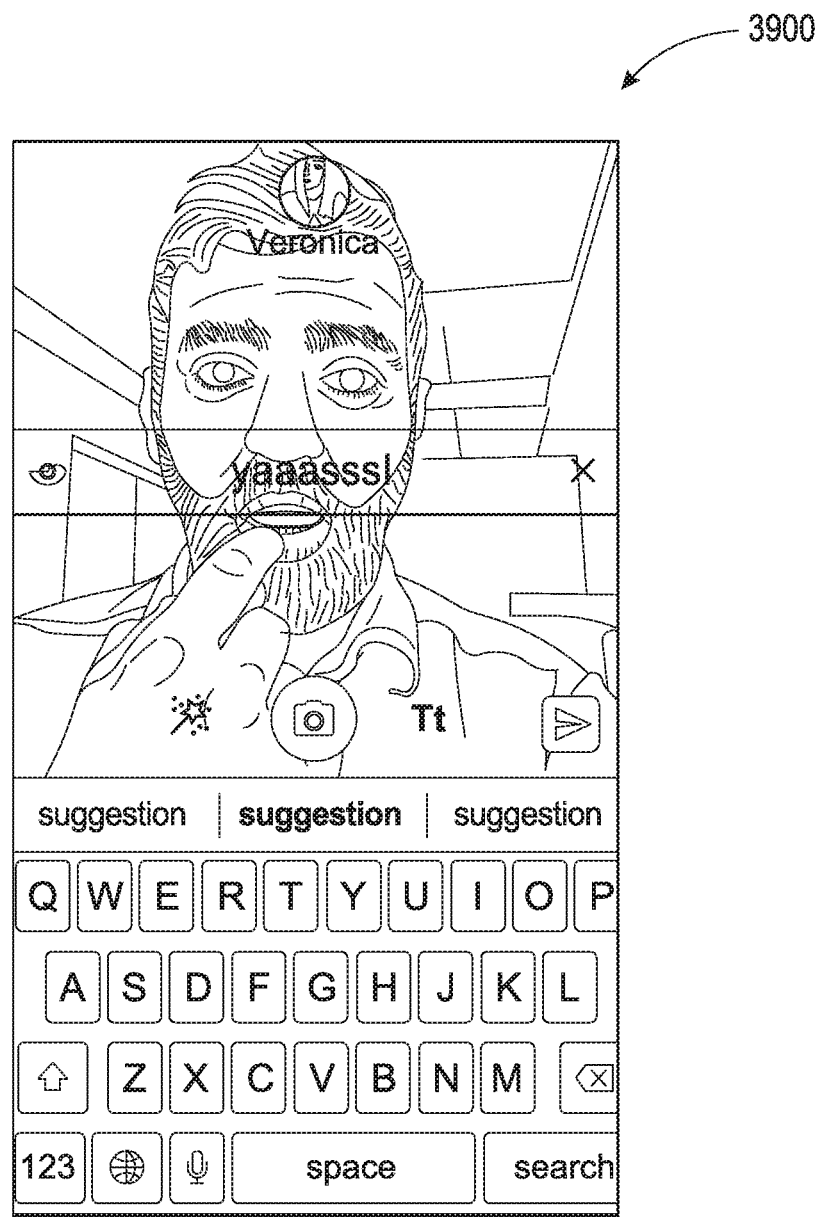
FIG. 39 illustrates an embodiment of a unified messaging interface for responding to a modified media content message in accordance with an embodiment of the systems and methods disclosed herein.

FIG. 38 depicts exemplary operations of the methods and systems 3800 for content modification of an incoming message via an interception by a lock-screen capable application and processing thereof using the methods and systems described herein to append, adapt, and/or replace a content item associated with the intercepted message. In embodiments, a message that may be received by the recipient 3802 may be intercepted by a lock-screen capable application 3284 that may include or access functions such as natural language processing 3232 and the content association services 3228. In embodiments, the message that may be received by the recipient 3802 and intercepted by the lock-screen capable application 3284 may also interface with a recipient SCCMC application 3280 to determine a content item that may be automatically or manually selected from the media library 3270, the SCCMC structures library 3272, or the like. In embodiments, the determined content item may be configured with the intercepted message and processed through the recipient SCCMC application 3280 (partially or wholly) or forwarded on to a corresponding messaging service or application. In embodiments, the modified message may be presented in a unified messaging user interface 3604 that may be made accessible by the lock-screen capable application 3284 without requiring that the lock state of the phone or connected device to be changed. The recipient 3802 may use the unified messaging user interface 3604 while the phone or connected device remains in an otherwise locked state to respond to the modified message. FIG. 39 depicts exemplary embodiments of the unified messaging user interface 3604 including a responsive modified message 3900 from the recipient 3802 to the sender 3602 and/or others in accordance with the many embodiments of the present disclosure.

In embodiments, the methods and systems related to automated gif/image/video identification based on content of a contact event, such as a text message and the like, may be beneficially applied for a wide range of languages. In particular, languages that include a large number of characters, such as some Eastern languages that may have one thousand or more characters, may benefit from the methods and systems described herein by automating annotation of typed content with at least one or more of the natural language processing approaches described herein. In addition to facilitating association of image-related content with such messages based on NLP of their text content, audio-based messages may benefit from the NLP-based image selection by adding a speech-to-text function that prepares an item of text content for the NLP. An image derived from the NLP processing of the generated text may be associated with the audio. In embodiments, an image may be tagged with the audio content so that transmitting the image to a recipient messaging application may result in the image being displayed while the audio is played back. In embodiments, more than one image may be associated with an audio message, such as based on NLP of a plurality of portions of the audio message. The more than one image may be configured in a slide show or the like that is coordinated with the audio file based on the NLP output so that each of the more than one image may be played back in a sequence that tracks with the relevant audio. In embodiments, the NLP may determine that a first portion of an audio transcribed message may embody a first theme or emotion and a second portion, that may follow the first portion may embody a second theme or emotion. A first image may be recommended and/or selected for the first portion and may be configured to display (e.g., by associating playback metadata with the image and the like) for a duration of time that is consistent with the first portion of the audio transcribed message. Likewise, the second image may be recommended and/or selected for the second portion and configured to display for a duration that is consistent with the second portion of the audio transcribed message. In embodiments, audio-associated image(s) may be recommended, selected, and exchanged as described herein between at least two users in a form of audio-messaging, such as VoIP, audio file capture and playback, and the like.

Figure 40:
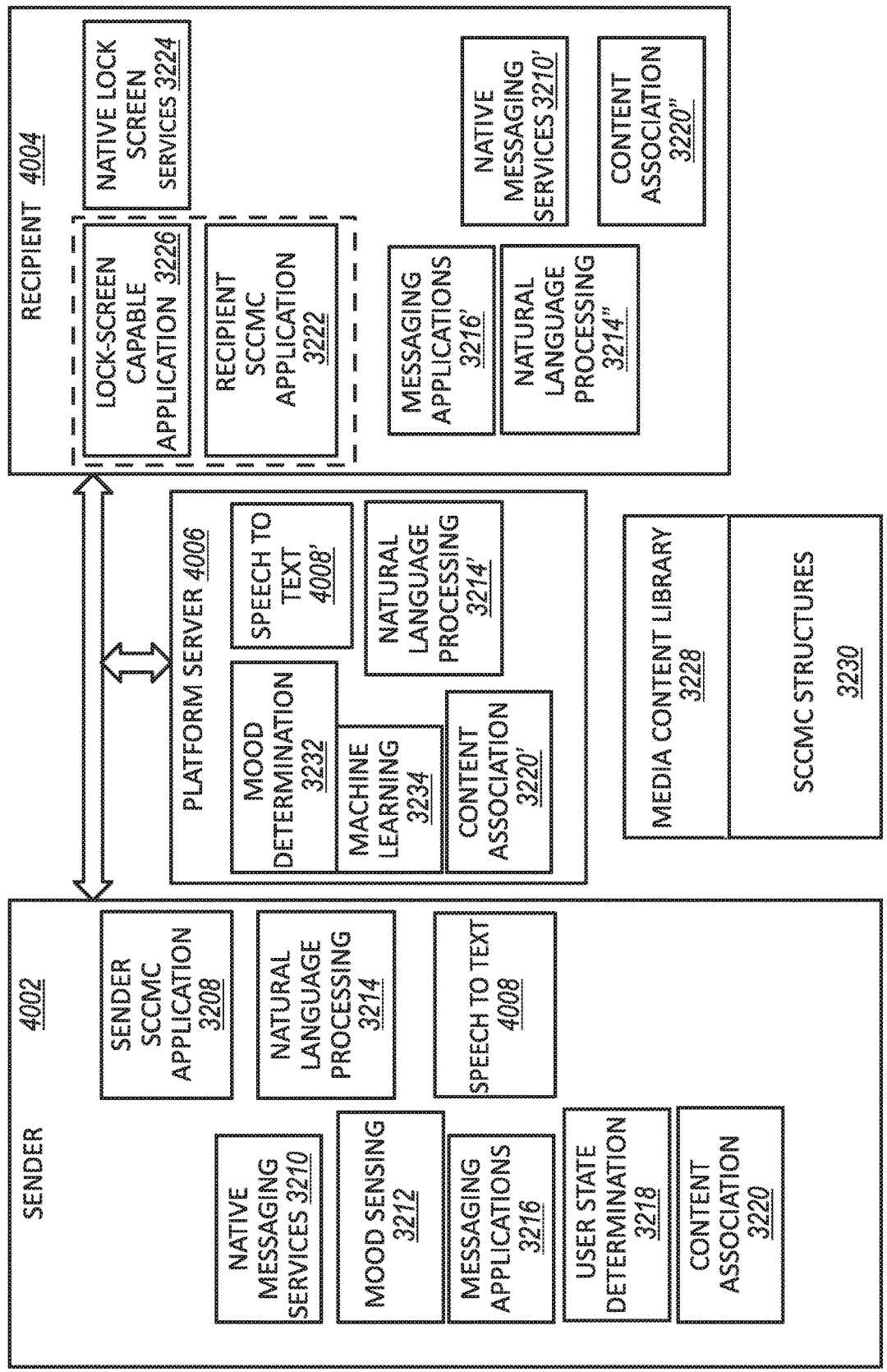
FIG. 40 illustrates an embodiment of the system of FIG. 32 further including speech to text for transcribing audio messages for use with NLP.

FIG. 40 depicts an embodiment of the platform of FIG. 32 with the addition of speech to text functionality to enable the use of natural language processing, such as for recommending candidate images to be associated with an audio message. A sender 4002 may be configured with, among other things, natural language processing 3214 as described herein. A user of a sender system 4002 may record an audio message. The audio message may be processed at the sender 4002 with a speech to text facility 4008 that may generate a text transcription of the audio recording. The NLP facility 3214 may process the transcription to determine a theme, intent, emotion, and other understanding of the audio message. As described elsewhere herein a sender SCCMC application 3208 may present the sender user with one or more recommended image contents to be associated with the audio message based on the NLP determined theme, intent, emotion or other understanding. The SCCMC application may communicate the audio message, and/or one or more of the image contents selected by the sender user, and/or the transcription to one or more of a platform server 4006 and a recipient 4004. Processing of the transcription may be performed by a natural language processing facility 3214' of the platform server 4006. Likewise, speech to text processing of the audio message may be performed by a speech to text facility 4008' of the platform server 4006. The platform server 4006 may perform speech to text and NLP and recommend one or more image contents to a sender user and the like. The platform server 4006 may combine a sender user selected image content with the originating audio file so that the image content is presented on an electronic interface of the recipient device 4004 when the audio message is played, such as on a lock screen of the recipient device 4004.

Figure 41:
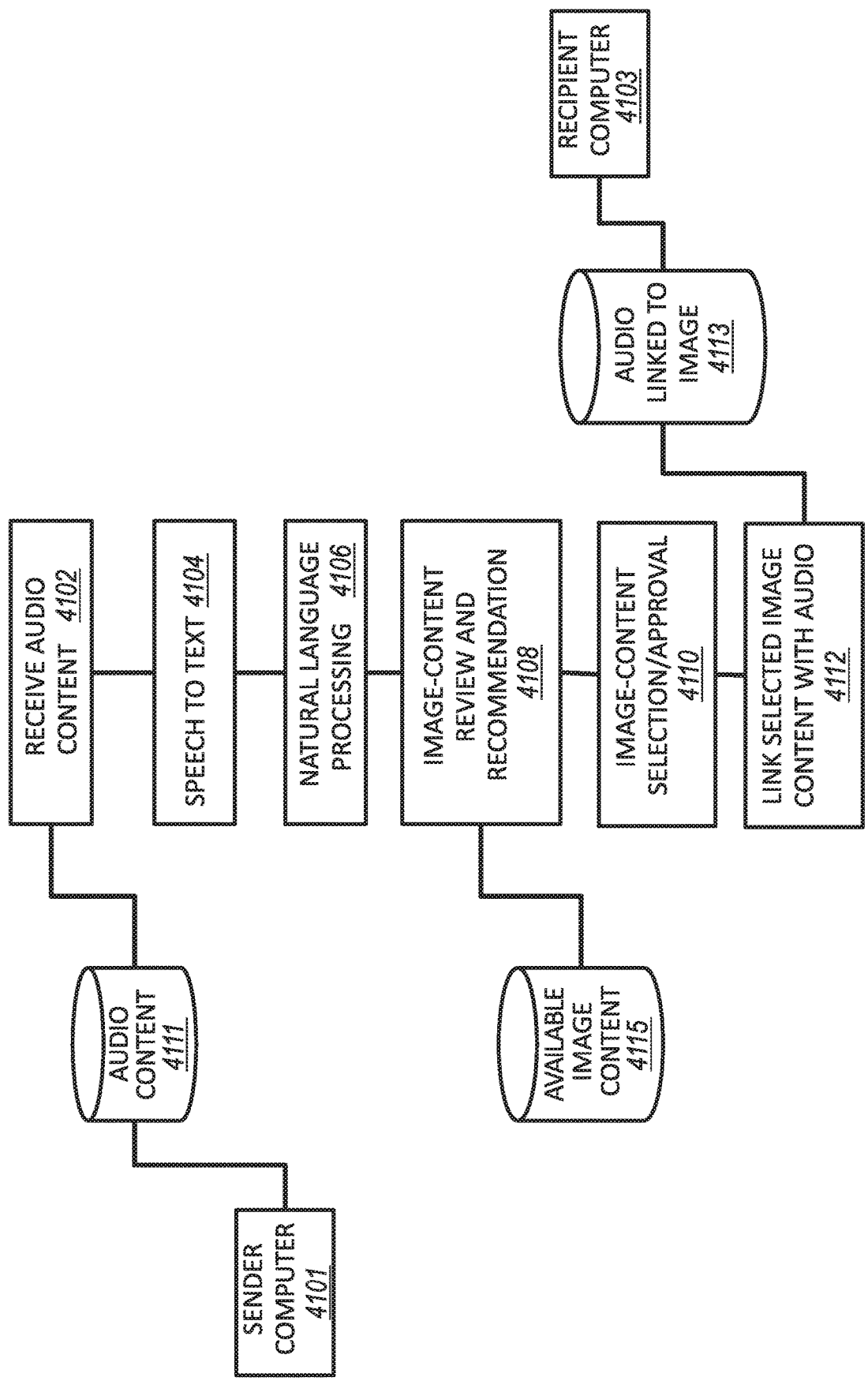
FIG. 41 illustrates a flow chart of processing an audio message with an embodiment of the platform of FIG. 40.

Referring to FIG. 41 a flowchart of audio message processing using, for example, the platform of FIG. 40 is depicted. A sender computer 4101 may generate an audio content item 4111 that may be provided to a platform where the audio content may be received 4102. Speech to text algorithms 4104 may be applied to the audio to generate a text transcription of the audio. The transcription may be processed by a natural language processing facility 4106. The output of the natural language processing facility 4106 may be processed by an image-content review and recommendation facility 4108 that may use the NLP output to select among a plurality of available content images 4115 to recommend at least one content image to a user, such as a user of the sender 4101. The user may select and/or approve of a recommended image in step 4110 image-content selection/approval. A selected image may be linked with the received audio file at step 4112, the audio content may be further linked to the selected image to facilitate coordinated playback on the recipient computer 4103.

In support of a user interface for facilitating selection of one or more images to be associated with a message, measures of user preference for the one or more images may be used when recommending images. Measuring user preference may be similar to those used in social media environments, such as providing a "thumbs up/down" function, providing a "like" function, detecting an amount of time a user dwells on an image, and the like may be used to help determine a likelihood that an image, such as a GIF, photograph, video and the like is popular. These measures of image popularity may be combined with other measures associated with the images, such as utilization of the image in messages, reuse of the image, social media activity of a message with a given image (sharing, re-sharing, reposting, re-tweeting, and the like) to form an additional degree of a likelihood of image popularity. These measures may be combined with natural language processing of text of messages that include the image to better determine if the resulting output of the NLP is consistent with social media perception of the combined text and image. As an example, NLP of text may suggest a particular image. Social media-based perception of the combination of text and the particular image may support the suggestion (e.g., social media users may indicate a preference for the combination, such as by liking the message or taking another action, such as reposting the message), or may indicate the suggested image may not be a suitable image for the text (e.g., social media users may indicate a dislike for the combined image/text, such as by disliking the message or exhibiting a lack of action such as not reposting the message). Therefore, prioritization of images may be represented as a function of user responses to the image in the user interface, social media responses to the image and/or to messages that include the image, such as Image-Prioritization=f(user interface response)+f(social media response). Additionally, in embodiments, image prioritization may be used in the platform user interface to determine an order, arrangement, image quality, image size, and the like for presenting candidate images in the user interface. Images with lower prioritization scores may be presented as smaller images, may be presented further down in a gallery of images, and the like.

Social media perception of images and/or messages that include an image may also be used as an input, such as a seed for natural language processing of text content of an image. Social media perception that may indicate that a message is popular, may facilitate determining temporal relevance of the message, which may indicate an importance of an emotion or other understanding of the message that may be derived from natural language processing of the message, and therefore temporal relevance of some of the words in the message. This temporal relevance, which may be short term or long term relevance, may be linked with one or more words in the message so that those words appearing in other messages may indicate a similar relevance or at least may indicate a relevance of an emotion and the like conveyed by the message. This information may be useful in validating and guiding for improvement natural language processing of the message.

Sources for images for the methods and systems for automated image recommendation and/or selection for inclusion with a message may include public images sources, such as publicly available social media photo galleries. In embodiments, social media and the like public galleries of participants of a message, such as a sender and a recipient, may be a source of candidate images. Through the use of tools such as face recognition, images may be organized based on detectable faces in photos. Further through the use of NLP of a text portion of a message being communicated from a sender to a recipient, a context of the message may be determined. The context of the message may be coded so that it can be used to facilitate selection of one or more candidate images from the sender's social media accessible photos, the recipient's photos, or a combination thereof. In an example, NLP may be used to analyze a message text content to generate a context or understanding of the message. In embodiments, such an understanding may suggest that a sender is inviting a recipient to dinner. The understanding may be coded into keywords, such as dinner, invitation, and the like that may be useful for indexing into a gallery of photographs of the sender and/or recipient. Images that are indicated by the keywords to be similar to the NLP understanding of the message may be suggested for use with the message.

In embodiments, the methods, systems and algorithms described herein for facilitating recommendation and/or selection of image-like content for use with a text and/or audio message, which may be based on natural language processing of the text and/or a transcript of the audio, may also be applied to other types of content than image-like content. In embodiments, messages with text may be tagged, such as with a hash tag and the like (e.g., a tweet, and the like). Hash tags may be applied across a plurality of messages, typically as an organizing tool to facilitate associating different messages that may share a common theme. Natural language processing, which may generate information about a message, such as its theme, may be applied to recommend one or more hash tags from a pool of hash tags based on the NLP-derived message theme, emotion, and the like. Hash tags may also be associated with descriptive metadata, that may be produced through use of NLP applied to the hash tag. This descriptive metadata may be useful in matching and/or recommending hash tags with content. In embodiments, NLP applied to a message text content may produce an understanding (e.g., theme, emotion, and the like) that may be coded to facilitate matching candidate hash tags from a pool of hash tags based on, for example, the hash tag itself and/or metadata associated with the hash tags. The candidate has tags may be presented in a user interface, comparable to the user interface described herein for manually selecting image content to be combined with a message text content. User interaction with the presented hash tags may be measured and used to further determine which hash tags are preferable for different types of text message content. In embodiments, a portion of the pool of hash tags may be processed with natural language processing to generate metadata descriptive of each hash tag, such as a theme, emotion, intent or understanding. This natural language processing generated metadata may be used in the selection of candidate hash tags, such as by determining a similarity of this natural language processing generated metadata with an output of the natural language processing of the message. In embodiments, the content matching platform may communicate the output of the natural language processing of the message to the messaging platform via an application programming interface.

In embodiments, an interface, such as an API, may facilitate interaction between a content matching platform that employs the methods and systems described herein and a messaging platform, such as a message platform that uses hash tags. The API or similar computer interface may facilitate the content matching platform programmatically receiving message content that it may processes, such as with NLP to develop an understanding of the message. The content matching platform may use the NLP to select among a plurality of hash tags to provide, through the API to the messaging platform for potential inclusion with the message. In embodiments, the content matching platform may provide information derived from the understanding to the messaging platform that may perform some degree of hash tag matching. In embodiments, the API may facilitate a user of the messaging platform to view candidate hash tags provided by the content matching platform. The user may view the candidate hash tags in an interface that is native to the messaging platform or that is shared with the content matching platform, such as by providing a link to a web page that contains the interface.

In embodiments, an interface, such as an API, may facilitate the exchange of message-based content and image-based content (e.g., gifs, and the like) between a messaging platform (e.g., TWITTER™) and the content-matching platform. This interface may facilitate the messaging platform providing message text content and the like to the content matching platform that may apply, among other things, natural language processing to develop an understanding of an intent of a message, such as a theme, emotion and the like. This understanding or result of other processing performed on the message text content may be used to identify one or more candidate image-type content items. The API may facilitate the transfer of these one or more candidate image-type content items from the content matching platform to the messaging platform for inclusion with the text portion of the message. In embodiments, the messaging platform may receive any of the one or more candidate image items, a coding of the understanding, a link to one or more candidate image items, a complete message including the text content provided from the messaging platform and the one or more candidate image items, and the like.

Figure 42:
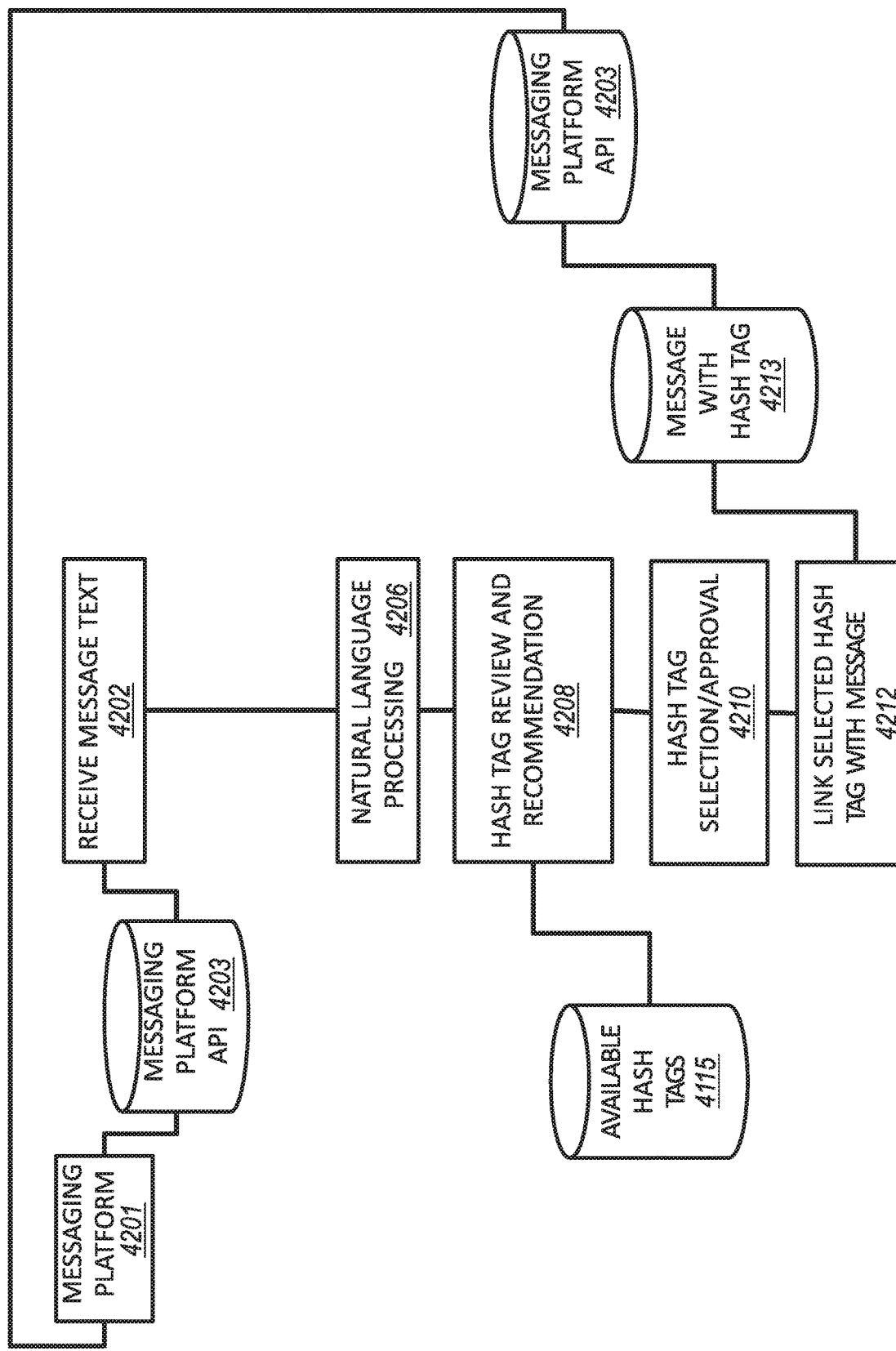
FIG. 42 illustrates a flowchart of communicating between a messaging platform via an API and a content matching platform to recommend hash tags rather than image content.

Referring to FIG. 42, a flow chart for use of natural language processing to facilitate recommendation and/or automatic selection of hash tags for use in a hash tag based messaging platform via a messaging platform interface, such as an API is depicted. Text of a message and the like may flow from a messaging platform 4201 via an inter-platform communication API 4203 to a content matching platform message reception interface 4202. The message, such as a text portion of a message, may be processed by a natural language processing facility 4206 to determine, as described herein, an intent, emotion, theme, or other understanding of the message text. The output of the NLP facility 4206 may be used to review and recommend at least one hash tag from available hash tags 4115 for potential use with the message from the messaging platform 4201. One or more recommended hash tags may be presented in a user interface 4210 that facilitates user selection and/or approval of one or more of the recommended hash tags. The hash tag(s) may be lined with the message in step 4212, which may produce a message with the selected hash tag that may be communicated through the messaging system interface API 4203 to the messaging platform 4201 where it may be handled according to the messaging platform 4201 protocols.

In embodiments, natural language processing of text content, such as a text portion of a contact event, message, and the like may produce an understanding of the text that may indicate a theme, emotion, intent, and the like of the text, which may also apply to the message that contains the processed text content. A result of NLP applied to message text content may be associated with the message as a form of descriptive metadata. The result of NLP may also be used to classify messages into categories of theme, emotion, intent, and the like. In embodiments, a messaging platform that may use hash tags to facilitate access to messages and the like may benefit from automated tagging of messages with hash tags indicative of the categories. As an example, a message in a hash tag-centric messaging platform may be processed with NLP to determine that a theme of the message is armed service personnel and an emotion of the message is respect. A hash tag indicative of this emotion-based theme may be recommended and/or automatically added to the message. The NLP-based classification hash tag may be made directly visible to users of the messaging platform, or may be hidden from the users while enabling the platform to better organize and manage messages being exchanged on the messaging platform. The NLP described herein may facilitate the creation of hash tag genres—emotion, intent, relevance, popularity, and the like.

In embodiments, in addition to facilitating a sender of a message, contact event, or the like controlling how that message is presented to a recipient on the recipient's computing device user interface (e.g., which image is displayed, ringtone is played back, video is played back and the like), a platform for providing comparable functionality may be adapted to enable collaboration among senders and recipients on how a contact event and/or message is presented on the recipient's computing device user interface. In a simplified two-user example, two users may share control of how messages and/or content events are presented on each other's user interface. Either user may have control of at least a portion of content that is presented in the user interface as a sender and as a recipient. This shared control may be implemented through the user interface features described herein that facilitate a sender determining what image, ring tone, and the like is activated on a recipient's computer interface. However, a recipient may influence, including potentially overriding what the sender has selected for playback on the recipient's computer. The user in the recipient role may configure his computing device to receive the sender's preference and messages from the sender, while ensuring that a portion of the message that the recipient has control over is defined by recipient settings or defaults a sender's settings if the recipient has not set any preferences for or opted to control the portion. In this example, a user in a sender role may indicate a first image to be presented to the recipient; however, a user in a recipient role may indicate a different image to be presented to the recipient responsive to the sender's message. Further in this example, a user may take on a recipient role and provide data to the other user's computing device that may restrict which images the other user may select among. In this example, the platform may identify a dozen candidate images based on the processing of a text portion of a message being composed by the sender. However, when the candidate images are presented to the sender for manual selection, only a subset that meets the criteria established by the recipient may be visible and/or selectable. Further in this example, a user in a recipient role may provide a specific list of images, set of images, links to a list of links to specific images to a user in a sender role that the sender's content matching platform may select from when presenting candidate images to the sender user for selection.

In examples of a recipient mobile device using the methods and systems described herein, the lock-screen capable application on a recipient mobile phone, computing device, or the like may capture incoming messages from a wide range of messaging clients (including, without limitation WhatsApp™, Facebook Messenger™, default SMS/MMS messaging apps, and the like) and use processing capabilities including natural language processing (NLP) capabilities to analyze an incoming message's content and pair it with a relevant item of content to display on the lock screen of the recipient's mobile device, such as a graphics interchange format item (a "GIF"), a video, or any other type of content noted throughout this disclosure. The paired content may then play on the lock screen as part of, or in response to, the message notification to the user. Continuing with this example, the lock-screen capable application may further allow users to respond to the messages they have received directly on the lock-screen, without having to unlock the phone or open a separate messaging application. The user interface of the lock-screen capable application on the lock screen may include a "Tap to view" button that brings users into an interface panel in which the user may begin creating a response. In embodiments, the phone may remain locked for all other purposes, so that exiting the interface panel returns the phone display to its lock screen.

By way of these examples, as the user enters text in the interface panel, one or more of at least three response modules may be activated. A plain text response module may be activated to facilitate user entry of a text response and interface with the messaging client, when applicable, to which the incoming message was intended. In embodiments, a GIF reply module may use natural language processing to automatically match relevant GIFs (or other such image files) with a user's response while it is being typed, such as based on association of a range of GIFs (or others) with keywords, topics, or the like in a table, database, library or the like that may be accessed to retrieve an appropriate GIF (or other images) based on derivation of the keyword or topic from the natural language processing. The GIF module may also update the interface panel with potentially relevant GIFs (or other images), such as in a portion of the panel, while enabling the user to use a keyboard and also see what he or she is typing. Interface elements (such as swiping left or right, for example) may allow a user to select among the potentially relevant GIFs and/or to bring up other automatically matched GIFs (or other images). Alternatively, a gallery of GIFs (or other images) may be presented in a portion of the interface panel to facilitate easier viewing and selection from a range of automatically matched GIFs (or other images). Swiping left or right, for example, may bring additional GIFs or the like into view. A video/photo module may be activated to facilitate a user snapping a photo or video with a camera, such as a camera integrated into the phone, computing device, or the like to which the user may access through his or her mobile device including a networked camera and the like. The video/photo module may also facilitate the user accessing his or her photo/video library, third-party photo/video libraries, complete SCCMC structures, SCCMC channels, or image/photo/video content therein, and the like.

Independent of which module(s) are activated to facilitate the user responding to the intercepted message, the response may be sent back to the sender's point of origination, optionally through the same messaging client, the SCCMC app, and the like that the originating message was targeted for. Thus, the lock-screen capable application may include capabilities for adapting outgoing communication such that it is appropriate for various channels of communication. The lock-screen capable application may also include capabilities for interfacing with and/or activating one or more communication capabilities or applications of the computing device, mobile phone, tablet, and the like without relinquishing the locked state of the device. In examples, if a message sent from a Snapchat™ client on a sender mobile device is intercepted by the lock-screen capable application, once the user indicates that a response message (with or without audio, GIFs, photos, videos, or the like) is ready to send, the lock-screen capable application may communicate with Snapchat™ application resident on the mobile device, or may generate a Snapchat™-format response message within the lock-screen capable application, to deliver the response back to the corresponding Snapchat™ application on the sender's mobile phone, computing device, and the like. As noted, in the many embodiments the lock-screen capable application may emulate inter-device communication aspects of Snapchat™ and communicate directly back to the sender's Snapchat™ application. After the user has completed entry and indicated that the prepared response should be sent, the user's display on his or her computing device, mobile device, tablet, and the like may return to the lock screen.

In embodiments, the methods and systems described herein may include configuring a library of audio, video, and image content for use when processing messages and the like as described herein. The library may include items, such as images that may be configured with attributes that facilitate associating a library item with a message, such as a text message. In embodiments, configuring the attributes may be based on an understanding of messages that the lock-screen capable application may process, such as text messages processed with natural language processing to develop an understanding of a topic, a keyword, a sentiment, or the like. In embodiments, attributes may represent aspects of a message related to the intent of messages, such as an emotion being conveyed, and the like. Natural language processing of text and other messages may result in attribute values and types that may be applied to items in the library. In some examples, applying these attributes and attribute types may be done by a human who reviews the images. In many of the embodiments, they may be applied automatically by a computer executing an algorithm or other methodologies that may determine aspects of an image, such as a facial expression and the like as being associated with an emotion and the like. In embodiments, an automated determination may be developed using machine learning such as by training a machine learning system using a training set of messages for which a human has assigned attributes. In examples, an image of a user smiling may be associated with an attribute of a happy emotion. An emotion attribute of such a library item may be populated with one or more data elements representing an output of natural language processing of text strings that indicates a happy emotion meaning in the text.

In embodiments, methods and systems for creation, use, and maintenance of media content structures include sender-controlled contact media content (SCCMC) structures, and applications thereof and may further include adapting, configuring, or the like one or more media content structures that are accessible to a recipient computing device, computer, mobile device, and the like including those stored on the computing device of the recipient or provided by a server, and the like, during a contact event interaction between a sender computing device and a recipient device. A media content structure, such as an SCCMC structure, that may be accessed in response to a recipient computing device receiving a message, such as a text message and the like from a sender computing device may include or reference one or more data elements, such as an image, video, audio, text content and the like. In embodiments, prior to presenting the media content structure, such as content associated with the sender of the message to the recipient, one or more of the data elements may be adapted, configured, or replaced by another data element based on information derived from the sender's computing device. The data element, such as an image may be adapted or replaced by another image to reflect a mood or emotion of the sender. In examples, an SCCMC for a sender may include an image of the sender with a pleasant smile. In other examples, however, the sender may be under the weather, such as due to the common cold, or the like, at the time that the sender sends the message to the recipient. Based on information indicative of the sender's state, the pleasant smile image may be changed to an image that reflects the recipient's state. The replacement image may come from a portion of an SCCMC structure, from another SCCMC structure of the sender, from a third-party source, from the sender's computing device, and the like. Information about the sender's current mood, emotional state, health status, and the like may be sent along with the message from the sender's computing device to the recipient's computing device. In embodiments, the lock-screen capable application on the recipient's computing device may include an SCCMC application on the recipient's computing device that may process the message and accompanying information to determine what aspects of the SCCMC to adapt prior to presenting an SCCMC item that corresponds to one or more attributes of the sender.

In embodiments, a sender may use an SCCMC messaging application to create a message that may include information about his or her current mood and the like. The SCCMC application may provide a user interface with features that enable the user to designate his or her mood. Alternatively, a mood determining system, operating on the sender computing device, the recipient computing device, or in a remote location (such as in the cloud) may rely on technologies that facilitate detecting the sender's mood, such as facial recognition, speech recognition, degree of distraction of the sender, and the like. The mood determining system operating on the sender computing device or in a remote location (such as in the cloud) may rely on technologies that facilitate detecting the sender's mood contemporaneously with the sender sending a message from the sender's computing device to the recipient's computing device. The mood determining system may interact with or operate as part of an SCCMC application, a lock-screen capable application, or a combination thereof to provide mood information, which in turn may be used as an attribute, such as for selection of appropriate media content structures, such as SCCMC media structures or other media structures, such as selecting a GIF or other image or video that reflects or is consistent with the mood of the sender.

In embodiments, the lock-screen capable application is an SCCMC-based application and may be part of a platform that may intercept messages originated on a sender's computing device prior to the messages being delivered to recipient's computing device, including messages prepared in other messaging applications as described herein. In embodiments, the platform may process the intercepted messages, including processing the messages while they are being inputted by the sender on the sender's computing device independent of which messaging application the sender is using (or none at all), to offer services of the platform to the sender prior to facilitating delivery of the message to one or more recipients. In embodiments, services offered may include the inclusion of an image, GIF, video, audio, alternate text and the like. Services offered may be customized for the sender based on information known to the platform about the sender, such as the sender's level of activity with the computing device, sender's mood, sender's preferences, and the like. The services offered may be further customized through natural language processing of text portions of the intercepted message and may include suggestions for gifs, images, video, audio, text and the like to be included with or integrated into the message and the like. The platform may, automatically or in response to a sender's acceptance of one or more offered services, prepare and/or update a content media structure, such as an SCCMC structure of the sender, to transmit to the one or more recipients as part of the contact event interaction. As an example, an updated SCCMC structure or a portion thereof may be sent to a corresponding SCCMC application on the one or more recipient computing devices ahead of the message to enable the use of the updated SCCMC structure by a recipient's computing device when processing the accompanying message.

In further embodiments of a platform, a state determining system, such as operating with or as part of an SCCMC application or the like operating on a sender's computing device, may be provided with or may detect a current mood, emotional state, health state and the like of the sender and responsively prepare or update a media content structure, such as an SCCMC structure, that may be provided to potential recipients, such as currently active users of a group of which the sender is a member. Alternatively, the updated media content structure may be provided to a platform server that may store the media content structure, such as storing it as an SCCMC, such as for use when facilitating message delivery during a contact event interaction. Methods and systems for updating SCCMC structures on recipient computing devices that are described herein may be employed to update the various recipient devices.

In embodiments, a contact event handling platform is provided that intercepts messages originating on the sender computing device from messaging capabilities or applications operable on a sender's computing device, that processes intercepted messages with natural language processing and, based thereon, forwards the message with an appropriate media content structure, such as an SCCMC structure, based on the processing, and/or a result of the natural language processing. In embodiments, the contact event handling platform includes a lock-screen capable application that provides a unified messaging user interface for a recipient computing device, such as while the recipient computing mobile device is in lock-screen mode, while also delivering an adaptation of the intercepted message, such as based on the processing that is compatible with the other messaging applications to the targeted other messaging applications.

In embodiments, the contact event handling platform may intercept, on a recipient computing device, messages destined for other messaging applications operable on the recipient's computing device. The platform may process the intercepted message with natural language processing and based thereon may forward the message, and/or media content structure, such as an SCCMC structure, based on the processing, and/or a result of the natural language processing to be processed in a unified messaging user interface of the recipient computing device, such as while the recipient computing device is in lock-screen mode, while also delivering an adaptation of the intercepted message based on the processing that is compatible with the other messaging applications to the targeted other messaging applications on the recipient computing device.

In embodiments, a lock-screen capable application may facilitate interacting with a user via user's computing device display while the user's computing device is locked (e.g., conventionally only the lock-screen may be presented on a mobile device display when the user's device is locked). The lock-screen capable application may, however, facilitate interacting with a user via a user's lock screen or facilitate interacting with the user on a screen other than the user's mobile device screen, such as a nearby screen on a TV, a screen designated by the user, a default screen, and the like. In embodiments, the user may interact with the lock-screen capable application via the other screen at least using the user interaction capabilities associated with the other screen, such as a touch screen, a touch pad, voice activation, keyboard, and the like. In this way, whether or not a user's computing device may be in lock screen mode, the lock-screen capable application may provide the user with a way to view and respond to a message being processed through the lock-screen capable application.

In embodiments, a lock-screen capable application as described herein may connect to, be associated with, or be integrated with augmented reality and/or virtual reality (AR/VR) user interfaces. The lock-screen capable application may provide information, such as images, audio, video, text and the like to the AR/VR user interfaces that enable presentation of a message in the interface. The information may be based on or include at least a portion of an SCCMC that is controlled by a sender of the message. As an example, an SCCMC application operating on or communicating with a computing device in control of the AR/VR user interface may receive, such as by intercepting a message for another messaging platform as noted herein, a message that it processes to access a corresponding SCCMC structure. In embodiments, the information in the structure may include media content, such as images, audio, video, and the like that may be provided to the AR/VR user interface for integration with the AR/VR user interface presentation. In embodiments, the AR/VR user interface may incorporate active elements, such as avatars and the like that may be deployed in the AR/VR user interface in response to receiving the message information from the SCCMC application.

In embodiments, the methods and systems of sender-controlled media (SCM) and the like described herein may facilitate enhancing existing caller ID functionality with other forms of content including audio, visual, animation, and the like. Use of SCM platform functionality that facilitates rendering SCM data structure content and the like through an electronic display may be integrated with or coupled with existing call functionality of smart phones to deliver visual caller ID as a new form of caller ID. Caller ID generally comprises a number or other alpha-numeric value (e.g., a name) of a caller, such as what may be found in a conventional phone directory and the like. On smart phone devices that include two dimensional electronic display graphic screens, this information is generally rendered in an incoming call display interface. Such an incoming call interface generally provides options to the user, such as answering the call, sending the call to voice mail, declining the call and the like. Integration of SCM content rendering capabilities with incoming call interface capabilities may facilitate presenting a range of content to a call recipient, including real-time images of the caller (e.g., through use of a caller's phone's camera function and the like). In embodiments, visual caller ID may provide a rich form of caller identification while optionally retaining incoming call recipient options.

As described and depicted herein, SCM content and data structures may be created and administered by callers using an SCM content creation interface. This interface may be activated automatically in response to a user initiating a call from a phone equipped with SCM platform capabilities, such as an SCM content creation application and the like. Such an interface may be adapted to generate call-specific SCM data structures that can be shared with a recipient at the initiation of a call. Such call-specific SCM data structures may be temporary, existing only for the initiated call. However, call-specific SCM data structures may be created and stored, such as on an SCM platform server and the like, so that, for example, they can be accessed when the same recipient is called by the caller. In this way creation of a call-specific SCM data structure may in effect generate a recipient-specific SCM data structure.

In embodiments, an SCM platform may use the methods and systems of sender-controlled media (SCM) described herein and depicted in the figures herewith to, for example, send a video or other forms of media to a caller in lieu of or in tandem with traditional Caller ID information. The platform may thusly overcome an apparent lack of information delivered in a traditional caller ID message that accompanies a phone call. In examples, the video could be a profile video. The video could be a customized video based on an advertiser or retail offering. In examples, the SCM is associated with the caller ID and is linked to a profile in which filters can be set up for predetermined SCM data structure to be sent to multiple users, e.g., coordinated call campaigns for retail, affiliated groups (school/job/church calls), etc. In examples, the SCM data structure can be grouped with a prearranged set of contacts so that it can be sent out to those specific phone numbers, such as when a call is configured to be sent to those specific phone numbers in a call queue and the like. In other examples, the SCM data structure can include and/or refer to an identity photo or video to facilitate a soft authentication or otherwise establish a level of reliability of establishing a connection with the caller (e.g., increasing a comfort level of the recipient in accepting the call). In examples, the SCM data structure can include or reference a registered logo. In examples, the SCM can be a live casting of a face of a user initiating the call. In examples, the SCM data structure may include an inside joke or shared memory.

Figure 43:
FIG. 43 illustrates exemplary screens of generating and playing back visual caller ID.

Referring to FIG. 43, interface screens for the creation, activation, and presentation of visual caller ID employing the methods and systems of visual caller ID described herein are presented. In embodiments, creation screen 4302 depicts a visual caller ID creation screen in which a user is shown an image currently being captured by the user's phone camera. The screen prompts the user to hold and record a caller ID Video. The video is captured and optionally associated with an SCM data structure to be used for a call to be placed by the user. In embodiments, the screen 4302 may be activated as a result of a user initiating a call to a recipient; however, the screen 4302 may be activated separately from initiating a call. The screen 4304 presents the user with an opportunity to review the captured visual caller ID, which is a video in this example, but could be an image, a graphic, or other content. The captured video may be saved so that it can be referenced by the user when generating visual caller ID for other users. The captured visual caller ID may be set at the default visual caller ID for calls placed by the user. This may be actuated by creating an SCM data structure for the user that can be presented to the user upon initiation of an outgoing call so that the user can choose to continue with the presented visual caller ID or create a new visual caller ID as enabled by the screen 4302. The screen 4306 depicts an incoming call screen of a recipient of a call from the user. In the screen 4306, the visual caller ID is presented/rendered/played back depending on the type of visual caller ID and recipient preferences. The screen 4306 also shows traditional caller ID 4308, indicating the possibility of an incoming call screen may be controlled by a traditional caller ID display function (for presenting caller ID 4308) and an SCM-based display function for presenting visual caller ID associated with the caller for at least this call instance.

In embodiments, a visual caller generation interface, an embodiment of which is depicted in the screen 4302 may present the user with options based at least in part on call context, such as if a call has been initiated to a recipient when the interface is activated. Options during such a condition may enable the user to opt out of sending the visual caller ID, adjusting an aspect of the visual caller ID, authorizing the SCM data structure platform to adjust aspects of the visual caller ID (e.g., based on an aspect of the recipient and the like). These and other options are described elsewhere herein.

In embodiments, SCM data structures may be created and accessed for calls to groups of callers. SCM data structures and the like may be associated with a recipient parameter that may be populated with values that indicate a particular SCM data structure that should be used when the recipient is called. In embodiments, a corresponding parameter of a recipient may indicate that the member is part of a call group, such as a member of a team, employee of a company and the like.

In embodiments, SCM data structure content may be utilized in combination with or may replace conventional caller ID. A sender-controller media (SCM) data structure may include content, such as a video or image and the like, that may be used in a global caller ID profile of the caller so that the video or image may be rendered on a recipient's phone's electronic display in lieu of conventional caller ID content. In embodiments, a global caller ID profile may be stored in the cloud or to other network facilities, to a central node in a network of smartphones, or call originating devices and the like. By way of these examples, the global caller ID profile may be stored in the cloud to the central node, which in some instances can be a cloud hub, for incoming and outgoing calls. The network of smartphones can provide the central node capabilities but the central node capabilities can also be offered by other cloud network systems and providers. In embodiments, existing caller ID functionality and communication channels may be adapted to facilitate access to SCM data structure content and the like. In embodiments, one example of adapting existing caller ID functionality to accommodate SCM data structure content access may include providing a URL or other link as the conventional caller ID value. In embodiments, the SCM data structure can be delivered in a peer-to-peer fashion directly by the call or message originator to the one or more receivers of such call or message. By adapting an incoming call functionality to recognize such a link, the linked content may be rendered as visual caller ID. In embodiments, incoming call functionality may be adapted to recognize such a link and transfer control of the phone's display screen (e.g., one or both for rendering and receiving user input) to an SCM data structure processing application that facilitates accessing the linked content and rendering it for the recipient. Accessing the linked content may include referencing an SCM data structure that has been transferred to the recipient device through the SCM data structure communication methods and systems described herein. In embodiments, initiation of a call from a caller to a recipient may include sending call-specific caller SCM data structure information to an SCM data structure handling application executing on the recipient's phone. Alternatively, initiation of a call may include sending call-specific caller SCM data structure information to an intermediate server, such as a web server that holds the call-specific caller SCM data structure waiting for an access request, such as from a recipient phone that has detected a link to the call-specific caller SCM data structure in the caller ID for the initiated call.

In embodiments, visual caller ID functionality may be provided by an exemplary system that may include an incoming call handling function executing on a personal mobile device that may present content from an SCM data structure that is referenced in caller ID data associated with the call. In such exemplary systems, the caller ID data may be provided to the incoming call handling function of the personal mobile device using existing caller ID techniques and the like. The exemplary system may further include an SCM selection interface presented to the originator of the incoming call on an electronic interface of a call originating device operated by the originator. The selection interface or other visual caller ID interfaces may facilitate selection of an SCM data structure by the originator of the incoming call contemporaneously with initiating the incoming call. In embodiments, the selection interface may be activated responsive to a user initiating a call. To facilitate linking the SCM data structure selected by the call originator with the caller ID information sent to the recipient, an SCM linking function executing on a networked server that receiving a selection of an originator SCM data structure selection from the SCM selection interface (or other visual caller ID interfaces) may form a digital link based on the indication, and may update the caller ID data for the incoming call with, for example, the digital link.

In embodiments, an alternate exemplary visual caller ID system may facilitate generating visual caller identification data. A visual caller ID selection interface may be responsive to a user of the call-originating device initiating a call and causing generation of options for content for a visual caller ID to be presented in the visual caller ID selection interface. In addition to the visual caller ID selection interface an SCM linking function executing, for example on the call-originating device, may, in response to receiving an indication of the visual caller ID from the SCM selection interface (or other visual caller ID interfaces) form a digital link to an SCM data-structure based on the indication. Lastly, a caller ID field of caller ID for the initiated call may be updated with the digital link so that the visual content referenced in the SCM data structure can be presented to the recipient on an incoming call user interface; thereby providing visual caller ID content and options for handling the call to the intended recipient.

In embodiments, visual caller ID functionality may be provided through a method that may include presenting at least one item of content in an SCM selection function of an electronic display of a caller's call-placing device or other mobile devices. Responsive to the caller selecting an item of content in the SCM selection function, which may include capturing an image or video with the phone's camera interface, the caller's device may initiate a call to a recipient. Also responsive to the caller selecting an item of content, a link may be generated to an SCM data structure through which the selected item of content is accessible. Next, the generated link may be used to update caller ID data for the call, so that the link is provided to the recipient's phone as a caller ID data value. Upon receipt of the updated caller ID data value, the content from the SCM data structure referenced via the caller ID data value may be rendered in the call recipients call-receiving device electronic user interface.

In embodiments, visual caller ID functionality may be provided through a method that may include responsive to receiving an indication of a request to initiate a call from a caller, presenting at least one of an image and a video in a visual caller ID selection user interface of an outgoing call function of a call-originating device. The visual caller ID selection user interface may facilitate generating an indication of a user selection of one of the images, the video, and no selection. An SCM data structure may next be configured to reference the selection. Caller ID data for the call may next be updated to include a link to the configured SCM data structure. At the recipient's call-receiving device (e.g., a phone) and responsive to receiving a receipt of the call, the content in the configured SCM data structure may be presented on a display screen of the call-receiving device by following the link in the caller identification information.

In embodiments, the methods and systems of visual caller ID functionality described herein may be enhanced in a variety of ways, examples of which are not described. In embodiments, the visual caller ID interface of the call-originating device may facilitate capturing content to be used as the visual caller ID content with a camera function of the call-originating device. The captured content may be any of a still image and a video. The captured content may further be presented as at least one of the selectable items of visual content in the visual caller ID interface. In embodiments, a caller ID field of an initiated call may comprise a link to an SCM data structure. Such as SCM data structure may indicate an image for presentation on an electronic display of a call receiving device upon receipt of the call. As noted, an item of content to be selected for use in the visual caller ID may be an image captured by a camera function of the call-initiating device during the activation of the visual caller ID selection interface. In embodiments, the SCM data structure may indicate a video for presentation on an electronic display of a call receiving device upon receipt of the call. Also, the SCM data structure may indicate a multimedia object for presentation on an electronic display of a call receiving device upon receipt of the call. The visual caller ID comprises a profile of the caller. The visual caller ID comprises promotional content. In embodiments, a linked SCM data structure may include an image and/or a video captured contemporaneously with the initiating of the call. Also, in embodiments, the visual caller ID selection interface may further present call originating phone numbers and based on a user selection of one thereof, updating the visual caller ID SCM data structure link. Such a function may be useful for a user who operates a plurality of disjoint businesses to facilitate the user selecting a business by selecting the phone number specific to the business.

In embodiments, visual caller ID methods and systems may be influenced by aspects of a recipient of a call or contact instance, such as a context of the recipient, a name of the recipient, a group affiliation of the recipient, a characteristic that distinguishes the recipient from other recipients in a group of recipients, and the like. In embodiments, a recipient-influenced visual caller ID media content object may be an optional combination of images, text, audio, and video that a user, such as a participant of an SCM platform as described herein chooses to, for example, form a template that can be adapted based on recipient context and rendered when the recipient (e.g., another participant in an SCM platform environment) is being called by the user. Elements of such a template may include a field for the recipient's name, a field for the recipient's group, a field for a group to which the user has assigned the recipient, a portion for a visual item of content (e.g., where an image of the recipient's face might be disposed), and the like.

In embodiments, configuring and/or using recipient-influenced visual caller ID may include a computing system, such as a server, a mobile phone of a caller and the like receiving an indication of an initiation of a call from a sender to a recipient. In embodiments, the initiation may be caused by a user of a call-originating device selecting a contact in a call originating interface. Additional steps for configuring recipient-influenced visual caller ID may include determining an SCM data structure for use in configuring visual caller ID for the call based on a selection of a visual content item by an originator of the call. In embodiments, the selected item of content may be cross-referenced to a library of SCM data structures. An SCM data structure that is found to include and/or reference the selected item of content may be selected for use with the call. Alternatively, an SCM data structure generating function may gather information about the caller, optionally include information about the call (e.g., time of day, location of the caller and the like), and the selected item of content to produce an SCM data structure for use with the call. To influence the visual caller ID for the call with recipient related aspects, an SCM platform participant database may be referenced, such as with an identifier of the recipient of the call. Such an identifier may be a phone number of the recipient. Alternatively, the caller may access the SCM platform participant database and select a recipient therein, effectively explicitly identifying the recipient entry in the SCM platform participant database. With the SCM data structure for the call and the SCM platform participant information for the recipient, an adapted SCM data structure may be generated by adapting a portion of the SCM data structure based on an item of information referenced in the SCM participant database with the recipient identifier. To complete use of the recipient-influences visual caller ID for the call, the caller ID for the call may be configured with a link to the adapted SCM data structure.

In embodiments, selection of a visual content item may occur in a visual caller ID selection interface executing on the call-originating device. Such a visual caller ID selection interface may cause options for content for a visual caller ID to be presented in the visual caller ID selection interface so that the caller can complete selection of the item of content for the call. In embodiments, the options for content presented in the visual caller ID selection interface may include an image being provided by a camera of the call-originating device. To facilitate generating an image provided by a camera of the call-originating device, the visual caller ID selection interface accesses the camera and presents content imaged by the camera as one of the options for content.

In embodiments, adapting a portion of the SCM data structure to influence visual caller ID for a recipient may include adapting a recipient name element of the data structure to correspond to a name of the recipient. Adapting a portion of the SCM data structure may include adapting a recipient group affiliation element of the data structure to correspond to a group affiliation of the recipient. Adapting a portion of the SCM data structure may be based on a recipient name. Adapting a portion of the SCM data structure may alternatively be based on a group affiliation of the recipient. A call may be made to a plurality of recipients, some of whom may be part of a group. For recipients in the plurality who are not part of the group, a different visual caller ID may be preferred. Therefore, the portion of the SCM data structure may be adapted based on a correspondence of the name of a recipient to a list of exception names.

In embodiments, calls from business owners to clients, cold prospects, warm prospects, referred prospects and the like may benefit from the use of visual caller ID by tailoring portions of the visual caller ID based on the client-status of each recipient. As an example, an item of information for the recipient referenced in the SCM participant database may indicate a client-status. Based on that indication, a client message portion of the SCM data structure may be adapted. Exemplary client-status and resulting client message portion adaptations may include the recipient is an existing client so the message to this recipient would refer to an existing relationship between the caller and the recipient; the recipient may be a referral from an existing client, so the message to the recipient may reflect this referral, the recipient may be a prospect without referral so the message to this recipient may be a non-referral prospect message.

In embodiments, visual caller ID content may be adapted based on call context, such as a time of a call, a date of a call, a proximity to a holiday or other event, a proximity in time to an upcoming meeting between the caller and the recipient, a location of the caller, a location of the recipient, an intent of the call, and the like. Adapting a caller ID content, such as visual caller ID content dynamically (e.g., at time of the call) may be based on call-specific context (e.g., other than recipient context, and the like). In embodiments, a specific caller ID content may be automatically selected based on the call-specific context. Adjusting a portion of the content, such as an image, an object in an image, and the like may be based on call-specific contexts, such as time of day, time remaining before an offer ends (e.g., sales promotion), and the like.

In embodiments, methods and systems for call context-based visual caller ID content may involve performing actions related to the visual caller ID (e.g., selecting, generating, adapting, and the like) upon receiving an indication of an initiation of a call from a sender to a recipient. Alternatively, the performing the actions may be associated with configuring a call queue of recipients, such as for automated calling and the like. For time-based call context an amount of time left in an offer related to the call, such as an offer from the sender to the recipient, an offer from a third-party to the sender and/or the recipient, timing of offers available to but not specifically for the sender, recipient or both, and the like. Other related time-based aspects of a call context may be time until an upcoming event or elapsed time since a prior event, such as a public event, a private event, an event detected on a calendar of at least one of the sender and the recipient. Yet other call time-based aspects that may impact visual caller ID may include a day, date, time-of-day and the like of the call. Based at least in part on the time-related context of the call, methods and systems for call context-based visual caller ID content may involve generating an SCM data structure that may impact the visual caller ID for the call.

In embodiments, an SCM data structure may be generated from the profile and related information for one of the call participants, such as the sender and the recipient and the like. The SCM data structure may also be configured from call context information, such as a location of the sender, and/or the recipient, a time/day/date of the call, an intended duration of the call, a product or service associated with the call, a message of the call, and the like. In an example of adapting visual caller ID based on time of day, an image may be adapted to reflect a current time of day by adjusting the overall tone of the image to correspond to an amount of daylight. For daytime calls, the tone may be lightened, for evening or night calls, the tone may be softened. Generating an SCM data structure may occur contemporaneously with initiation of the call by the caller, such as by the caller using the camera function of the call-originating device to capture an image and/or video of the caller that can be used at least in part in the SCM data structure, such as a display content portion of the SCM data structure. The SCM data structure may also be generated by adapting a portion of an existing SCM data structure based on the amount of time left. To effect use of the SCM data structure content and the like as visual caller ID content, a caller ID data element for the call may be configured with a link to the generated SCM data structure. Use of the SCM data structure by a recipient call receiving device (e.g., a smartphone and the like) may be accomplished by an application executing on the recipient device accessing the SCM data structure through the received caller ID information such that the SCM data structure indicates an image, graphic, video, rendering, handwritten note, and the like for presentation on an electronic display of a call receiving device upon receipt of the call. The SCM data structure may include a multi-media object (e.g., an animated cartoon with caller voice over and the like) to be presented on the recipient's call-receiving device upon receipt of the call. In embodiments, the image may be an image captured by a camera function of a call-initiating device that was captured contemporaneously with the initiation of the call. A call time-adapted SCM data structure may include a profile of the sender (e.g., call originator, party that the sender represents, and the like), promotional content (e.g., that the caller, optionally acting as a representative, offers to the recipient), and the like.

The examples above of visual caller ID content generation, delivery and use may include functionality such as sending an SCM data structure and/or a link thereto with and/or in place of traditional caller ID information. This disclosure includes descriptions of a range of forms of SCM data structure content; any such form may be included in these methods and systems of visual caller ID. In embodiments, the methods and systems of visual caller ID may utilize some existing channels, such as a caller ID channel that conventionally is controlled by a third party, such as a telephone call service provider, and the like; however, the visual caller ID may be controlled through these methods and systems by the caller/sender rather than a third-party. This capability supports a caller communicating information such as a profile, advertisement, retailer content, and the like as a form of caller ID. As described herein, an SCM data structure used for providing visual caller ID to a recipient for a call may be linked to an existing caller ID for a caller, such that the caller ID may be used as, for example, a link into an SCM data structure database through which a corresponding SCM data structure and/or visual caller ID content may be accessed for presentation to a recipient of an incoming call. Caller ID-based access to visual caller ID SCM data structure content may support a caller selecting an originating phone number for a call that may be different than the native phone number associated with a call-originating device of the caller. In this way, for example, a caller may initiate automated calling to one or more recipients with visual caller ID content dedicated to different call-originating numbers. As an example, a broker of insurance services may select an originating phone number for a first insurance provider for a call from the broker to clients of the first insurance provider and select for a second call an originating phone number of a second insurance provider for a call to, for example, prospects of the second insurance provider. Also, as described in the examples above, visual caller ID content may be impacted by and/or combined with recipient-related information. One such example of visual caller ID impacted by recipient-related information occurs when a recipient is part of a group (e.g., member of a church, job, school, business, professional group, and the like). A group-affiliation of the recipient may be used to adapt and/or otherwise impact the generation of an SCM data structure for the call, such as changing a logo or the like presented as visual caller ID to reflect the group affiliation, and the like. For retail examples, visual caller ID may automatically be adapted based on a relationship between a caller and a recipient. A message related to the caller may be changed based on, for example, a recipient being an existing client of the caller, the recipient being a referral to the caller, the call going to a new prospect (e.g., a cold-call) and the like. In embodiments, the caller may be associated with a profile and an SCM data structure used for providing visual caller ID to a recipient for the call. By way of these examples, the caller may be associated with the profile that may be from a single phone or call originating device but that phone is associated with at least two (or multiple) subscriber identification modules, SIM cards, or other electronic devices onboard or insertable that can control the identification of the phone. In these examples, the caller may be associated with the profile that is specifically associated with multiple subscriber identification modules or the like so even though the caller may appear to have multiple phones or call originating devices, the caller with their multiple subscriber identification modules or the like can appear to be from a single source when associated with the one or more specific SCM data structures used for providing visual caller ID.

In embodiments, methods and systems of visual caller ID, such as SCM data structure-based methods and systems may support a user setting up content, such as video, audio, text, image, multi-media and the like as part of a temporary visual caller ID that expires, such as after a certain amount of time, related to an event, and the like. In embodiments, this allows users to have a visual caller ID that expresses a feeling or mood for a certain amount of time before it reverts to what previously was set as their profile visual caller ID. This temporary visual caller ID can be accessible to specific contacts, groups, or all recipients.

In embodiments, methods and systems of temporary visual caller ID content generation and use may include configuring, such as with a visual caller ID interface executing on a call-originating device, temporary content for visual caller ID for calls initiated by a user of the call-originating device. An SCM data structure with the temporary content may be generated from an existing SCM data structure by copying the existing SCM data structure and including a temporary item of visual content in place of existing visual content. An existing SCM data structure may be configured with control data fields that may facilitate marking a time/duration of a link to temporary visual caller ID content while retaining a link to the content that will be accessed and uses for visual caller ID once the temporary content expires. A function executing on, for example, the caller's call-originating phone or a server through which calls from the caller are routed, may upon receiving an indication of an initiation of a call by the caller, access the (temporary) SCM data structure for the caller and present the temporary item of visual content or an existing item of visual content as visual caller id to a recipient of the call. The function may determine which visual caller ID content to present based on a relationship between a current time, such as a time of the call and a time-limited use parameter of the temporary item of visual content. In embodiments, configuring visual caller ID comprises configuring an SCM data structure with at least one of a link to the temporary item of visual content and the temporary item of visual content. In an example, the relationship between a current time and a time-limited use parameter of the temporary item of visual content may include a time remaining for use of the temporary item of visual content. The relationship may be a use status of the temporary item of visual content. In examples, the time-limited use parameter of the temporary item of visual content may include an expiration date for use of the temporary item of visual content; the parameter may include a use start date and a use end date for use of the temporary item of visual content. Other forms of time-limited use parameter may include a calendar date, a pre-date duration of use prior to the calendar date and a post-date duration of use of the temporary item of visual content after the calendar date, a link to an entry in a digital calendar of the user of the call-originating device and the like. For embodiments in which SCM data structure content may be distributed among various servers and edge devices, such as to facilitate faster access to the content for incoming calls, the methods and systems of temporary visual caller ID content use may include updating the caller ID function system wide, such as with expiration criteria.

In examples, time of temporary items of content for visual caller ID use may be limited so that the content may be good until a duration of time from a first-use time, may be good until an event and the like. An event may be a specific time in the future, such as a scheduled meeting and the like. An event may also be based on an asynchronous trigger, such as when a user clocks out of work for the day. An event may also be described conditionally, such as based on a candidate getting elected to an office. Conditional events may be used for activating temporary content as well, such as changing the title of the caller based on a result of an election and the like. In further examples, conditional events may include locations of the caller, changes to the location of the caller, one or more reoccurrences of the caller being in certain locations, or the like. In embodiments, conditional events may include a relationship status of the caller, changes to the relationship status of the caller, time between changes of relationship statuses of the caller, changes in relationship statuses on the receiving and sending end of the call, or the like. In embodiments, conditional events may include a birthday of the caller, proximity of the caller's birthday to certain age ranges or a minimum age, a birthday used in age verification, proximity to other users with similar or identical birthdays, or the like. In embodiments, conditional events may include a holiday relevant to the caller or any caller, proximity of the caller's birthday to certain holidays, a holiday relevant to the caller's identified religious, social, or familial affiliations, proximity to other users with similar interest in a holiday relevant to the caller, or the like.

In embodiments, such as a multi-call/call group-based program, visual caller ID may be adapted for select recipients. Caller ID and related content may be configured, selected, and/or adapted, such as by editing an SCM and the like with one of several options when contacting a group to effectively configure an SCM for individual recipients in the group based on, for example, a recipient relationship to the group. In an exemplary automated calling program, caller ID content, such as visual caller ID content and the like may be adapted for select recipients. Caller ID may be adapted based on, for example, a context of a recipient's membership in the call-group, if the recipient is an SCM platform user, and the like.

In embodiments, methods and systems for recipient-specific caller ID (e.g., SCM data structure) adaptation may include, among other things, detecting initiation of a first call from a first caller to a first recipient of a recipient call group. Using at least existing caller ID delivery mechanisms, the call may cause visual caller ID content configured based on characteristics of the recipient call group to be accessible by a call receiving device of the first recipient contemporaneously with receipt of the first call by the call receiving the device. In this way, visual caller ID content that is specific to a call group, such as content described in a sender-controlled media data structure associated with the group, the caller, or the combination thereof, may be provided to at least one of the recipients in the call group. As calls to the recipients in the group progress, information about the caller, the recipient and the group may be processed for the purposes of generating recipient-specific caller ID information. In response to detecting initiation of a second call from the first caller to a second recipient of the recipient call group and based on a comparison of a characteristic of the recipient group and a corresponding characteristic of the second recipient, visual caller ID content that may be different than the group visual caller ID content may be used for the call to the second recipient. Such action may be accomplished by indicating a first SCM data structure for the group and a second SCM data structure for recipients for whom, while members of the group, the group SCM data structure is not suitable. An example may include a group that includes adults and children. Some messages that may be suitable for adults may not be suitable for children in the group. Rather than sending a child-suitable message to all members of the group, the recipient-differentiated caller ID content methods and systems enable sending recipient differentiated caller ID content to a group of recipients.

In embodiments, the visual caller ID content may be made accessible to a call receiving device of the recipient as a link (e.g., a URL to a network-based location) to an SCM data-structure that comprises at least one of the visual caller ID content and a link thereto. For such embodiments, multiple SCM data structures may be configured at the network-based location so that the only piece of differentiating information delivered to the recipient's phone in the call is a link to the recipient-specific SCM data structure. Processing of the SCM data structure can be the same for all recipients, with the content in the recipient-specific SCM data structure being rendered for the recipient. Therefore, a link to an SCM data-structure may be provided to the call receiving device as caller ID information. To facilitate presenting the visual caller ID content for the recipient timed so that the recipient can view the caller ID content as the call connection is being requested, the visual caller ID content is made accessible to the call receiving device as a link in an SCM data-structure that is provided to the call receiving device contemporaneously with receipt of the call. As described herein, a characteristic that may distinguish a recipient from other recipients in a group may be a group affiliation identifier. To facilitate differentiating members of a group, a corresponding characteristic of the second recipient may be a status of group affiliation of the recipient with the recipient group, such as is the member a long-term member, a temporary member, a trial member, a new member, a junior member, a fee-free member, a paying member, and the like.

In embodiments, configuring visual caller ID content for the second recipient may include adjusting at least one element of the visual caller ID content that is based on the characteristics of the recipient group and further based on a result of the comparison. As an example, the element of visual caller ID content that may be adjusted may be a logo for the general group caller ID content, whereas a message in the visual caller ID content may be adjusted (optionally along with the logo) for recipients who are exceptions to receiving the group visual caller ID content. As another example, the corresponding characteristic may distinguish the second recipient from at least one other recipient in the call group. Other examples include the characteristic of the recipient group indicating business contacts and the recipient-specific distinction indicates whether the recipient is an internal or external business contact, so that a confidential message for internal contacts is not delivered as visual caller ID content to an external business contact.

In addition to recipient-to-recipient differences, the corresponding characteristic for differentiation of the second recipient may be a status of the second recipient with respect to an object of the second call; such as if the call is to recruit members to a group, prior members of the group may receive a different message than recipients who were not prior members of the group.

Generating group-specific visual caller ID content for recipients for whom the group caller ID content is suitable, may include configuring visual caller ID content based on characteristics of the recipient call group by selecting a first caller visual caller ID content and adapting the first caller visual caller ID content to reflect the characteristics of the recipient group. This is exemplified by, in embodiments, an image of a recent group meeting that may be changed for calls made to members of the group who were in that group meeting. Continuing further, configuring visual caller ID content for the second call may further be based on an identifier of a user actuating the initiation of the first call, an objective of the call, a time of the call, and/or an aspect of a call-receiving device of the recipient. In embodiments, configuring the visual caller ID content may be based on a characteristic of the call receiving device. Such a characteristic may be selected from the list of call receiving device characteristics including, without limitation, device storage capacity, device screen size, device operating mode, and availability of a sender-controlled media (SCM) application on the call receiving device.

In embodiments, in addition to conventional caller ID delivery channels, visual caller ID content may be made accessible to the call-receiving device by transporting at least one of the visual caller ID content and a link thereto over a short-message-service connection to the call-receiving device. Similarly, the visual caller ID content or a link thereto may be transported over an iMessage channel linking the first caller with the call-receiving device.

In embodiments, an SCM data structure may be adapted for recipient-specific exceptions at the recipient call-receiving device. An SCM data structure processing application may process the SCM data structure identified in the caller ID data, for example, and adapt it with recipient-specific content, such as from a profile of the recipient based on, for example certain fields in the SCM data structure being marked as optional and/or as conditional based on the recipient's relationship to a group, and the like.

In embodiments, a group SCM data structure, including visual caller ID items of content and the like may be created automatically on a computing device, such as a server that has access to group-specific information, such as a member list of members of the group, conditions for determining when a member on the member list should not receive the group visual caller ID content, and the like. A group SCM data structure may be configured, selected, adapted, and the like at a server, at a sender's call-originating device, at a recipient's call-receiving device and the like.

Other factors that may impact visual caller ID content may be related to a network over which the call is being placed, such as network speed, location of an SCM data structure relative to the recipient, user device characteristics, such as storage capacity, screen size, mode of operation, parental controls present on the device, and the like.

In embodiments, a call-originating interceptor function may allow overriding pre-arranged single profiles or contact groups established for group contact (e.g., group emails, group texts, etc.) and the like. Such an interceptor function may facilitate avoiding a classic problem of an unintended "reply all" situation. When originating the group contacts (or even a single contact) to which an existing SCM data structure is assigned or when a pre-arranged SCM data structure exists, the initiator may be directed to a specific screen that interrupts sending the prearranged SCM. The screen may be configured to require confirmation whether that SCM should be used for this call to a recipient or to all recipients in the case of multiple recipients (e.g., group texts and the like). In examples, the user may be presented with a skip button that may, for example, remove the recipient from the group contact, cancel the message when to a single user, curate the list to whom the message is to be sent, and the like. In further examples, a contact originator may be reminded of (i) the specific SCM to be used for this contact/sent to this group, (ii) the size of the group, and (iii) the option to skip the recipient, the use of caller ID, the use of the specific SCM and the like.

In embodiments, generating visual content on the fly, such as visual caller ID content for calls placed from a smartphone, computer and the like and SCM data structure content for presenting to a recipient of a digital contact, such as a message, text, video call, and the like may facilitate contact-time differentiating of contact-initiating content for one or more recipients, such as when contacting a group of recipients some of which the caller may prefer to exclude from receiving a generalized group-directed contact initiating content, such as a group text message and the like. In embodiments, generating visual contact content on the fly may be facilitated by an initiated contact interrupt function that presents to the contact originator (e.g., a contact sender, caller and the like) options for one or more recipients prior to the one or more recipients being notified of the pending contact/call. In a call-based example, such a contact interrupt process may be activated for operation on a caller's call-originating device in response to detecting initiation of a call that causes visual caller ID content to be accessible to a visual caller ID rendering function executing on a call receiving device. The interrupt process may include pausing delivery of the call until a call delivery signal is detected, such as a signal from the caller to proceed with the call using visual caller ID content selected for the call. The interrupt process may, while pausing delivery of the call, present a visual caller ID configuration user interface to the caller. The visual caller ID configuration user interface may be configured to enable selection of visual caller ID content for the call from, for example, a plurality of visual caller ID content options. By way of these examples, the visual caller ID content options may include: existing content, at least one alternate content, and generation of content via a camera and/or microphone function of the call originating device. In embodiments, the visual caller ID content options may be emojis. In embodiments, the visual caller ID content options may be gifs including gifs with embedded motion. In embodiments, the visual caller ID content options may be jpegs or other image content. In embodiments, the visual caller ID content options may be stickers, labels, and the like. By interrupting a call before it reaches the recipient, (optionally before it is initiated by the call-originating device), the caller may be able to influence the visual caller ID for the call by selecting content (or exclude content). The selection may result in a call delivery signal being generated and the selected item of content being communicated to the recipient. In embodiments, the selected item of content can be an emoji. In embodiments, the selected item of content can be a gif. In embodiments, the selected item of content can be stickers or labels. The selected item of content may be null. The selected item of content may be one of an emoji, a gif, and a sticker. The interrupt function may activate a visual caller ID configuration user interface that may use audio/video recording capabilities of the caller's device to configure the visual caller ID content. The visual caller ID configuration user interface may include an option for designating the selected visual caller ID to be used for calls made to the recipient. The interface may also present an indication of visual caller ID content in an SCM data structure as the existing content. The existing content may include content that is recipient-specific. The existing content may be adapted on the fly for the recipient via the interrupt function and optionally via the visual caller ID configuration user interface. In embodiments, existing visual caller ID content may be designated for calls made by the caller to members of a group of which the recipient is a member. In an example, the call may include multiple recipients with the existing content being designated for a caller-group comprising the multiple recipients. Other examples include single recipient calls. The interrupt function facilitates causing the user selected content option during pausing of the call to be used as visual caller ID content for a subset of the recipients. Recipients for this subset of recipients may be selected by the caller during, for example pausing of the call.

In embodiments, pausing the delivery of the call may be based on a characteristic of the recipient, such as a relationship between the recipient and a group of recipients to whom the call is directed. In embodiments, an interrupt function may include detecting initiation of the call on the caller's device; the interrupt function further causes the pausing of delivery.

Figure 44:
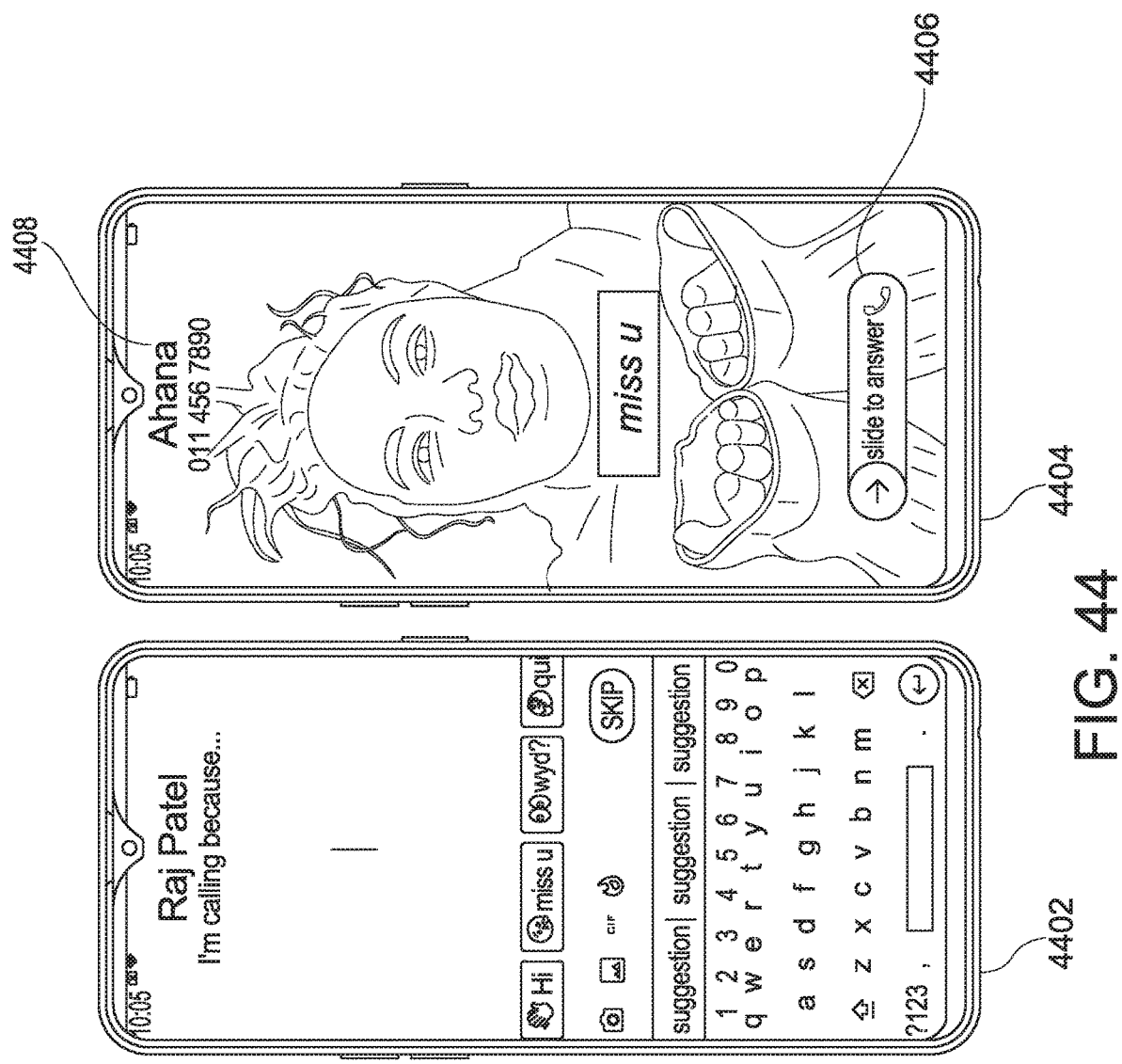
FIG. 44 illustrates exemplary screens for leaving a video voice mail.

Referring to FIG. 44, an interrupter screen is depicted for supporting the methods and systems of on-the-fly visual caller ID content adaptation, generation, and control for outgoing calls, which may include calls to a group of callers some of whom an existing visual caller ID is not suitable. While the embodiment of FIG. 44 depicts a user calling a recipient, the methods and systems of interrupting outgoing SCM data structure content delivery may apply to any type of electronic contact, including without exception emails, text messages, videocasts, video calls, and the like. The screen 4402 depicts one option for interrupting delivery of an SCM data structure to a recipient. In this option, a user has initiated a call to a recipient. This creation screen 4402 may result from (i) no SCM data structure for the caller available, (ii) the user has indicated in a prior screen of the interrupter methods and systems to generate a new, and optionally temporary visual caller ID, (iii) the user indicated or accepted a recommendation from the SCM data structure platform to not use an existing visual caller ID for this call to this recipient. The screen 4402 provides the user with several options for generating visual caller ID, such as typing a message, selecting an emoji, recording a video, and the like. The screen 4404 depicts an incoming call screen of the recipient in which visual caller ID generated and/or selected in the screen 4402 is presented to the recipient along with an option to accept the call 4406 as well as conventional caller ID 4408.

In embodiments, visual caller ID methods and systems may include generating in real time and using, as visual caller ID SCM data structure visual content that is contextual to audio/text recorded on-the-fly (e.g., during initiation of a call), such as by determining an intent of the recorded audio/text and selecting visual content based on that understanding. As an example of call content-based visual caller ID, a method may include detecting initiation of a call from a caller to a recipient and pausing delivery of the call until a call delivery signal is detected. While pausing delivery of the call, the method may include producing the visual caller ID content by a sequence of steps including: (i) capturing live content comprising at least one of audio and text input to a call-originating device by the caller; (ii) processing the captured live content to determine an intent of the live content; (iii) automatically selecting a visual element based on the intent, combining the selected visual element with the live content thereby producing the visual caller ID content; and (iv) and generating the call delivery signal for delivery of the call. Processing the captured live content may include audio to text conversion of the captured live content. The processing may further include natural language processing (NLP) of a least one of the captured text and the text converted from the captured audio to determine at least one of an intent of the call, a subject of the call and an action of the call. In embodiments, automatically selecting content may be performed by a visual content selection algorithm that performs, among other techniques, the best fit of a visual content item to the determined intent, action, or subject. The intent in such content may be based on a recipient of the call, a relationship of the recipient to a group of recipients associated with the call, such as a group of call recipients, and the like. As part of the methods and systems for generating context based on call content, pausing the call may be based on a range of aspects related to the call, such as a characteristic of the recipient, which may be a relationship between the recipient and a group of recipients to whom the call is directed.

In embodiments, a storytelling feature of the methods and systems described herein may allow users of an SCM platform who are having a conversation to receive suggestions of SCM to deliver in tandem with the conversation being exchanged by the users. Various methods and systems for understanding content, such as machine learning, natural language processing and the like may be applied to sense characteristics of the exchange that can be used as storytelling information for suggesting SCM content, such as in a paneled storyboard fashion for being added to the conversation and the like.

In embodiments, a message, such as a text message that may be part of a text exchange between users may be intercepted as it is being sent from a first user in the exchange to a second user in the exchange. Intercepting facilitates developing an understanding of the message with natural language processing, the understanding further used to facilitate making suggestions for video/image/audio of an SCCMC to be associated with the message.

Suggesting video/images/audio and the like based on an understanding of a message exchange may facilitate storytelling. Other sources of suggestions and evaluations of suggested content may include social media. In embodiments, social media-based perception of the combination of text and the particular image may support the suggestion (e.g., social media users may indicate a preference for the combination, such as by liking the message or taking another action, such as reposting the message), or may indicate the suggested image may not be a suitable image for the text (e.g., social media users may indicate a dislike for the combined image/text, such as by disliking the message or exhibiting a lack of action such as not reposting the message).

Visual content suggestions, such as videos and images as well as audio content and the like may be a result of natural language processing of an exchange among users. In an example, NLP may be used to analyze a message text content to generate a context or understanding of the message. In embodiments, such an understanding may suggest that a sender is inviting a recipient to a sporting event. The understanding may be coded into keywords, such as team, invitation, and the like that may be useful for indexing into a gallery of photographs of the sender and/or recipient. Images that are indicated by the keywords to be similar to the NLP understanding of the message may be suggested for use with the message. As an example, an image of the team mentioned, along with a schedule showing the date of the event and the competitor being played may be suggested for the purposes of enhancing storytelling.

In embodiments, the context of one or more participants in an electronic exchange between users of an SCM data structure platform may be useful on enhancing storytelling, such as by suggesting images and the like to include in the exchange. One such context is the current mood of one or more of the participants in the exchange. As described herein, sender/recipient state detection functionality may facilitate detecting a mood of a participant in an electronic exchange. Methods and systems described herein may include a method that may include adapting an SCM data structure in response to receiving an indication of a current state of a sender or a recipient in a digital exchange. The SCM data structure may be useful in facilitating storytelling by being adapted as described herein with images and the like suitable for convening, for example, the mood of the sender and/or recipient. Techniques such as facial recognition of the sender or recipient as well as processing the content of the exchange to develop an understanding may adjust content matching parameters so that rather than selecting an image of the sender and recipient smiling, selecting one where the participant without the happy mood is not smiling.

In embodiments, a platform of users, such as participants in an SCM platform may generate information about callers, such as unknown callers, that may be useful for other users of the platform when deciding how to respond to requests for connecting to an unknown caller. Information gathered about calls from the caller to other recipients may be stored in a caller identification and evaluation database that may be made available for update and use by participants in a platform or group, such as a group of uses of the SCM platform. This database may be indexed by, for example, caller ID information provided by a call connection network about the callers. The database may include public number search information, further search information derived from the results of a public number search, such as criminal records, other phone numbers, names, addresses and the like of potential callers and the like. Public number search results may be communicated to participants of the platform and the like for validation and/or determining relevance to an evaluation of the caller. Additional information, which may be gathered from platform participants may include call tracking information for prior calls from the caller. Platform participants may generate caller evaluation data, such as in response to requests for evaluation of unknown callers and the like. Caller evaluation data may include thumbs up/thumbs down regarding a usefulness, applicability, spammer status, and the like. In embodiments, enhancing information about unknown callers may include generating a profile, such as an SCM data structure, for unknown callers based on information gathered about the caller from internal and external data sources. Such a profile may be generated in response to receiving an indication that a caller who is not a participant of an SCM platform is calling a participant of the platform. This automatically generated profile may be embodied as a portion of an SCM data structure associated with the caller ID of the unknown caller. Upon subsequent calls from the unknown caller, the SCM data structure for the caller may be processed by the recipient SCM data structure processing software (e.g., an app on the recipient's phone) for the purpose of presenting visual caller ID content of the caller to a recipient; thereby providing the recipient context regarding the unknown caller that would not otherwise be readily available at the time that a call from the unknown caller is incoming.

In embodiments, when a user of an SCM data structure handling platform is receiving a phone call (text message, email and the like) from someone who is not a user of the platform, the platform can provide much information that is available and aggregate it into information delivered as an SCM data structure for the caller to the recipient. The information in the automatically generated caller-specific SCM data structure can be used to better identify the unknown caller and can include content readily available on the Internet including social media, any information available from point of sale systems associated with the platform, any information available from other caller/user interactions on the platform and the like. In examples, specific interactions with others on the platform can supplement information to identify, or at least better identify the unknown caller. In examples, this functionality enables platform users to avoid spam calls. For example, a phone call from a restaurant to a user of the platform could have caller ID for the restaurant be adapted through Internet searches of the restaurant to include a photo or video from the restaurant's website or social media presence serve as their visual caller ID. In examples, an incoming call from a ride-sharing service can cause visual caller ID content to be adapted based on an active request for the ride-sharing service that is associated with the recipient's phone number to show information from the request, such as a live map and picture of the driver with the vehicle as part of an SCM data structure referenced through the caller ID data, and the like.

In embodiments, an unknown caller information improvement method may be activated by receiving an indication that a caller who is not a participant in a sender-controlled media (SCM) platform has initiated a call to a recipient who is a participant of a sender-controlled media (SCM) platform. The information improvement method may include using caller ID information provided with the call to gather content pertaining to the caller from a plurality of sources including information available in data stores of the platform, public number search information and the like. The gathered information may be used to generate a sender-controlled media (SCM) data structure for the caller. This automatically generated SCM data structure may be delivered to a call receiving device of the recipient whereat visual content of the SCM data structure may be presented to the recipient, such as through a visual caller ID interface on the call-receiving device. By encouraging platform participants to provide their opinion and/or observations about each caller to a participant of the platform, information available in data stores of the platform may include information collected regarding calls from the caller placed to other participants of the SCM platform. This information may be used, optionally along with unverified information provided by platforms members and others about the caller to inform an SCM data structure generation process for the caller.

In an example, the information available in data stores of the platform comprises ratings of the caller made by participants of the SCM platform. Once an SCM data structure for the unknown caller is created, it may be associated with the caller so that future calls from the caller may facilitate accessing the generated SCM data structure. In embodiments, rather than sending the existing caller ID information to a recipient device, the generated SCM data structure may be provided to the call-receiving device using, for example, one or more of the visual caller ID delivery methods described herein. This may be accomplished by replacing an existing caller ID information, if any, with a link to the generated SCM data structure. As a way for enabling the recipient of a call from an unknown caller to take advantage of the information gathered and evaluations made by other platform participants, a generated SCM data structure for the caller may be provided to an SCM platform application executing on the call receiving device contemporaneously with the incoming call.

In embodiments, handling unknown callers with an SCM data structure platform may facilitate taking an action toward the caller, such as suggesting that the caller join the platform, such as by providing an audio message while attempting to complete the call, or by sending a text message to the caller contemporaneously with the call (e.g., while attempting to complete the call, while waiting for the recipient to make a decision regarding accepting the call, while the accepted call is in progress, at completion of the accepted call, at another time).

In embodiments, methods and systems for handling unknown or not-well-known callers may include generating SCM data structure content, such as an audio message that is presented to the unknown caller contemporaneously with a call being placed by the caller to a recipient. The content may be relayed to the caller's call-originating device at various times related to the call, such as prior to the call being presented to the recipient in an incoming call handling user interface of the recipient's call-receiving device (e.g., the recipient's smartphone), while the call is presented to the recipient for accepting or rejecting the call, during the call (e.g., after the recipient has indicated acceptance of the call), as a result of the recipient rejecting the call, at a time designated by the recipient during or immediately after the call ends (e.g., by the recipient indicating in an unknown caller handling interface screen to send one of a plurality of types of messages to the caller), upon conclusion of the call, and at another time, such as when the next time a call from the caller is processed by the platform.

In embodiments, a method for handling unknown or not-well-known callers may be initiated by receiving an indication that a caller who is not a participant in a sender-controlled media (SCM) platform has initiated a call to a recipient who is a participant of a sender-controlled media (SCM) platform. The call may include caller ID information that may be used to facilitate gathering content pertaining to the caller from a plurality of sources including information available in data stores of the platform and public number search information. This gathered information may be used as a basis for automatically generating a sender-controlled media (SCM) data structure for the caller, which may include visual and/or audio content, a portion of which may be delivered to a call originating device of the caller. The portion delivered to the call originating device may be delivered as a ring-back tone, as an SMS message, as an MMS message, and an iMessage, as a traditional voicemail, as visual voicemail, and the like. In embodiments, the content delivered to the caller's call originating device may include an offer and/or instructions to join the SCM data structure platform, such as to facilitate easier access to platform participants, and the like.

In embodiments, methods and systems for handling calls to platform recipients by unknown or not-well-known callers may include generating caller ID-specific SCM data structure content to be used as visual caller ID for the recipient and caller-directed content that may be structured as part of the caller ID-specific SCM data structure or a caller ID-directed SCM data structure so that the caller-directed content is delivered to the caller, such as to the caller's call-originating device. An exemplary method may be initiated by receiving an indication that a caller who is not a participant in a sender-controlled media (SCM) platform has initiated a call to a recipient who is a participant of a sender-controlled media (SCM) platform. Any caller ID information associated with the call may be used to facilitate gathering content pertaining to the caller from a plurality of sources including information available in data stores of the platform and public number search information. A first SCM data structure may be automatically generated for sending to the recipient based on the gathered content. A second SCM data structure may be automatically generated for sending the caller based on the gathered content and both the first and second SCM data structure or a content portion thereof may be delivered to the recipient and caller respectively.

The automatically generated first SCM data structure may be delivered to a call receiving device of the recipient whereat visual content of the first SCM data structure may be presented to the recipient, such as through a visual caller ID interface on the call-receiving device. By encouraging platform participants to provide their opinion and/or observations about each caller to a participant of the platform, information available in data stores of the platform may include information collected regarding calls from the caller placed to other participants of the SCM platform. This information may be used, optionally along with unverified information provided by platforms members and others about the caller to inform an SCM data structure generation process for the caller. In an example, the information available in data stores of the platform comprises ratings of the caller made by participants of the SCM platform. Once an SCM data structure for the unknown caller is created, it may be associated with the caller so that future calls from the caller may facilitate accessing the generated SCM data structure. In embodiments, rather than sending the existing caller ID information to a recipient device, the generated first SCM data structure may be provided to the call-receiving device using, for example, one or more of the visual caller ID delivery methods described herein. This may be accomplished by replacing an existing caller ID information, if any, with a link to the generated first SCM data structure. As a way for enabling the recipient of a call from an unknown caller to take advantage of the information gathered and evaluations made by other platform participants, a generated SCM data structure for the caller may be provided to an SCM platform application executing on the call receiving device contemporaneously with the incoming call.

A portion of the second SCM data structure delivered to the call originating device may be delivered as a ring-back tone, as an SMS message, as an MMS message, and an iMessage, as a traditional voicemail, as visual voicemail, and the like. In embodiments, the content delivered to the caller's call originating device may include an offer and/or instructions to join the SCM data structure platform, such as to facilitate easier access to platform participants, and the like.

Figure 45:
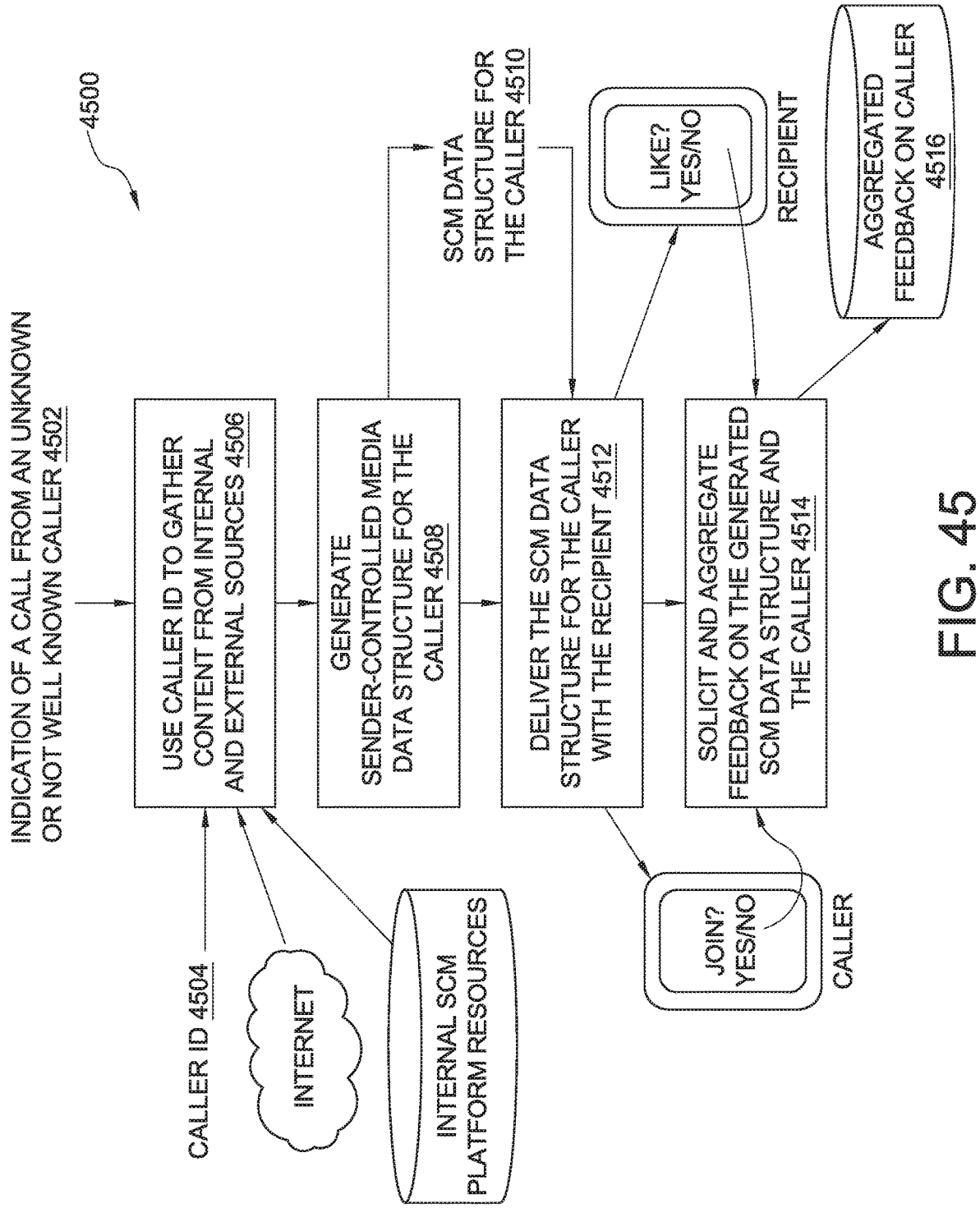
FIG. 45 illustrates a flow for handling unknown callers.

Referring to FIG. 45, a flowchart of a method for unknown caller ID visual caller ID generation and feedback aggregation. In embodiments, visual caller ID, optionally embodied as a portion of an SCM data structure may be generated for unknown callers using the flow 4500. An indication of a call from an unknown caller is detected and/or received at step 4502. The indication is provided to a content gathering function at step 4506 that uses caller ID 4504 for the call to find and gather information about the caller from external (e.g., the Internet) and internal (e.g., internal SCM platform resources). The gathered information may next be used in step 4508 to generate an SCM data structure for the caller 4510. The SCM data structure for the caller 4510 may be provided to an SCM platform communication function that may perform a step 4512 of delivering the SCM data structure to a recipient device, such as an item of visual caller ID that the recipient may accept, reject, or provide feedback on, such as whether or not the visual caller ID is helpful and the like. The SCM data structure or portions thereof, such as an item of visual content may optionally be provided to the caller. Content provided to the caller may be adapted to inform the caller of the presence of an SCM data structure platform operating on behalf of the recipient to screen/augment caller ID information, an invitation to join the platform, and the like. At step 4514 the feedback from the caller, recipient, or both may be aggregated and saved in a data structure 4516 that may be accessible to the platform as an internal platform resource and the like.

In embodiments, an after-call experience for recipients of calls may include the platform taking actions to communicate with the recipient after receipt or completion of a phone call. For calls with a business, the platform can coordinate presentation of content to a call participant (typically a consumer), such as from third-party advertisers, retailers and other partners to deliver coupons, text alerts, reviews, and other retail-based enticements to further continue with a relationship initiated or a prior relationship continued during the call. Other examples of post-call experience may include the platform pairing with partners that want to learn more from caller participants, such as follow-up comments, reviews, debrief efforts, etc. The methods and systems described herein for post call experience may facilitate a range of content delivery and interaction, both direct and real-time (e.g., by presenting interactive content in a user interface of a phone of the call participant) and indirect (e.g., texting, email, and the like).

In embodiments, methods and systems of post-call experience may include using a call-in-process screen to present auto-generated interactive content, such as by use of the SCM data structure methods and systems described herein, optionally interfacing a phone call in/out application or function with an SCM data structure platform recipient/caller application. Post call experience methods and systems that interface with existing phone call applications may provide post call (and/or active call) experienced by, for example configuring a sender-controlled media (SCM) application to receive SCM data-structures from sender participants of an SCM platform. In examples, a sender participant may be any user of the platform, but may preferentially be a party that is interested in gathering further input and/or establishing/continuing a relationship between a sender/caller and a recipient established or referenced in a call. With an SCM data structure application configured, the post-call experience may be activated by interfacing the SCM application with a phone screen control portion of a phone application so that content in the received SCM data structure is provided to the phone application as content to be presented on an electronic display of the phone while the phone call is in progress. Essentially the effect of this to a user is content (e.g., images, text, video, moving content, and the like) may be presented in an in-process call screen on the call participant's smartphone, and the like. Feedback and/or input from a call participant on whose screen the content is displayed may be captured by monitoring, such as with the SCM application, user actions in association with the electronic display (e.g., user clicks, swipes, scrolls, dismissal actions, or simply no action at all) while content is presented during or after the call. To the extent that the user actions may impact what is being presented, there may be a need for updating the SCM data structure for affecting the electronic display responsive to the monitored user actions (such as changing to a "thank you" screen, and the like). Interfacing an SCM data structure application with a phone application may be directed at a phone screen control portion of the phone application. In embodiments, the SCM data structure application, or at least a portion useful for post-call call-participant interaction, may have the phone screen control portion of the phone application integrated into it. In embodiments, the SCM data structure application, or at least a portion useful for post-call call-participant interaction may be integrated into the phone application. Such a portion may include functionality for receiving and processing SCM data structures. Other forms of interfacing an SCM data structure application with a phone application may include, without limitation configuring a real-time channel of communication between the SCM application and the phone application through which SCM content is provided to the phone application and user actions with the phone screen are provided to the SCM application.

Figure 46:
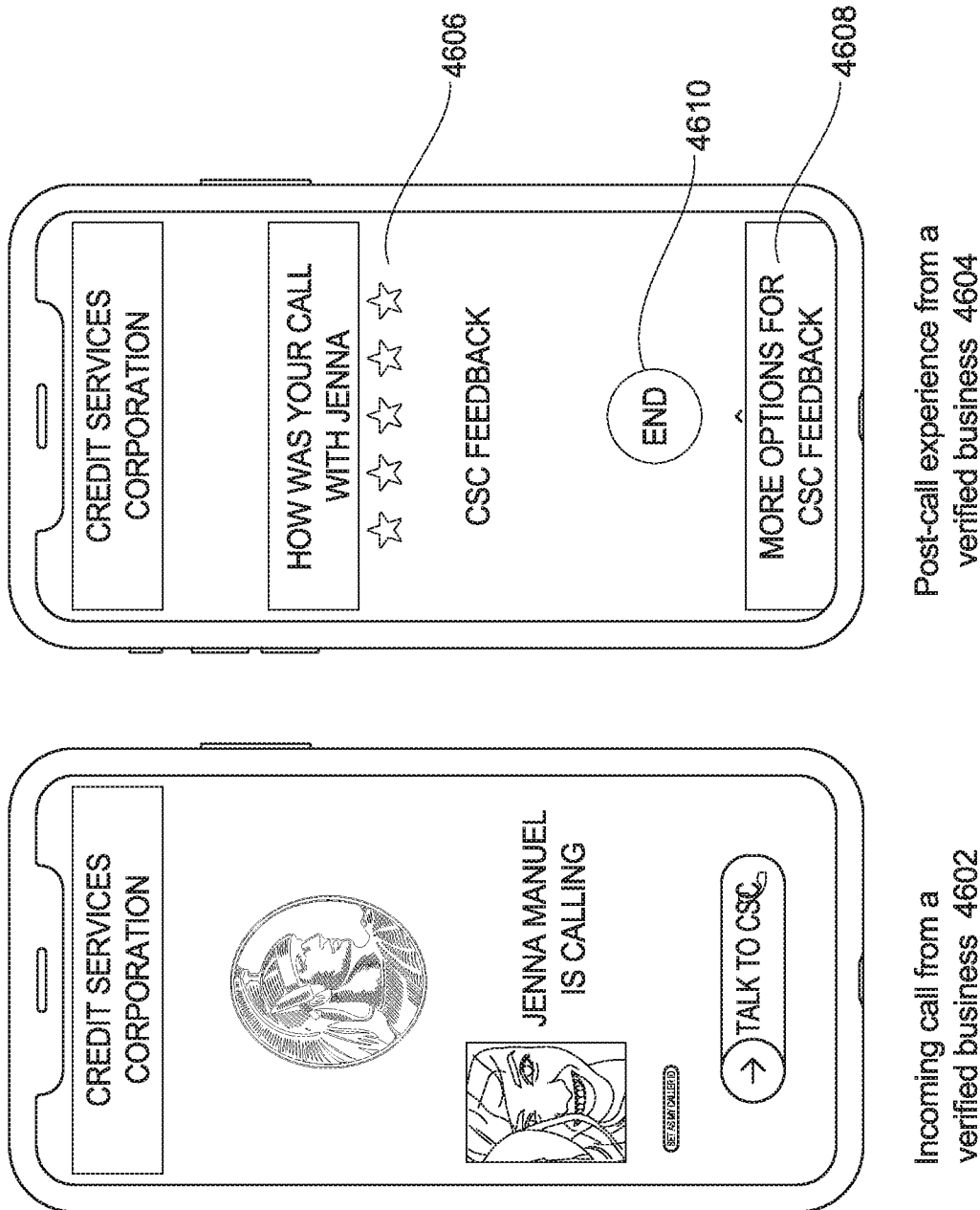
FIG. 46 illustrates post call experience user screens.

Referring to FIG. 46 user screens for post call experience methods and systems are presented. An incoming call may include caller identification features, such as those exemplarily presented in the screen 4602 in which a vendor, Credit Services Corporation (CSC) is placing a call to a recipient. The caller identification features may be presented in association with the methods and systems of visual caller ID presented herein as well as in association with the methods and systems of source-controlled media data structure operation described herein. Upon indication that, for example, a call between CSC and the recipient has ended, but optionally before the phone is returned to its mode of operation prior to the call, a post call experience screen 4604 may be presented to, among other things, gather feedback about the call, such as about the recipient's call with the CSC representative. In embodiments, the context from the caller identification screen, such as the name of the representative may be used in the post-call experience screen to more effectively personalize the post call experience. A portion of the post call experience screen 4604 may include a rating option 4606 for the call, an option to provide more feedback 4608, and an option to end the post call experience 4610, such as without providing feedback.

In embodiments, post-call experience may include determining and/or using an intent or understanding of in-process call content, such as a conversation between call participants using, for example, audio natural language processing, audio-to-text and text natural language processing, machine learning, artificial intelligence and the like to generate content, optionally content in an SCM data structure, that is contextually relevant to the call content and presenting the generated (SCM data structure-optional) content to at least one of the call participants, such as an originator of the call (e.g., a caller) and a call receiver (e.g., a recipient). Call intent-based post call experience may be affected by a process that includes gathering call context for an active call between a caller and a recipient and developing an understanding (e.g., during or after completion of the call) of the call that may include at least one of a call intent, a call participant, and a call-related action (e.g., an action of or associated with a call participant) based on content exchanged between the caller and recipient and optionally context of the call (e.g., time of call and the like). This understanding may be utilized by content suggesting algorithms that determine candidate items of content (e.g., a video, image, photo from a gallery, and the like) that are relevant to at least one of the participants of the call based on the applicability of the content items to the understanding. Content suggesting algorithms, methods and systems that may be applied in examples are described elsewhere herein. With the suggested content in hand, a next step may be to present at least one of the candidate items of content to at least one of the caller and the recipient during (or after) the call in an electronic interface of a device in use during the call. In examples, discussion during a call may be about a product. An understanding developed from the call may be that a first participant uses the product and the second does not. Content suggested may include images from the first participant's social media posting of the first participant using the product. This image may be presented to the first participant for approval of sharing it with the second participant. Based on feedback from the first participant, the content may be configured into an SCM data structure that is delivered to and SCM data structure application of the second participant's phone. The delivered SCM data structure may activate the SCM application on the second participant's phone to present, optionally through a screen control portion of a phone application, the item of content approved by the first participant. Therefore, in embodiments, the electronic interface of the device is adapted to facilitate selection by a first call participant of one of the presented items of content for sharing with a second call participant.

In embodiments, understanding of call content may be based on natural language processing of call audio and/or of a transcript of the call audio, such as a real-time transcript stream, and the like.

In embodiments, call context may optionally be used to enrich an in-call and/or a post call experience. Call context may also be a form of machine-based understanding, such as an understanding of at least one prior call between the caller and the recipient, an understanding of at least one other call made by the caller, and an understanding of at least one other call received by the recipient. Other ways in which other calls of the participants may impact post call experience may include using call context gathered from at least one prior call between the caller and the recipient. The call context may be related to a call participant's use of an SCM data structure platform, such as the context may include sender-controlled media communicated to the recipient contemporaneously with the call, a sender-controlled media platform profile of the caller, a sender-controlled media platform profile of the recipient, and the like.

In embodiments, providing in-call or post-call experience may include configuring a smartphone application that overtakes control of a call-in-process screen. Control of the screen may be taken during the call connection, upon detection of termination of the call, prior to releasing the phone function of the phone, and the like. Such in- or post-call processing may include monitoring call in-process status of a call-participant device, such as a smartphone. Upon detection of call-in-process status indicating, for example, that a call in process has terminated, activating a post-call application of the device, the activating causing a screen update of the device. In embodiments, the screen update could include any content but may preferably include a call to action by the call-participant or informational content pertinent to the call. The call in-process status may indicate instead that control of the phone screen is permitted, such as after an initial period of time while the recipient accepts the call. Example of a call to action may include at least one selectable element presented in the screen that when selected by the call-participant causes an update of a database associated with the call to action based on the at least one selectable element that is selected. As an example, a call to action might be to agree to terms of business between the call participants or to disagree. Based on the call participant's acceptance or rejection of the terms, the database would be updated differently. In embodiments, activating a post-call application may cause a call function of the phone that was active during the call to remain active (essentially hold the phone call function from allowing another call to be initiated or received) until either the screen update is acknowledged by the call-participant (e.g., by the call participant selecting an element in the updated screen), a screen update timer expires, and the user dismisses the updated screen. In embodiments, a screen update may be acknowledged by the call participant when the call participant selects a selectable element presented in the screen update or the call participant dismisses the screen update. The post call screen update application may continue to present the updated screen until the screen update is acknowledged by the call-participant or a screen update timer expires.

In embodiments, methods and systems for effecting a post-call experience may include signaling to a post-call application to take control of the user interface screen of a phone upon detection of an indication of a call ending. The indication may be based on the content of the call (e.g., words spoken during the call) or based on a connection status (e.g., the call network signaling that the connection over which the call was being made has been terminated). An exemplary method thereof may include responsive to receiving an indication that a call in process is ending, activating a post-call application of a call-participant device, which causes a screen update of the device that includes content relevant to the callers or a content of the call and may include a call to action, information and the like. The indication received about the call in process status that indicates an ending is based on the connection status as noted above. however, the indication may be provided by a call function of the device, such as when a user of the device touches the "end" function. However, as noted above, an indication that a post call experience may be activated may be based on the content of the call. In embodiments, the content of the call may be processed with speech analysis of the audio in near-real time as it is being spoken, such as by detecting a call ending word, such as "goodbye" and the like. Other forms of call content analysis may be employed, including natural language understanding and the like that may indicate that a call is coming to an end, or at least a conversation on the call is winding down.

In embodiments, the content provided by the post-call application may include a call to action. Exemplary calls to action may include an offer for a product or service to the call-participant, asking the call-participant their review of the call, soliciting comments about the call, capturing call-participant feedback on one of the call-participants regarding a spammer status of the other of the call-participants, collecting call-participant feedback on an SCM data structure or more likely its content related to the call (e.g., visual caller ID and the like) and the like.

In embodiments, a post call application may update a screen to include content from a sender-control media (SCM) data structure for an originator of the call that is automatically generated based on the call in process. The update and/or call to action may facilitate collecting call-participant feedback on the automatically generated SCM data structure content. In embodiments, another type of feedback that may be collected through a post call experience may include feedback regarding an originator of the call, a good or service referenced during the call, and the like. When one or more of the call participants utilizes SCM data structure methods and systems described herein, the screen update may include visual content provided by one of the call-participants, such as from a sender-controlled media (SCM) data structure associated with one of the call-participants.

In embodiments, methods and systems of call-community influenced caller handling may facilitate protecting recipients of the call community when receiving phone calls from users outside the platform. A form of call/contact firewall may be configured based on the confidence of other users completing phone calls or other communication on the platform to assess whether the unknown caller (unknown message sender) is spam, "bad businesses," other a caller to avoid. In examples, call community members can provide reviews and contribute to confidence intervals of a "safe" caller that can be determined from those reviews and metrics based on "successful" calls relative to spam calls.

Referring to FIG. 47, a block diagram of call community firewall configuration and a flow charge of a process for handling calls by the firewall are depicted. A call community firewall process may include detecting an incoming call at step 4702. Such an incoming call 4712 may be caused by a call from an outside caller 4710, such as caller who is not part of the community. The community firewall 4714 may act as a proxy or filter for such incoming calls 4712 for at least a portion of the members of the community 4718. Caller ID information for the caller 4710 may be used to identify one or more entries in a community firewall database 4716 at step 4704. Based on the information contained in the database 4716, such as input from community members 4720 regarding the caller and/or the member's preferences regarding the firewall operation on behalf of the member(s), at least one call impacting action may be determined at step 4706. Performing call impacting actions at step 4708 may include, for example allowing the call to be passed along to the recipient, augmenting the call with visual caller ID information, providing a SCM data structure for the caller to the recipient's phone, terminating the call, providing an item of content back to the caller (e.g., a voice response), and many other such call impacting actions.

In embodiments, a call/message/contact firewall may activate firewall action(s) on calls destined for or received at a recipient phone of a participant of the firewall. The firewall action(s) may be based on caller ID-based criteria derived from firewall participant experience/feedback with the caller. In embodiments, a call community contact firewall may include a caller ID capture function that retrieves caller ID data (e.g., provided by a call network) for a call (e.g., being placed over the call network) to a recipient who is a member of the call community. The firewall may include a caller ID lookup function that retrieves firewall status from a firewall status database linked through the retrieved caller ID data (e.g., a phone number of the caller). The firewall status database links caller ID data with call community ratings of the caller (e.g., of prior calls associated with the caller ID data) that were received by members of the call community. A firewall action function then performs at least one call impacting action based on the retrieved firewalls status. In embodiments, call impacting actions may include terminating the call, connecting the call to the recipient, redirecting the call to voicemail, redirecting the call to an automated response system.

In embodiments, call impacting actions may include providing call-action recommendations to the recipient and based on the recipient's response thereto taking at least one other call impacting action. Actions that may be taken by or as a result of activating the firewall action function may include generating a multi-media profile based on the caller ID data and delivering that to the recipient. The multi-media profile may be configured into a sender controlled media (SCM) data structure. In embodiments, delivering this form of profiler may include communicating about the profile with an SCM interface function of a call-receiving device of the participant. In embodiments, a multi-media form of the profile may be delivered via a multimedia messaging service (MMS). A caller in this scenario may also be contacted. As an example, a multi-media profile based on the caller ID data may be generated and delivered to a phone number indicated in the caller ID of the call as a multimedia messaging service (MMS) message. Another type of content that can be provided to the caller may include an audio message that can be played for the originator of the call in lieu of placing the call to the recipient. Call actions may further include redirecting the call to a quarantine module, redirecting the call to law enforcement, and the like. In embodiments, the multi-media profile may be configured into a sender controlled media (SCM) data structure but may be accomplished (wholly or partially) with a third-party web application through the SCM that can be created and uploaded through a webapp, application programming interfaces, other links, and the like. By way of these examples, the SCM data structure can be created in and delivered from a third-party portal or a system outside of the platform but then imported into the platform for use as the SCM data structure. In embodiments, a business with many locations and even those still with landlines can establish the SCM data structure to extend an associated multi-media profile during calls or messages to users on the platform. In doing so, a single number may be used for outreach as the caller ID number while more geographically-specific call back numbers can be provided during the call or during post-call experiences and follow-up. In examples, a barbershop with many locations can establish content for the SCM data structure to extend a barbershop related multi-media profile during calls or messages to users on the platform. In embodiments, in call or in message experience can include linking to local barbershops and offering coupons to barbershop locations that are close to each caller or message recipient in the group call and/or message from the barbershop. In embodiments, post-call or post-message experience can also be used to link to local barbershops and other entities to offer coupons, feedback and various post call or post message offerings.

In embodiments, building a contact firewall action set, which may be a data structure, for a caller and/or for protecting one or more recipients may be based on call-community (e.g., SCM platform participant) experience with the caller. Third-party provided and/or publicly accessible information about a sender/caller may also be used in constructing the call-community firewall. A contact firewall for protecting participants of a sender-controlled media (SCM) platform may be generated when a call is received by a participant or when an indication that a sender who is not a participant in a sender-controlled media (SCM) platform has initiated contact with a recipient who is a participant of a sender-controlled media (SCM) platform. Sender information associated with the contact instance (e.g., caller ID, source IP address, recorded name and the like) may be used to pole participants of the platform regarding a spammer status value for the sender, essentially asking the participants if they think the caller is worth passing through to the recipient. In embodiments, the information and poll results may be aggregated across many calls by the caller to members of the platform. The aggregated information may be processed (e.g., summed, averaged, or otherwise analyzed and may produce a spammer value that can be compared to a spammer threshold. If the threshold is exceeded or the aggregation of poll results otherwise indicates that the caller should be blocked, future contacts from the sender can be rejected by the platform so that the sender is blocked from contacting participants of the platform. Such a firewall may be for phone calls, emails, text messages, and any other form of electronic contact. In embodiments, such a firewall may be applied to services that receive and scan hard copy mailings that are then delivered as an electronic contact (e.g., as a daily or weekly email and the like).

In embodiments, a contact firewall for protecting participants of a call group may be generated when a call is received by a member or when an indication that a sender who is not a member has initiated contact with a recipient who is a member. Sender information associated with the contact instance (e.g., caller ID, source IP address, recorded name and the like) may be used to poll members regarding a spammer status value for the sender, essentially asking the members if they think the caller is worth passing through to the recipient. The information and poll results may be aggregated across many calls by the caller to members. The aggregated information may be processed (e.g., summed, averaged, or otherwise analyzed and may produce a spammer value that can be compared to a spammer threshold. If the threshold is exceeded or the aggregation of poll results otherwise indicates that the caller should be blocked, future contacts from the sender can be rejected so that the sender is blocked from contacting the members. Such a firewall may be for phone calls, emails, text messages, and any other form of electronic contact. In embodiments, such a firewall may be applied to services that receive and scan hard copy mailings that are then delivered as an electronic contact (e.g., as a daily or weekly email and the like) to members of the call group.

As noted herein, a contact firewall may take a contact impacting action including terminating the contact, forwarding the contact to the participant, offering the participant the option of accepting the contact, redirecting the contact to an automated response system, redirecting the contact to an off-line message service, such as voice mail or facilitating the sender to leave a text, image, or video message and the like. The firewall may provide additional control to the recipient by providing call-action recommendations to the recipient and based on the recipient's response thereto taking a call impacting action.

In embodiments, actions that may be taken by or as a result of activating the firewall action function may include generating a multi-media profile based on the caller ID data and delivering that to the recipient. The multi-media profile may be configured into a sender controlled media (SCM) data structure. Delivering this form of profiler may include communicating about the profile with an SCM interface function of a call-receiving device of the participant. In embodiments, a multi-media form of the profile may be delivered via a multimedia messaging service (MMS). A caller in this scenario may also be contacted. As an example, a multi-media profile based on the caller ID data may be generated and delivered to a phone number indicated in the caller ID of the call as a multimedia messaging service (MMS) message. In embodiments, another type of content that can be provided to the caller may include an audio message that can be played for the originator of the call in lieu of placing the call to the recipient. Call actions may further include redirecting the call to a quarantine module, redirecting the call to law enforcement, and the like. In embodiments, an action by the firewall may include delivering an audio message to an originator of the call. Such an action may be performed in lieu of placing the call to the recipient.

In embodiments, call community firewall methods and systems may include gathering call originator feedback from members of the community for each call originator originating a call to members of the community. The call community firewall methods may further include storing the feedback from the members in a contact firewall data structure indexed by call originator identification information, such as caller ID and the like. Also, a contact firewall function may be configured that intercepts a call to a member of the group while determining if the feedback in the contact firewall data structure for an originator of the call indicates that an action to impact the call should be taken.

In embodiments, the firewall may operate on calls routed through a VoIP channel and the firewall may be processed on a cloud server. The cloud server may be acting as a call-receiving proxy for the recipients.

In embodiments, sender-controlled media (SCM) platform methods and systems may facilitate authentication of participants in a contact instance (e.g., a phone call, customer service text exchange, and the like). In embodiments, a retailer or other third-parties may rely on the platform to communicate and/or authenticate its users. In examples, a credit card provider, such as American Express can use the platform methods and systems to develop its own SCM data structure that may be communicated to customers engaged with an electronic exchange/contact instance to facilitate trusting the parties. In examples, customers using SCM data structure applications and the like on a digital device, such as a mobile phone can interact with the SCM data structure content presented as a technique for establishing a form of authentication. In examples, the SCM data structure can include information about the participants, including information that may only be known to the participants, such as an authentication key, a picture, a picture of a face, a quiz to establish indemnity, choice of spelling for difficult names, and other media with which interaction can be used to authenticate the user, the retailer, and/or the communication channel. In examples, when a retailer/credit card provider's agent is working with a client (e.g., via phone, text, etc.), the agent can verify identity, name, address or other information by displaying content visually on the client's screen, such as on a locked screen of the client device, optionally using SCM data structure rendering functions described herein. The agent can use this interface to show relevant tutorials, videos photos or other media to enhance the conversation or customer support experience.

Figure 48:
FIG. 48 illustrates call participant validation user screens.

Referring to FIG. 48, a call participant authentication screens that use the SCM data structure methods and systems for providing content to a recipient of a call contemporaneously with a call and other such methods as described herein are depicted. In embodiments, an incoming call from a business may include a call participant verification screen 4802 that may further include an interactive item of content 4804 to facilitate at least partial verification of a recipient of the call. Upon selection of a valid response in the interactive item of content 4804, a second caller identification screen 4806 may be presented to the recipient with the option to talk with the caller 4808.

In embodiments, an authentication system may use user-generated SCM data structure content to authenticate the user for current or future actions. Such an authentication system may affect user authentication by accessing with a processor an instance of a sender-controlled media (SCM) data structure, the structure optionally is secured with encoding and other techniques, of a first contact participant in a digital contact/exchange between the first contact participant and a second contact participant. In examples, a user contacting a vendor may have created an SCM data structure that contains information useful for the vendor authenticating the user such as a password and the like that a person using the user's phone might not know. The exchange may require the user providing a response to SCM data structure content presented in the user interface portion of the digital exchange. Based on the response, real-time content captured through the interface may be used to update the context of the digital exchange (e.g., a real-time captured image of the phone user's face). In embodiments, algorithms may process the updated digital exchange context in an attempt to validate the first contact participant by, for example comparing the real-time content with another portion of the secure SCM data structure. In examples, the real-time captured image of the phone user's face may be matched to a stored image of the validated user's face. Thus, based on a result of the validating, sending a digital signal to the second contact participant that the first contact participant is or is not an authenticated participant. In examples, the content exchange may occur via SCM data structure applications or functions operating on one or both of the user's phone (or computer, laptop, tablet and the like) and the other participants computing system. Optionally algorithms for securely managing access to SCM data structure content for the participants may be executing on a third server that controls access to SCM data structures.

In embodiments, the real-time content is an image captured through a camera interface of the digital device; the image may be a face of a user proximal to the digital device. In embodiments, the real-time content may include audio captured through a microphone interface of the digital device that may produce an audio recording of a user proximal to the digital device. Further, the audio may be a voice recording of a word spoken into the microphone of the digital device. Validation may be based on a comparison of the spoken word with a copy of that spoken word identified in the SCM data structure. The validation may be based on comparing audio files, transcripts of audio files, and a combination thereof. Alternatives for real-time captured content may include a biometric indicator captured through a biometric interface of the digital device, such as a fingerprint, retinal scan, multi-biometric factor metric and the like.

In embodiments, after receiving no answer to a text message or a phone call, a user can generate and submit to the platform for delivering a video follow-up, such as a video message. The video message may be delivered instead of just a voicemail or text message. In examples, the follow-up may be configured as content in an SCM data structure and can be a video "voicemail," follow up details (e.g., notes of the call, transcript of the call, URL, document link and the like), location information, call history, etc. Delivery of the follow-up content may be performed through the SCM platform methods and system described herein or through a third-party communication channel.

Referring to FIG. 49, screens for producing and viewing visual/video voice mail are depicted. In response to a recipient not answering a call, visual voicemail screen 4902 may be presented to the caller on the caller's call originating device screen. The screen 4902 may include options for recording a voice mail, recording a video, capturing a new image, selecting an existing image, typing a text message, and combinations thereof as well as ending the call without leaving any message. In embodiments, the recorded video may be communicated to the voice mail handling function of the recipient, such as a voice mail system that supports playback of audio recordings left by callers. In embodiments, the recorded video may be accessible via an SCM data structure that was created or modified based on the recorded video. A link to a corresponding SCM data structure may be forwarded to the recipient in addition to or in lieu of an audio message. When a call message handling function of the recipient encounters an indication of an SCM data structure being left by the caller, an SCM data structure handling application, a portion of which may execute on the recipient's phone, thereby causing the caller's visual/video message to be played back on the recipient's phone. Such playback is depicted in the video voicemail playback screen 4904.

In embodiments, upon receiving an indication of no-answer by a recipient of a phone call placed from a caller who may be a participant in an SCM data structure platform, a portion of platform, such as a call interface of the caller's phone, may activate an SCM data structure content selection/generation interface on the caller's phone through which the caller can cause to be generated content for use in a follow-up message to the recipient. The generated content may then be delivered to the recipient's phone and/or to the recipient's message storage queue (e.g., voice mail queue). Upon retrieval from the phone message storage queue, an SCM data structure platform interface executing on the recipient's phone, optionally in cooperation with a companion function executing on a server, presents/plays back the content through the user interface of an electronic device through which the recipient accessed the phone message storage queue.

No-answer methods and systems for generating a video message may include receiving an indication of no-answer by a recipient of a call placed from a caller to the recipient. Responsive to that indication, a sender-controlled media (SCM) content selection/generation interface may be activated on the caller's phone so that the caller can generate an item of content, such as a video recording that can then be delivered to the recipient. In embodiments, the SCM content selection/generation interface facilitates capturing content with a camera function of the caller's phone. The content may include at least one of a still image and a video. In embodiments, the generated item of content is an image captured by a camera function of the caller's phone during use of the SCM content selection/generation interface.

In embodiments, producing video content to a caller responsive to the caller receiving an indication of no-answer by a recipient of a call may include activating a sender-controlled media (SCM) content selection/generation interface on the caller's phone through which is caused to be generated an SCM data structure comprising an item of content selected by the caller. Delivering the generated item of content may include delivering at least one of a link to the SCM data structure and the SCM data structure to the recipient's call message storage system, wherein the SCM data structure is linked to the missed call. When the recipient retrieves the stored item of content, such as by retrieving a link to an SCM data structure referencing the item of content, an SCM data structure rendering function of a phone of the recipient may render the content indicated in the retrieval on a display screen of the recipient phone or through any electronic device through which the retrieval is performed. Therefore, a user may retrieve his phone messages with a tablet and can see the video message left by the caller.

In embodiments, standard functions, such as voice mail access functions may work cooperatively with video message generation and delivery functions so that a call message access function executing on a computing device (e.g., voice mail menu in a phone app) causes (optionally automatically) activation of an SCM content playback function thereby rendering the content referenced in the voice mail access retrieval. The SCM content playback function and/or the voice mail access function may access a portion of the SCM data structure content from a networked server.

The generated content may exemplarily include a video captured by the caller through the SCM content selection/generation interface, a location of the caller, a location related to the recipient, an existing SCM data structure of the caller (e.g., a caller SCM data structure profile and the like).

In embodiments, methods and systems of no answer handling may include a replacement for or companion to visual voice mail that determines at least an intent, an object, and an action of a voice mail message and uses the determined information to generate an SCM-based data structure of audio, text, and image-based content, a link to which is stored in the recipient's voice mail queue and may be linked to or used in place of a corresponding voice mail message. Accessing the link with a recipient's voice mail handler app may cause the handler app to activate an SCM platform user interface that takes control of the recipient's phone to present at least one of visual and audio content of the SCM-based data structure.

In embodiments, a method for automatically generating visual content from a voice mail recording may include processing a voice mail recording or transcription thereof with machine learning functions responsive to receiving an indication of the voice mail being recorded. The understanding of the new voice mail by may be accomplished by applying at least one of machine learning and natural language processing to the new voice mail. A visual content selection function may select an item of visual content that is consistent with the understanding and link it to an SCM data structure that facilitates programmatically linking the voice mail to the item of visual content.

In embodiments, a real-time method for automatically generating visual content from a voice mail may include developing an understanding of audio content of a voice mail message being played back on a computing device by applying at least one of machine learning and natural language processing to the playback. Based on the developed understanding, operating a content selection function that facilitates selecting at least one item of visual content that is consistent with the understanding. The visual item of content may then be presented on a display screen of the computing device contemporaneously with the playback. Therefore, while a user is listening to a voice mail message, a visual item of content, such as an image, a video, a photo selected from a user's photo gallery, visual content from the Internet, and a wide range of other sources may be automatically matched to an understanding of the message. In embodiments, the understanding of the audio content may be determined to be an intent of the call, an object of the call, and an action associated with at least one of a caller leaving the message and an intended recipient of the message, and the like. The understanding may be an intent that is based on an intended recipient of the message; it may also be an intent based on a relationship of the intended recipient to a caller leaving the message. In embodiments, selecting is performed by a visual content selection algorithm that performs a best fit of a visual content item to the understanding.

The methods and systems of the present disclosure include receiving an indication of an initiation of a call from a sender to a recipient; determining an SCM data structure for use in configuring visual caller ID for the call based on a selection of a visual content item by an originator of the call; referencing an SCM participant database with an identifier of the recipient; generating an adapted SCM data structure by adapting a portion of the SCM data structure based on an item of information referenced in the SCM participant database with the recipient identifier; and configuring caller ID for the call with a link to the adapted SCM data structure.

In the methods and systems, the selection of a visual content item occurs in a visual caller ID selection interface that when executed on a call-originating device causes, responsive to a user of the call-originating device initiating a call, options for content for a visual caller ID to be presented in the visual caller ID selection interface.

In the methods and systems, the selection of a visual content item occurs in a visual caller ID selection interface that when executed on a call-originating device causes options for content for visual caller ID to be presented in the visual caller ID selection interface.

In the methods and systems, at least one of the options for content comprises an image being provided by a camera of the call-originating device In the methods and systems, the visual caller ID selection interface accesses a camera of the call-originating device and presents content imaged by the camera as one of the options for content.

In the methods and systems, adapting a portion of the SCM data structure comprises adapting a recipient name element of the data structure to correspond to a name of the recipient.

In the methods and systems, adapting a portion of the SCM data structure comprises adapting a recipient group affiliation element of the data structure to correspond to a group affiliation of the recipient.

In the methods and systems, adapting a portion of the SCM data structure is based on a recipient name.

In the methods and systems, adapting a portion of the SCM data structure is based on a group affiliation of the recipient.

In the methods and systems, adapting a portion of the SCM data structure is based on a name of a recipient referenced in the SCM participant database corresponding to a list of exception names.

In the methods and systems, the item of information referenced in the SCM participant database determines a client-status message portion of the SCM data structure.

In the methods and systems, based on the item of information, the client-status message portion is configured as one of an existing client message, a referral client message, and a cold-call client message.

The methods and systems of the present disclosure include receiving an indication of an initiation of a call from a sender to a recipient; determining an amount of time left in an offer from the sender to the recipient; generating an SCM data structure by adapting a portion of the SCM data structure based the amount of time left; and configuring caller ID for the call with a link to the generated SCM data structure.

In the methods and systems, the SCM data structure indicates an image for presentation on an electronic display of a call receiving device upon receipt of the call.

In the methods and systems, the image is an image captured by a camera function of a call-initiating device captured contemporaneously with the initiation of the call.

In the methods and systems, the SCM data structure indicates a video for presentation on an electronic display of a call receiving device upon receipt of the call.

In the methods and systems, the SCM data structure indicates a multi-media object for presentation on an electronic display of a call receiving device upon receipt of the call.

In the methods and systems, the SCM data structure comprises a profile of the caller.

In the methods and systems, the SCM data structure comprises promotional content.

In the methods and systems, the linked SCM data structure comprises at least one of an image and a video captured contemporaneously with the initiating of the call.

The methods and systems of the present disclosure include receiving an indication of an initiation of a call from a sender to a recipient; determining call context comprising at least one of a day, date, and time-of-day of the call; generating an SCM data structure by adapting a portion of the SCM data structure based the determined call context; and configuring caller ID for the call with a link to the generated SCM data structure.

In the methods and systems, the SCM data structure indicates an image for presentation on an electronic display of a call receiving device upon receipt of the call.

In the methods and systems, the image is an image captured by a camera function of a call-initiating device captured contemporaneously with the initiation of the call.

In the methods and systems, the SCM data structure indicates a video for presentation on an electronic display of a call receiving device upon receipt of the call.

In the methods and systems, the SCM data structure indicates a multi-media object for presentation on an electronic display of a call receiving device upon receipt of the call.

In the methods and systems, the SCM data structure comprises a profile of the caller.

In the methods and systems, the SCM data structure comprises promotional content.

In the methods and systems, the linked SCM data structure comprises at least one of an image and a video captured contemporaneously with the initiating of the call.

The methods and systems of the present disclosure include configuring, with a visual caller ID interface executing on a call-originating device, visual caller ID for calls initiated by a user of the call-originating device comprising a temporary item of visual content; and upon receiving an indication of an initiation of a call by the user, providing at least one of the temporary item of visual content and a permanent item of visual content as visual caller id to a recipient of the call based on a relationship between a current time and a time-limited use parameter of the temporary item of visual content.

In the methods and systems, configuring visual caller ID comprises configuring an SCM data structure with at least one of a link to the temporary item of visual content and the temporary item of visual content.

In the methods and systems, the relationship comprises a time remaining for use of the temporary item of visual content.

In the methods and systems, the relationship comprises a use status of the temporary item of visual content.

In the methods and systems, the time-limited use parameter comprises an expiration date for use of the temporary item of visual content.

In the methods and systems, the time-limited use parameter comprises a use start date and a use end date for use of the temporary item of visual content.

In the methods and systems, the time-limited use parameter comprises a calendar date, a pre-date duration of use prior to the calendar date and a post-date duration of use of the temporary item of visual content after the calendar date.

In the methods and systems, the time-limited use parameter comprises a link to an entry in a digital calendar of the user of the call-originating device.

The methods and systems of the present disclosure include detecting initiation of a first call from a first caller to a first recipient of a recipient call group, the call causing visual caller ID content configured based on characteristics of the recipient call group to be accessible by a call receiving device of the first recipient contemporaneously with receipt of the first call by the call receiving device; and in response to detecting initiation of a second call from the first caller to a second recipient of the recipient call group, configuring visual caller ID content for the second call based on a comparison of a characteristic of the recipient group and a corresponding characteristic of the second recipient.

In the methods and systems, the visual caller ID content is made accessible to the call receiving device as a link to an SCM data-structure that comprises at least one of the visual caller ID content and a link thereto.

In the methods and systems, the link to an SCM data-structure is provided to the call receiving device as caller ID information.

In the methods and systems, the visual caller ID content is made accessible to the call receiving device as a link in an SCM data-structure that is provided to the call receiving device contemporaneously with receipt of the first call.

In the methods and systems, the characteristic of the recipient group is a group affiliation identifier.

In the methods and systems, the corresponding characteristic of the second recipient is a status of group affiliation with the recipient group.

In the methods and systems, configuring visual caller ID content for the second recipient comprises adjusting at least one element of the visual caller ID content configured that was based on the characteristics of the recipient group based on a result of the comparison.

In the methods and systems, the corresponding characteristic distinguishes the second recipient from at least one other recipient in the call group.

In the methods and systems, the characteristic of the recipient group indicates business contacts and wherein the distinction indicates whether the second recipient is an internal or external business contact.

In the methods and systems, the corresponding characteristic of the second recipient is a status of the second recipient with respect to an object of the second call In the methods and systems, causing visual caller ID content configured based on characteristics of the recipient call group is performed by selecting a first caller visual caller ID content and adapting the first caller visual caller ID content to reflect the characteristic of the recipient group.

In the methods and systems, configuring visual caller ID content for the second call is further based on at least one of an identifier of a user actuating the initiation of the first call, an objective of the call, a time of the call, and an aspect of a call-receiving device of the recipient.

In the methods and systems, configuring visual caller ID content is based on a characteristic of the call receiving device selected from the list of call receiving device characteristics consisting of device storage capacity, device screen size, device operating mode, and availability of a sender-controlled media (SCM) application on the call receiving device.

In the methods and systems, causing visual caller ID content to be accessible to the call-receiving device comprises transporting at least one of the visual caller ID content and a link thereto over a short-message-service connection to the call-receiving device.

In the methods and systems, causing visual caller ID content to be accessible to the call-receiving device comprises transporting at least one of the visual caller ID content and a link thereto over an imessage channel linking the first caller with the call-receiving device.

The methods and systems of the present disclosure include detecting initiation of a call from a caller to a recipient, wherein the call causes visual caller ID content to be accessible to a visual caller ID application executing on a call-receiving device of the recipient; pausing delivery of the call until a call delivery signal is detected; while pausing delivery of the call, presenting a visual caller ID configuration user interface on a call-originating device of the caller, the visual caller ID configuration user interface facilitating providing the visual caller ID content for the call by enabling selection from a plurality of visual caller ID content options to the caller, wherein the visual caller ID content options include: existing content, at least one alternate content, and generation of content via a camera function of the call originating device; and responsive to a user selection of one of the visual caller ID content options, generating the call delivery signal for delivery of the call.

In the methods and systems, the visual caller ID configuration user interface uses audio/video recording capabilities of the caller's device to configure the visual caller ID content.

In the methods and systems, detecting initiation of the call is performed by a caller ID interrupt function of the caller's device that further causes the pausing of delivery.

The methods and systems of the present disclosure further comprising an option in the interface for designating the selected visual caller ID to be used for calls made to the recipient.

In the methods and systems, the interface presents an indication of visual caller ID content in a sender-controlled media data structure as the existing content.

In the methods and systems, the existing visual caller ID content is recipient-specific.

In the methods and systems, the existing visual caller ID SCM content is adapted on-the-fly for the recipient.

In the methods and systems, the existing visual caller ID content is one of an emoji, a gif, and a sticker.

In the methods and systems, the existing visual caller ID content is designated for calls made by the caller to members of a group of which the recipient is a member.

In the methods and systems, the call includes multiple recipients and the existing content is designated for a caller-group comprising the multiple recipients and the user selected option is used as visual caller ID content for a subset of the recipients, wherein the subset of recipients is selected by the caller in the interface.

In the methods and systems, pausing the delivery of the call is based on a characteristic of the recipient.

In the methods and systems, the characteristic is a relationship between the recipient and a group of recipients to whom the call is directed.

The methods and systems of the present disclosure include detecting initiation of a call from a caller to a recipient, wherein the call causes visual caller ID content to be accessible to a visual caller ID application executing on a call-receiving device of the recipient; pausing delivery of the call until a call delivery signal is detected; and while pausing delivery of the call, producing the visual caller ID content by a sequence of steps comprising: capturing live content comprising at least one of audio and text input to a call-originating device by the caller; processing the captured live content to determine an intent of the live content; automatically selecting a visual element based on the intent, combining the selected visual element with the live content thereby producing the visual caller ID content: and generating the call delivery signal for delivery of the call.

In the methods and systems, processing comprises audio to text conversion of the captured live content.

In the methods and systems, processing comprises natural language processing (NLP) of a least one of the captured text and the text converted from the captured audio to determine the intent.

In the methods and systems, processing comprises natural language processing (NLP) of a least one of the captured text and the text converted from the captured audio to determine a subject of the call.

In the methods and systems, processing comprises natural language processing (NLP) of a least one of the captured text and the text converted from the captured audio to determine an action of the call.

In the methods and systems, automatically selecting is performed by a visual content selection algorithm that performs a best fit of a visual content item to the determined intent.

In the methods and systems, the determined intent is based on the recipient.

In the methods and systems, the determined intent is based on a relationship of the recipient to a group of recipients associated with the call.

In the methods and systems, pausing the delivery of the call is based on a characteristic of the recipient.

In the methods and systems, the characteristic is a relationship between the recipient and a group of recipients to whom the call is directed.

The methods and systems of the present disclosure include configuring a sender-controlled media (SCM) data structure to include content selected in response to an understanding of digital content captured by a call originating device, comprising: capturing content by the call originating device comprising at least one of audio, video and text input to a call-originating device by the caller; processing the captured live content to determine an intent of the live content automatically selecting at least one visual element based on the intent; presenting the at least one visual element in an electronic user interface of the call originating device; and based on a selection of at least one of the at least one visual element combining the selected visual element with the live content thereby producing a caller story: and forwarding the caller story to a recipient.

An unknown caller method comprising: receiving an indication that a caller who is not a participant in a sender-controlled media (SCM) platform has initiated a call to a recipient who is a participant of a sender-controlled media (SCM) platform; using caller ID information of the call to gather content pertaining to the caller from a plurality of sources including information available in data stores of the platform and public number search information; generating a sender-controlled media (SCM) data structure based on the gathered content; delivering the generated SCM data structure to a call receiving device of the recipient; and presenting content from the generated SCM data structure to the recipient in a visual caller ID interface on the call-receiving device.

In the methods and systems, the information available in data stores of the platform comprises information collected regarding calls from the caller placed to other participants of the SCM platform.

In the methods and systems, the information available in data stores of the platform comprises unverified information provided by platforms members about the caller.

In the methods and systems, the information available in data stores of the platform comprises ratings of the caller made by participants of the SCM platform.

In the methods and systems, the generated SCM data structure is associated with the caller in the platform.

In the methods and systems, the generated SCM data structure is provided to the call-receiving device instead of the caller ID information.

In the methods and systems, caller ID information for the call is replaced with a link to the generated SCM data structure.

In the methods and systems, the generated SCM data structure is provided to an SCM platform application executing on the call receiving device contemporaneously with the initiated call.

An unknown contactor method comprising: receiving an indication that a sender who is not a participant in a sender-controlled media (SCM) platform has initiated contact with a recipient who is a participant of a sender-controlled media (SCM) platform; using sender information associated with the contact instance to gather content pertaining to the sender from a plurality of sources including information available in data stores of the platform and public search sources; generating a sender-controlled media (SCM) data structure based on the gathered content; delivering the generated SCM data structure to a contact-receiving device of the recipient; and presenting content from the generated SCM data structure to the recipient in an SCM interface on the contact-receiving device.

In the methods and systems, the information available in data stores of the platform comprises information collected regarding contact by the sender to other participants of the SCM platform.

In the methods and systems, the information available in data stores of the platform comprises unverified information provided by platforms members about the sender.

In the methods and systems, the information available in data stores of the platform comprises ratings of the sender made by participants of the SCM platform.

In the methods and systems, the generated SCM data structure is associated with the sender in the platform.

In the methods and systems, the generated SCM data structure is provided to the call-receiving device.

In the methods and systems, the generated SCM data structure is provided to an SCM platform application executing on the contact receiving device contemporaneously with the initiated contact.

The methods and systems of the present disclosure include receiving an indication that a caller who is not a participant in a sender-controlled media (SCM) platform has initiated a call to a recipient who is a participant of a sender-controlled media (SCM) platform; using caller ID information of the call to gather content pertaining to the caller from a plurality of sources including information available in data stores of the platform and public number search information; generating a sender-controlled media (SCM) data structure based on the gathered content; and delivering a portion of the SCM data structure to a call originating device of the caller.

In the methods and systems, the portion of the SCM data structure is delivered to the caller's call originating device as a ring-back tone.

In the methods and systems, the portion of the SCM data structure is delivered to the caller's call originating device as an SMS message.

In the methods and systems, the portion of the SCM data structure is delivered to the caller's call originating device as an MMS message.

In the methods and systems, the portion of the SCM data structure is delivered to the caller's call originating device as an imessage.

In the methods and systems, the portion of the SCM data structure is delivered to the caller's call originating device as visual voicemail.

In the methods and systems, the portion of the SCM data structure is delivered to the caller's call originating device as a voicemail.

In the methods and systems, the portion of the SCM data structure comprises an offer to join the platform.

The methods and systems of the present disclosure include receiving an indication that a caller who is not a participant in a sender-controlled media (SCM) platform has initiated a call to a recipient who is a participant of a sender-controlled media (SCM) platform; using caller ID information of the call to gather content pertaining to the caller from a plurality of sources including information available in data stores of the platform and public number search information; generating a recipient sender-controlled media (SCM) data structure based on the gathered content; delivering the generated recipient SCM data structure to a call receiving device of the recipient; presenting content from the generated recipient SCM data structure to the recipient in a visual caller ID interface on the call-receiving device; generating a sender (SCM) data structure based on the gathered content; and delivering a portion of the sender SCM data structure to a call originating device of the caller.

In the methods and systems, the information available in data stores of the platform comprises information collected regarding calls from the caller placed to other participants of the SCM platform.

In the methods and systems, the information available in data stores of the platform comprises unverified information provided by platforms members about the caller.

In the methods and systems, the information available in data stores of the platform comprises ratings of the caller made by participants of the SCM platform.

In the methods and systems, the generated recipient SCM data structure is associated with the caller in the platform.

In the methods and systems, the generated recipient SCM data structure is provided to the call-receiving device instead of the caller ID information.

In the methods and systems, caller ID information for the call is replaced with a link to the generated recipient SCM data structure.

In the methods and systems, the generated recipient SCM data structure is provided to an SCM platform application executing on the call receiving device contemporaneously with the initiated call.

In the methods and systems, the portion of the sender SCM data structure is delivered to the caller's call originating device as a ring-back tone.

In the methods and systems, the portion of the sender SCM data structure is delivered to the caller's call originating device as an SMS message.

In the methods and systems, the portion of the sender SCM data structure is delivered to the caller's call originating device as an MMS message.

In the methods and systems, the portion of the sender SCM data structure is delivered to the caller's call originating device as an imessage.

In the methods and systems, the portion of the sender SCM data structure is delivered to the caller's call originating device as visual voicemail.

In the methods and systems, the portion of the sender SCM data structure is delivered to the caller's call originating device as a voicemail.

In the methods and systems, the portion of the sender SCM data structure comprises an offer to join the platform.

The methods and systems of the present disclosure include configuring a sender-controlled media (SCM) application to receive SCM data-structures from sender participants of an SCM platform; interfacing the SCM application with a phone screen control portion of a phone application so that content in the received SCM data structure is provided to the phone application as content to be presented on an electronic display of the phone while the phone call is in progress; monitoring with the SCM application user actions in the electronic display while content is presented during the call; and updating the SCM data structure for affecting the electronic display responsive to the monitored user actions.

In the methods and systems, interfacing comprises integrating the phone screen control portion of the phone application with the SCM application.

In the methods and systems, interfacing comprises integrating SCM application functionality for receiving and processing SCM data structures into the phone application.

In the methods and systems, interfacing comprises configuring a real-time channel of communication between the SCM application and the phone application through which SCM content is provided to the phone application and user actions with the phone screen are provided to the SCM application.

The methods and systems of the present disclosure include gathering call context for an active call between a caller and a recipient; developing an understanding during the call of at least one of a call intent, a call participant, and a participant action based on content exchanged between the caller and recipient and the call context; applying content suggesting algorithms that determine candidate items of content that are relevant to at least one of the participants of the call based on applicability of the content items to the understanding; and presenting at least one of the candidate items of content to at least one of the caller and the recipient during the call in an electronic interface of a device in use during the call.

In the methods and systems, the electronic interface of the device is adapted to facilitate selection by a first call participant of one of the presented items of content for sharing with a second call participant.

In the methods and systems, the understanding is based on natural language processing of call audio.

In the methods and systems, the understanding is based on natural language processing of a transcript of the call audio In the methods and systems, the call context comprises an understanding of at least one prior call between the caller and the recipient.

In the methods and systems, the call context comprises an understanding of at least one other call made by the caller.

In the methods and systems, the call context comprises an understanding of at least one other call received by the recipient.

In the methods and systems, the call context comprises sender-controlled media communicated to the recipient contemporaneously with the call.

In the methods and systems, the call context comprises a sender-controlled media platform profile of the caller.

In the methods and systems, the call context comprises a sender-controlled media platform profile of the recipient.

In the methods and systems, the call context comprises call context gathered from at least one prior call between the caller and the recipient.

The methods and systems of the present disclosure include monitoring call-in process status of a call-participant device; and upon detection of call-in-process status indicating that a call-in process has terminated, activating a post-call application of the device, the activating causing a screen update of the device that includes at least one of a call to action by the call-participant and informational content pertinent to the call.

In the methods and systems, the call to action comprises at least one selectable element presented in the screen that when selected by the call-participant causes an update of a database associated with the call to action based on the at least one selectable element that is selected.

In the methods and systems, activating further causes a call function of the phone that was active during the call to remain active until at least one of the screen update is acknowledged by the call-participant and a screen update timer expires In the methods and systems, the screen update continues until at least one of the screen update is acknowledged by the call-participant and a screen update timer expires In the methods and systems, the screen update is acknowledged by the call-participant comprises at least one of the user selecting a selectable element presented in the screen update and the user dismisses the screen update.

The methods and systems of the present disclosure include activating a post-call application of a call-participant device responsive to receiving an indication that a call-in process is ending. The activating causes a screen update of the device that includes at least one of a call to action by the call-participant and informational content pertinent to the call.

In the methods and systems, the indication that a call-in process is ending is connection-based.

In the methods and systems, the indication that a call-in process is ending is provided by a call function of the device.

In the methods and systems, the indication that a call-in process is ending is call content-based.

In the methods and systems, a call content-based indication of a call-in process ending is based on speech analysis of call audio.

In the methods and systems, speech analysis of call audio detects at least one call ending keyword spoken by at least one of the call-participants.

In the methods and systems, the call to action comprises an offer for a product or service to the call-participant.

In the methods and systems, the call to action comprises asking the call-participant their review of the call.

In the methods and systems, the call to action comprises soliciting comments about the call.

In the methods and systems, the call to action facilitates the capture of call-participant feedback on one of the call-participants regarding a spammer status of one of the call-participants.

In the methods and systems, the screen update comprises content from a sender-control media (SCM) data structure for an originator of the call that is automatically generated based on the call-in process.

In the methods and systems, the call to action of the screen update facilitates collecting call-participant feedback on the SCM data structure content.

In the methods and systems, the screen update facilitates collecting call-participant feedback regarding an originator of the call.

In the methods and systems, the screen update facilitates collecting call-participant feedback on a good or service referenced during the call.

In the methods and systems, the screen update comprises visual content provided by one of the call-participants.

In the methods and systems, the visual content is retrieved from a sender-controlled media (SCM) data structure associated with one of the call-participants.

The methods and systems of the present disclosure include a call community contact firewall that includes a caller ID capture function retrieving caller ID data provided by a call network for a call being placed over the call network to a recipient who is a member of the call community; a caller ID lookup function retrieving firewall status from a firewall status database based on the retrieved caller ID data, the firewall status database linking caller ID data with call community ratings of prior calls associated with the caller ID data that were received by members of the call community; and a firewall action function that performs at least one call impacting action based on the retrieved firewalls status.

In the methods and systems, the at least one call impacting action comprises terminating the call.

In the methods and systems, the at least one call impacting action comprises connecting the call to the participant.

In the methods and systems, the at least one call impacting action comprises redirecting the call to voicemail In the methods and systems, the at least one call impacting action comprises redirecting the call to an automated response system.

In the methods and systems, the at least one call impacting action comprises providing call-action recommendations to the recipient and based on the recipient's response thereto taking at least one other call impacting action.

In the methods and systems, the firewall action function further facilitates generating a multi-media profile based on the caller ID data and delivering that to the recipient.

In the methods and systems, the multi-media profile comprises a sender controlled media (SCM) data structure and delivering to the recipients comprises communicating about the profile with an SCM interface function of a call-receiving device of the participant.

In the methods and systems, the multi-media profile is delivered via a multimedia messaging service (MMS).

In the methods and systems, the firewall action function further facilitates generating a multi-media profile based on the caller ID data and delivering that to a phone number indicated in the caller ID of the call as a multimedia messaging service (MMS) message.

In the methods and systems, the multi-media profile comprises a sender controlled media (SCM) data structure and delivering to the recipients comprises communicating about the profile with an SCM interface function of a call-receiving device of the participant.

In the methods and systems, the call impacting action comprises delivering an audio message to an originator of the call in lieu of placing the call to the recipient.

A method of generating a contact firewall for protecting participants of a sender-controlled media (SCM) platform, the method comprising: receiving an indication that a sender who is not a participant in a sender-controlled media (SCM) platform has initiated contact with a recipient who is a participant of a sender-controlled media (SCM) platform; using sender information associated with the contact instance to pole participants of the platform regarding a spammer status value for the sender; aggregating the spammer status values received in the pole; and based on a comparison of the aggregated spammer status values with a spammer threshold, causing future contacts from the sender to be rejected by the platform so that the sender is blocked from contacting participants of the platform.

A method of generating a contact firewall for protecting members of a call group, the method comprising: receiving an indication that a sender who is not a member of the call group has initiated contact with a recipient who is a member of the call group; using sender information associated with the contact instance to pole members of the call group regarding a spammer status value for the sender; aggregating the spammer status values received in the pole; and based on a comparison of the aggregated spammer status values with a spammer threshold, causing future contacts from the sender to be acted upon by the contact firewall to facilitate unwanted callers being blocked from contacting members of the call group.

In the methods and systems, the contact firewall acts upon contacts from the sender by taking at least one call impacting action.

In the methods and systems, the at least one call impacting action comprises terminating the call.

In the methods and systems, the at least one call impacting action comprises connecting the call to the participant.

In the methods and systems, the at least one call impacting action comprises redirecting the call to voicemail In the methods and systems, the at least one call impacting action comprises redirecting the call to an automated response system.

In the methods and systems, the at least one call impacting action comprises providing call-action recommendations to the recipient and based on the recipient's response thereto taking at least one other call impacting action.

In the methods and systems, the at least one call impacting action further facilitates generating a multi-media profile based on the caller ID data and delivering that to the recipient.

In the methods and systems, the multi-media profile comprises a sender controlled media (SCM) data structure and delivering to the recipients comprises communicating about the profile with an SCM interface function of a call-receiving device of the participant.

In the methods and systems, the multi-media profile is delivered via a multimedia messaging service (MMS).

In the methods and systems, the at least one call impacting action further facilitates generating a multi-media profile based on the caller ID data and delivering that to a phone number indicated in the caller ID of the call as a multimedia messaging service (MMS) message.

In the methods and systems, the multi-media profile comprises a sender controlled media (SCM) data structure and delivering to the recipients comprises communicating about the profile with an SCM interface function of a call-receiving device of the participant.

In the methods and systems, the at least one call impacting action comprises delivering an audio message to an originator of the call in lieu of placing the call to the recipient.

The methods and systems of the present disclosure include for each call originator originating a call to members of a call group, gathering call originator feedback from the members; storing the feedback from the members in a contact firewall data structure indexed by call originator identification information; and configuring a contact firewall function that intercepts a call to a member of the group while determining if the feedback in the contact firewall data structure for an originator of the call indicates that an action to impact the call should be taken.

In the methods and systems, call originator identification information comprises caller ID data;

In the methods and systems, the action to impact the call comprises terminating the call.

In the methods and systems, the action to impact the call comprises connecting the call to the participant.

In the methods and systems, the action to impact the call comprises redirecting the call to voicemail.

In the methods and systems, the action to impact the call comprises redirecting the call to an automated response system.

In the methods and systems, the action to impact the call comprises providing call-action recommendations to the recipient and based on the recipient's response thereto taking at least one other call impacting action.

In the methods and systems, the action to impact the call further facilitates generating a multi-media profile based on the caller ID data and delivering that to the recipient.

In the methods and systems, the multi-media profile comprises a sender controlled media (SCM) data structure and delivering to the recipients comprises communicating about the profile with an SCM interface function of a call-receiving device of the participant.

In the methods and systems, the multi-media profile is delivered via a multimedia messaging service (MMS).

In the methods and systems, the action to impact the call further facilitates generating a multi-media profile based on the caller ID data and delivering that to a phone number indicated in the caller ID of the call as a multimedia messaging service (MMS) message.

In the methods and systems, the multi-media profile comprises a sender controlled media (SCM) data structure and delivering to the recipients comprises communicating about the profile with an SCM interface function of a call-receiving device of the participant.

In the methods and systems, the action to impact the call comprises delivering an audio message to an originator of the call in lieu of placing the call to the recipient.

The methods and systems of the present disclosure include accessing with a processor an instance of a secure sender-controlled media (SCM) data structure of a first contact participant in a digital exchange between the first contact participant and a second contact participant; updating the instance with real-time content captured through an interface of a digital device through which the first contact participant participates in the digital exchange; validating with the processor the first contact participant by comparing the real-time content with another portion of the secure SCM data structure; and based on a result of the validating, sending a digital signal to the second contact participant that the first contact participant is an authenticated participant.

In the methods and systems, the real-time content comprises an image captured through a camera interface of the digital device.

In the methods and systems, the image is a face of a user proximal to the digital device.

In the methods and systems, the real-time content comprises audio captured through a microphone interface of the digital device.

In the methods and systems, the audio is a voice recording of a user proximal to the digital device.

In the methods and systems, the audio is of a voice recording of the word spoken by a user proximal to the digital device, the work identified in the SCM data structure.

In the methods and systems, the real-time content comprises a biometric indicator captured through a biometric interface of the digital device.

In the methods and systems, the biometric indicator is a fingerprint.

The methods and systems of the present disclosure include receiving an indication of no-answer by a recipient of a call placed from a caller to the recipient; in response to receiving the indication, activating a sender-controlled media (SCM) content selection/generation interface on the caller's phone through which is caused to be generated an item of content; delivering the item of content to the recipient's call message storage system, wherein the item of content is linked to the missed call.

In the methods and systems, the SCM content selection/generation interface facilitates capturing content with a camera function of the caller's phone, the content comprising at least one of a still image and a video.

In the methods and systems, the generated item of content is an image captured by a camera function of the caller's phone during use of SCM content selection/generation interface.

In the methods and systems, causing an item of content to be generated comprises accessing a camera function of the caller's phone through which at least one of an image and a video is captured as the item of content.

The methods and systems of the present disclosure include receiving an indication of no-answer by a recipient of a call placed from a caller to the recipient; in response to receiving the indication, activating a sender-controlled media (SCM) content selection/generation interface on the caller's phone through which is caused to be generated an SCM data structure comprising an item of content selected by the caller; delivering at least one of a link to the SCM data structure and the SCM data structure to the recipient's call message storage system, wherein the SCM data structure is linked to the missed call.

In the methods and systems, the item of content comprises a video captured by the caller through the SCM content selection/generation interface.

In the methods and systems, the item of content comprises a location.

In the methods and systems, the location is a location of the caller.

In the methods and systems, the location is a location to which the recipient is directed.

In the methods and systems, the item of content comprises an SCM data structure of the caller.

The methods and systems of the present disclosure include receiving an indication of a new digital voice mail message; developing an understanding of the new voicemail by applying at least one of machine learning and natural language processing to the new voicemail; selecting an item of visual content that is consistent with the understanding; and generating a sender-controlled media (SCM) data structure that facilitates linking the voice mail to the item of visual content.

In the methods and systems, the understanding of the audio content comprises an intent of the call, an object of the call, and an action associated with at least one of a caller leaving the message and an intended recipient of the message.

In the methods and systems, selecting is performed by a visual content selection algorithm that performs a best fit of a visual content item to the understanding.

In the methods and systems, the understanding comprises an intent that is based on an intended recipient of the message.

In the methods and systems, the determined intent is based on a relationship of the intended recipient to a caller leaving the message.

The methods and systems of the present disclosure include developing an understanding of audio content of a voice mail message being played back on a computing device by applying at least one of machine learning and natural language processing to the playback; selecting at least one item of visual content that is consistent with the understanding; and presenting the at least one item of visual content on a display screen of the computing device contemporaneously with the playback.

In the methods and systems, the understanding of the audio content comprises an intent of the call, an object of the call, and an action associated with at least one of a caller leaving the message and an intended recipient of the message.

In the methods and systems, selecting is performed by a visual content selection algorithm that performs a best fit of a visual content item to the understanding.

In the methods and systems, the understanding comprises an intent that is based on an intended recipient of the message.

In the methods and systems, the determined intent is based on a relationship of the intended recipient to a caller leaving the message.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network.

The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims unless a different meaning is expressly provided or otherwise clear from the context. So, for example performing the step of X includes any suitable method for causing another party such as a remote user, a remote processing resource (e.g., a server or cloud computing environment) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not to be located within a particular jurisdiction.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A method comprising:
receiving, at a unified messaging application associated with a unified messaging platform, an indication of no-answer by a recipient of a call placed from a caller to the recipient, wherein the unified messaging application is separate from a native messaging application utilized to place the call;
in response to receiving the indication, activating a sender-controlled media (SCM) content selection/generation interface via the unified messaging application on the caller's phone through which is caused to be generated an item of content; and
delivering the item of content to the recipient's call message storage system via the unified messaging platform, wherein the item of content is linked to the missed call.

2. The method of claim 1, wherein the SCM content selection/generation interface facilitates capturing content with a camera function of the caller's phone, the content comprising at least one of a still image and a video.

3. The method of claim 1, wherein the generated item of content is an image captured by a camera function of the caller's phone during use of SCM content selection/generation interface.

4. The method of claim 1, wherein causing an item of content to be generated comprises accessing a camera function of the caller's phone through which at least one of an image and a video is captured as the item of content.

5. A method comprising:
receiving, at a unified messaging application associated with a unified messaging platform, an indication of no-answer by a recipient of a call placed from a caller to the recipient, wherein the unified messaging application is separate from a native messaging application utilized to place the call;
in response to receiving the indication, activating a sender-controlled media (SCM) content selection/generation interface via the unified messaging application on the caller's phone through which is caused to be generated an SCM data structure comprising an item of content selected by the caller; and
delivering at least one of a link to the SCM data structure and the SCM data structure to the recipient's call message storage system via the unified messaging platform, wherein the SCM data structure is linked to the missed call.

6. The method of claim 5, further comprising responsive to retrieval of at least one of an SCM data structure link, an SCM data structure and an item of content from the call message storage system, activating a SCM rendering function of a phone of the recipient that renders the content indicated in the retrieval on a display screen of the recipient phone.

7. The method of claim 5, further comprising responsive to retrieval of at least one of an SCM data structure link, an SCM data structure and an item of content from the call message storage system, rendering the content indicated in the retrieval on a display screen of an electronic device through which the retrieval is performed.

8. The method of claim 5, wherein a call message access function executing on a computing device causes, responsive to retrieving at least one of an SCM data structure link and an SCM data structure from the call message storage system activation of a SCM content playback function thereby rendering the content referenced in the retrieval for the recipient.

9. The method of claim 5, further comprising responsive to retrieval of at least one of an SCM data structure link, an SCM data structure and an item of content from the call message storage system, accessing the generated content in a database of SCM data structures from a networked server and rendering the generated content for the recipient.

10. The method of claim 5, wherein the item of content comprises a video captured by the caller through the SCM content selection/generation interface.

11. The method of claim 5, wherein the item of content comprises a location.

12. The method of claim 11, wherein the location is a location of the caller.

13. The method of claim 11, wherein the location is a location to which the recipient is directed.

14. The method of claim 5, wherein the item of content comprises an SCM data structure of the caller.

15. A caller computing device, comprising:
one or more processors; and
a non-transitory computer-readable storage medium having a plurality of instructions stored thereon, which, when executed by the one or more processors, cause the one or more processors to perform operations comprising:
receiving, at a unified messaging application associated with a unified messaging platform, an indication of no-answer by a recipient of a call placed from a caller to the recipient;
in response to receiving the indication, activating a sender-controlled media (SCM) content selection/ generation interface via the unified messaging application on the caller computing device through which is caused to be generated an item of content; and delivering the item of content to the recipient's call message storage system via the unified messaging platform, wherein the item of content is linked to the missed call.

16. The caller computing device of claim 15, wherein the SCM content selection/generation interface facilitates capturing content with a camera function of the caller computing device, the content comprising at least one of a still image and a video.

17. The caller computing device of claim 15, wherein the generated item of content is an image captured by a camera function of the caller computing device during use of SCM content selection/generation interface.

18. The method of claim 15, wherein causing an item of content to be generated comprises accessing a camera function of the caller computing device through which at least one of an image and a video is captured as the item of content.

19. A caller computing device, comprising:
receiving, at a unified messaging application associated with a unified messaging platform, an indication of no-answer by a recipient of a call placed from a caller to the recipient, wherein the unified messaging application is separate from a native messaging application utilized to place the call;

in response to receiving the indication, activating a sender-controlled media (SCM) content selection/generation interface via the unified messaging application on the caller computing device through which is caused to be generated an SCM data structure comprising an item of content selected by the caller; and delivering at least one of a link to the SCM data structure and the SCM data structure to the recipient's call message storage system via the unified messaging platform, wherein the SCM data structure is linked to the missed call.

20. The caller computing device of claim 19, further comprising responsive to retrieval of at least one of an SCM data structure link, an SCM data structure and an item of content from the call message storage system, activating a SCM rendering function of a phone of the recipient that renders the content indicated in the retrieval on a display screen of the recipient phone.

21. The caller computing device of claim 19, further comprising responsive to retrieval of at least one of an SCM data structure link, an SCM data structure and an item of content from the call message storage system, rendering the content indicated in the retrieval on a display screen of an electronic device through which the retrieval is performed.

22. The caller computing device of claim 19, wherein a call message access function executing on an electronic device causes, responsive to retrieving at least one of an SCM data structure link and an SCM data structure from the call message storage system activation of a SCM content playback function thereby rendering the content referenced in the retrieval for the recipient.

23. The caller computing device of claim 19, further comprising responsive to retrieval of at least one of an SCM data structure link, an SCM data structure and an item of content from the call message storage system, accessing the generated content in a database of SCM data structures from a networked server and rendering the generated content for the recipient.

24. The caller computing device of claim 19, wherein the item of content comprises a video captured by the caller through the SCM content selection/generation interface.

25. The caller computing device of claim 19, wherein the item of content comprises a location.

26. The caller computing device of claim 25, wherein the location is a location of the caller.

27. The method of claim 25, wherein the location is a location to which the recipient is directed.

* * * * *